(12) United States Patent
Xia et al.

(10) Patent No.: US 10,579,257 B2
(45) Date of Patent: Mar. 3, 2020

(54) MANAGING REAL-TIME HANDWRITING RECOGNITION

(71) Applicant: Apple Inc., Cupertino, CA (US)

(72) Inventors: Mei-Qun Xia, San Francisco, CA (US); Jannes G. Dolfing, Daly City, CA (US); Ryan S. Dixon, Mountain View, CA (US); Karl M. Groethe, San Francisco, CA (US); Karan Misra, Mountain View, CA (US); Jerome R. Bellegarda, Saratoga, CA (US); Ueli Meier, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 15/898,025

(22) Filed: Feb. 15, 2018

(65) Prior Publication Data
US 2018/0173415 A1    Jun. 21, 2018

Related U.S. Application Data

(63) Continuation of application No. 14/290,935, filed on May 29, 2014, now Pat. No. 9,898,187.
(Continued)

(51) Int. Cl.
| G06F 3/048 | (2013.01) |
| G06F 3/0488 | (2013.01) |
| G06K 9/00 | (2006.01) |
| G06F 3/01 | (2006.01) |
| G06F 3/0482 | (2013.01) |
| G06F 17/24 | (2006.01) |
| G06F 17/27 | (2006.01) |
| G06F 3/00 | (2006.01) |

(52) U.S. Cl.
CPC .......... *G06F 3/04883* (2013.01); *G06F 3/018* (2013.01); *G06F 3/0482* (2013.01);
(Continued)

(58) Field of Classification Search
CPC .... G06Q 10/00; G06Q 30/02; G06Q 30/0601; G06Q 10/10
See application file for complete search history.

(56) References Cited

U.S. PATENT DOCUMENTS 4,317,109 A    2/1982  Odaka et al.
4,685,142 A    8/1987  Ooi et al.
(Continued)

FOREIGN PATENT DOCUMENTS

CN    101676838 A    3/2010
CN    101893987 A    11/2010
(Continued)

OTHER PUBLICATIONS

On-Line Handwriting Recognition; TORU WAMARA; IEEE (Year: 1992).*

(Continued)

*Primary Examiner* — Nicholas Augustine
(74) *Attorney, Agent, or Firm* — Dentons US LLP

(57) ABSTRACT

Methods, systems, and computer-readable media related to a technique for providing handwriting input functionality on a user device. A handwriting recognition module is trained to have a repertoire comprising multiple non-overlapping scripts and capable of recognizing tens of thousands of characters using a single handwriting recognition model. The handwriting input module provides real-time, stroke-order and stroke-direction independent handwriting recognition for multi-character handwriting input. In particular, real-time, stroke-order and stroke-direction independent handwriting recognition is provided for multi-character, or sentence level Chinese handwriting recognition. User interfaces for providing the handwriting input functionality are also disclosed.

21 Claims, 92 Drawing Sheets

Related U.S. Application Data

(60) Provisional application No. 61/832,908, filed on Jun. 9, 2013.

(52) U.S. Cl.
CPC .......... *G06F 17/24* (2013.01); *G06F 17/276* (2013.01); *G06K 9/00416* (2013.01); *G06K 9/00422* (2013.01); *G06K 9/00436* (2013.01)

(56) References Cited

U.S. PATENT DOCUMENTS

| | | | |
|---|---|---|---|
| 5,313,528 A | 5/1994 | Nishida | |
| 5,438,631 A | 8/1995 | Dai | |
| 5,491,758 A | 2/1996 | Bellegarda et al. | |
| 5,500,937 A | 3/1996 | Thompson-Rohrlich | |
| 5,526,440 A | 6/1996 | Sakano et al. | |
| 5,539,839 A | 7/1996 | Bellegarda et al. | |
| 5,544,257 A | 8/1996 | Bellegarda et al. | |
| 5,544,264 A | 8/1996 | Bellegarda et al. | |
| 5,687,254 A | 11/1997 | Poon et al. | |
| 5,710,831 A | 1/1998 | Beernink et al. | |
| 5,751,851 A | 5/1998 | Guzik et al. | |
| 5,781,662 A | 7/1998 | Mori et al. | |
| 5,796,867 A | 8/1998 | Chen et al. | |
| 5,812,697 A | 9/1998 | Sakai et al. | |
| 5,828,999 A | 10/1998 | Bellegarda et al. | |
| 5,850,477 A | 12/1998 | Takada | |
| 5,864,636 A | 1/1999 | Chisaka | |
| 5,903,666 A | 5/1999 | Guzik et al. | |
| 5,926,566 A | 7/1999 | Wang et al. | |
| 5,991,441 A | 11/1999 | Jourjine | |
| 6,011,865 A | 1/2000 | Fujisaki et al. | |
| 6,035,063 A | 3/2000 | Nakashima et al. | |
| 6,212,298 B1 | 4/2001 | Yoshii et al. | |
| 6,323,859 B1* | 11/2001 | Gantt | G06F 17/50 345/419 |
| 6,438,631 B1 | 8/2002 | Kawase | |
| 6,462,733 B1* | 10/2002 | Murakami | G06F 3/033 345/156 |
| 6,636,163 B1 | 10/2003 | Hsieh | |
| 6,707,942 B1 | 3/2004 | Cortopassi et al. | |
| 6,970,599 B2 | 11/2005 | Longe et al. | |
| 7,502,017 B1 | 3/2009 | Ratzlaff et al. | |
| 7,634,137 B2 | 12/2009 | Simard et al. | |
| 7,669,149 B2 | 2/2010 | Dietl et al. | |
| 7,720,316 B2* | 5/2010 | Shilman | G06K 9/00436 382/179 |
| 8,010,901 B1 | 8/2011 | Rogers | |
| 8,094,941 B1 | 1/2012 | Rowley et al. | |
| 9,026,428 B2 | 5/2015 | Sternby et al. | |
| 9,330,331 B2 | 5/2016 | Kasthuri | |
| 9,355,090 B2* | 5/2016 | Goldsmith | G06F 3/018 |
| 9,465,985 B2 | 10/2016 | Xia et al. | |
| 9,495,620 B2 | 11/2016 | Dolfing et al. | |
| 9,633,191 B2 | 4/2017 | Fleizach et al. | |
| 9,921,744 B2 | 3/2018 | Ha et al. | |
| 9,928,651 B2 | 3/2018 | Mariappan | |
| 9,998,888 B1 | 6/2018 | Chang et al. | |
| 10,013,162 B2 | 7/2018 | Fleizach et al. | |
| 10,133,397 B1 | 11/2018 | Smith | |
| 2002/0019731 A1 | 2/2002 | Masui et al. | |
| 2002/0067854 A1 | 6/2002 | Reintjes et al. | |
| 2003/0038788 A1 | 2/2003 | Demartines et al. | |
| 2003/0043189 A1 | 3/2003 | Rieffel et al. | |
| 2003/0086611 A1 | 5/2003 | Loudon et al. | |
| 2003/0099398 A1* | 5/2003 | Izumi | G06K 9/222 382/186 |
| 2003/0185444 A1 | 10/2003 | Honda | |
| 2003/0212961 A1 | 11/2003 | Soin et al. | |
| 2004/0017946 A1* | 1/2004 | Longe | G06F 3/018 382/185 |
| 2004/0230912 A1 | 11/2004 | Clow et al. | |
| 2005/0222848 A1 | 10/2005 | Napper et al. | |
| 2005/0237311 A1 | 10/2005 | Nakajima | |
| 2006/0050962 A1 | 3/2006 | Geiger et al. | |
| 2006/0092128 A1 | 5/2006 | Gao et al. | |
| 2007/0005537 A1 | 1/2007 | Abdulkader et al. | |
| 2007/0140561 A1 | 6/2007 | Abdulkader et al. | |
| 2007/0146340 A1 | 6/2007 | Webb | |
| 2008/0019591 A1 | 1/2008 | Iwayama et al. | |
| 2008/0098456 A1 | 4/2008 | Alward et al. | |
| 2008/0240570 A1 | 10/2008 | Shi et al. | |
| 2008/0260252 A1 | 10/2008 | Borgaonkar et al. | |
| 2008/0270118 A1 | 10/2008 | Kuo et al. | |
| 2009/0041354 A1 | 2/2009 | Liu et al. | |
| 2009/0109188 A1* | 4/2009 | Ohshita | G06F 3/018 345/173 |
| 2009/0161958 A1 | 6/2009 | Markiewicz et al. | |
| 2009/0226091 A1 | 9/2009 | Goldsmith et al. | |
| 2009/0228842 A1 | 9/2009 | Westerman et al. | |
| 2009/0256808 A1 | 10/2009 | Kun et al. | |
| 2009/0295750 A1* | 12/2009 | Yamazaki | G06F 3/04886 345/173 |
| 2009/0326918 A1 | 12/2009 | Georgiev et al. | |
| 2010/0066691 A1 | 3/2010 | Li et al. | |
| 2010/0104189 A1 | 4/2010 | Aravamudhan et al. | |
| 2010/0246964 A1 | 9/2010 | Matic et al. | |
| 2010/0309147 A1 | 12/2010 | Fleizach et al. | |
| 2010/0329562 A1 | 12/2010 | Zhu | |
| 2011/0279379 A1 | 11/2011 | Morwing et al. | |
| 2012/0014601 A1 | 1/2012 | Jiang et al. | |
| 2012/0089632 A1 | 4/2012 | Zhou et al. | |
| 2012/0095748 A1 | 4/2012 | Li et al. | |
| 2012/0113007 A1* | 5/2012 | Koch | G06F 3/0488 345/168 |
| 2012/0117506 A1* | 5/2012 | Koch | G06F 3/04886 715/773 |
| 2012/0139859 A1 | 6/2012 | Ohira et al. | |
| 2012/0216113 A1 | 8/2012 | Li | |
| 2012/0216141 A1 | 8/2012 | Li | |
| 2012/0308143 A1 | 12/2012 | Bellegarda et al. | |
| 2013/0002553 A1 | 1/2013 | Colley | |
| 2013/0120274 A1 | 5/2013 | Ha et al. | |
| 2013/0136360 A1 | 5/2013 | Maruyama et al. | |
| 2013/0182956 A1 | 7/2013 | Wang et al. | |
| 2013/0212511 A1 | 8/2013 | Kim et al. | |
| 2013/0251247 A1 | 9/2013 | Khorsheed et al. | |
| 2013/0251249 A1 | 9/2013 | Huo et al. | |
| 2013/0314337 A1 | 11/2013 | Asano | |
| 2014/0035823 A1 | 2/2014 | Khoe et al. | |
| 2014/0044357 A1 | 2/2014 | Moorthy et al. | |
| 2014/0085215 A1 | 3/2014 | Och et al. | |
| 2014/0093161 A1 | 4/2014 | Oda | |
| 2014/0129931 A1 | 5/2014 | Hashiba | |
| 2014/0143721 A1 | 5/2014 | Suzuki et al. | |
| 2014/0160032 A1 | 6/2014 | Che et al. | |
| 2014/0210759 A1* | 7/2014 | Toriyama | G06F 17/2735 345/173 |
| 2014/0214398 A1 | 7/2014 | Sanders et al. | |
| 2014/0244234 A1 | 8/2014 | Huang et al. | |
| 2014/0245221 A1 | 8/2014 | Dougherty et al. | |
| 2014/0267072 A1 | 9/2014 | Andersson et al. | |
| 2014/0270529 A1 | 9/2014 | Sugiura | |
| 2014/0340333 A1 | 11/2014 | Takasugi et al. | |
| 2014/0344684 A1 | 11/2014 | Jang | |
| 2014/0361983 A1 | 12/2014 | Dolfing et al. | |
| 2014/0363074 A1 | 12/2014 | Dolfing et al. | |
| 2014/0363082 A1 | 12/2014 | Dixon et al. | |
| 2014/0363083 A1 | 12/2014 | Xia | |
| 2014/0365949 A1 | 12/2014 | Xia et al. | |
| 2015/0040213 A1 | 2/2015 | Fleizach et al. | |
| 2015/0067488 A1 | 3/2015 | Liu | |
| 2015/0100537 A1 | 4/2015 | Grieves et al. | |
| 2015/0139550 A1 | 5/2015 | Kuno | |
| 2015/0169948 A1 | 6/2015 | Motoi | |
| 2015/0193141 A1 | 7/2015 | Goldsmith et al. | |
| 2015/0234588 A1 | 8/2015 | Andersson et al. | |
| 2015/0235097 A1 | 8/2015 | Wang et al. | |
| 2015/0248235 A1 | 9/2015 | Offenberg et al. | |
| 2015/0294145 A1 | 10/2015 | Bouaziz et al. | |
| 2015/0310267 A1 | 10/2015 | Nicholson et al. | |
| 2015/0317069 A1 | 11/2015 | Clements et al. | |
| 2015/0324011 A1 | 11/2015 | Czelnik et al. | |
| 2015/0370529 A1 | 12/2015 | Zambetti et al. | |

(56) References Cited

U.S. PATENT DOCUMENTS

| | | |
|---|---|---|
| 2015/0370779 A1 | 12/2015 | Dixon et al. |
| 2016/0019201 A1 | 1/2016 | Qian et al. |
| 2016/0139805 A1 | 5/2016 | Kocienda et al. |
| 2016/0179225 A1 | 6/2016 | Black et al. |
| 2016/0259548 A1 | 9/2016 | Ma |
| 2016/0274686 A1 | 9/2016 | Alonso Ruiz et al. |
| 2016/0357752 A1 | 12/2016 | Jon et al. |
| 2017/0010802 A1 | 1/2017 | Xia et al. |
| 2017/0017835 A1 | 1/2017 | Dolfing et al. |
| 2017/0075878 A1 | 3/2017 | Jon et al. |
| 2017/0115875 A1 | 4/2017 | Ha et al. |
| 2017/0300559 A1 | 10/2017 | Fallah |
| 2017/0351420 A1 | 12/2017 | Rigouste |
| 2017/0357438 A1 | 12/2017 | Dixon et al. |
| 2017/0359302 A1 | 12/2017 | Van Os et al. |
| 2018/0091732 A1 | 3/2018 | Wilson et al. |
| 2019/0163359 A1 | 5/2019 | Dixon et al. |
| 2019/0332259 A1 | 10/2019 | Xia et al. |

FOREIGN PATENT DOCUMENTS

| | | | |
|---|---|---|---|
| CN | 101894266 A | | 11/2010 |
| CN | 102135838 A | | 7/2011 |
| CN | 102243570 A | | 11/2011 |
| CN | 102455911 A | | 5/2012 |
| CN | 102566933 A | | 7/2012 |
| CN | 103294257 A | | 9/2013 |
| EP | 2031485 A1 | | 3/2009 |
| EP | 2336871 A1 | | 6/2011 |
| EP | 2386984 A2 | | 11/2011 |
| EP | 2650766 A1 | | 10/2013 |
| JP | 7-57053 A | | 3/1995 |
| JP | 8-339415 A | | 12/1996 |
| JP | 9-507936 A | | 8/1997 |
| JP | 9-507937 A | | 8/1997 |
| JP | 10-307675 A | | 11/1998 |
| JP | 2015-501022 A | | 11/2006 |
| JP | 2015-97103 A | | 1/2008 |
| JP | 2002-15282 A | | 3/2009 |
| JP | 2003-178257 A | | 11/2011 |
| JP | 2013-89131 A | | 5/2013 |
| JP | 2005-341387 A | | 10/2013 |
| JP | 2014-178954 A | | 9/2014 |
| JP | 2015-148946 A | | 12/2014 |
| JP | 2005-341411 A | | 6/2016 |
| KR | 10-2006-0135056 A | | 12/2006 |
| KR | 10-2016-0065174 A | | 6/2016 |
| TW | I286708 B | | 9/2007 |
| TW | 201142627 A | | 12/2011 |
| TW | 201201113 A | | 1/2012 |
| TW | 201216124 A | | 4/2012 |
| TW | 201234280 A1 | | 8/2012 |
| TW | 201237764 A | | 9/2012 |
| TW | 201305925 A | | 2/2013 |
| WO | 2006/115825 A2 | | 11/2006 |
| WO | 2008/005304 A2 | | 1/2008 |
| WO | 2012/071730 A1 | | 6/2012 |
| WO | 2013/048880 A1 | | 4/2013 |
| WO | 2014/205648 A1 | | 12/2014 |
| WO | 2015/094587 A1 | | 6/2015 |
| WO | 2015/122885 A1 | | 8/2015 |

OTHER PUBLICATIONS

Notice of Allowance received for Japanese Patent Application No. 2017-108227, dated Feb. 4, 2019, 4 pages (1 page of English Translation and 3 pages of Official Copy).

Advisory Action received for U.S. Appl. No. 14/292,138, dated May 10, 2019, 7 pages.

Notice of Allowance received for Korean Patent Application No. 10-2018-7024261, dated Apr. 24, 2019, 7 pages (1 page of English Translation and 6 pages of Official Copy).

Office Action received for Danish Patent Application No. PA201770921, dated Apr. 26, 2019, 6 pages.

Das, et al., "A statistical-topological feature combination for recognition of handwritten numerals", Applied Soft Computing, vol. 12, 2012, pp. 2486-2495.

Decision to Grant received for Danish Patent Application No. PA201670624, dated Feb. 5, 2018, 3 pages.

Decision to Grant received for Danish Patent Application No. PA201670626, dated Mar. 21, 2018, 2 pages.

Extended European Search Report received for European Patent Application No. 17211174.2, dated Mar. 27, 2018, 13 pages.

Extended European Search Report received for European Patent Application No. 17173810.7, dated Oct. 17, 2017, 24 pages.

Final Office Action received for U.S. Appl. No. 14/292,138, dated Jun. 1, 2018, 31 pages.

Malaviya, et al., "Fuzzy handwriting description language: FOHDEL", Pattern Recognition, vol. 33, 2000, pp. 119-131.

Intention to Grant received for Danish Patent Application No. PA201670624, dated Oct. 17, 2017, 2 pages.

Intention to grant received for Danish Patent Application No. PA201670626, dated Jan. 26, 2018, 2 pages.

Non-Final Office Action received for U.S. Appl. No. 14/292,138, dated Aug. 10, 2017, 28 pages.

Non-Final Office Action received for U.S. Appl. No. 15/614,276, dated Jul. 12, 2018, 13 pages.

Notice of Acceptance received for Australian Patent Application No. 2017203816, dated Jul. 30, 2018, 13 pages.

Notice of Allowance received for Chinese Patent Application No. 201480030897.0, dated Aug. 3, 2018, 2 pages (1 page of English Translation and 1 page of Official Copy).

Notice of Allowance received for U.S. Appl. No. 15/280,749, dated Jul. 11, 2017, 10 pages.

Notice of Allowance received for U.S. Appl. No. 15/280,749, dated Nov. 29, 2017, 9 pages.

Office Action received for Australian Patent Application No. 2017203816, dated Feb. 12, 2018, 3 pages.

Office Action received for Danish Patent Application No. PA201670624, dated Jun. 28, 2017, 3 pages.

Office Action received for Danish Patent Application No. PA201670624, dated Oct. 20, 2016, 8 pages.

Office Action received for Danish Patent Application No. PA201670626, dated Jun. 30, 2017, 3 pages.

Office Action received for Danish Patent Application No. PA201670626, dated Oct. 24, 2016, 8 pages.

Office Action received for Danish Patent Application No. PA201770921, dated May 3, 2018, 3 pages.

Office Action received for Korean Patent Application No. 10-2017-0068927, dated Jun. 11, 2018, 14 pages (7 pages of English Translation and 7 pages of Official Copy).

Search Report received for Danish Patent Application No. PA201770921, dated Jan. 23, 2018, 7 pages.

Notice of Allowance received for Korean Patent Application No. 10-2015-7033627, dated May 28, 2018, 4 pages (1 page of English Translation and 3 pages of Official copy).

Office Action received for Korean Patent Application No. 10-2019-0054454, dated May 20, 2019, 7 pages (3 pages of English Translation and 4 pages of Official Copy).

Advisory Action received for U.S. Appl. No. 14/292,138, dated Aug. 30, 2018, 6 pages.

Non-Final Office Action received for U.S. Appl. No. 14/292,138, dated Sep. 12, 2018, 33 pages.

Office Action received for Japanese Patent Application No. 2017-108227, dated Aug. 6, 2018, 8 pages (4 pages of English Translation and 4 pages of Official Copy).

Office Action received for Japanese Patent Application No. 2017-109294, dated Aug. 3, 2018, 9 pages (4 pages of English Translation and 5 pages of Official Copy).

Office Action received for Taiwanese Patent Application No. 103119279, dated Aug. 1, 2018, 14 pages (6 pages of English Translation and 8 pages of Official Copy).

Notice of Allowance received for U.S. Appl. No. 15/614,276, dated Oct. 31, 2018, 11 pages.

(56) References Cited

OTHER PUBLICATIONS

Office Action received for Korean Patent Application No. 10-2018-7024261, dated Oct. 24, 2018, 5 pages (2 pages of English Translation and 3 pages of Official copy).
Notice of Allowance received for Korean Patent Application No. 10-2017-0068927, dated Feb. 25, 2019, 3 pages (1 pages of English Translation and 2 pages of Official Copy).
Corrected Notice of Allowance received for U.S. Appl. No. 14/290,935, dated Dec. 18, 2017, 6 pages.
Final Office Action received for U.S. Appl. No. 14/290,935, dated Apr. 10, 2017, 15 pages.
Final Office Action received for U.S. Appl. No. 14/290,945, dated Jan. 21, 2016, 12 pages.
Final Office Action received for U.S. Appl. No. 14/292,138, dated Jun. 3, 2016, 28 pages.
Ghosh et al, "Script Recognition—a Review", IEEE Transactions on Pattern Analysis and Machine Intelligence, vol. 32, No. 12, Dec. 2010, pp. 2142-2161.
Huang et al, "A Hybrid Hmm-SVM Method for Online Handwriting Symbol Recognition", Proceedings of the Sixth International Conference on Intelligent Systems Design and Applications, Jinan, 2006, pp. 887-891.
International Preliminary Report on Patentability received for PCT Patent Application No. PCT/US2014/040417, dated Dec. 23, 2015, 8 pages.
International Search Report and Written Opinion received for PCT Patent Application No. PCT/US2014/040417, dated Sep. 25, 2014, 10 pages.
K.C. et al, "A Comprehensive Survey on On-line Handwriting Recognition Technology and Its Real Application to the Nepalese Natural Handwriting", Kathmandu University Journal of Science, Engineering, and Technology, vol. 5, No. 1, Jan. 2009, pp. 31-55.
Kessentini et al, "A Multi-stream Hmm-based Approach for Off-line Multi-script Handwritten Word Recognition", Proceedings of the ICFHR'08, Jan. 1, 2011, 6 pages.
Natarajan et al, "Multilingual Machine Printed OCR", International Journal of Pattern Recognition and Artificial Intelligence, vol. 15, No. 1, 2001, pp. 43-63.
Natarajan et al, "Multi-lingual Offline Handwriting Recognition Using Hidden Markov Models: a Script-independent Approach", Arabic and Chinese Handwriting Recognition, Lecture Notes in Computer Science, Sep. 27, 2006, pp. 231-250.
Non-Final Office Action received for U.S. Appl. No. 14/290,935, dated Jun. 7, 2016, 12 pages.
Non-Final Office Action received for U.S. Appl. No. 14/290,945, dated Jul. 16, 2015, 11 pages.
Non-Final Office Action received for U.S. Appl. No. 14/291,722, dated Aug. 26, 2016, 17 pages.
Non-Final Office Action received for U.S. Appl. No. 14/291,865, dated Sep. 24, 2015, 27 pages.
Non-Final Office Action received for U.S. Appl. No. 14/292,138, dated Dec. 15, 2016, 25 pages.
Non-Final Office Action received for U.S. Appl. No. 14/292,138, dated Sep. 10, 2015, 29 pages.
Non-Final Office Action received for U.S. Appl. No. 15/280,749, dated Jan. 17, 2017, 18 pages.
Notice of Allowance received for Japanese Patent Application No. 2016-518366, dated May 8, 2017, 3 pages.
Notice of Allowance received for Taiwanese Patent Application No. 103119324, dated Sep. 30, 2016, 2 pages.
Notice of Allowance received for Taiwanese Patent Application No. 103119951, dated Aug. 23, 2016, 2 pages.
Notice of Allowance received for U.S. Appl. No. 14/290,935, dated Oct. 12, 2017, 11 pages.
Notice of Allowance received for U.S. Appl. No. 14/290,945, dated Jun. 8, 2016, 9 pages.
Notice of Allowance received for U.S. Appl. No. 14/291,865, dated Apr. 8, 2016, 9 pages.
Office Action received for Japanese Patent Application No. 2016-518366, dated Nov. 7, 2016, 8 pages (4 pages of English Translation and 4 pages of Official copy).
Office Action received for Korean Patent Application No. 10-2015-7033627, dated Jul. 26, 2017, 5 pages (2 pages of English Translation and 3 pages of Official copy).
Office Action received for Taiwanese Patent Application No. 103119279, dated Dec. 21, 2016, 15 pages (6 pages of English Translation and 9 pages of Official copy).
Office Action received for Taiwanese Patent Application No. 103119279, dated May 4, 2016, 13 pages (5 pages of English Translation and 8 pages of Official copy).
Office Action received for Taiwanese Patent Application No. 103119279, dated Sep. 21, 2015, 21 pages (9 pages of English Translation and 12 pages of Official copy).
Office Action received for Taiwanese Patent Application No. 103119324, dated Mar. 10, 2016, 23 pages (9 pages of English Translation and 14 pages of Official copy).
Office Action received for Taiwanese Patent Application No. 103119816, dated Jun. 22, 2016, 9 pages (4 pages of English Translation and 5 pages of Official copy).
Office Action received for Taiwanese Patent Application No. 103119951, dated Nov. 20, 2015, 6 pages (3 pages of English Translation and 3 pages of Official copy).
Office Action received for Taiwanese Patent Application No. 103119952, dated Apr. 27, 2016, 2 pages (Official copy only).
Office Action received for Taiwanese Patent Application No. 103119952, dated Oct. 8, 2015, 16 pages (7 pages of English Translation and 9 pages of Official copy).
Pham et al., "Online Handwriting Recognition Using Multi Convolution Neural Networks", In Proceedings of the 9th international conference on Simulated Evolution and Learning (SEAM '12). Springer-Verlag, Berlin, Heidelberg, 2012, pp. 310-319.
Serrano et al, "Handwritten Word-spotting Using Hidden Markov Models and Universal Vocabularies", Pattern Recognition, vol. 42, 2009, pp. 2106-2116.
Suresh et al, "Fuzzy Technique Based Recognition of Handwritten Characters", Image and Vision Computing, vol. 25, 2007, pp. 230-239.
Wikipedia, "Framebuffer", Retrieved from the Internet: https://en.wikipedia.org/wiki/Framebuffer, 2015, pp. 1-7.
Decision to Grant received for European Patent Application No. 17173810.7, dated Apr. 4, 2019, 2 pages.
Intention to Grant received for European Patent Application No. 17211174.2, dated Apr. 9, 2019, 7 pages.
Final Office Action received for U.S. Appl. No. 14/292,138, dated Jan. 10, 2019, 35 pages.
Notice of Allowance received for U.S. Appl. No. 15/614,276, dated Jan. 17, 2019, 4 pages.
Office Action received for Japanese Patent Application No. 2017-109294, dated Dec. 14, 2018, 4 pages (2 pages of English Translation and 2 pages of Official Copy).
Notice of Allowance received for U.S. Appl. No. 15/275,309, dated Sep. 27, 2018, 7 pages.
Corrected Notice of Allowance received for U.S. Appl. No. 15/614,276, dated Dec. 10, 2018, 2 pages.
Intention to Grant Received for European Patent Application No. 17173810.7, dated Nov. 21, 2018, 8 pages.
Non-Final Office Action received for U.S. Appl. No. 15/275,309, dated Feb. 27, 2018, 17 pages.
Office Action received for Chinese Patent Application No. 201480030897.0, dated Mar. 12, 2018, 10 pages (5 pages of English Translation and 5 pages of Official Copy).
Notice of Allowance received for Taiwanese Patent Application No. 103119279, dated Nov. 29, 2018, 5 pages (2 pages of English Translation and 3 pages of Official copy).
Office Action received for Danish Patent Application No. PA201770921, dated Dec. 6, 2018, 6 pages.
Warren, Tom, "Microsoft Android Wear keyboard", Online Available at: <https://www.youtube.com/watch?v=_Iu7bUKKrJE>, Oct. 11, 2014, 4 pages.
Extended European Search Report received for European Patent Application No. 19171354.4, dated Sep. 23, 2019, 11 pages.

(56) References Cited

OTHER PUBLICATIONS

Notice of Allowance received for Korean Patent Application No. 10-2019-0054454, dated Oct. 24, 2019, 3 pages (1 page of English Translation and 2 pages of Official Copy).
Office Action received for Korean Patent Application No. 10-2019-7021958, dated Oct. 21, 2019, 5 pages (2 pages of English Translation and 3 pages of Official Copy).
Notice of Allowance received for Japanese Patent Application No. 2017-109294, dated Jun. 24, 2019, 4 pages (1 page of English Translation and 3 pages of Official Copy).
Notice of Allowance received for U.S. Appl. No. 16/265,676, dated Jul. 3, 2019, 11 pages.
Office Action received for Australian Patent Application No. 2018260930, dated Jun. 26, 2019, 3 pages.
Corrected Notice of Allowability received for U.S. Appl. No. 16/265,676, dated Aug. 26, 2019, 4 pages.
Decision to Grant received for European Patent Application No. 17211174.2, dated Aug. 29, 2019, 2 pages.
Intention to Grant received for European Patent Application No. 17211174.2, dated Aug. 20, 2019, 6 pages.

* cited by examiner

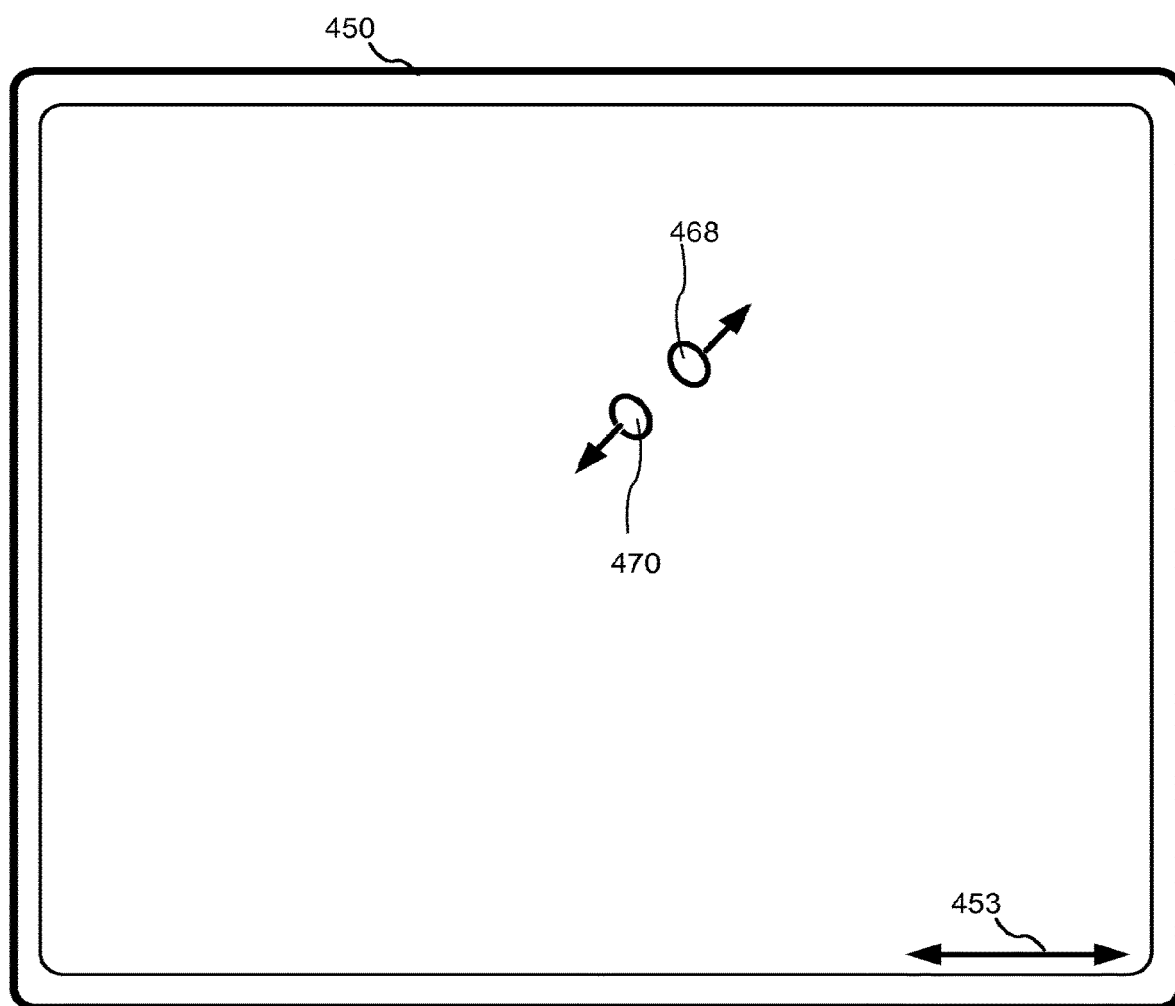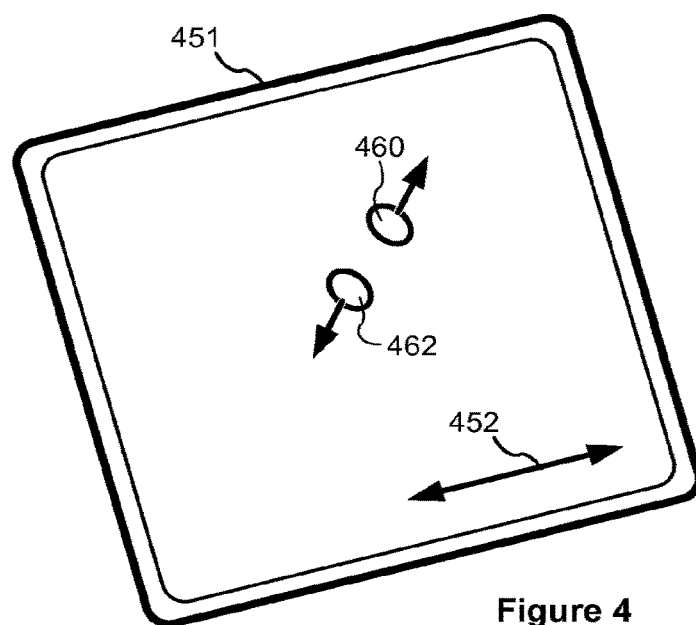
Figure 4

700 ⟶

```
┌─────────────────────────────────────────────────────────────────────────────┐
│ Train a multi-script handwriting recognition model based on spatially-derived features of a multi- │
│ script training corpus, the multi-script training corpus including respective handwriting samples │
│         corresponding to characters of at least three non-overlapping scripts 702           │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │   The spatially-derived features of the multi-script training corpus are stroke-order     │ │
│ │              independent and stroke-direction independent 704                │ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│                                                                             │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │  The training of the multi-script handwriting recognition model is independent of temporal │ │
│ │       information associated with respective strokes in the handwriting samples 706        │ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│                                                                             │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │  The at least three non-overlapping scripts include Chinese characters, emoji characters,  │ │
│ │                              and Latin script 708                              │ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│                                                                             │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │ The multi-script handwriting recognition model has at least thirty thousand output classes, │ │
│ │     representing at least thirty thousand characters spanning the at least three non-       │ │
│ │                              overlapping scripts 710                                        │ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│                                                                             │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │         Provide the handwriting samples of the multi-script training corpus to a single    │ │
│ │      convolutional neural network having a single input plane and a single output plane 712│ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
│                                        ▼                                     │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │   Determine, using the convolutional neural network, the spatially-derived features of the  │ │
│ │         handwriting samples and respective weights for the spatially-derived features for   │ │
│ │    differentiating characters of the at least three non-overlapping scripts represented in the│ │
│ │                              multi-script training corpus 714                                │ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────────────────┘
                                         ▼
┌─────────────────────────────────────────────────────────────────────────────┐
│ Provide real-time handwriting recognition for a user's handwriting input using the multi-script │
│ handwriting recognition model that has been trained on the spatially-derived features of the │
│                            multi-script training corpus 716                                  │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │  Provide the multi-script handwriting recognition model to a user device, wherein the user  │ │
│ │     device receives a plurality of handwritten strokes from the user, and locally performs  │ │
│ │       handwriting recognition on one or more recognition units identified from the plurality of │ │
│ │     handwritten strokes based on the received multi-script handwriting recognition model 718 │ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────────────────┘
```

Receive a multi-script handwriting recognition model, the multi-script recognition model having been trained on spatially-derived features of a multi-script training corpus, the multi-script training corpus including respective handwriting samples corresponding to characters of at least three non-overlapping scripts 902

> The multi-script handwriting recognition model is a single convolutional neural network having a single input plane and a single output plane, and includes spatially-derived features and respective weights for the spatially-derived features for differentiating characters of the at least three non-overlapping scripts represented in the multi-script training corpus 904

> The multi-script handwriting recognition model is configured to recognize characters based on respective input images of one or more recognition units identified in the handwriting input, and wherein respective spatially-derived features used for recognition are independent of respective stroke order, stroke direction, and continuity of strokes in the handwriting input 906

Receive a handwriting input from a user, the handwriting input comprising one or more handwritten strokes provided on a touch-sensitive surface coupled to the user device 908

In response to receiving the handwriting input, provide in real-time one or more handwriting recognition results to the user based on the multi-script handwriting recognition model that has been trained on the spatially-derived features of the multi-script training corpus 910

> Segment the user's handwriting input into one or more recognition units, each recognition unit comprising one or more of the handwritten strokes provided by the user 912

> Provide a respective image of each of the one or more recognition units as an input to the multi-script handwriting recognition model 914

> For at least one of the one or more recognition units, obtain from the multi-script handwriting recognition model, at least a first output character from a first script, and at least a second output character from a second script different from the first script 916

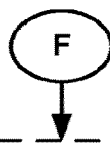

The end recognition unit does not include a temporally final handwritten stroke among the plurality of handwritten strokes provided by the user 1818

In response to receiving an initial portion of the deletion input, visually distinguish the end recognition unit from other recognition units identified in the handwriting input area 1820

The initial portion of the deletion input is an initial contact detected on a deletion button in the handwriting input interface, and the deletion input is detected when the initial contact is sustained for more than a predetermined threshold amount of time 1822

The deletion input is a sustained contact on a deletion button provided in the handwriting input interface, and removing the respective subset of the plurality of handwritten strokes further comprises removing the subset of handwritten strokes in the end recognition unit from the handwriting input area, stroke-by-stroke in a reverse temporal order by which the subset of handwritten strokes has been provided by the user 1824

Generate a partial recognition result comprising a subset of the respective characters recognized from the plurality of recognition units, wherein each of the subset of the respective characters meets a predetermined confidence threshold 1826

Display the partial recognition result concurrently with the multi-character recognition result in the candidate display area of the handwriting input interface 1828

The partial recognition result does not include at least the end character in multi-character recognition result 1830

The partial recognition result does not include at least an initial character in multi-character recognition result 1832

The partial recognition result does not include at least an intermediate character in multi-character recognition result 1834

Separately train a set of spatially-derived features and a set of temporally-derived features of a handwriting recognition model, wherein:

the set of spatially-derived features are trained on a corpus of training images each being an image of a handwriting sample for a respective character of an output character set, and the set of temporally-derived features are trained on a corpus of stroke-distribution profiles, each stroke-distribution profile numerically characterizing a spatial distribution of a plurality of strokes in a handwriting sample for a respective character of the output character set 2502

--- separately training the set of spatially-derived features further includes training a convolutional neural network having an input layer, an output layer, and a plurality of convolutional layers including a first convolutional layer, a last convolutional layer, zero or more intermediate convolutional layers between the first convolutional layer and the last convolutional layer, and a hidden layer between the last convolutional layer and the output layer 2504

---

Separately training the set of temporally-derived features further includes providing the plurality of stroke-distribution profiles to a statistical model to determine a plurality of temporally-derived parameters and respective weights for the plurality of temporally-derived parameters for classifying the respective characters of the output character set 2506

---

Combine the set of spatially-derived features and the set of temporally-derived features in the handwriting recognition model 2508

Combining the set of spatially-derived features and the set of temporally-derived features in the handwriting recognition model includes injecting the plurality of spatially-derived parameters and the plurality of temporally-derived parameters into one of the convolutional layers or the hidden layer of the convolutional neural network 2510

---

Provide real-time handwriting recognition for a user's handwriting input using the handwriting recognition model 2512

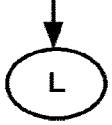

Figure 25A

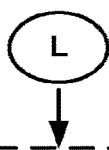

Generate the corpus of stroke-distribution profiles from a plurality writing samples 2514

Each of the plurality of handwriting samples corresponds to a character in the output character set and separately preserves respective spatial information for each constituent stroke of the handwriting sample as it was written 2516

Generating the corpus of stroke-distribution profiles further includes: 2518

For each of the plurality of handwriting samples: 2520

Identify constituent strokes in the handwriting sample 2522

For each of the identified strokes of the handwriting sample, calculate a respective occupancy ratio along each of a plurality of predetermined directions, occupancy ratio being a ratio between a projected span of said each stroke direction and a maximum projected span of said writing sample 2524

For each of the identified strokes of the handwriting sample, calculate a respective saturation ratio for said each stroke based on a ratio between a respective number of pixels within said each stroke and an overall number of pixels within said writing sample 2526

Generate a feature vector for the handwriting sample as the stroke-distribution profile of the writing sample, the feature vector including the respective occupancy ratios and the respective saturation ratio of at least N strokes in the handwriting sample, wherein N is a predetermined natural number 2528

Figure 25B

MANAGING REAL-TIME HANDWRITING RECOGNITION

RELATED APPLICATION

This application is a continuation of U.S. patent application Ser. No. 14/290,935, filed May 29, 2014, titled "MANAGING REAL-TIME HANDWRITING RECOGNITION", which claims priority to U.S. Provisional Patent Application No. 61/832,908, filed Jun. 9, 2013, which are incorporated by reference herein in their entirety.

FIELD OF THE INVENTION

This specification relates to providing handwriting input functionality on a computing device, and more specifically, to providing real-time, multi-script, stroke-order independent handwriting recognition and input functionality on a computing device.

BACKGROUND

A handwriting input method is an important alternative input method for computing devices that are equipped with touch-sensitive surfaces (e.g., touch-sensitive display screens, or touch-pads). Many users, particularly users in some Asian or Arab countries, are accustomed to writing in a cursive style, and may feel comfortable writing in longhand as opposed to typing on a keyboard.

For certain logographic writing systems, such as Hanzi and Kanji (also referred to as Chinese characters), even though alternative syllabic input methods (e.g., Pinyin or Kana) are available to enter characters of the corresponding logographic writing systems, such syllabic input methods are inadequate when the user does not know how to phonetically spell a logographic character, and uses an incorrect phonetic spelling of the logographic character. Therefore, being able to use handwriting input on a computing device becomes crucial for users who are not able to pronounce words well enough or at all for a relevant logographic writing system.

Although handwriting input functionality has gained some popularity in certain regions of the world, improvements are still needed. In particular, human handwriting is highly variable (e.g., in terms of stroke order, size, writing style, etc.), and high-quality handwriting recognition software is complex and requires extensive training. As such, providing efficient, real-time handwriting recognition on a mobile device having limited memory and computing resources has been a challenge.

Furthermore, in today's multi-cultural world, users in many countries are multi-lingual, and may frequently need to write in more than one script (e.g., writing a message in Chinese that mentions a movie title in English). However, manually switching a recognition system to a desired script or language during writing is cumbersome and inefficient. Furthermore, the utility of conventional multi-script handwriting recognition techniques is severely limited because scaling-up the recognition capability of a device to simultaneously handle multiple scripts vastly increases the complexity of the recognition system and the demand on computer resources.

In addition, conventional handwriting techniques rely heavily on language or script-specific particularities to achieve recognition accuracy. Such particularities are not easily portable to other languages or scripts. Thus, adding handwriting input capabilities for new languages or scripts is a daunting task that is not lightly undertaken by suppliers of the software and devices. As a result, users of many languages are deprived of an important alternative input method for their electronic devices.

Conventional user interfaces for providing handwriting input include an area for accepting handwriting input from the user and an area for displaying handwriting recognition results. On portable devices having a small form factor, significant improvement of the user interface is still required to improve the efficiency, accuracy, and user experience in general.

SUMMARY

This specification describes a technique for providing multi-script handwriting recognition using a universal recognizer. The universal recognizer is trained using a large multi-script corpus of writing samples for characters in different languages and scripts. The training of the universal recognizer is language-independent, script-independent, stroke-order independent, and stroke-direction independent. Thus, the same recognizer is capable of recognizing mixed-language, mixed-script handwriting input without requiring manual switching between input languages during use. In addition, the universal recognizer is lightweight enough to be deployed as a standalone module on mobile devices to enable handwriting input in different languages and scripts used in different regions worldwide.

In addition, because the universal recognizer is trained on spatially-derived features which are stroke-order independent and stroke-direction independent, and require no temporal or sequence information at the stroke-level, the universal recognizer provides numerous additional features and advantages over conventional temporally-based recognition methods (e.g., recognition methods based on the Hidden Markov Method (HMM)). For example, the user is permitted to enter the strokes of one or more characters, phrases, and sentences in any order, and still obtain the same recognition results. Thus, out-of-order multi-character input, and out-of-order corrections (e.g., additions or rewrites) of earlier-entered characters are now possible.

Furthermore, the universal recognizer is used for real-time handwriting recognition, where temporal information for each stroke is available and is optionally used to disambiguate or segment the handwriting input before character recognition is performed by the universal recognizer. The real-time, stroke-order independent recognition described herein differs from conventional offline recognition methods (e.g., Optical Character Recognition (OCR)) and can offer better performance than conventional offline recognition methods. In addition, the universal recognizer described herein is able to handle high variability in individual writing habits (e.g., variability in speed, tempo, stroke-order, stroke-direction, stroke-continuity, etc.) without explicitly embedding distinguishing features of the different variations (e.g., variations in speed, tempo, stroke-order, stroke-direction, stroke-continuity, etc.) in the recognition system, thereby reducing the overall complexity of the recognition system.

As described herein, in some embodiments, temporally-derived stroke distribution information is optionally reintroduced into the universal recognizer to enhance recognition accuracy and disambiguate between similar-looking recognition outputs for the same input image. The re-introduction of the temporally-derived stroke distribution information does not destroy the stroke-order and stroke-direction independence of the universal recognizer, because the temporally-derived features and the spatially-derived features are obtained through a separate training process and are only combined in the handwriting recognition model after the separate training has been completed. Furthermore, the temporally-derived stroke distribution information is carefully designed such that it captures distinguishing temporal characteristics of similar-looking characters, without relying on explicit knowledge on the differences in the stroke-orders of the similar-looking characters.

User interfaces for providing handwriting input functionality are also described herein.

In some embodiments, a method of providing multi-script handwriting recognition includes: training a multi-script handwriting recognition model based on spatially-derived features of a multi-script training corpus, the multi-script training corpus including respective handwriting samples corresponding to characters of at least three non-overlapping scripts; and providing real-time handwriting recognition for a user's handwriting input using the multi-script handwriting recognition model that has been trained on the spatially-derived features of the multi-script training corpus.

In some embodiments, a method of providing multi-script handwriting recognition includes: receiving a multi-script handwriting recognition model, the multi-script recognition model having been trained on spatially-derived features of a multi-script training corpus, the multi-script training corpus including respective handwriting samples corresponding to characters of at least three non-overlapping scripts; receiving a handwriting input from a user, the handwriting input comprising one or more handwritten strokes provided on a touch-sensitive surface coupled to the user device; and in response to receiving the handwriting input, providing in real-time one or more handwriting recognition results to the user based on the multi-script handwriting recognition model that has been trained on the spatially-derived features of the multi-script training corpus.

In some embodiments, a method of providing real-time handwriting recognition includes: receiving a plurality of handwritten strokes from a user, the plurality of handwritten strokes corresponding to a handwritten character; generating an input image based on the plurality of handwritten strokes; providing the input image to a handwriting recognition model to perform real-time recognition of the handwritten character, wherein the handwriting recognition model provides stroke-order independent handwriting recognition; and displaying in real-time of receiving the plurality of handwritten strokes, an identical first output character irrespective of a respective order by which the plurality of handwritten strokes have been received from the user.

In some embodiments, the method further includes: receiving a second plurality of handwritten strokes from the user, the second plurality of handwritten strokes corresponding to a second handwritten character; generating a second input image based on the second plurality of handwritten strokes; providing the second input image to the handwriting recognition model to perform real-time recognition of the second handwritten character; and displaying in real-time of receiving the second plurality of handwritten strokes, a second output character corresponding to the second plurality of handwritten strokes, wherein the first output character and the second output character are concurrently displayed in a spatial sequence independent of a respective order by which the first plurality of handwriting inputs and the second plurality of handwriting inputs have been provided by the user.

In some embodiments, the second plurality of handwritten strokes spatially follow the first plurality of handwritten strokes along a default writing direction of a handwriting input interface of the user device, and the second output character follows the first output character in a spatial sequence along the default writing direction, and the method further includes: receiving a third handwritten stroke from the user to revise the handwritten character, the third handwritten stroke being received temporally after the first and the second plurality of handwritten strokes; in response to receiving the third handwritten stroke, assigning the handwritten stroke to a same recognition unit as the first plurality of handwritten strokes based on relative proximity of the third handwritten stroke to the first plurality of handwritten strokes; generating a revised input image based on the first plurality of handwritten stroke and the third handwritten stroke; providing the revised input image to the handwriting recognition model to perform real-time recognition of the revised handwritten character; and displaying in response to receiving the third handwriting input, a third output character corresponding to the revised input image, wherein the third output character replaces the first output character and is concurrently displayed with the second output character in the spatial sequence along the default writing direction.

In some embodiments, the method further includes: while the third output character and the second output character are concurrently displayed as a recognition result in a candidate display area of the handwriting input interface, receiving a deletion input from the user; and in response to the deletion input, deleting the second output character from the recognition result, while maintaining the third output character in the recognition result.

In some embodiments, rendering in real-time the first plurality of handwritten strokes, the second plurality of handwritten strokes, and the third handwritten stroke in the handwriting input area of the handwriting input interface as each of said handwritten stroke is provided by the user; and in response to receiving the deletion input, deleting a respective rendering of the second plurality of handwritten strokes from the handwriting input area, while maintaining respective renderings of the first plurality of handwritten strokes and the third handwritten stroke in the handwriting input area.

In some embodiments, a method of providing real-time handwriting recognition includes: receiving a handwriting input from a user, the handwriting input comprising one or more handwritten strokes provided in a handwriting input area of a handwriting input interface; based on a handwriting recognition model, identifying a plurality of output characters for the handwriting input; dividing the plurality of output characters into two or more categories based on a predetermined categorization criterion; displaying, in an initial view of a candidate display area of the handwriting input interface, respective output characters in a first category of the two or more categories, wherein the initial view of the candidate display area is concurrently provided with an affordance for invoking an extended view of the candidate display area; receiving a user input selecting the affordance for invoking the extended view; and in response to the user input, displaying, in the extended view of the candidate display area, the respective output characters in the first category and respective output characters in at least a second category of the two or more categories which were not previously displayed in the initial view of the candidate display area.

In some embodiments, a method of providing real-time handwriting recognition includes: receiving a handwriting input from a user, the handwriting input comprising a plurality of handwritten strokes provided in an handwriting input area of a handwriting input interface; recognizing, based on a handwriting recognition model, a plurality of output characters from the handwriting input, the output characters including at least a first emoji character and at least a first character from a script of a natural human language; and displaying a recognition result comprising the first emoji character and the first character from the script of the natural human language in a candidate display area of the handwriting input interface.

In some embodiments, a method of providing handwriting recognition includes: receiving a handwriting input from a user, the handwriting input comprising a plurality of handwritten strokes provided in a touch-sensitive surface coupled to the device; rendering, in real-time, the plurality of handwritten strokes in a handwriting input area of a handwriting input interface; receiving one of a pinch gesture input and a expand gesture input over the plurality of handwritten strokes; upon receiving a pinch gesture input, generating a first recognition result based on the plurality of handwritten strokes by treating the plurality of handwritten strokes as a single recognition unit; upon receiving a expand gesture input, generating a second recognition result based on the plurality of handwritten strokes by treating the plurality of handwritten strokes as two separate recognition units pulled apart by the expand gesture input; and upon generating a respective one of the first and second recognition results, displaying the generated recognition result in a candidate display area of the handwriting input interface.

In some embodiments, a method of providing handwriting recognition, includes: receiving a handwriting input from a user, the handwriting input comprising a plurality of handwritten strokes provided in an handwriting input area of a handwriting input interface; identifying a plurality of recognition units from the plurality of handwritten strokes, each recognition unit including a respective subset of the plurality of handwriting strokes; generating a multi-character recognition result comprising respective characters recognized from the plurality of recognition units; displaying the multi-character recognition result in a candidate display area of the handwriting input interface; while the multi-character recognition result is displayed in the candidate display area, receiving a deletion input from the user; and in response to receiving the deletion input, removing an end character from the multi-character recognition result displayed in the candidate display area.

In some embodiments, a method of providing real-time handwriting recognition includes: determining an orientation of the device; providing a handwriting input interface on the device in a horizontal input mode in accordance with the device being in a first orientation, wherein a respective line of handwriting input entered in the horizontal input mode is segmented into one or more respective recognition units along a horizontal writing direction; and providing the handwriting input interface on the device in a vertical input mode in accordance with the device in a second orientation, wherein a respective line of handwriting input entered in the vertical input mode is segmented into one or more respective recognition units along a vertical writing direction.

In some embodiments, a method of providing real-time handwriting recognition includes: receiving a handwriting input from a user, the handwriting input comprising a plurality of handwritten strokes provided on a touch-sensitive surface coupled to the device; rendering the plurality of handwritten strokes in a handwriting input area of a handwriting input interface; segmenting the plurality of handwritten strokes into two or more recognition units, each recognition unit comprising a respective subset of the plurality of handwritten strokes; receiving an edit request from the user; in response to the edit request, visually distinguishing the two or more recognition units in the handwriting input area; and providing a means for individually deleting each of the two or more recognition units from the handwriting input area.

In some embodiments, a method of providing real-time handwriting recognition includes: receiving a first handwriting input from a user, the first handwriting input comprising a plurality of handwritten strokes, and the plurality of handwritten strokes forming multiple recognition units distributed along a respective writing direction associated with a handwriting input area of a handwriting input interface; rendering each of the plurality of handwritten strokes in the handwriting input area as the handwritten stroke is provided by the user; starting a respective fading process for each of the multiple recognition units after the recognition unit is completely rendered, wherein during the respective fading process, the rendering of the recognition unit in the first handwriting input are becomes increasingly faded; receiving a second handwriting input from the user over a region of the handwriting input area occupied by a faded recognition unit of the multiple recognition unit; and in response to receiving the second handwriting input: rendering the second handwriting input in the handwriting input area; and clearing all faded recognition units from the handwriting input area.

In some embodiments, a method of providing handwriting recognition includes: separately training a set of spatially-derived features and a set of temporally-derived features of a handwriting recognition model, wherein: the set of spatially-derived features are trained on a corpus of training images each being an image of a handwriting sample for a respective character of an output character set, and the set of temporally-derived features are trained on a corpus of stroke-distribution profiles, each stroke-distribution profile numerically characterizing a spatial distribution of a plurality of strokes in a handwriting sample for a respective character of the output character set; and combining the set of spatially-derived features and the set of temporally-derived features in the handwriting recognition model; and providing real-time handwriting recognition for a user's handwriting input using the handwriting recognition model.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates an exemplary user interface for a multifunction device with a touch-sensitive surface that is separate from the display in accordance with some embodiments.

FIG. 7 is a flow chart of an exemplary process for training a multi-script handwriting recognition model in accordance with some embodiments.

FIGS. 9A-9B are flow charts of an exemplary process for providing real-time multi-script handwriting recognition and input on a portable multifunction device.

FIGS. 18A-18B are flow charts of an exemplary process for providing character-by-character deletion of a user's handwriting input in accordance with some embodiments.

FIGS. 25A-25B are flow charts of an exemplary process for integrating temporally-derived stroked distribution information into a handwriting recognition model based on spatially-derived features, without destroying the stroke-order and stroke direction independence of the handwriting recognition model, in accordance with some embodiments.

Like reference numerals refer to corresponding parts throughout the drawings.

DETAILED DESCRIPTION

Figure 1:
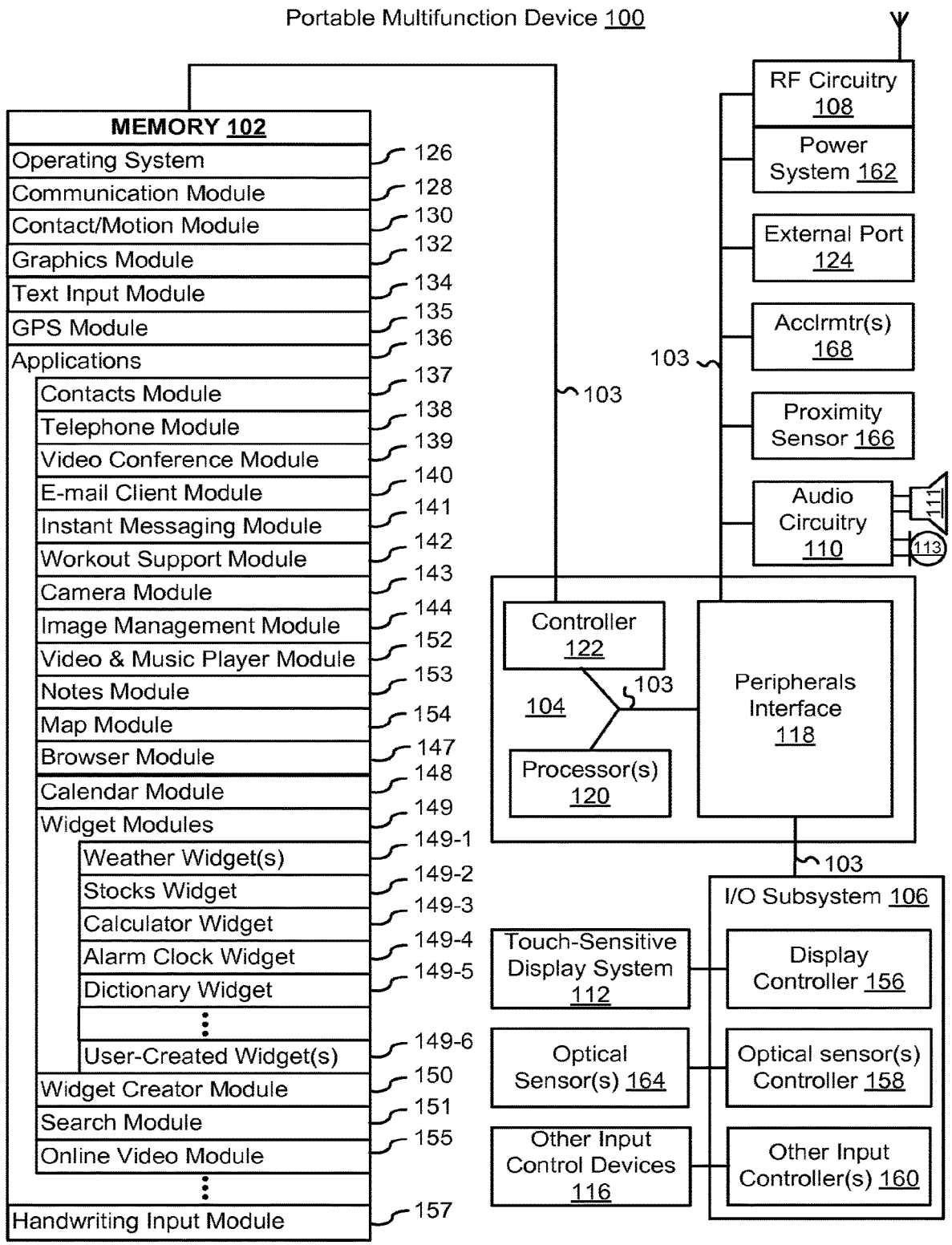
FIG. 1 is a block diagram illustrating a portable multifunction device with a touch-sensitive display in accordance with some embodiments.

Many electronic devices have graphical user interfaces with soft keyboards for character entry. On some electronic devices, a user may also be able to install or enable a handwriting input interface that allows the user to input characters via handwriting on a touch-sensitive display screen or a touch-sensitive surface coupled to the devices. Conventional handwriting recognition input methods and user interfaces have a number of issues and shortcomings. For example, In general, conventional handwriting input functionality is enabled language-by-language or script-by-script. Each additional input language requires installation of a separate handwriting recognition model that takes-up separate storage space and memory. Little synergy is provided by combining the handwriting recognition models for different languages, and mixed-language or mixed-script handwriting recognition conventionally took a very long time due to a complex disambiguation process.

In addition, because conventional handwriting recognition systems rely heavily on language-specific or script-specific characteristics for character recognition. Recognition of mixed language handwriting input had a poor accuracy. Furthermore, available combinations of recognized languages are very limited. Most systems required the user to manually specify the desired language-specific handwriting recognizer before providing handwriting input in each non-default language or script.

Many existing real-time handwriting recognition models require temporal or sequence information on a stroke-by-stroke level, which produce inaccurate recognition results when dealing with the high variability of how a character can be written (e.g., high variability in the shape, length, tempo, segmentation, order, and direction of strokes due to writing styles and personal habits). Some systems also require users to adhere to strict spatial and temporal criteria (e.g., with built-in assumptions on the size, sequence, and timeframe of each character input) when providing a handwriting input. Any deviation from these criteria caused inaccurate recognition results that were difficult to correct.

Currently, most real-time handwriting input interfaces only allow the user to enter a few characters at a time. Entry of long phrases or sentences are broken down into short segments and inputted separately. This stilted input not only places cognitive burden on the user to maintain the flow of the composition, but also makes it difficult for the user to correct or revise an earlier entered character or phrase.

The embodiments described below address these and related issues.

FIGS. 1-4 below, provide a description of exemplary devices. FIGS. 5, 6, and 26-27 illustrate exemplary handwriting recognition and input systems. FIGS. 8A-8B, 11A-11K, 13A-13E, 15A-15K, 17A-17H, 19A-19F, 21A-21H, 23A-23L illustrate exemplary user interfaces for handwriting recognition and input. FIGS. 7, 9A-9B, 10A-10C, 12A-12B, 14, 16A-16B, 18A-18B, 20A-20C, 22A-22B, 24A-24B, and 25 are flow charts illustrating methods of enabling handwriting recognition and input on user devices, including training handwriting recognition models, providing real-time handwriting recognition results, providing means for inputting and revising a handwriting input, and providing means for entering a recognition result as a text input. The user interfaces in FIGS. 8A-8B, 11A-11K, 13A-13E, 15A-15K, 17A-17H, 19A-19F, 21A-21H, 23A-23L are used to illustrate the processes in FIGS. 7, 9A-9B, 10A-10C, 12A-12B, 14, 16A-16B, 18A-18B, 20A-20C, 22A-22B, 24A-24B, and 25.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1 is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1 may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user. Handwriting input may be provided on the touch screen 112 via locations and movements of finger-based or stylus-based contacts. In some embodiments, the touch screen 112 renders the finger-based or stylus-based input as instantaneous visual feedback to the current handwriting input, and provides the visual effect of actual writing on a writing surface (e.g., a sheet of paper) with a writing instrument (e.g., a pen).

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1 shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video.

Device 100 may also include one or more proximity sensors 166. FIG. 1 shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1 shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
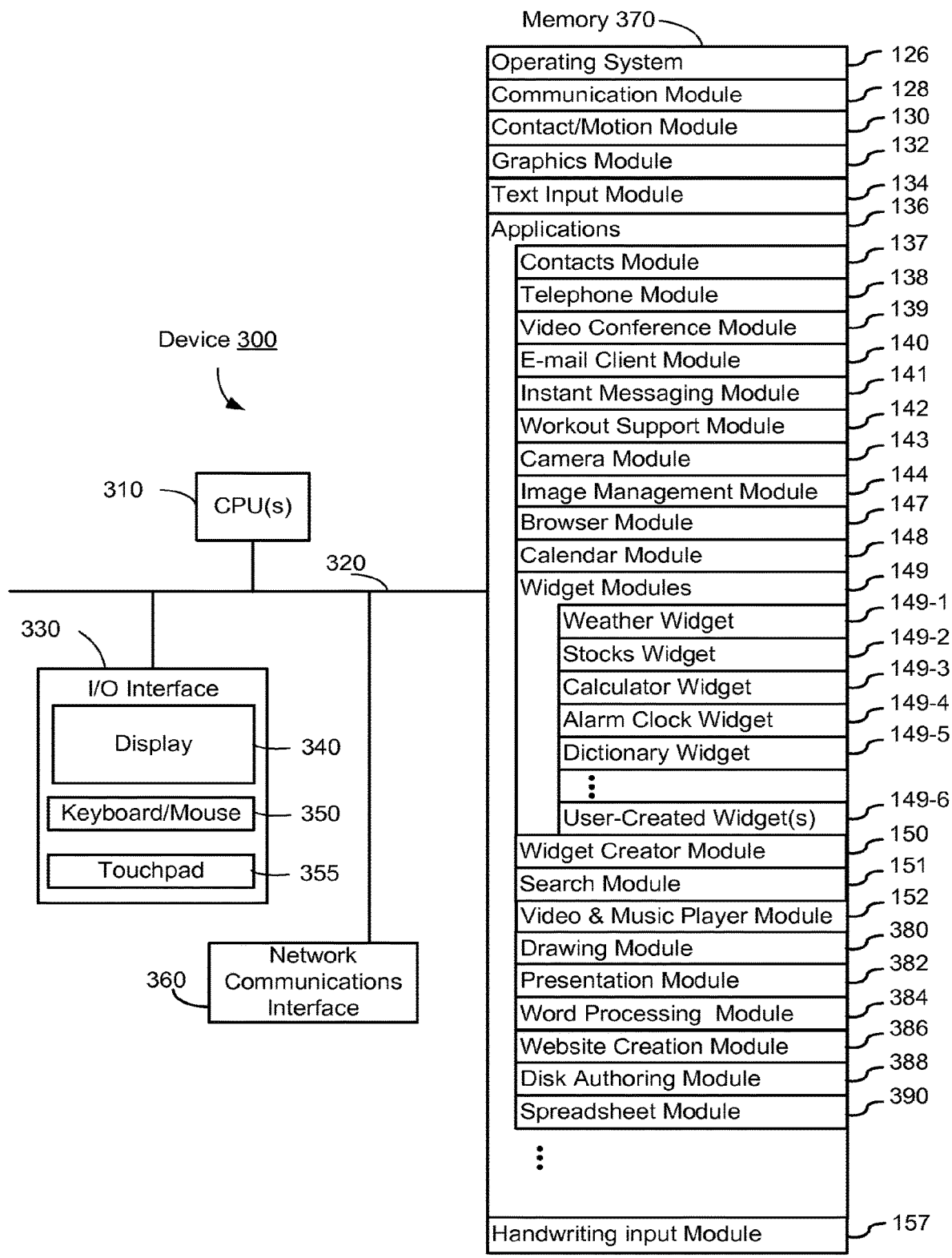
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 stores handwriting input module 157, as shown in FIGS. 1 and 3. The handwriting input module 157 includes a handwriting recognition model, and provides handwriting recognition and input function to a user of the device 100 (or device 300). More details of the handwriting input module 157 are provided with respect to FIGS. 5-27 and accompanying descriptions thereof.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.).

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Contact/motion module 130 is optionally utilized by the handwriting input module 157 to register input of handwritten strokes within a handwriting input area of a handwriting input interface displayed on the touch-sensitive display screen 112 (or within an area of the touch-pad 355 corresponding to the handwriting input area displayed on display 340 in FIG. 3). In some embodiments, locations, motion path, and intensities associated with the contact during the initial finger-down event, the final finger-up event, any time there between is recorded as a handwritten stroke. Based on such information, the handwritten strokes can be rendered on the display, as feedback for the user input. In addition, one or more input images can be generated based on handwritten strokes registered by the contact/motion module 130.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input). In some embodiments, the handwriting input module 157 is optionally invocated through a user interface of the text input module 134, e.g., though a keyboard selection affordance. In some embodiments, the same or similar keyboard selection affordance is also provided in the handwriting input interface to invoke the text input module 134.

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof: contacts module 137 (sometimes called an address book or contact list); telephone module 138; video conferencing module 139; e-mail client module 140; instant messaging (IM) module 141; workout support module 142; camera module 143 for still and/or video images; image management module 144; browser module 147; calendar module 148; widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6; widget creator module 150 for making user-created widgets 149-6; search module 151; video and music player module 152, which may be made up of a video player module and a music player module; notes module 153; map module 154; and/or online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, handwriting input module 157, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, handwriting input module 157, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, handwriting input module 157, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, handwriting input module 157, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, handwriting input module 157, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, handwriting input module 157, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, handwriting input module 157, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, handwriting input module 157, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, handwriting input module 157, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, handwriting input module 157, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, handwriting input module 157, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, handwriting input module 157, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, handwriting input module 157, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, handwriting input module 157, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, handwriting input module 157, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

Figure 2:
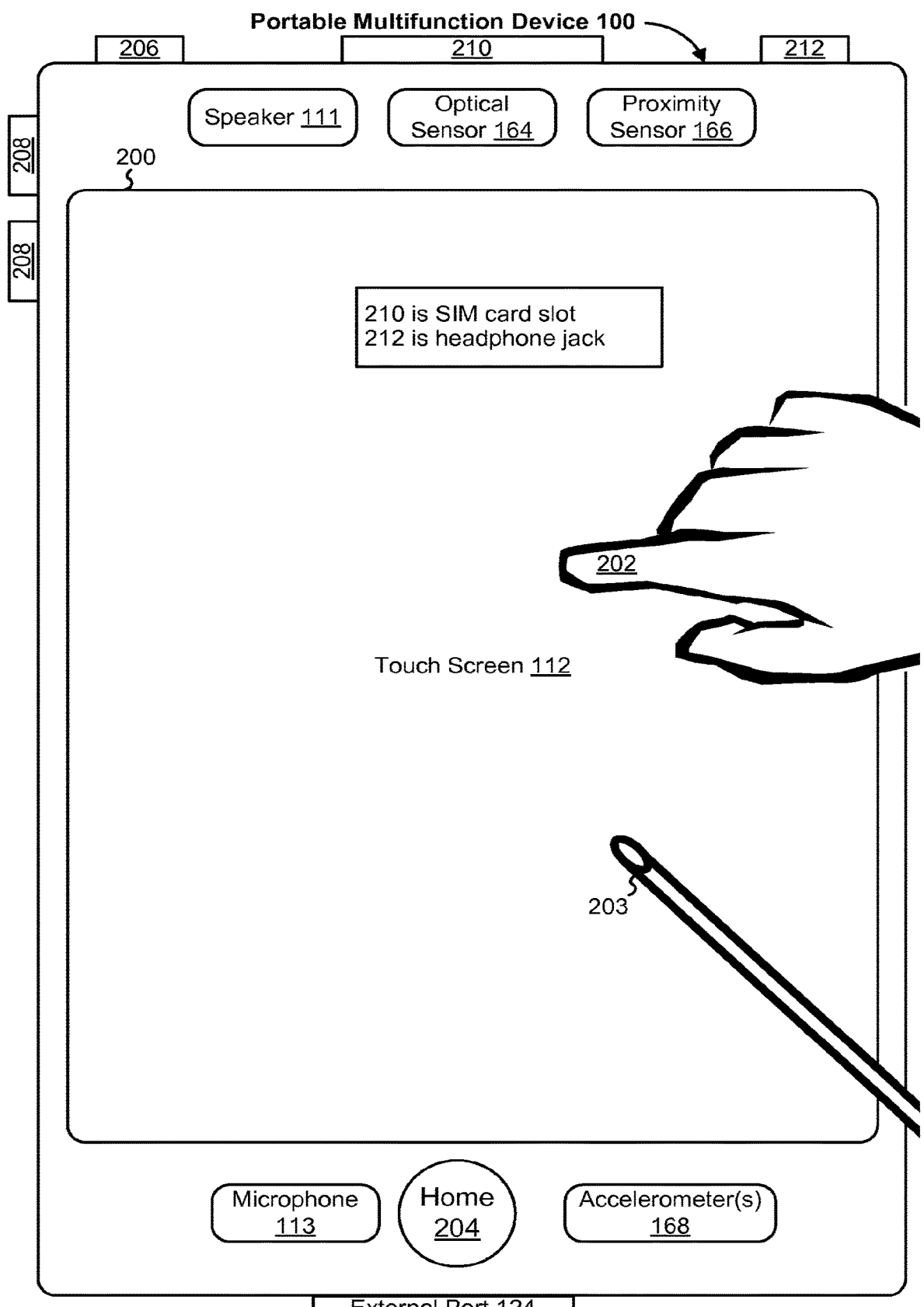
FIG. 2 illustrates a portable multifunction device having a touch-sensitive display in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval;

to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, a telephony device, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods may be used for other user interfaces described herein.

Attention is now directed towards embodiments of handwriting input methods and user interfaces ("UI") that may be implemented on a multifunction device (e.g., device 100).

Figure 5:
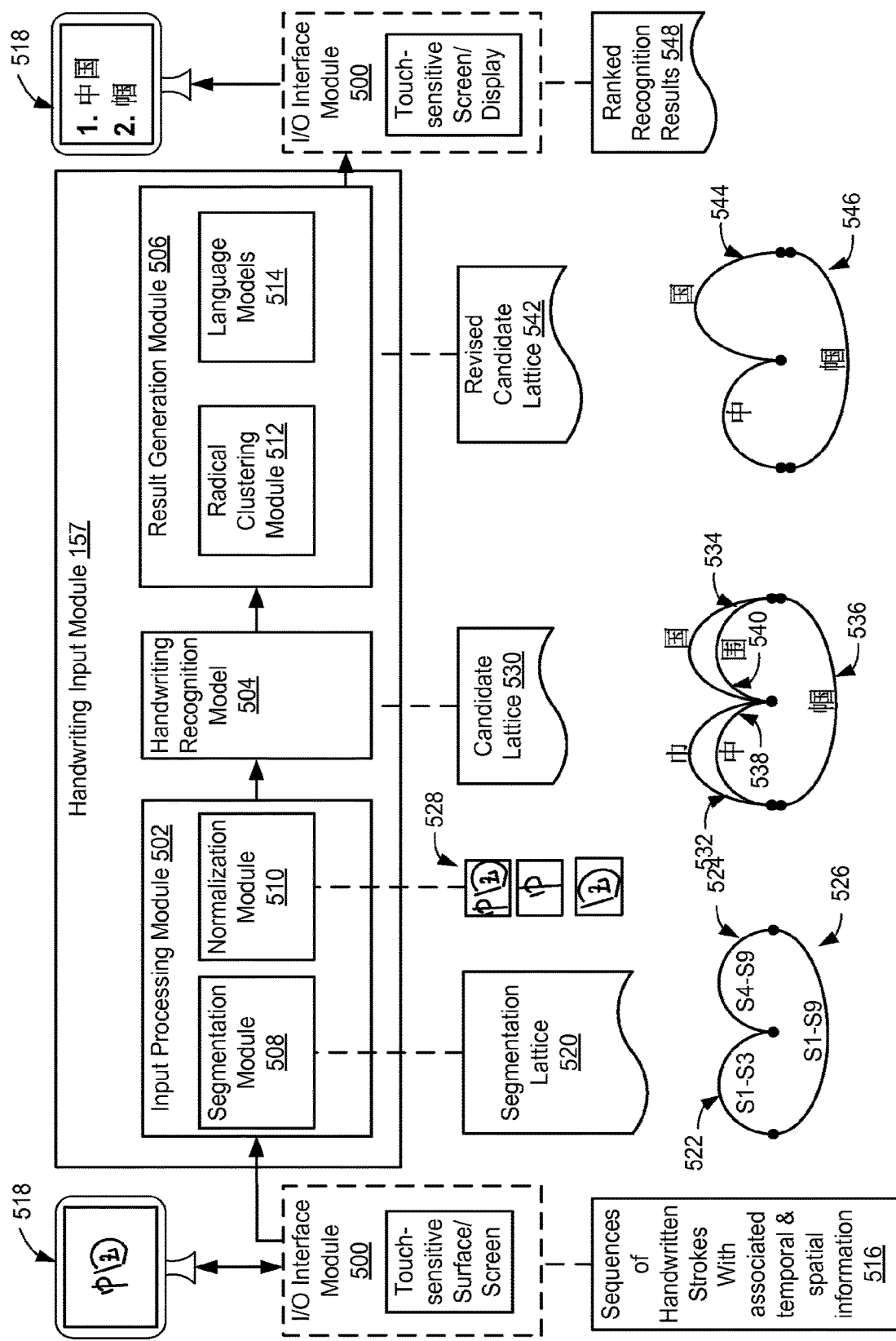
FIG. 5 is a block diagram of an operating environment of a handwriting input system in accordance with some embodiments.

FIG. 5 is a block diagram illustrating an exemplary handwriting input module 157 that interacts with the I/O interface module 500 (e.g., I/O interface 330 in FIG. 3 or I/O subsystem 106 in FIG. 1) to provide handwriting input capabilities on the device in accordance with some embodiments. As shown in FIG. 5, the handwriting input module 157 includes an input processing module 502, a handwriting recognition module 504, and a result generation module 506. In some embodiments, the input processing module 502 includes a segmentation module 508, and a normalization module 510. In some embodiments, the result generation module 506 includes a radical clustering module 512 and one or more language models 514.

In some embodiments, the input processing module 502 communicates with the I/O interface module 500 (e.g., I/O interface 330 in FIG. 3 or I/O subsystem 106 in FIG. 1) to receive handwriting inputs from a user. Handwriting is input via any suitable means, such as a touch-sensitive display system 112 in FIG. 1 and/or a touchpad 355 in FIG. 3. The handwriting inputs include data representing each stroke provided by the user within a predetermined handwriting input area within the handwriting input UI. In some embodiments, the data representing each stroke of the handwriting input includes data such as the start and end locations, the intensity profile, and the motion path of a sustained contact (e.g., a contact between the user's finger or a stylus and the touch-sensitive surface of the device) within the handwriting input area. In some embodiments, the I/O Interface module 500 passes the sequences of handwritten strokes 516 with associated temporal and spatial information to the input processing module 502 in real-time. At the same time, the I/O Interface module also provides real-time rendering 518 of the handwritten strokes within the handwriting input area of the handwriting input user interface as visual feedback to the user's input.

In some embodiments, as the data representing each handwritten stroke is received by the input processing module 502, the temporal and sequence information associated with multiple consecutive strokes is also recorded. For example, the data optionally includes a stack showing the shape, size, spatial saturation of the individual strokes with respective stroke sequence numbers, and relative spatial locations of the strokes along a writing direction of the entire handwriting input, etc. In some embodiments, the input processing module 502 provides instructions back to the I/O interface modules 500 to render the received strokes on a display 518 (e.g., display 340 in FIG. 3 or touch-sensitive display 112 in FIG. 1) of the device. In some embodiments, the rendering of the received strokes is animated to provide a visual effect mimicking actual progress of writing on a writing surface (e.g., a sheet of paper) with a writing instrument (e.g., a pen). In some embodiments, the user is optionally allowed to specify the pen-tip style, color, texture, etc. of the rendered strokes.

In some embodiments, the input processing module 502 processes the strokes currently accumulated in the handwriting input area to assign the strokes into one or more recognition units. In some embodiments, each recognition unit corresponds to a character that is to be recognized by the handwriting recognition model 504. In some embodiments, each recognition unit corresponds to an output character or a radical that is to be recognized by the handwriting recognition model 504. A radical is a recurring component that is found in multiple composite logographic characters. A composite logographic character may include two or more radicals arranged in accordance with a common layout (e.g., a left-right layout, a top-bottom layout, etc.). In one example, a single Chinese character "听" is constructed using two radicals, i.e., a left radical "口" and a right radical "斤".

In some embodiments, the input processing module 502 relies on the segmentation module to assign or divide the currently accumulated handwritten strokes into one or more recognition units. For example, when segmenting the strokes for the handwritten character "听", the segmentation module 508 optionally assigns the strokes clustered on the left side of handwriting input to one recognition unit (i.e., for the left radical "口"), and the strokes clustered on the right side of the handwriting input to another recognition unit (i.e., for the right radical "斤"). Alternatively, the segmentation module 508 may also assign all of the strokes into a single recognition unit (i.e., for the character "听").

In some embodiments, the segmentation module 508 segments the currently accumulated handwriting input (e.g., one or more handwritten strokes) into a group of recognition units in several different ways to create a segmentation lattice 520. For example, suppose a total of nine strokes have been accumulated in the handwriting input area so far. According to a first segmentation chain of the segmentation lattice 520, strokes 1, 2, 3 are grouped into a first recognition unit 522, and strokes 4, 5, 6 are grouped into a second recognition unit 526. According to a second segmentation chain of the segmentation lattice 520, all of strokes 1-9 are grouped into one recognition unit 526.

In some embodiments, each segmentation chain is given a segmentation score to measure the likelihood that the particular segmentation chain is a correct segmentation of the current handwriting input. In some embodiments, factors that are optionally used to calculate the segmentation score of each segmentation chain include: absolute and/or relative size of the stroke, relative and/or absolute span of the stroke in various directions (e.g., x, y, z directions), average of and/or variations in the saturation level of the stroke, absolute and/or relative distances to adjacent strokes, absolute and/or relative locations of the strokes, the order or sequence by which the strokes are entered, the duration of each stroke, average of and/or variations in the speed (or tempo) by which each stroke has been entered, the intensity profile of each stroke along the length of the stroke, etc. In some embodiments, one or more functions or transformations are optionally applied to one or more of these factors to generate the segmentation scores of the different segmentation chains in the segmentation lattice 520.

In some embodiments, after the segmentation module 508 has segmented the current handwriting input 516 received from the user, the segmentation module 508 passes the segmentation lattice 520 to the normalization module 510. In some embodiments, the normalization module 510 generates an input image (e.g., input images 528) for each recognition unit (e.g., recognition units 522, 524, and 526) specified in the segmentation lattice 520. In some embodiments, the normalization module performs the necessary or desired normalization (e.g., stretching, cropping, down-sample or up-sampling) to the input image, such that the input image can be provided to the handwriting recognition model 504 as input. In some embodiments, each input image 528 includes the strokes assigned to one respective recognition unit, and corresponds to one character or radical that is to be recognized by the handwriting recognition module 504.

In some embodiments, the input images generated by the input processing module 502 does not include any temporal information associated with the individual strokes, and only spatial information (e.g. information represented by the location and density of pixels in the input image) are preserved in the input image. A handwriting recognition model trained purely on spatial information of the training writing samples is capable of handwriting recognition based on spatial information alone. As a result, the handwriting recognition model is stroke-order and stroke-direction independent, without exhaustively enumerating all possible permutations of stroke-orders and stroke-directions for all characters in its vocabulary (i.e., all output classes) during training. In fact, in some embodiments, the handwriting recognition module 502 does not differentiate the pixels belonging to one stroke versus another within the input image.

As will be explained in more detail later (e.g., with respect to FIGS. 25A-27), in some embodiments, some temporally-derived stroke distribution information is reintroduced into a purely-spatial handwriting recognition model to improve recognition accuracy without compromising the stroke-order, and stroke-direction independence of the recognition model.

In some embodiments, the input image generated by the input processing module 502 for one recognition unit does not overlap with the input image of any other recognition unit in the same segmentation chain. In some embodiments, input images generated for different recognition units may have some overlap. In some embodiments, some overlap between input images is permitted for recognizing handwriting input written in a cursive writing style and/or including run-on characters (e.g., one stroke connecting two adjacent characters).

In some embodiments, some normalization is performed before segmentation. In some embodiments, the functions of the segmentation module 508 and the normalization module 510 may be performed by the same module or two or more other modules.

In some embodiments, as the input image 528 of each recognition unit is provided to the handwriting recognition model 504 as input, the handwriting recognition model 504 produces an output consisting of different likelihood of the recognition unit being a respective output character in the repertoire or vocabulary (i.e., the list of all characters and radicals recognizable by the handwriting recognition module 504) of handwriting recognition model 504. As will be explained in more detail later, the handwriting recognition model 504 has been trained to recognize a large number of characters in multiple scripts (e.g., at least three non-overlapping scripts that have been encoded by the Unicode standard). Examples of non-overlapping scripts include the Latin script, Chinese characters, Arabic letters, Farsi, Cyrillic, and artificial scripts such as emoji characters. In some embodiments, the handwriting recognition model 504 produces one or more output characters for each input image (i.e., for each recognition unit), and assigns a respective recognition score for each output character based on the confidence level associated with the character recognition.

In some embodiments, the handwriting recognition model 504 generates a candidate lattice 530 in accordance with the segmentation lattice 520, where each arc in a segmentation chain (e.g., corresponding to a respective recognition unit 522, 524, 526) in the segmentation lattice 520 is expanded into one or more candidate arcs (e.g., arcs 532, 534, 536, 538, 540 each corresponding to a respective output character) within the candidate lattice 530. Each candidate chain within the candidate lattice 530 is scored according to the respective segmentation score of the segmentation chain underlying the candidate chain, and the recognition scores associated with the output characters in the character chain.

In some embodiments, after the handwriting recognition model 504 produces the output characters from the input images 528 of the recognition units, the candidate lattice 530 is passed to the result generation module 506 to generate one or more recognition results for the currently accumulated handwriting input 516.

In some embodiments, the result generation module 506 utilizes the radical clustering module 512 to combine one or more radicals in a candidate chain into a composite character. In some embodiments, the result generation module 506 uses one or more language models 514 to determine whether a character chain in the candidate lattice 530 is a likely sequence in a particular language represented by the language models. In some embodiments, the result generation module 506 generates a revised candidate lattice 542 by eliminating particular arcs or combining two or more arcs in the candidate lattice 530.

In some embodiments, the result generation module 506 generates an integrated recognition score for each character sequence still remaining in the revised candidate lattice 542 (e.g., character sequences 544 and 546), based on the recognition scores of the output characters in the character sequence, as modified (e.g., augmented or diminished) by the radical clustering module 512 and language models 514. In some embodiments, the result generation module 506 ranks the different character sequences remaining in the revised candidate lattice 542 based on their integrated recognition scores.

In some embodiments, the result generation module 506 sends the top-ranked character sequences as ranked recognition results 548 to the I/O interface module 500 to display to the user. In some embodiments, the I/O interface module 500 displays the received recognition results 548 (e.g., "中医" and "蓝") in a candidate display area of the handwriting input interface. In some embodiments, the I/O interface module displays multiple recognition results (e.g., "中医" and "蓝") for the user, and allows the user to select a recognition result to enter as a text input for a relevant application. In some embodiments, the I/O interface module automatically enters a top-ranked recognition result (e.g., "蓝") in response to other inputs or indications of user confirmation of the recognition result. Effective automatic entry of a top-ranked result can improve the efficiency of the input interface and provide a better user experience.

In some embodiments, the result generation module 506 uses other factors to alter the integrated recognition scores of the candidate chains. For example, in some embodiments, the result generation module 506 optionally maintains a log of most frequently used characters for a particular user, or a multitude of users. The result generation module 506 optionally boosts the integrated recognition scores of particular candidate characters or character sequences, if the particular candidate characters or character sequences are found among the list of most frequently used characters or character sequences.

In some embodiments, the handwriting input module 157 provides real-time updates for the recognition results displayed to the user. For example, in some embodiments, for each additional stroke entered by the user, the input processing module 502 optionally re-segments the currently accumulated handwriting input, and revises the segmentation lattice and input images provided to the handwriting recognition model 504. In turn, the handwriting recognition model 504 optionally revises the candidate lattice provided to the result generation module 506. As a result, the result generation module 506 optionally updates the recognition results presented to the user. As used in this specification, real-time handwriting recognition refers to handwriting recognition in which handwriting recognition results are presented to the user instantaneously or within a short time period (e.g., within tens of milliseconds to seconds). Real-time handwriting recognition differs from offline recognition (e.g., as in offline optical character-recognition (OCR) applications) in that recognition is initiated immediately and performed substantially contemporaneously with receipt of the handwriting input, rather than at a time after the current user session from a recorded image that is saved for later retrieval. In addition, offline character recognition is performed without any temporal information regarding individual strokes and stroke sequences, and thus segmentation is performed without the benefit of such information. Further disambiguation between similar-looking candidate characters are also without the benefit of such temporal information.

Figure 6:
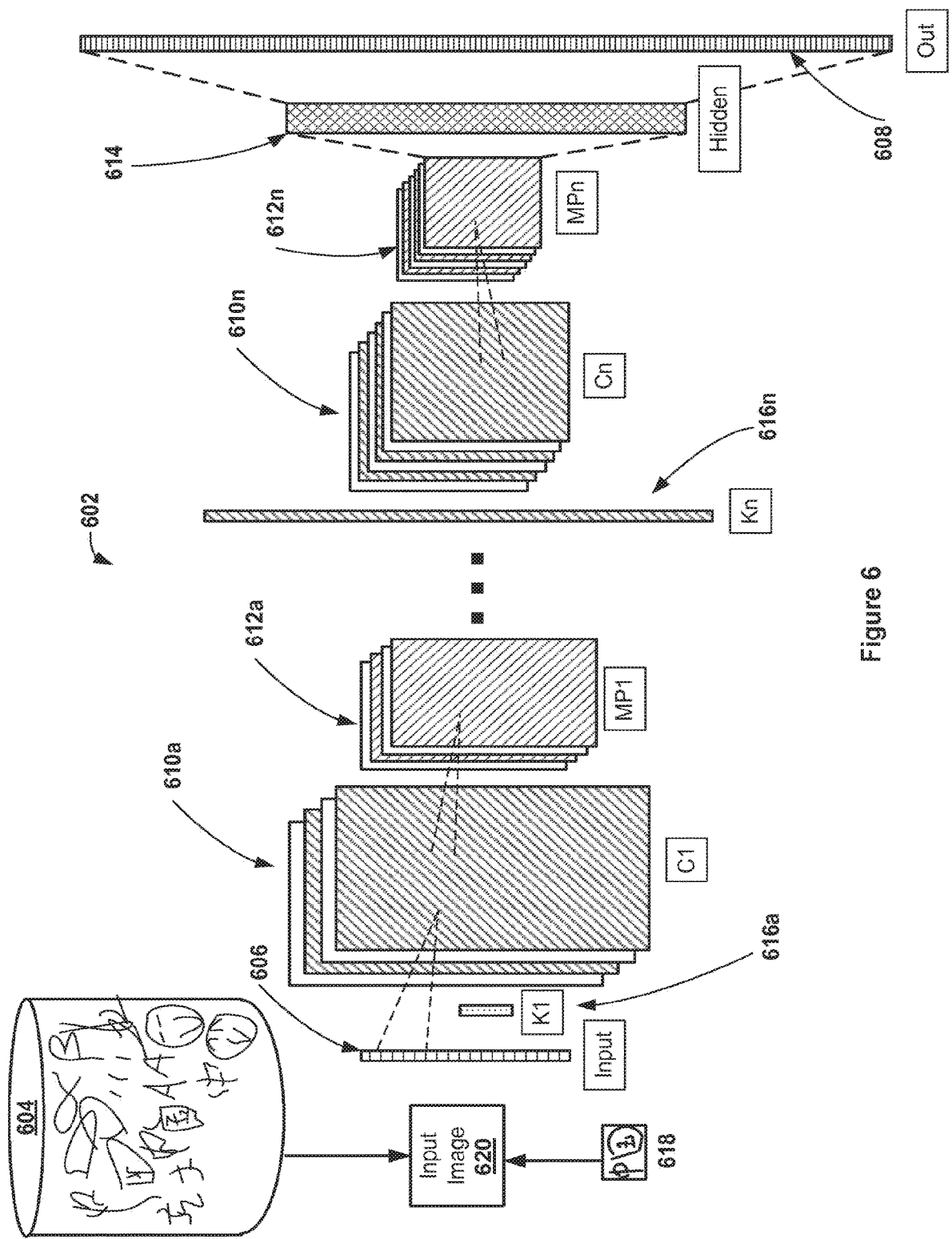
FIG. 6 is a block diagram of a multi-script handwriting recognition model in accordance with some embodiments.

In some embodiments, the handwriting recognition model 504 is implemented as a convolutional neural network (CNN). FIG. 6 illustrates an exemplary convolutional neural network 602 trained on a multi-script training corpus 604 containing writing samples for characters in multiple non-overlapping scripts.

As shown in FIG. 6, the convolutional neural network 602 includes an input plane 606, and output plane 608. Between the input plane 606 and the output plane 608 reside a plurality of convolutional layers 610 (e.g., including a first convolutional layer 610a, zero or more intermediate convolutional layers (not shown), and a last convolutional layer 610n). Each convolutional layer 610 is followed by a respective sub-sampling layer 612 (e.g., a first sub-sampling layer 612a, zero or more intermediate sub-sampling layers (not shown), and a last sub-sampling layer 612n). After the convolutional layers and the sub-sampling layers and right before the output plane 608 resides a hidden layer 614. The hidden layer 614 is the last layer before the output plane 608. In some embodiments, a kernel layer 616 (e.g., including a first kernel layer 616a, zero or more intermediate kernel layers (not shown), and a last kernel layer 612n) is inserted before each convolutional layer 610 to improve computation efficiency.

As shown in FIG. 6, the input plane 606 receives an input image 620 of a handwritten recognition unit (e.g., a handwritten character or radical), and the output plane 608 outputs a set of probabilities indicating the likelihood that the recognition unit belongs to respective output class (e.g., a particular character among an output character set that the neural network is configured to recognize). The output classes of the neural network as a whole (or the output character set of the neural network) are also referred to as the repertoire or vocabulary of the handwriting recognition model. The convolutional neural network described herein can be trained to have a repertoire of tens of thousands of characters.

When an image 620 is processed through the different layers of the neural network, different spatial features embedded in the image 620 are extracted by the convolutional layers 610. Each convolutional layer 610 is also referred to as a set of feature maps and act as filters for picking out particular features in the image 620 for differentiating between the images corresponding to different characters. The sub-sampling layers 612 ensure that features on an increasingly larger scale are captured from the image 620. In some embodiments, the sub-sampling layers 612 are implemented using a max-pooling technique. The max-pooling layers create position invariance over larger local regions and down samples the output image of the preceding convolutional layer by a factor of Kx and Ky along each direction, Kx and Ky being the size of the max-pooling rectangle. Max-pooling leads to a faster convergence rate by selecting superior invariant features which improves generalization performances. In some embodiments, sub-sampling is achieved using other methods.

In some embodiments, after the last set of convolutional layer 610n and sub-sampling layer 612n and before the output plane 608 resides a fully-connected layer, namely the hidden layer 614. The fully-connected hidden layer 614 is a multi-layer perceptron that fully connects the nodes in the last sub-sampling layer 612n and the nodes in the output plane 608. The hidden layer 614 takes the output images received from the layer before and through logistic regression reaches one of the output characters in the output layer 608.

During training of the convolutional neural network 602, features and respective weights associated with the features in the convolutional layers 610, as well as weights associated with the parameters in the hidden layer 614 are tuned such that classification errors are minimized for the writing samples with known output classes in the training corpus 604. Once the convolutional neural network 602 has been trained, and the optimal set of parameters and associated weights have been established for the different layers in the network, the convolutional neural network 602 can be used to recognize new writing samples 618 that are not part of the training corpus 604, such as input images generated based on real-time handwriting input received from the user.

As described in herein, the convolutional neural network of a handwriting input interface is trained using a multi-script training corpus to enable multi-script or mixed-script handwriting recognition. In some embodiments, the convolutional neural network is trained to recognize a large repertoire of 30 thousand to over 60 thousand characters (e.g., all characters encoded by the Unicode standard). Most state-of-the-art handwriting recognition systems are based on stroke-order dependent Hidden Markov Methods (HMMs). In addition, most existing handwriting recognition models are language-specific, and include a small repertoire of tens of characters (e.g., characters of the English alphabet, the Greek alphabet, all ten digits, etc.), up to a few thousand of characters (e.g., a set of most commonly used Chinese character). As such, the universal recognizer described herein can handle orders of magnitudes more characters than most existing systems.

Some conventional handwriting systems may include several individually trained handwriting recognition models, each tailored for a particular language or a small set of characters. A writing sample is propagated through the different recognition models until a classification can be made. For example, the handwriting sample may be provided to a series of concatenated language-specific or script-specific character recognition models, if the handwriting sample cannot be conclusively classified by a first recognition model, it is provided to a next recognition model, which attempts to classify the handwriting sample within its own repertoire. The approach for classification is time consuming, and the memory requirement increases quickly with each additional recognition model that needs to be employed.

Other state-of-the art models require the user to specify a preferred language, and use the selected handwriting recognition model to classify the current input. Such implementations not only are cumbersome to use and consume significant memory, but also cannot be used to recognize mixed language input. Requiring the user to switch language preferences in the middle of inputting a mixed-language or mixed-script input is impractical.

The multi-script or universal recognizer described herein addresses at least some of the above issues with the conventional recognition systems. FIG. 7 is a flow chart of an exemplary process 700 for training a handwriting recognition module (e.g., a convolutional neural network) using a large multi-script training corpus, such that the handwriting recognition module can be subsequently used to provide real-time multi-language and multi-script handwriting recognition for a user's handwriting input.

In some embodiments, the training of the handwriting recognition model is performed on a server device, and the trained handwriting recognition model is then provided to a user device. The handwriting recognition model optionally performs real-time handwriting recognition locally on the user device without requiring further assistance from the server. In some embodiments, both the training and the recognition is provided on the same device. For example, a server device can receive the user's handwriting input from a user device, performs the handwriting recognition, and sends the recognition results to the user device in real-time.

In the exemplary process 700, at a device having one or more processors and memory, the device trains (702) a multi-script handwriting recognition model based on spatially-derived features (e.g., stroke-order independent features) of a multi-script training corpus. In some embodiments, the spatially-derived features of the multi-script training corpus are (704) stroke-order independent and stroke-direction independent. In some embodiments, the training of the multi-script handwriting recognition model is (706) independent of temporal information associated with respective strokes in the handwriting samples. Specifically, images of the handwriting samples are normalized to a predetermined size, and the images do not include any information on the order by which individual strokes are entered to form the image. Furthermore, the images also do not include any information on the direction by which individual strokes are entered to form the image. In fact, during training, features are extracted from the handwriting images without regard to how the images are temporally formed by the individual strokes. Therefore, during recognition, no temporal information related to the individual strokes is needed. As a result, the recognition robustly provides consistent recognition results despite of delayed, out-of-order strokes, and arbitrary stroke directions in the handwriting input.

In some embodiments, the multi-script training corpus includes handwriting samples corresponding to characters of at least three non-overlapping scripts. As shown in FIG. 6, the multi-script training corpus includes handwriting samples collected from many users. Each handwriting sample corresponds to one character of a respective script that is represented the handwriting recognition model. To adequately train the handwriting recognition model, the training corpus includes a large number of writing samples for each character of the scripts represented in the handwriting recognition model.

In some embodiments, the at least three non-overlapping scripts include (708) Chinese characters, emoji characters, and Latin script. In some embodiments, the multi-script handwriting recognition model has (710) at least thirty thousand output classes, representing thirty thousand characters spanning at least three non-overlapping scripts.

In some embodiments, multi-script training corpus includes respective writing samples for each character of all Chinese characters encoded in the Unicode standard (e.g., all or a substantial portion of all CJK (Chinese-Japanese-Korean) unified ideographs). The Unicode standard defines a total of about seventy-four thousand CJK unified ideographs. The basic block (4E00-9FFF) of the CJK unified ideographs includes 20,941 basic Chinese characters, which are used in the Chinese language, as well as in Japanese, Korean, and Vietnamese languages. In some embodiments, the multi-script training corpus includes writing samples for all characters in the basic block of the CJK unified ideographs. In some embodiments, the multi-script training corpus further includes writing samples for CJK radicals that can be used to structurally compose one or more composite Chinese characters. In some embodiments, the multi-script training corpus further includes writing samples for less frequently used Chinese characters, such as the Chinese characters encoded in one or more of the CJK unified ideograph extensions.

In some embodiments, the multi-script training corpus further includes respective writing samples for each character of all characters in the Latin script encoded by the Unicode standard. The characters in the basic Latin script include capital and small Latin letters, as well as various basic symbols and digits commonly used on a standard Latin keyboard. In some embodiments, the multi-script training corpus further includes characters in the extended Latin script (e.g., various accented forms of the basic Latin letters).

In some embodiments, the multi-script training corpus includes writing samples that correspond to each character of an artificial script that is not associated with any natural human language. For example, in some embodiments, a set of emoji characters is optionally defined in an emoji script, and writing samples corresponding to each of the emoji characters are included in the multi-script training corpus. For example, a hand-drawn heart-shaped symbol is a handwriting sample for the emoji character "♥" in the training corpus. Similarly, a hand-drawn smiley face (e.g., two dots above an upturned arc) is a handwriting sample for the emoji character "☺" in the training corpus. Other emoji characters includes categories of icons showing different emotions (e.g., happy, sad, angry, embarrassed, shocked, laughing, crying, frustrated, etc.), different objects and characters (e.g., cat, dog, bunny, heart, fruit, eye, lips, gift, flowers, candle, moon, star, etc.), and different actions (e.g., hand-shake, kiss, run, dance, jump, sleep, eat, meet, love, like, vote, etc.), etc. In some embodiments, the strokes in the handwriting sample corresponding to an emoji character are simplified and/or stylized lines of the actual lines forming the corresponding emoji character. In some embodiments, each device or application may use a different design for the same emoji character. For example, a smiley emoji character presented to a female user may be different from a smiley emoji character presented to a male user, even if the handwriting inputs received from the two users are substantially the same.

In some embodiments, the multi-script training corpus also includes writing samples for characters in other scripts, such as the Greek script (e.g., including Greek letters and symbols), the Cyrillic script, the Hebrew script, and one or more other scripts encoded according to the Unicode standard. In some embodiments, the at least three non-overlapping scripts included in the multi-script training corpus include Chinese characters, emoji characters, and characters in the Latin script. Chinese characters, emoji characters, and Characters in the Latin script are naturally non-overlapping scripts. Many other scripts may overlap with one another for at least some characters. For example, some characters (e.g., A, Z) in the Latin script may be found in many other scripts (e.g., Greek, and Cyrillic). In some embodiments, the multi-script training corpus includes Chinese characters, Arabic script, and Latin script. In some embodiments, the multi-script training corpus includes other combinations of overlapping and/or non-overlapping scripts. In some embodiments, the multi-script training corpus includes writing samples for all characters encoded by the Unicode standard.

As shown in FIG. 7, in some embodiments, to train the multi-script handwriting recognition model, the device provides (712) the handwriting samples of the multi-script training corpus to a single convolutional neural network having a single input plane and a single output plane. The device determines (714) using the convolutional neural network, the spatially-derived features (e.g., stroke-order independent features) of the handwriting samples and respective weights for the spatially-derived features for differentiating characters of the at least three non-overlapping scripts represented in the multi-script training corpus. The multi-script handwriting recognition model differs from conventional multi-script handwriting recognition models in that, a single handwriting recognition model having a single input plane and a single output plane is trained using all samples in the multi-script training corpus. A single convolutional neural network is trained to distinguish all characters represented in the multi-script training corpus, without relying on individual sub-networks that each handles a small subset of the training corpus (e.g., sub-networks each trained for recognizing characters of a particular script or characters used in a particular language). In addition, the single convolutional neural network is trained to distinguish a large number of characters spanning multiple non-overlapping scripts, rather than characters of a few overlapping scripts, such as the Latin script and the Greek script (e.g., with overlapping letters A, B, E, Z, etc.).

In some embodiments, the device provides (716) real-time handwriting recognition for a user's handwriting input using the multi-script handwriting recognition model that has been trained on the spatially-derived features of the multi-script training corpus. In some embodiments, providing real-time handwriting recognition for a user's handwriting input includes continuously revising a recognition output for the user's handwriting input as the user continues to provide additions and revisions of the handwriting input. In some embodiments, providing real-time handwriting recognition for a user's handwriting input further includes (718) providing the multi-script handwriting recognition model to a user device, where the user device receives a handwriting input from a user, and locally performs handwriting recognition on the handwriting input based on the multi-script handwriting recognition model.

In some embodiments, the device provides the multi-script handwriting recognition model to a plurality of devices that have no existing overlap in their respective input languages, and the multi-script handwriting recognition model is used on each of the plurality of devices for handwriting recognition of a different language associated with said each user device. For example, when the multi-script handwriting recognition model has been trained to recognize characters in many different scripts and languages, the same handwriting recognition model can be used worldwide to provide handwriting input for any of those input languages. A first device for a user who only wishes to input in English and Hebrew can use the same handwriting recognition model to provide handwriting input functionality as a second device for another user who only wishes to input in Chinese and emoji characters. Instead of requiring the user of the first device to separately install a English handwriting input keyboard (e.g., implemented with an English-specific handwriting recognition model), and a separate Hebrew handwriting input keyboard (e.g., implemented with a Hebrew-specific handwriting recognition model), the same universal multi-script handwriting recognition model can be installed once on the first device, and used to provide handwriting input function for both English, Hebrew, as well as mixed input in both languages. Furthermore, instead of requiring the second user to install a Chinese handwriting input keyboard (e.g., implemented with a Chinese-specific handwriting recognition model), and a separate emoji handwriting input keyboard (e.g., implemented with an emoji handwriting recognition model), the same universal multi-script handwriting recognition model can be installed once on the second device, and used to provide handwriting input function for both Chinese, emoji, as well as mixed input in both scripts. Using the same multi-script handwriting model to handle a large repertoire spanning multiple scripts (e.g., a substantial portion or all of the characters encoded in nearly one hundred different scripts) improves the utility of the recognizer without substantial burden on part of the device suppliers and the users.

The multi-script handwriting recognition model training using a large multi-script training corpus differ from conventional HMI-based handwriting recognition system, and does not rely on temporal information associated with individual strokes of the characters. In addition, the resource and memory requirement for the multi-script recognition system does not increase linearly with the increase of symbols and languages covered by the multi-script recognition system. For example, in a conventional handwriting system, increasing the number of languages means adding another independently trained model, and the memory requirement would be at least doubled to accommodate the increasing capability of the handwriting recognition system. In contrast, when the multi-script model is trained by a multi-script training corpus, increasing language coverage requires retraining the handwriting recognition model with additional handwriting samples, and increasing the size of the output plane, but the amount of increase is very moderate. Suppose that the multi-script training corpus includes handwriting samples corresponding to n different languages, and the multi-script handwriting recognition model occupies a memory of size m, when increasing the language coverage to N languages (N>n), the device re-trains the multi-script handwriting recognition model based on spatially-derived features of a second multi-script training corpus, the second multi-script training corpus including second handwriting samples corresponding to the N different languages. The changes in M/m remain substantially constant within a range of 1-2, with the changes in N/n from 1 to 100. Once the multi-script handwriting recognition model has been retrained, the device can provide real-time handwriting recognition for a user's handwriting input using the re-trained multi-script handwriting recognition model.

Figure 8A:
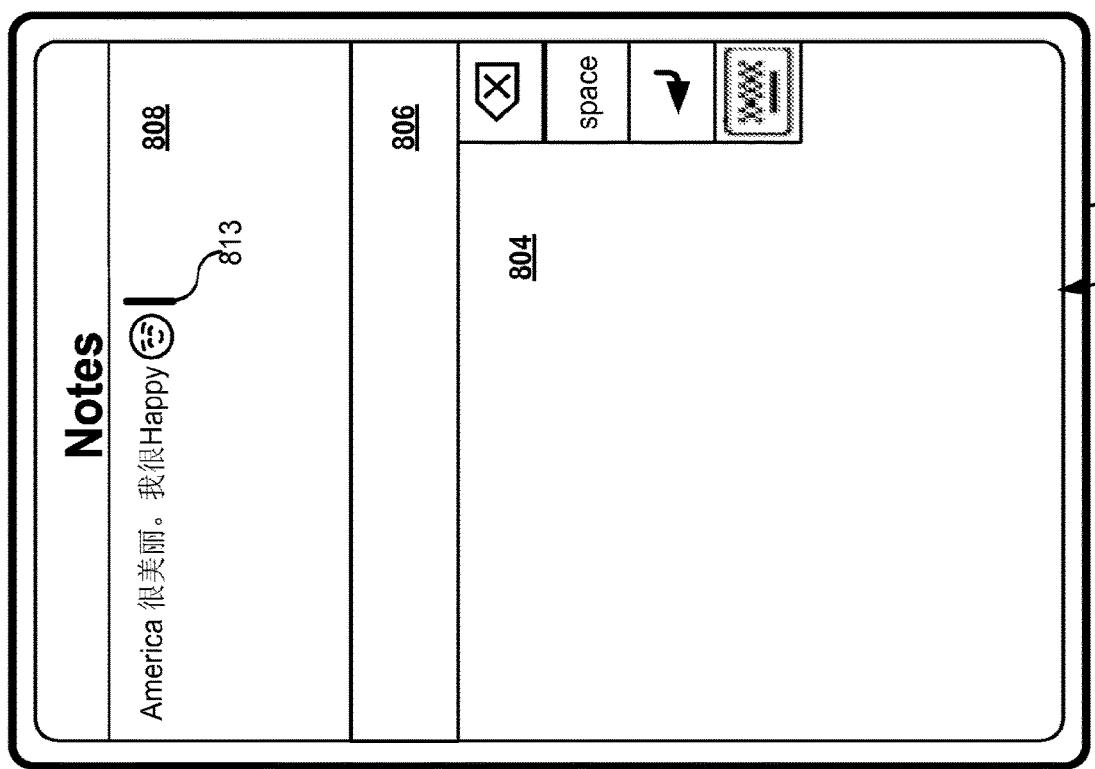
FIGS. 8A-8B show exemplary user interfaces showing real-time, multi-script handwriting recognition and input on a portable multifunction device in accordance with some embodiments.
Figure 8B:
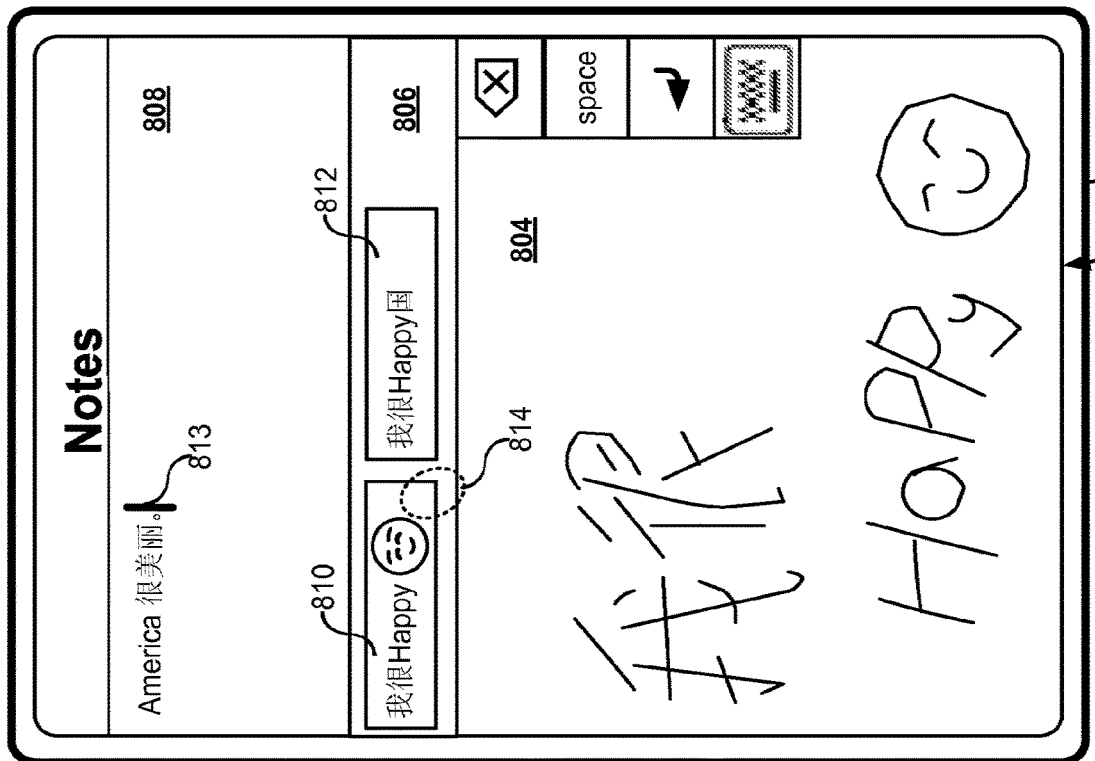

FIGS. 8A-8B show exemplary user interfaces for providing real-time, multi-script handwriting recognition and input on a portable user device (e.g., device 100). In FIGS. 8A-8B, the handwriting input interface 802 is displayed on a touch-sensitive display screen (e.g., touch screen 112) of the user device. The handwriting input interface 802 includes a handwriting input area 804, a candidate display area 806, and a text input area 808. In some embodiments, the handwriting input interface 802 further includes a plurality of control elements, where each can be invoked to cause the handwriting input interface to perform a predetermined function. As shown in FIG. 8A, a delete button, a space button, a carriage return or Enter button, a keyboard switching button are included in the handwriting input interface. Other control elements are possible, and can be optionally provided in the handwriting input interface to suit each different application utilizing the handwriting input interface 802. The layout of the different components of the handwriting input interface 802 is merely illustrative, and can vary for different devices and different applications.

In some embodiments, the handwriting input area 804 is a touch-sensitive area for receiving handwriting input from the user. A sustained contact and its associated motion path on the touch screen within the handwriting input area 804 are registered as a handwritten stroke. In some embodiments, the handwritten stroke registered by the device is visually rendered within the handwriting input area 804 at the same locations traced by the sustained contact. As shown in FIG. 8A, the user has provided a number of handwritten strokes in the handwriting input area 804, including some handwritten Chinese characters (e.g., "我很"), some handwritten English letters (e.g., "Happy"), and a hand-drawn emoji character (e.g., a smiley). The handwritten characters are distributed in multiple lines (e.g., two lines) in the handwriting input area 804.

In some embodiments, the candidate display area 806 displays one or more recognition results (e.g., 810 and 812) for the handwriting input currently accumulated in the handwriting input area 804. In general, the top-ranked recognition result (e.g., 810) is displayed in the first position in the candidate display area. As shown in FIG. 8A, since the handwriting recognition model described herein is capable of recognizing characters of multiple non-overlapping scripts including Chinese characters, the Latin script, and emoji characters, the recognition result (e.g., 810) provided by the recognition model correctly includes the Chinese characters, English letters, and the emoji character represented by the handwriting input. The user is not required to stop in the middle of writing the input to choose or switch the recognition languages.

In some embodiments, the text input area 808 is an area that displays text input provided to a respective application that is employing the handwriting input interface. As shown in FIG. 8A, the text input area 808 is used by a Notes application, and text (e.g., "America 根美國 ") currently shown within the text input area 808 is text input already provided to the Notes application. In some embodiments, a cursor 813 indicates a current text input position in the text input area 808.

In some embodiments, a user can select a particular recognition result displayed in the candidate display area 806, e.g., by an explicit selection input (e.g., a tap gesture on one of the displayed recognition result), or an implicit confirmation input (e.g., a tap gesture on the "Enter" button or a double tap gesture in the handwriting input area). As shown in FIG. 8B, the user has explicitly selected the top-ranked recognition result 810 using a tap gesture (as indicated by a contact 814 over the recognition result 810 in FIG. 8A). In response to the selection input, text of the recognition result 810 is inserted at the insertion point indicated by the cursor 813 in the text input area 808. As shown in FIG. 8B, once the text of the selected recognition result 810 has been entered into the text input area 808, the handwriting input area 804 and the candidate display area 806 are both cleared. The handwriting input area 804 is now ready to accept a new handwriting input, and the candidate display area 806 can now be used to display recognition results for the new handwriting input. In some embodiments, an implicit confirmation input causes the top-ranked recognition result to be entered into the text input area 808 without requiring the user to stop and select the top-ranked recognition result. A well-designed implicit confirmation input improves text entry speed and reduces cognitive burden placed on the user during text composition.

In some embodiments (not shown in FIGS. 8A-8B), the top-ranked recognition result of a current handwriting input is optionally tentatively displayed in the text input area 808. The tentative text input shown in the text input area 808 is visually distinguished from other text input in the text input area, e.g., by a tentative input box surrounding the tentative text input. The text shown in the tentative input box is not yet committed or provided to the associated application (e.g., the Notes application), and is automatically updated when the top-ranked recognition result is changed by the handwriting input module, e.g., in response to user revision of the current handwriting input.

Figure 9B:
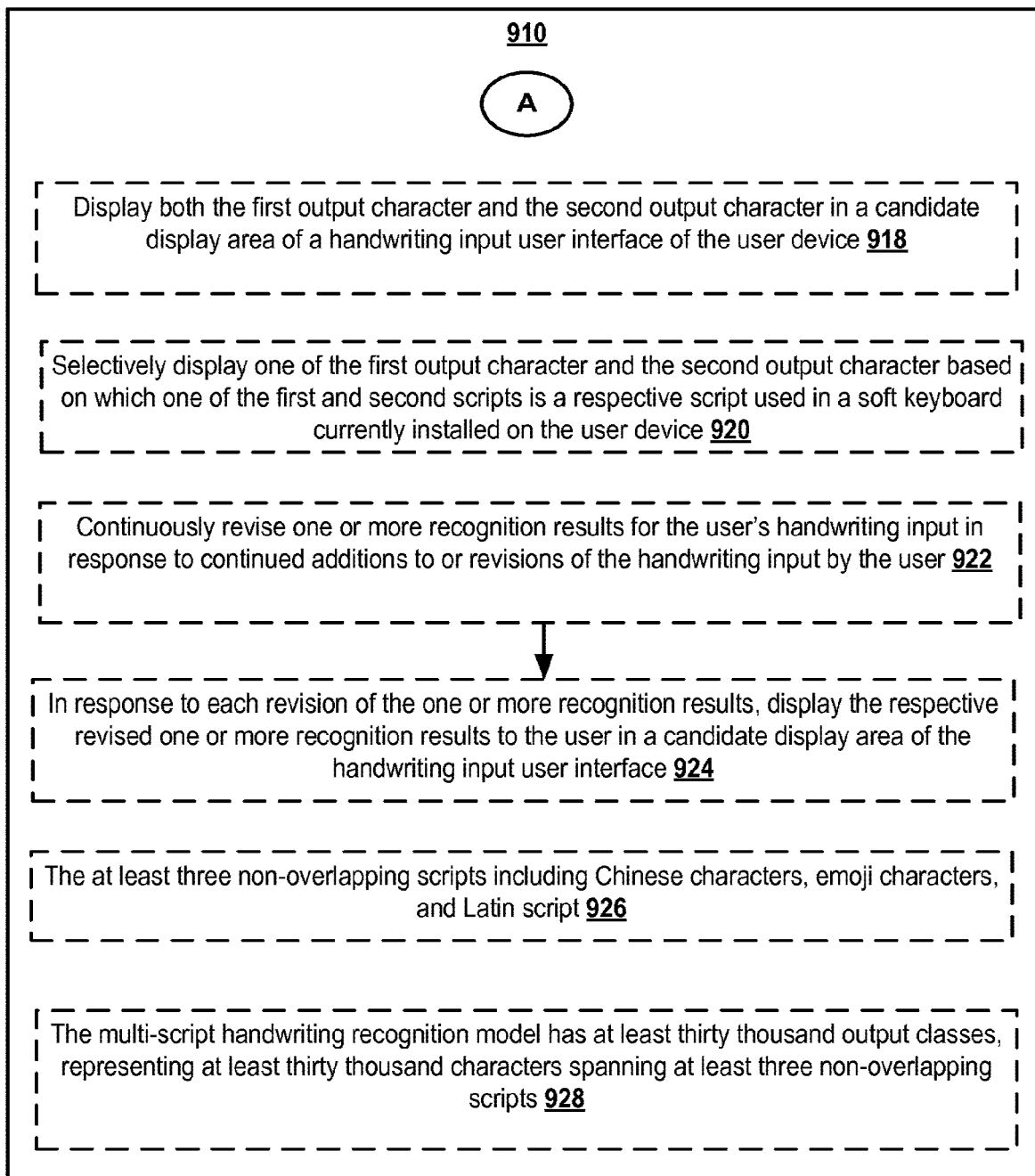

FIGS. 9A-9B are flow charts of an exemplary process 900 for providing multi-script handwriting recognition on a user device. In some embodiments, as shown in FIG. 900, the user device receives (902) a multi-script handwriting recognition model, the multi-script recognition model having been trained on spatially-derived features (e.g., stroke-order and stroke-direction independent features) of a multi-script training corpus, the multi-script training corpus including handwriting samples corresponding to characters of at least three non-overlapping scripts. In some embodiments, the multi-script handwriting recognition model is (906) a single convolutional neural network having a single input plane and a single output plane, and includes spatially-derived features and respective weights for the spatially-derived features for differentiating characters of the at least three non-overlapping scripts represented in the multi-script training corpus. In some embodiments, the multi-script handwriting recognition model is (908) configured to recognize characters based on respective input images of one or more recognition units identified in the handwriting input, and respective spatially-derived features used for recognition are independent of respective stroke order, stroke direction, and continuity of strokes in the handwriting input.

In some embodiments, the user device receives (908) a handwriting input from a user, the handwriting input including one or more handwritten strokes provided on a touch-sensitive surface coupled to the user device. For example, the handwriting input includes respective data on the location and movement of a contact between a finger or stylus and the touch-sensitive surface coupled to the user device. In response to receiving the handwriting input, the user device provides (910) in real-time one or more handwriting recognition results to the user based on the multi-script handwriting recognition model that has been trained on the spatially-derived features of the multi-script training corpus (912).

In some embodiments, when providing real-time handwriting recognition results to the user, the user device segments (914) the user's handwriting input into one or more recognition units, each recognition unit including one or more of the handwritten strokes provided by the user. In some embodiments, the user device segments the user's handwriting input according to the shape, location, and size of the individual strokes made by the contact between the user's finger or stylus and the touch-sensitive surface of the user device. In some embodiments, the segmentation of the handwriting input further takes into account of the relative order, and relative position of the individual strokes made by the contact between the user's finger or stylus and the touch-sensitive surface of the user device. In some embodiments, the user's handwriting input is in a cursive writing style, and each continuous stroke in the handwriting input may correspond to multiple strokes in a recognized character in print form. In some embodiments, the user's handwriting input may include a continuous stroke spanning multiple recognized characters in printed form. In some embodiments, the segmentation of the handwriting input generates one or more input images each corresponding to a respective recognition unit. In some embodiments, some of the input images optionally include some overlapping pixels. In some embodiments, the input images do not include any overlapping pixels. In some embodiments, the user device generates a segmentation lattice, each segmentation chain of the segmentation lattice represents a respective way of segmenting the current handwriting input. In some embodiments, each arc in a segmentation chain corresponds to a respective group of strokes in the current handwriting input.

As shown in FIG. 900, the user device provides (914) a respective image of each of the one or more recognition units as an input to the multi-script recognition model. For at least one of the one or more recognition units, the user device obtains (916) from the multi-script handwriting recognition model at least a first output character from a first script and at least a second output from a second script different from the first script. For example, the same input image may cause the multi-script recognition model to output two or more similar looking output characters from different scripts as recognition results for the same input image. For example, the handwriting inputs for the letter "a" in the Latin script and the character "α" in the Greek script are often similar. Furthermore, the handwriting inputs for the letter "J" in the Latin script and the Chinese character " 丁 " are often similar. Similarly, the handwriting input for the emoji character " ☺ " may be similar to the handwriting input for the CJK radical " 圀 ". In some embodiments, the multi-script handwriting recognition model often produces multiple candidate recognition results that are likely correspond to the user's handwriting input, because the visual appearance of the handwriting input would be difficult even for a human reader to decipher. In some embodiments, the first script is the CJK basic character block and the second script is the Latin script as encoded by the Unicode standard. In some embodiments, the first script is CJK basic character block, and the second script is a set of emoji characters. In some embodiments, the first script is the Latin script, and the second script is the emoji characters.

In some embodiments, the user device displays (918) both the first output character and the second output character in a candidate display area of the handwriting input interface of the user device. In some embodiments, the user device selectively displays (920) one of the first output character and the second output character based on which one of the first and second scripts is a respective script used in a soft keyboard currently installed on the user device. For example, suppose the handwriting recognition model has identified the Chinese character "入" and the Greek letter "λ" as the output characters for the current handwriting input, the user device determines whether the user has installed a Chinese soft keyboard (e.g., a keyboard using the Pinyin input method) or the Greek input keyboard on the user device. If the user device determines that only the Chinese soft keyboard has been installed, the user device optionally displays only the Chinese character "入" and not the Greek letter "λ" as the recognition result to the user.

In some embodiments, the user device provides real-time handwriting recognition and input. In some embodiments, the user device continuously revises (922) one or more recognition results for the user's handwriting input in response to continued additions to or revisions of the handwriting input by the user, before the user makes an explicit or implicit selection of a recognition result displayed to the user. In some embodiments, in response to each revision of the one or more recognition results, the user displays (924) the respective revised one or more recognition results to the user in a candidate display area of the handwriting input user interface.

In some embodiments, the multi-script handwriting recognition model is (926) trained to recognize all characters of at least three non-overlapping scripts including Chinese characters, emoji characters, and the Latin script encoded according to the Unicode standard. In some embodiments, the at least three non-overlapping scripts include Chinese characters, the Arabic script, and the Latin script. In some embodiments, the multi-script handwriting recognition model has (928) at least thirty thousand output classes, representing at least thirty characters spanning the at least three non-overlapping scripts.

In some embodiments, the user device allows the user to enter a multi-script handwriting input, such as a phrase that includes characters in more than one script. For example, the user may write continuously and receives handwriting recognition results including characters in more than one script, without stopping in the middle of writing to manually switch the recognition language. For example, the user may write the multi-script sentence "Hello means 你好 in Chinese." in the handwriting input area of the user device, without having to switch the input language from English to Chinese before writing the Chinese characters "你好" or switching the input language back from Chinese to English when writing the English words "in Chinese."

Figure 10A:
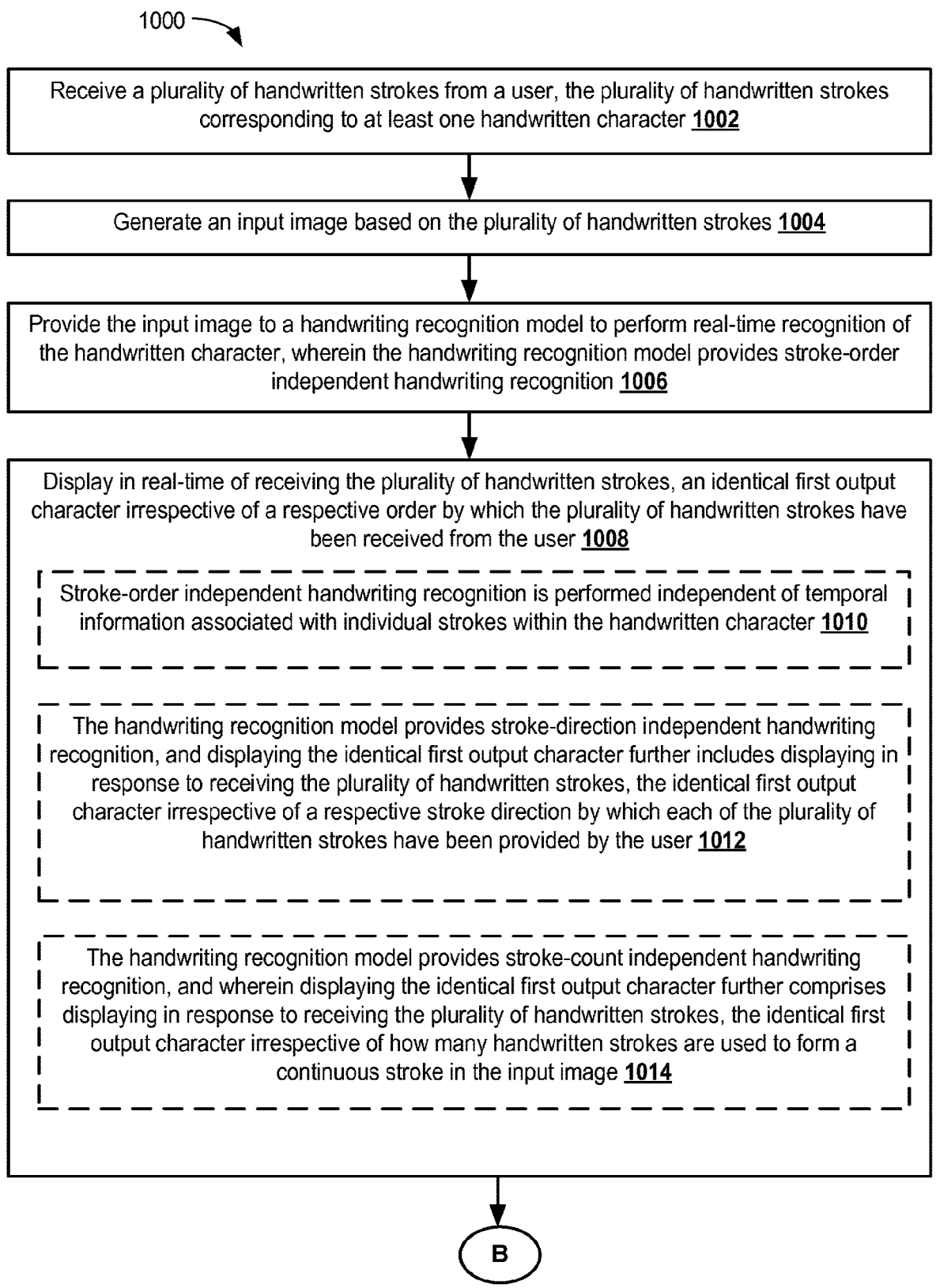
FIGS. 10A-10C are flow charts of an exemplary process for providing real-time stroke-order independent handwriting recognition and input on a portable multifunction device in accordance with some embodiments.
Figure 10B:
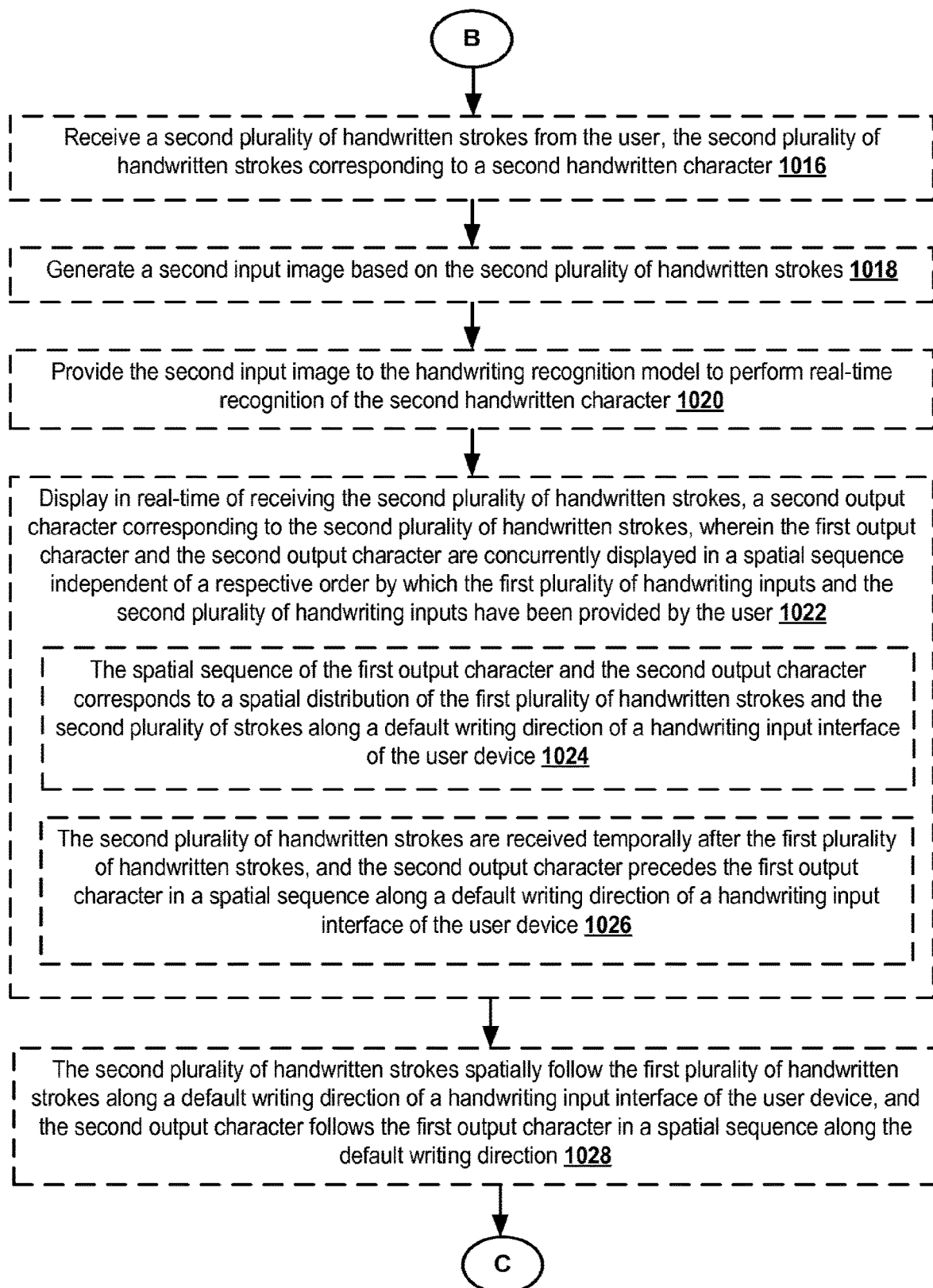
Figure 10C:
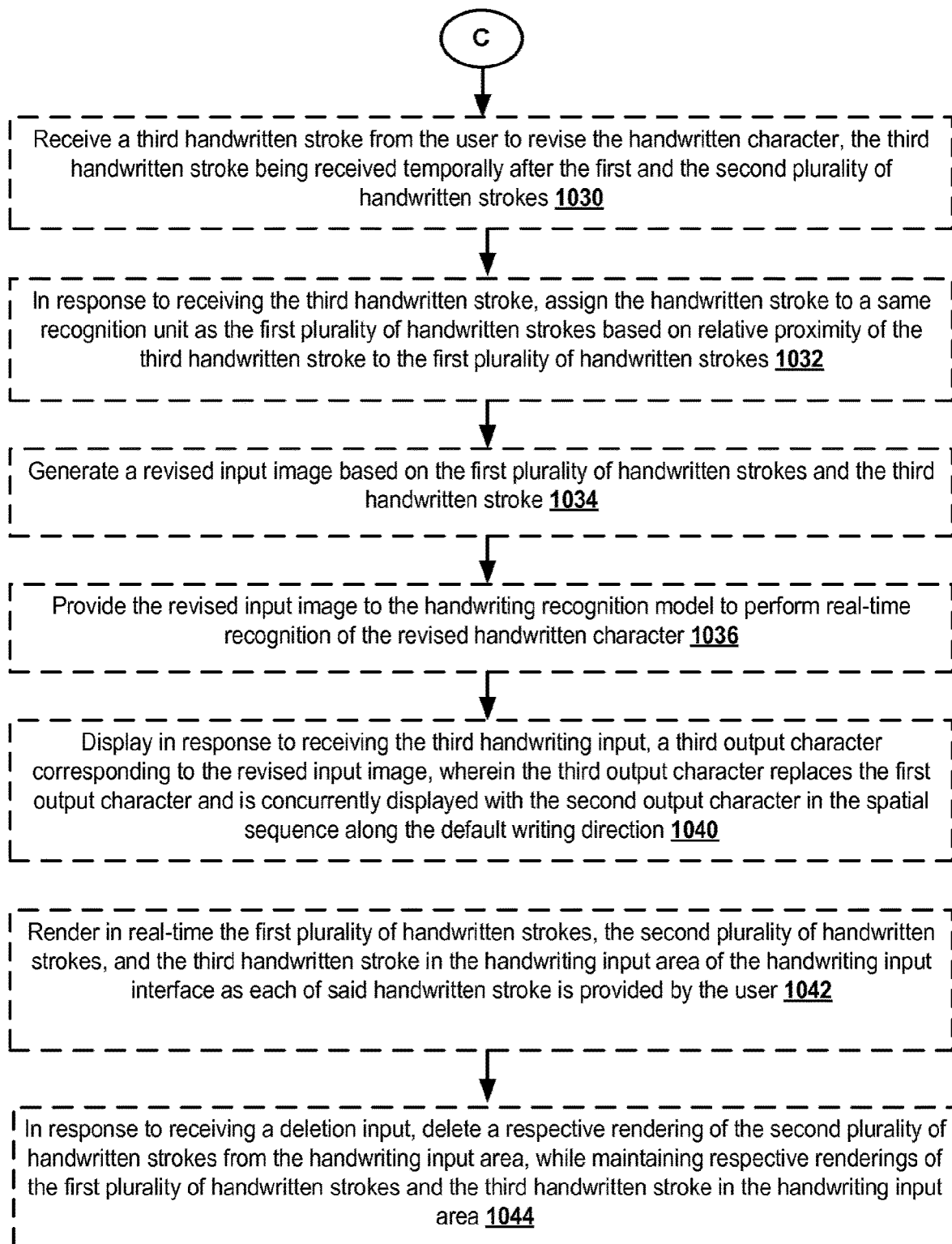

As described herein, the multi-script handwriting recognition model is used to provide real-time handwriting recognition for a user's input. In some embodiments, the real-time handwriting recognition is used to provide real-time multi-script handwriting input functionality on a user's device. FIGS. 10A-10C are flow charts of an exemplary process 1000 for providing real-time handwriting recognition and input on a user device. Specifically, the real-time handwriting recognition is stroke-order independent on a character-level, a phrase level, and a sentence level.

In some embodiments, stroke-order independent handwriting recognition on a character level requires that the handwriting recognition model provides the same recognition result for a particular handwritten character, regardless of the sequence by which the individual strokes of the particular character has been provided by the user. For example, Individual strokes of a Chinese character are typically written in a particular order. Although native speakers of Chinese are often trained to write each character in a particular order in school, many users have later adopted personalized styles and stroke sequences that depart from the conventional stroke order. In addition, cursive writing styles are highly individualized, and multiple strokes in a printed form of a Chinese character are often merged into a single stylized stroke that twists and turns, and sometimes even runs on to a next Character. A stroke-order independent recognition model is trained based on images of writing samples that is free of temporal information associated with individual strokes. Therefore, the recognition is independent of stroke-order information. For example, for the Chinese character "十", the same recognition result "十" will be given by the handwriting recognition model regardless of whether the user wrote the horizontal stroke first or the vertical stroke first.

As show in FIG. 10A, in the process 1000, the user device receives (1002) a plurality of handwritten strokes from a user, the plurality of handwritten strokes corresponding to a handwritten character. For example, the handwriting input for the character "十" typically includes a substantially horizontal handwritten stroke intersecting a substantially vertical handwritten stroke.

In some embodiments, the user device generates (1004) an input image based on the plurality of handwritten strokes. In some embodiments, the user device provides (1006) the input image to a handwriting recognition model to perform real-time handwriting recognition of the handwritten character, where the handwriting recognition model provides stroke-order independent handwriting recognition. The user device then displays (1008) in real-time of receiving the plurality of handwritten strokes, an identical first output character (e.g., the character "十" in printed form) irrespective of a respective order by which the plurality of handwritten strokes (e.g., the horizontal stroke and the vertical stroke) have been received from the user.

Although some conventional handwriting recognition system permits minor stroke-order variations in a small number of characters, by specifically including such variations in the training of the handwriting recognition system. Such conventional handwriting recognition systems are not scalable to accommodate arbitrary stroke-order variations in a large number of complex characters, such as Chinese characters, because even a Character of moderate complexity would already give rise to a large number of variations in stroke order. Furthermore, by merely including more permutations of acceptable stroke orders for particular characters, the conventional recognition systems still would not be able to handle handwriting inputs in which multiple strokes are combined into a single stroke (e.g., as in writing of a super cursive style) or in which one stroke is broken down into multiple sub-strokes (e.g., as in a character captured with super coarse sampling of the input stroke). Therefore, the multi-script handwriting system that is trained on spatially-derived features as described herein provides advantages over the conventional recognition systems.

In some embodiments, stroke-order independent handwriting recognition is performed independent of temporal information associated with individual strokes within each handwritten character. In some embodiments, stroke-order independent handwriting recognition is performed in conjunction with stroke-distribution information which takes into account of spatial distribution of individual strokes before they are merged into a flat input image. More details on how the temporally-derived stroke-distribution information is used to augment the stroke-order independent handwriting recognition described above are provided later in the specification (e.g., with respect to FIGS. 25A-27). The technique described with respect to FIGS. 25A-27 does not destroy the stroke-order independence of the handwriting recognition system.

In some embodiments, the handwriting recognition model provides (1010) stroke-direction independent handwriting recognition. In some embodiments, stroke-direction independent recognition requires that the user device displays in response to receiving the plurality of handwriting inputs, the identical first output character irrespective of a respective stroke direction by which each of the plurality of handwritten strokes have been provided by the user. For example, if the user has written the Chinese character " 十 " in the handwriting input area of the user device, the handwriting recognition model would output the same recognition result, regardless of whether the user has drawn the horizontal stroke from left to right or from right to left. Similarly, the handwriting recognition model would output the same recognition result, regardless of whether the user has drawn the vertical stroke in the downward direction or in the upward direction. In another example, many Chinese characters are structurally made of two or more radicals. Some Chinese characters each include a left radical and a right radical, and people customarily write the left radical first, and the right radical second. In some embodiments, the handwriting recognition model would provide the same recognition result regardless of whether the user has written the right radical or the left radical first, as long as the resulting handwriting input shows the left radical to the left of the right radical when the user completes the handwritten character. Similarly, some Chinese characters each include a top radical and a bottom radical, and people customarily write the top radical first, and the bottom radical last. In some embodiments, the handwriting recognition model would provide the same recognition result regardless of whether the user has written the top radical or the bottom radical first, as long as the resulting handwriting input shows the top radical above the bottom radical. In other words, the handwriting recognition model does not rely on the directions by which the user provides the individual strokes of the handwritten character to determine the identity of the handwritten character.

In some embodiments, the handwriting recognition model provides handwriting recognition based on the image of a recognition unit, regardless of the number of sub-strokes by which the recognition unit has been provided by the user. In other words, in some embodiments, the handwriting recognition model provides (1014) stroke-count independent handwriting recognition. In some embodiments, the user device displays in response to receiving the plurality of handwritten strokes, the identical first output character irrespective of how many handwritten strokes are used to form a continuous stroke in the input image. For example, if the user has written the Chinese character "十" in the handwriting input area, the handwriting recognition model outputs the same recognition result, regardless of whether the user has provided four strokes (e.g., two short horizontal strokes and two short vertical strokes to make up the cross-shaped character), or two strokes (e.g., an L-shaped stroke and a 7-shaped stroke, or a horizontal stroke and a vertical stroke), or any other number of strokes (e.g., hundreds of extremely short strokes or dots) to make up the shape of the character " 十 ".

In some embodiments, not only is the handwriting recognition model capable of recognizing the same character regardless of the order, direction, and stroke-count by which each single character has been written, the handwriting recognition model is also capable of recognizing multiple characters regardless of the temporal order by which the strokes of the multiple characters have been provided by the user.

In some embodiments, the user device has not only received the first plurality of handwritten strokes, but also received (1016) a second plurality of handwritten strokes from the user, where the second plurality of handwritten strokes correspond to a second handwritten character. In some embodiments, the user device generates (1018) a second input image based on the second plurality of handwritten strokes. In some embodiments, the user device provides (1020) the second input image to the handwriting recognition model to perform real-time recognition of the second handwritten character. In some embodiments, the user device displays (1022) in real-time of receiving the second plurality of handwritten strokes, a second output character corresponding to the second plurality of handwritten strokes. In some embodiments, the second output character and the first output character are concurrently displayed in a spatial sequence independent of a respective order by which the first plurality of handwritten strokes and the second plurality of handwritten strokes have been provided by the user. For example, if the user has written two Chinese characters (e.g., " 十 " and " 人 ") in the handwriting input area of the user device, the user device will display the recognition result " 十 人 " regardless of whether the user has written strokes of the character " 十 " or the strokes of the character " 人 " first, as long as the handwriting input currently accumulated in the handwriting input area shows the strokes for the character " 十 " to the left of the strokes for the character " 人 ". In fact, even if the user has written some of the strokes (e.g., the left-slanted stroke) for the character " 人 " before some of the strokes (e.g., the vertical stroke) for the character " 十 ", as long as the resulting image of the handwriting input in the handwriting input area shows all the strokes for the character " 十 " to the left of all the strokes for the character " 人 ", the user device will show the recognition result " 十 人 " in the spatial sequence of the two handwritten characters.

In other words, as shown in FIG. 10B, in some embodiments, the spatial sequence of the first output character and the second output character corresponds (1024) to a spatial distribution of the first plurality of handwritten strokes and the second plurality of strokes along a default writing direction (e.g., from left to right) of a handwriting input interface of the user device. In some embodiments, the second plurality of handwritten strokes are received (1026) temporally after the first plurality of handwritten strokes, and the second output character precedes the first output character in a spatial sequence along a default writing direction (e.g., from left to right) of a handwriting input interface of the user device.

In some embodiments, the handwriting recognition model provides stroke-order independent recognition on a sentence to sentence level. For example, even if the handwritten character " 十 " is in a first handwritten sentence and the handwritten character " 八 " is in a second handwritten sentence, and the two handwritten characters are separated by one or more other handwritten characters and/or words in the handwriting input area, the handwriting recognition model would still provide the recognition result showing the two characters in the spatial sequence " 十 . . . 八 ". The recognition result and the spatial sequence of the two recognized characters remain the same regardless of the temporal order by which the strokes of the two characters have been provided by the user, provided that the recognition units for the two characters are spatially arranged in the sequence " 十 . . . 八 " when the user completes the handwriting input. In some embodiments, the first handwritten character (e.g., " 十 ") is provided by the user as part of a first handwritten sentence (e.g., " 十 is a number."), and the second handwriting character (e.g., " 八 ") is provided by the user as part of a second handwritten sentence (e.g., " 八 is another number.") and the first and the second handwritten sentences are concurrently displayed in a handwriting input area of the user device. In some embodiments, when the user confirms that the recognition result (e.g., " 十 is a number 八 . is another number.") is the correct recognition result, the two sentences will be entered into a text input area of the user device, and the handwriting input area will be cleared for the user to enter another handwriting input.

In some embodiments, since the handwriting recognition model is stroke-order independent not only on a character-level, but also on a phrase level and a sentence level, the user can make corrections to a previously uncompleted character after subsequent characters have been written. For example, if the user has forgotten to write a particular stroke for a character before moving on to write one or more subsequent characters in the handwriting input area, the user can still put down the missing stroke later at the right location in the particular character to receive the correct recognition result.

In conventional stroke-order dependent recognition systems (e.g., an HMM-based recognition system), once a character is written, it is committed, and the user can no longer make any changes to it. If the user wishes to make any changes, the user has to delete the character and all subsequent characters to start all over again. In some conventional recognition systems, the user is required to complete a handwritten character within a short, predetermined time window, and any strokes entered outside of the predetermined time window would not be included in the same recognition unit as other strokes provided during the time window. Such conventional systems are difficult to use and cause much frustration for the user. A stroke-order independent system does not suffer from these shortcomings, and the user can complete a character in any order and any time frame as the user seems fit. The user may also make a correction (e.g., add one or more strokes) to an earlier written character after having subsequently written one or more characters in the handwriting input interface. In some embodiments, the user may also individually delete (e.g., using the methods described later with respect to FIGS. 21A-22B) an earlier written character and rewrite it in the same location in the handwriting input interface.

As shown in FIGS. 10B-10C, the second plurality of handwritten strokes spatially follow (1028) the first plurality of handwritten strokes along a default writing direction of the handwriting input interface of the user device, and the second output character follows the first output character in a spatial sequence along the default writing direction in the candidate display area of the handwriting input interface. The user device receives (1030) a third handwritten stroke from the user to revise the first handwritten character (i.e., the handwritten character formed by the first plurality of handwritten strokes), the third handwritten stroke being received temporally after the first and the second pluralities of handwritten strokes. For example, the user has written two characters in a spatial sequence from left to right (e.g., " 人体 ") in the handwriting input area. The first plurality of strokes form a handwritten character " 八 " Note that, the user in fact intended to write the character " 个 ", but missed one stroke. The second plurality of strokes form the handwritten character " 体 ". When the user later realizes that he wished to write " 个体 " instead of " 人体 ", the user can simply put one more vertical stroke below the strokes for the character " 八 ", and the user device will assign the vertical stroke to the first recognition unit (e.g., the recognition unit for " 八 "). The user device will output a new output character (e.g., " 八 ") for the first recognition unit, where the new output character will replace the previous output character (e.g., " 八 ") in the recognition result. As shown in FIG. 10C, in response to receiving the third handwritten stroke, the user device assigns (1032) the third handwritten stroke to the same recognition unit as the first plurality of handwritten strokes based on relative proximity of the third handwritten stroke to the first plurality of handwritten strokes. In some embodiments, the user device generates (1034) a revised input image based on the first plurality of handwritten stroke and the third handwritten stroke. The user device provides (1036) the revised input image to the handwriting recognition model to perform real-time recognition of the revised handwritten character. In some embodiments, the user device displays (1040) in response to receiving the third handwriting input, a third output character corresponding to the revised input image, where the third output character replaces the first output character and is concurrently displayed with the second output character in the spatial sequence along the default writing direction.

In some embodiments, the handwriting recognition module recognizes the handwriting input written in a default writing direction from left to right. For example, the user can write characters from left to right, and in one or more rows. In response to the handwriting input, the handwriting input module presents recognition results that include characters in a spatial sequence from left to right, and in one or more rows as necessary. If the user selects a recognition result, the selected recognition result is inputted into the text input area of the user device. In some embodiments, the default writing direction is from top to bottom. In some embodiments, the default writing direction is from right to left. In some embodiments, the user optionally changes the default writing direction to an alternative writing direction after a recognition result has been selected and the handwriting input area has been cleared.

In some embodiments, the handwriting input module allows the user to enter multiple-character handwriting input in the handwriting input area and allows deletion of strokes from the handwriting input one recognition unit at a time, rather than all recognition units at once. In some embodiments, the handwriting input module allows deletion from the handwriting input one stroke at a time. In some embodiments, the deletion of recognition unit proceeds one by one in the direction opposite to the default writing direction, regardless of the order by which the recognition units or strokes have been entered to produce the current handwriting input. In some embodiments, the deletion of strokes proceeds one by one in the reverse order it has been entered within each recognition unit, and when the strokes in one recognition unit have all been deleted, the deletion of strokes proceed to the next recognition unit in the direction opposite to the default writing direction.

In some embodiments, while the third output character and the second output character are concurrently displayed as a candidate recognition result in the candidate display area of the handwriting input interface, the user device receives a deletion input from the user. In response to the deletion input, the user device deletes the second output character from the recognition result, while maintaining the third output character in the recognition result displayed in the candidate display area.

In some embodiments, as shown in FIG. 10C, the user device renders (1042) in real-time the first plurality of handwritten strokes, the second plurality of handwritten strokes, and the third handwritten stroke as each of said handwritten stroke is provided by the user. In some embodiments, in response to receiving the deletion input from the user, the user device deletes (1044) a respective rendering of the second plurality of handwriting inputs (e.g., corresponding to the second handwritten character) from the handwriting input area, while maintaining respective renderings of the first plurality of handwritten strokes and the third handwritten stroke (e.g., together corresponding to the revised first handwritten character) in the handwriting input area. For example, after the user has provided the missing vertical stroke in the character sequence "个体", if the user enters a deletion input, the strokes in the recognition unit for the character "体" is removed from the handwriting input area, and the character "体" is removed from the recognition result "个体" in the candidate display area of the user device. After the deletion, the strokes for the character "个" remain in the handwriting input area, while the recognition result shows only the character "个".

In some embodiments, the handwritten character is a multi-stroke Chinese character. In some embodiments, the first plurality of handwriting input is provided in a cursive writing style. In some embodiments, the first plurality of handwriting input is provided in a cursive writing style and the handwritten character is a multi-stroke Chinese character. In some embodiments, the handwritten characters are written in Arabic in a cursive style. In some embodiments, the handwritten characters are written in other scripts in a cursive style.

In some embodiments, the user device establishes respective predetermined constraints on a set of acceptable dimensions for a handwritten character input, and segments a currently accumulated plurality of handwritten strokes into a plurality of recognition units based on the respective predetermined constraints, where a respective input image is generated from each of the recognition units, provided to the handwriting recognition model, and recognized as a corresponding output character.

In some embodiments, the user device receives an additional handwritten stroke from the user after having segmented the currently accumulated plurality of handwritten strokes. The user device assigns the additional handwritten stroke to a respective one of the plurality of recognition units based on a spatial position of the additional handwritten stroke relative to the plurality of recognition units.

Attention is now turned to exemplary user interfaces for providing handwriting recognition and input on a user device. In some embodiments, the exemplary user interfaces are provided on a user device based on a multi-script handwriting recognition model that provides real-time, stroke-order independent handwriting recognition of a user's handwriting input. In some embodiments, the exemplary user interfaces are user interfaces of an exemplary handwriting input interface 802 (e.g., shown in FIGS. 8A and 8B), including a handwriting input area 804, a candidate display area 804, and a text input area 808. In some embodiments, the exemplary handwriting input interface 802 also includes a plurality of control elements 1102, such as a deletion button, a space bar, an Enter button, a keyboard switching button, etc. One or more other areas and/or elements may be provided in the handwriting input interface 802 to enable additional functionalities described below.

As described herein, the multi-script handwriting recognition model is capable of having a very large repertoire of tens of thousands of characters in many different scripts and languages. As a result, it is very likely that for a handwriting input, the recognition model will identify a large number of output characters that all have a reasonably good likelihood of being the character intended by the user. On a user device having a limited display area, it is advantageous to provide only a subset of the recognition results initially, while keeping the other results available upon user request.

FIGS. 11A-11G show exemplary user interfaces for displaying a subset of the recognition results in a normal view of the candidate display area, along with an affordance for invoking an extended view of the candidate display area for display the remainder of the recognition results. In addition, within the extended view of the candidate display area, the recognition results are divided into different categories, and displayed on different tabbed pages in the extended view.

Figure 11A:
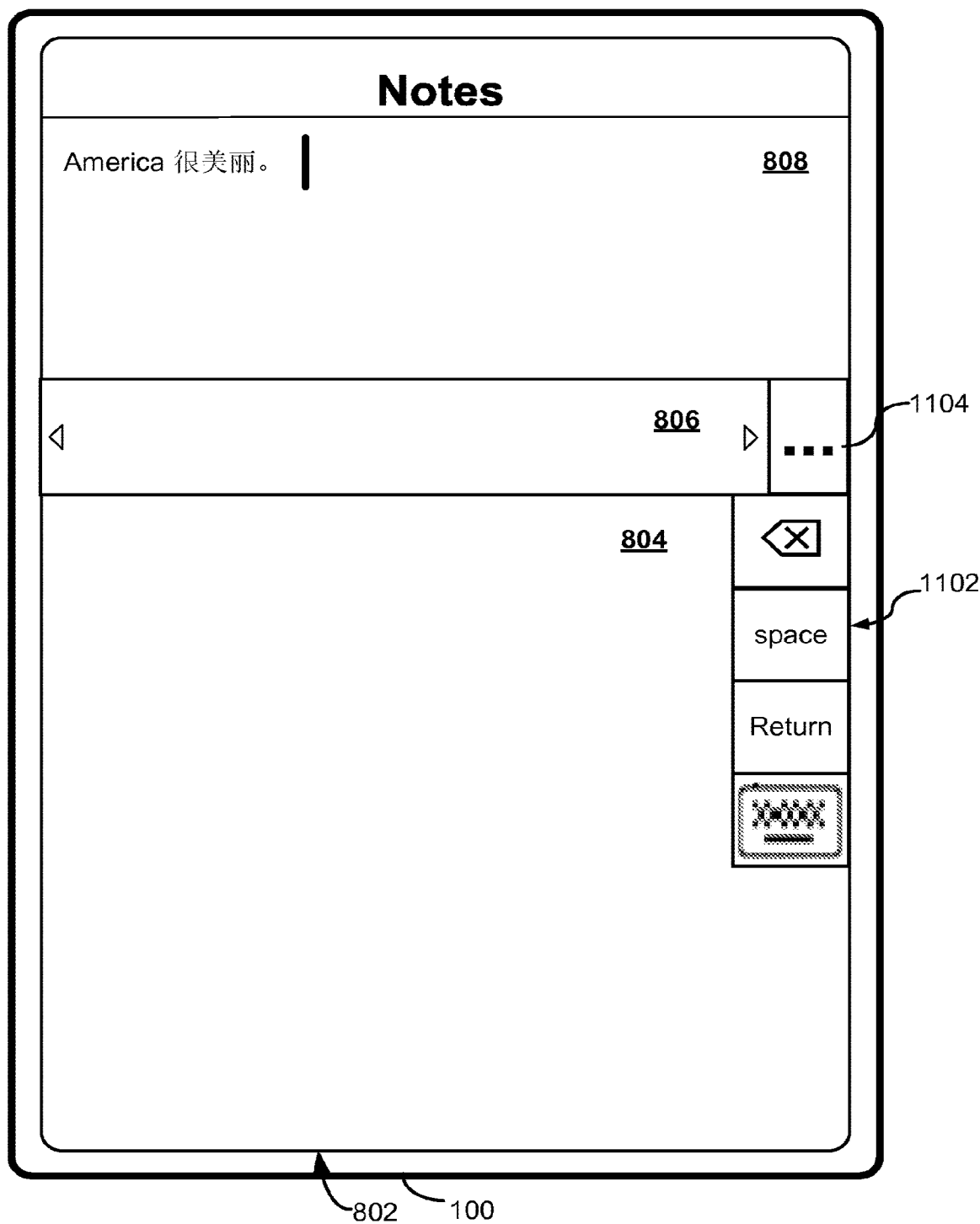
FIGS. 11A-11K show exemplary user interfaces for selectively displaying one category of recognition results in a normal view of a candidate display area, and other categories of recognition results in an extended view of the candidate display area, in accordance with some embodiments.

FIG. 11A shows an exemplary handwriting input interface 802. The handwriting input interface includes a handwriting input area 804, a candidate display area 806, and a text input area 808. One or more control elements 1102 are also included in the handwriting input interface 1002.

As shown in FIG. 11A, the candidate display area 806 optionally includes an area for displaying one or more recognition results and an affordance 1104 (e.g., an expansion icon) to invoke an extended version of the candidate display area 806.

Figure 11B:
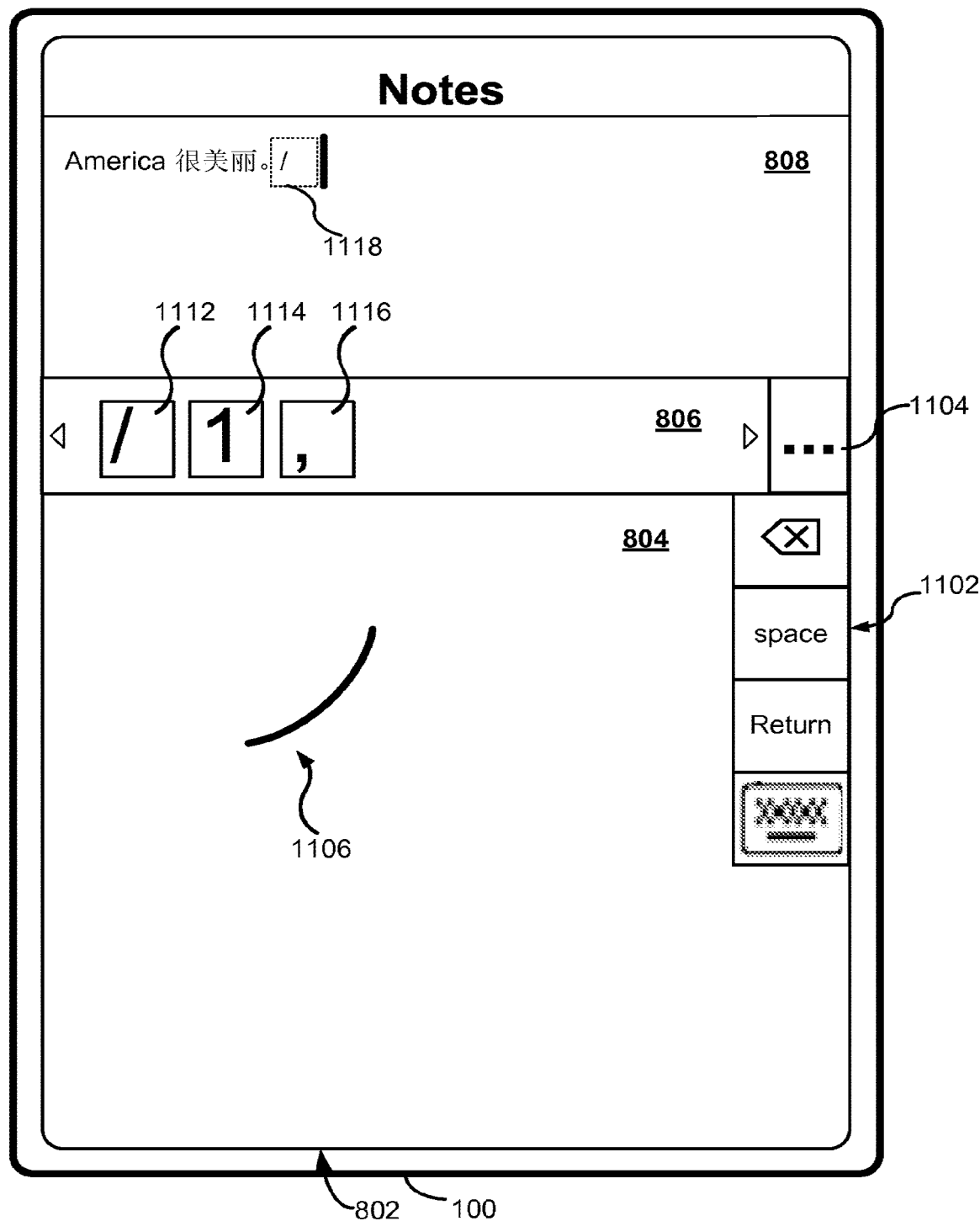
Figure 11C:
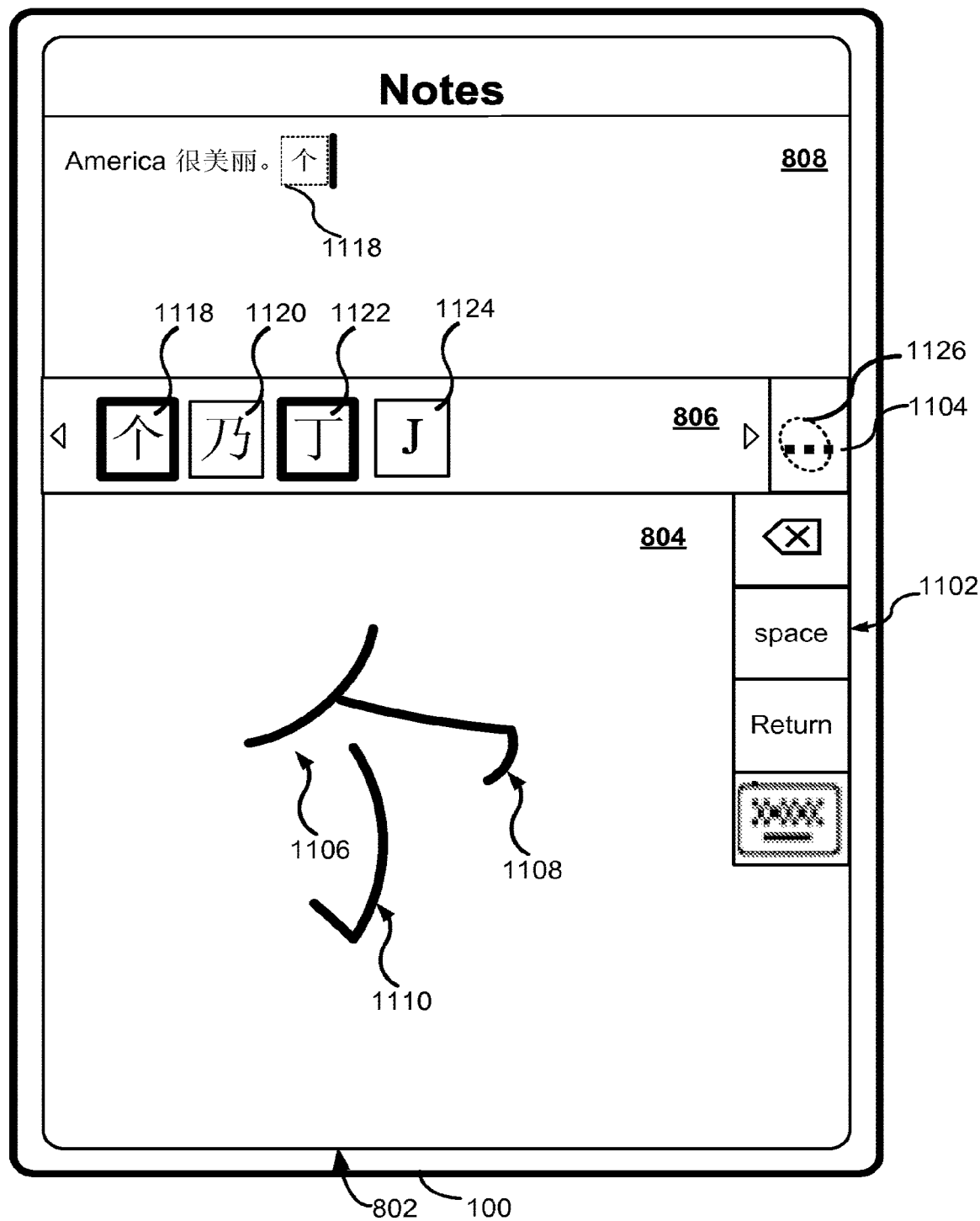

FIGS. 11A-11C illustrate that, as the user provides one or more handwritten strokes in the handwriting input area 804 (e.g., strokes 1106, 1108, and 1110), the user device identifies and displays a respective set of recognition results corresponding to the currently accumulated strokes in the handwriting input area 804. As shown in FIG. 11B, after the user has entered a first stroke 1106, the user device identifies and displays three recognition results 1112, 1114, and 1116 (e.g., characters "/", "1", and ","). In some embodiments, the small number of candidate characters are displayed in the candidate display area 806 in an order according to the recognition confidence associated with each character.

In some embodiments, the top-ranked candidate result (e.g., "/") is tentatively displayed in the text input area 808, e.g., within a box 1118. The user can optionally confirm that the top-ranked candidate is the intended input with a simple confirmation input (e.g., by pressing the "Enter" key, or providing a double-tap gesture in the handwriting input area).

FIG. 11C illustrates that, before the user has selected any candidate recognition result, as the user enters two more strokes 1108 and 1110 in the handwriting input area 804, the additional strokes are rendered in the handwriting input area 804 with the initial stroke 1106, and the candidate results are updated to reflect the changes to the recognition unit(s) identified from the currently accumulated handwriting inputs. As shown in FIG. 11C, based on the three strokes, the user device has identified a single recognition unit. Based on the single recognition unit, the user device has identified and displayed a number of recognition results 1118-1124. In some embodiments, one or more of the recognition results (e.g., 1118 and 1122) currently displayed in the candidate display area 806 are each a representative candidate character selected from among multiple similar-looking candidate characters for the current handwriting input.

Figure 11D:
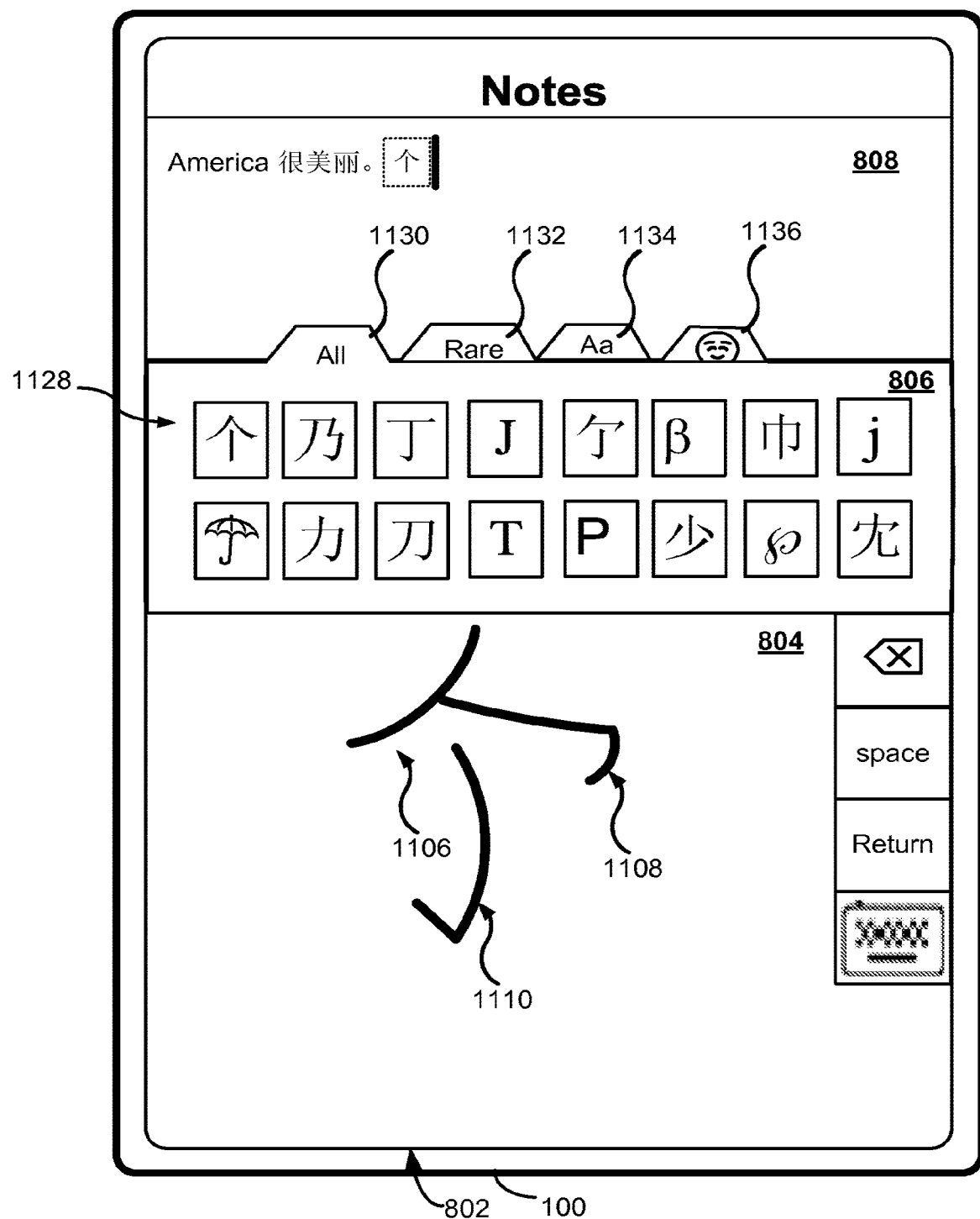

As shown in FIGS. 11C-11D, when the user selects the affordance 1104 (e.g., using a tap gesture with a contact 1126 over the affordance 1104), the candidate display area changes from a normal view (e.g., shown in FIG. 11C) to an extended view (e.g., shown in FIG. 11D). In some embodiments, the extended view shows all of the recognition results (e.g., candidate characters) that have been identified for the current handwriting input.

In some embodiments, the initially displayed normal view of the candidate display area 806 only shows the most commonly used characters used in a respective script or language, while the extended view shows all candidate characters, including characters that are rarely used in a script or language. The extended view of the candidate display area may be designed in different ways. FIGS. 11D-11G illustrate an exemplary design of the extended candidate display area in accordance with some embodiments.

As shown in FIG. 11D, in some embodiments, the extended candidate display area 1128 includes one or more tabbed pages (e.g., pages 1130, 1132, 1134, and 1136) each presenting a respective category of candidate characters. The tabbed design shown in FIG. 11D allows the user to quickly find the desired category of characters, and then find the character that he or she intended to enter within the corresponding tabbed page.

In FIG. 11D, the first tabbed page 1130 displays all candidate characters that have been identified for the currently accumulated handwriting input, including both commonly used characters as well as rare characters. As shown in FIG. 11D, the tabbed page 1130 includes all of the characters shown in the initial candidate display area 806 in FIG. 11C, and a number of additional characters (e.g., " ダ ", "β", " ih ", etc.) that were not included in the initial candidate display area 806.

In some embodiments, the characters displayed in the initial candidate display area 806 include only characters from a set of commonly used characters associated with a script (e.g., all characters in the basic block of the CJK script, as encoded according to the Unicode standard). In some embodiments, the characters displayed in the extended candidate display area 1128 further include a set of rare characters associated with the script (e.g., all characters in the extended block of the CJK script, as encoded according to the Unicode standard). In some embodiments, the extended candidate display area 1128 further includes candidate characters from other scripts that are not commonly used by the user, e.g., the Greek script, the Arabic script, and/or the emoji script.

Figure 11E:
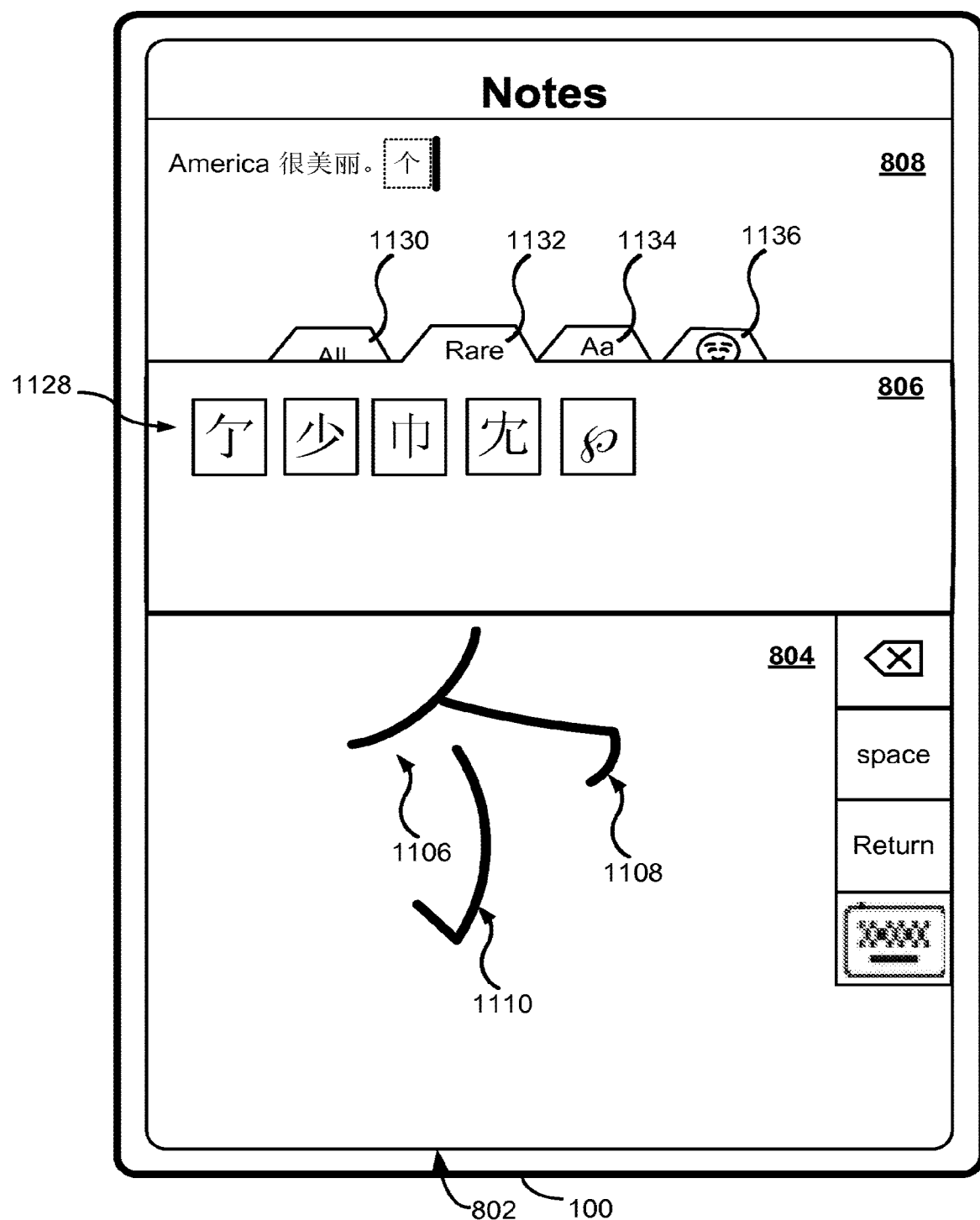
Figure 11F:
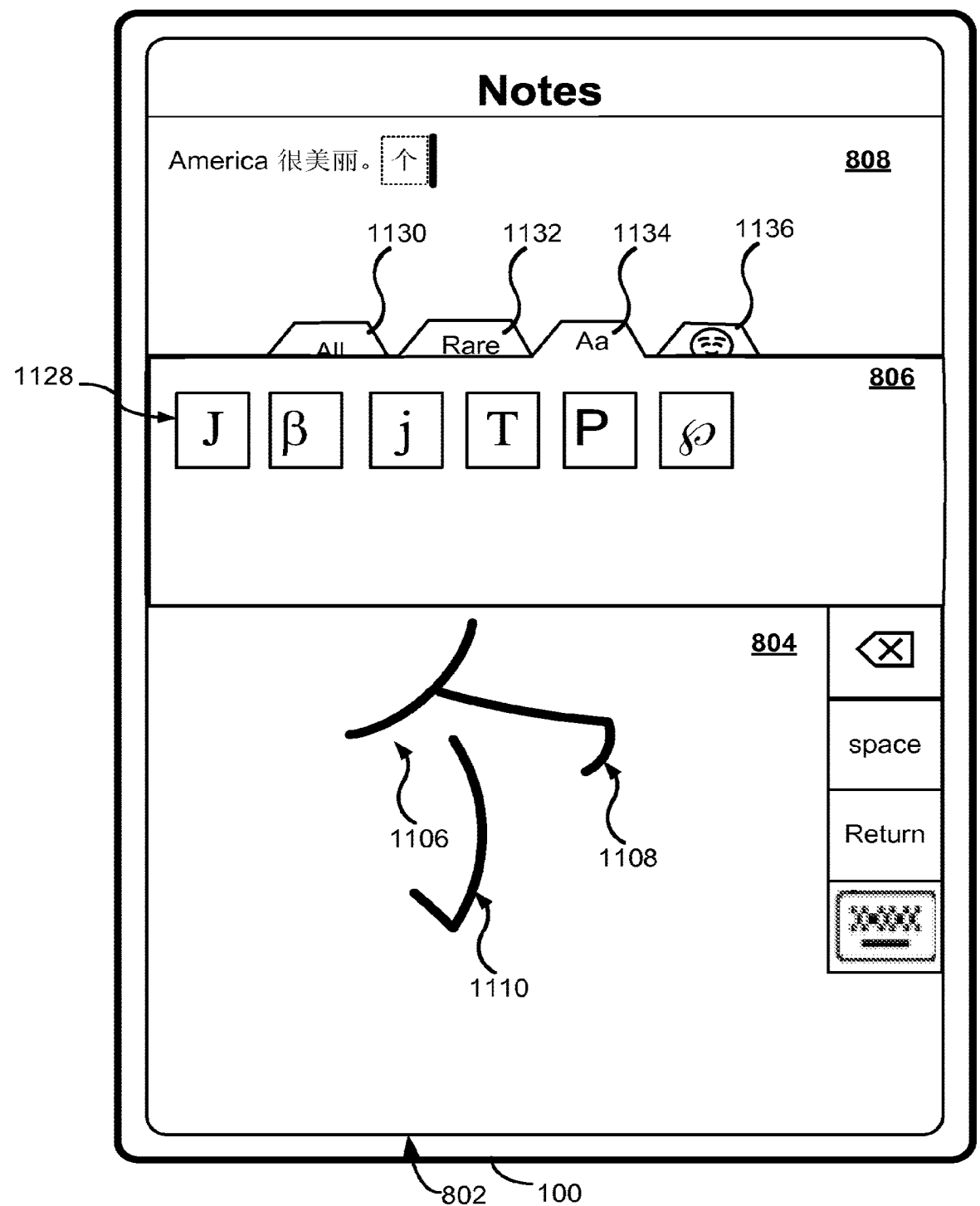
Figure 11G:
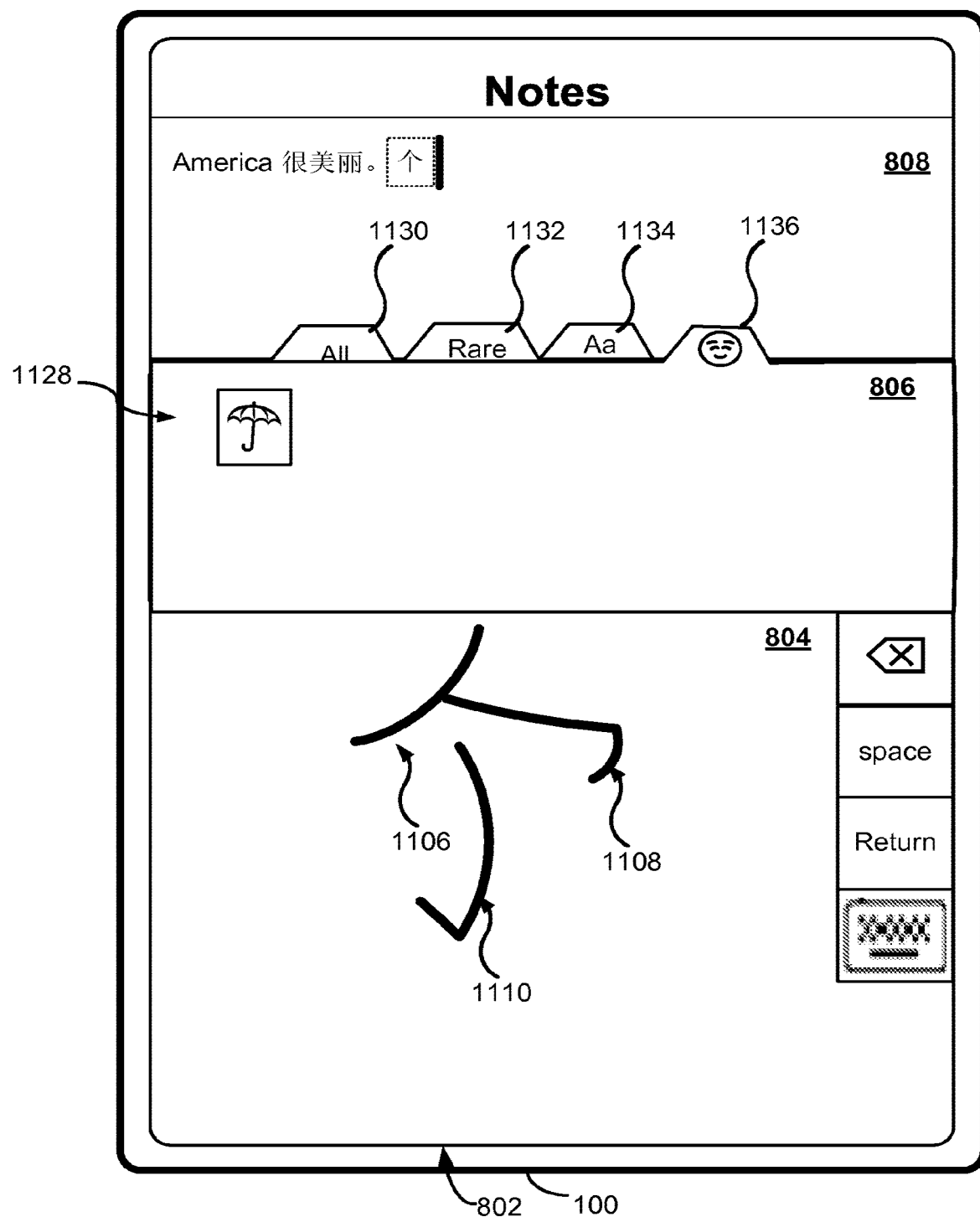

In some embodiments, as shown in FIG. 11D, the extended candidate display area 1128 includes respective tabbed pages 1130, 1132, 1134, and 1138 each corresponding to a respective category of candidate characters (e.g., all characters, rare characters, characters from the Latin script, and characters from the emoji script, respectively). FIGS. 11E-11G illustrate that the user can select each of the different tabbed pages to reveal the candidate characters in a corresponding category. FIG. 11E shows only the rare characters (e.g., characters from the extended block of the CJK script) that correspond to the current handwriting input. FIG. 11F shows only Latin and Greek letters that correspond to the current handwriting input. FIG. 11G shows only emoji characters that correspond to the current handwriting input.

In some embodiments, the extended candidate display area 1128 further includes one or more affordances to sort the candidate characters in a respective tabbed page based on a respective criterion (e.g., based on phonetic spelling, based on number of strokes, and based on radicals, etc.). The ability to sort the candidate characters in each category according to a criterion other than the recognition confidence scores provides the user with additional ability to quickly find the desired candidate character for text input.

FIGS. 11H-11K illustrate that, in some embodiments, similar-looking candidate characters may be grouped, and only a representative character from each group of similar-looking candidate characters are presented in the initial candidate display area 806. Since the multi-script recognition model described herein can produce many candidate characters that are almost equally good for a given handwriting input, the recognition model cannot always eliminate one candidate at the expense of another similar-looking candidate. On a device having a limited display area, displaying many similar-looking candidates all at once is not helpful for the user to pick out the correct character, because the fine distinction may not be easy to see, and even if the user can see the desired character, it may be difficult to select it from a very crammed display using a finger or stylus.

Figure 11H:
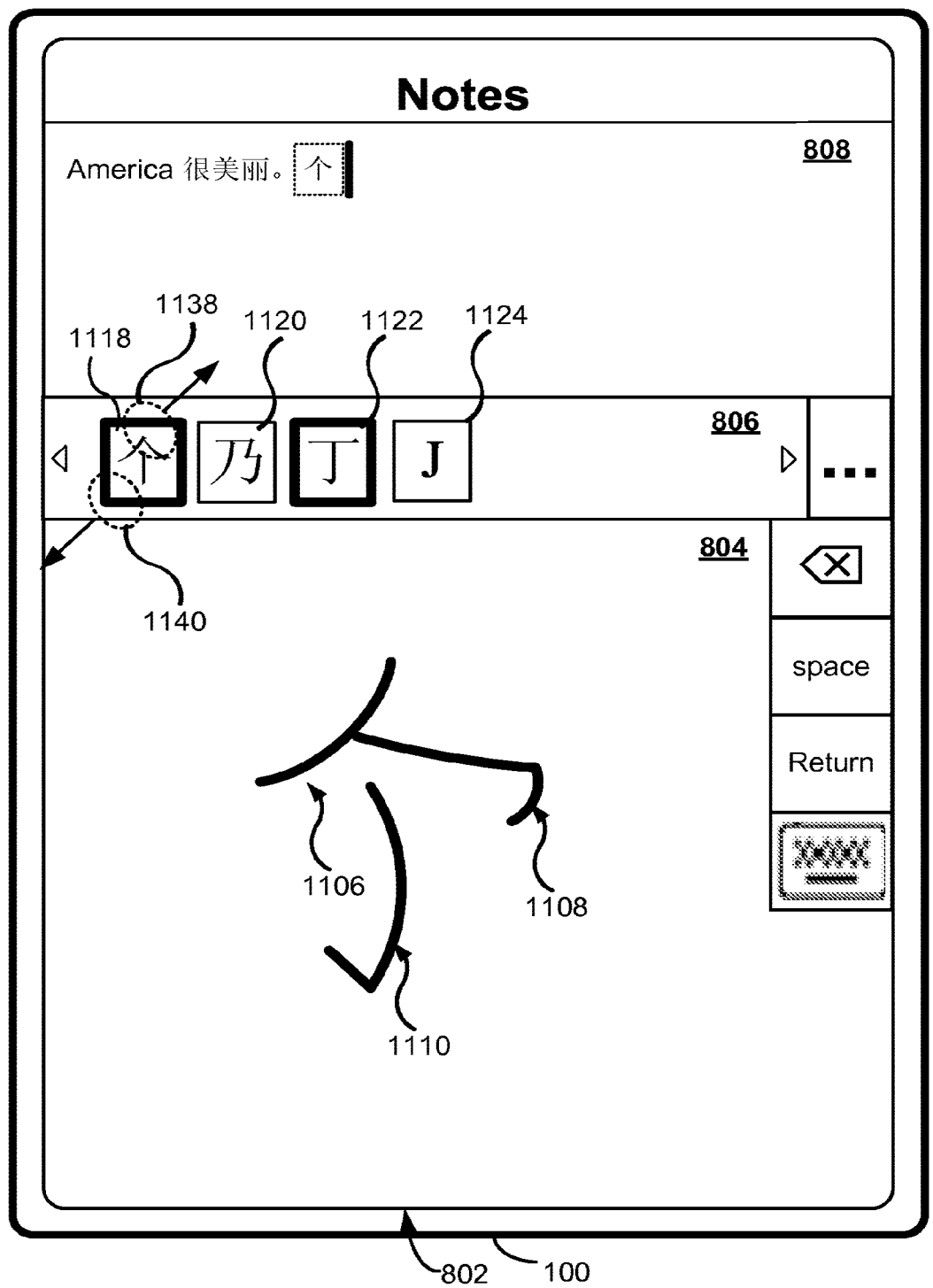

In some embodiments, to address the above issues, the user device identifies candidate characters that have a great resemblance to one another (e.g., according to a concordance or dictionary of similar-looking characters, or some image-based criteria), and group them into a respective group. In some embodiments, one or more groups of similar-looking characters may be identified from a set of candidate characters for a given handwriting input. In some embodiments, the user device identified a representative candidate character from among a plurality of similar-looking candidate characters in the same group, and only displays the representative candidate in the initial candidate display area 806. If a commonly used character does not look similar enough to any other candidate characters, it is displayed by itself. In some embodiments, as shown in FIG. 11H, the representative candidate character (e.g., candidate characters 1118 and 1122, " ↑ " and "T") of each group is displayed in a different manner (e.g., in a bolded box) from a candidate character (e.g., candidate characters 1120 and 1124, " ß " and "J") that does not belong to any group. In some embodiments, the criterion for choosing the representative character of a group is based on a relative usage frequency of the candidate characters in the group. In some embodiments, other criteria may be used.

In some embodiments, once the representative character(s) are displayed to the user, the user can optionally expand the candidate display area 806 to show the similar-looking candidate characters in an expanded view. In some embodiments, the selection of a particular representative character can cause the expanded view of only those candidate characters in the same group as the selected representative character.

Various designs for providing the expanded view of the similar-looking candidates are possible. FIGS. 11H-11K illustrate one embodiment in which the expanded view of a representative candidate character is invoked by a predetermined gesture (e.g., an expand gesture) detected over a representative candidate character (e.g., representative character 1118). The predetermined gesture (e.g., an expand gesture) for invoking an expanded view is different from the predetermined gesture (e.g., a tap gesture) for selecting the representative character for text input.

Figure 11I:
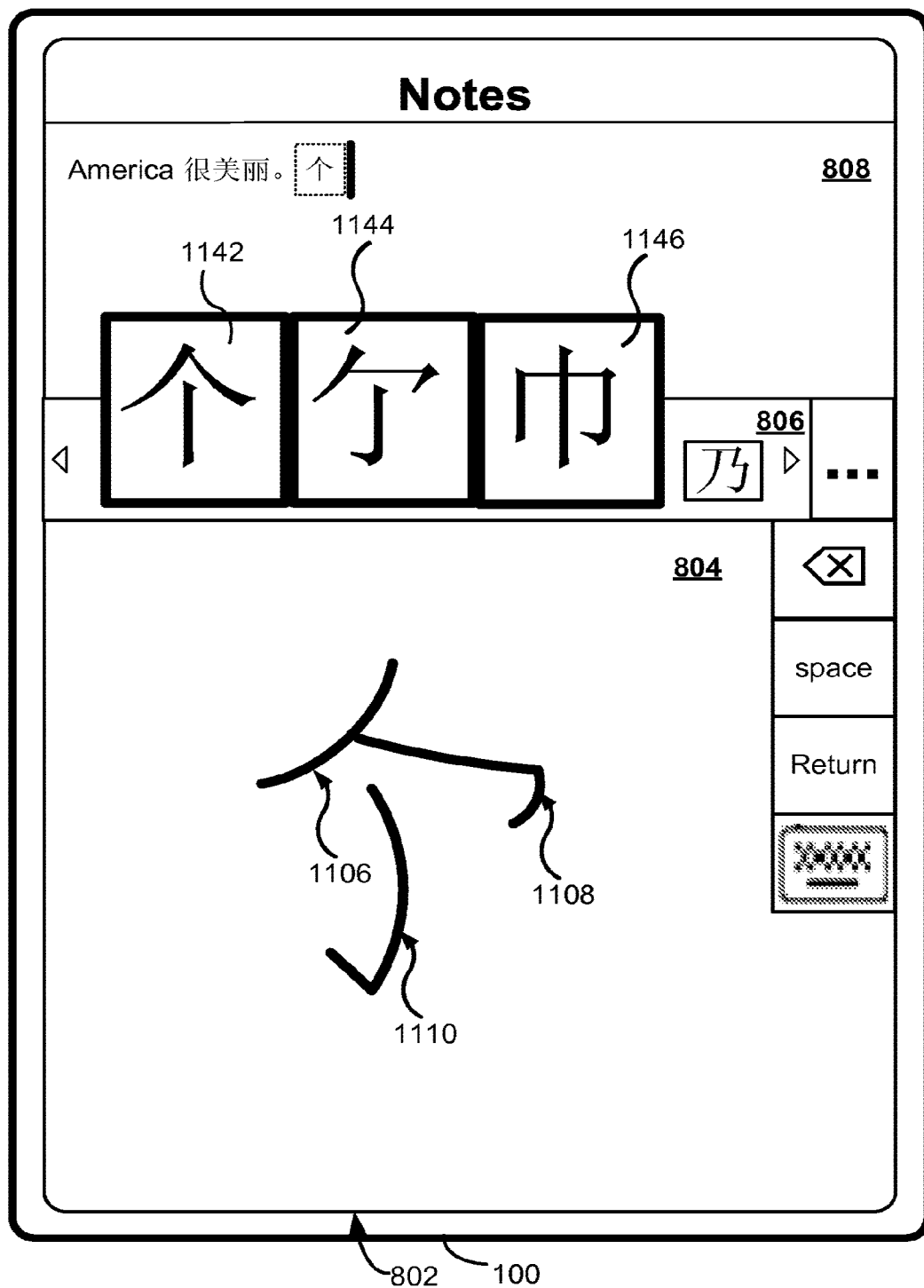

As shown in FIGS. 11H-11I, when the user provides an expand gesture (e.g., as indicated by two contacts 1138 and 1140 moving away from each other) over the first representative character 1118, the area displaying the representative character 1118 is expanded, and three similar-looking candidate characters (e.g., "个", "亇" and "忄") are presented in an enlarged view (e.g., in enlarged boxes 1142, 1144, and 1146, respectively) as compared to the other candidate characters (e.g., "乃") which are not in the same expanded group.

Figure 11J:
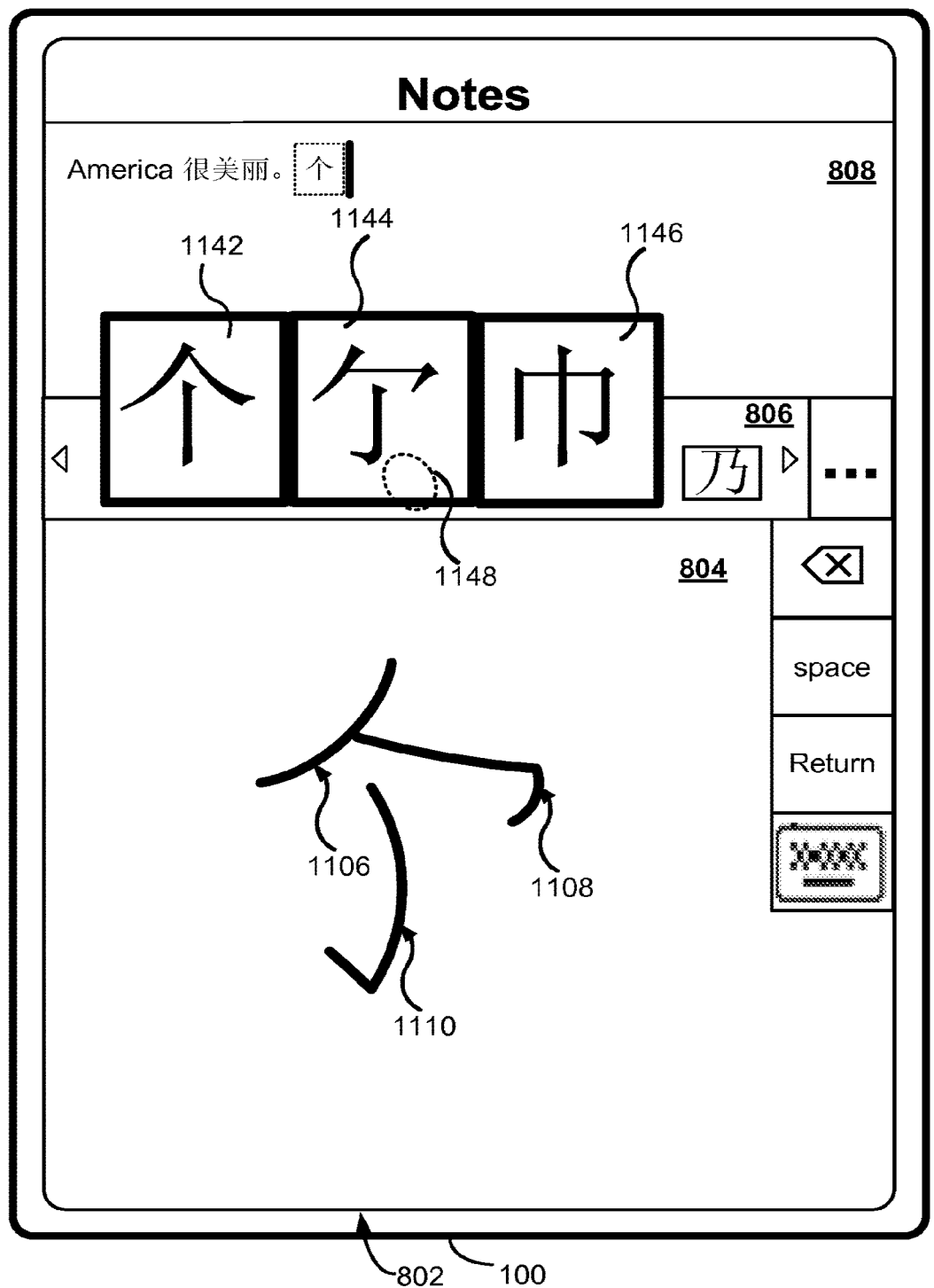
Figure 11K:
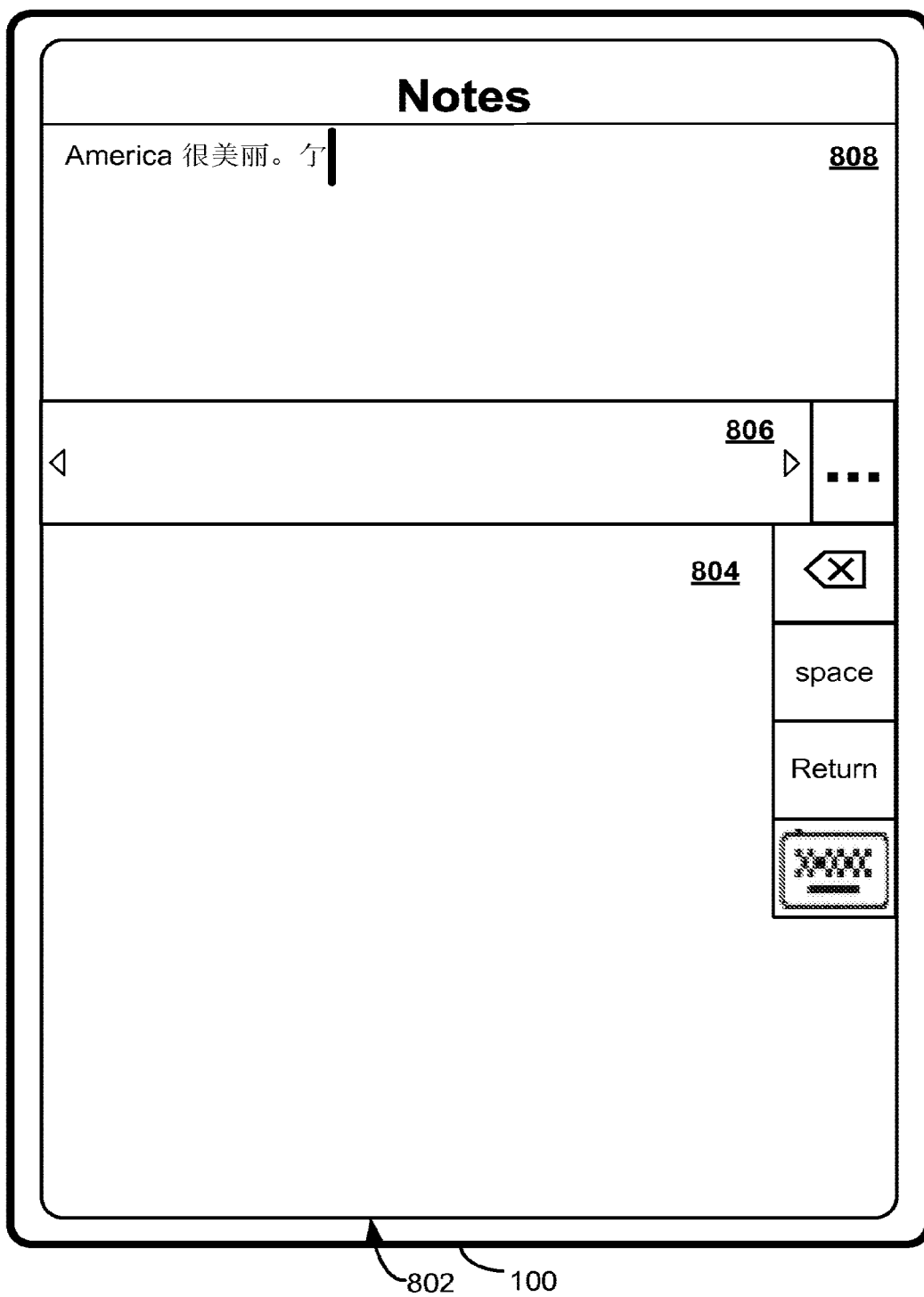

As shown in FIG. 11I, when presented in the enlarged view, fine distinctions of the three similar-looking candidate characters (e.g., "个", "亇" and "忄") can be more easily seen by the user. If one of the three candidate characters is the intended character input, the user can select the candidate character, e.g., by touching the area in which the character is displayed. As shown in FIGS. 11J-11K, the user has selected (with contact 1148) the second character (e.g., "亇") shown in box 1144 in the expanded view. In response, the selected character (e.g., "亇") is entered into the text input area 808 at the insertion point indicated by the cursor. As shown in FIG. 11K, once a character has been selected, the handwriting input in the handwriting input area 804 and the candidate characters in the candidate display area 806 (or the extended view of the candidate display area) are cleared for subsequent handwriting input.

In some embodiments, if the user does not see a desired candidate character in the expanded view of the first representative candidate character 1142, the user can optionally use the same gesture to expand other representative characters displayed in the candidate display area 806. In some embodiments, expanding another representative character in the candidate display area 806 automatically restores the currently presented expanded view to a normal view. In some embodiments, the user optionally uses a contraction gesture to restore the currently expanded view to a normal view. In some embodiments, the user can scroll the candidate display area 806 (e.g., to the left or to the right) to reveal other candidate characters that are not visible in the candidate display area 806.

Figure 12A:
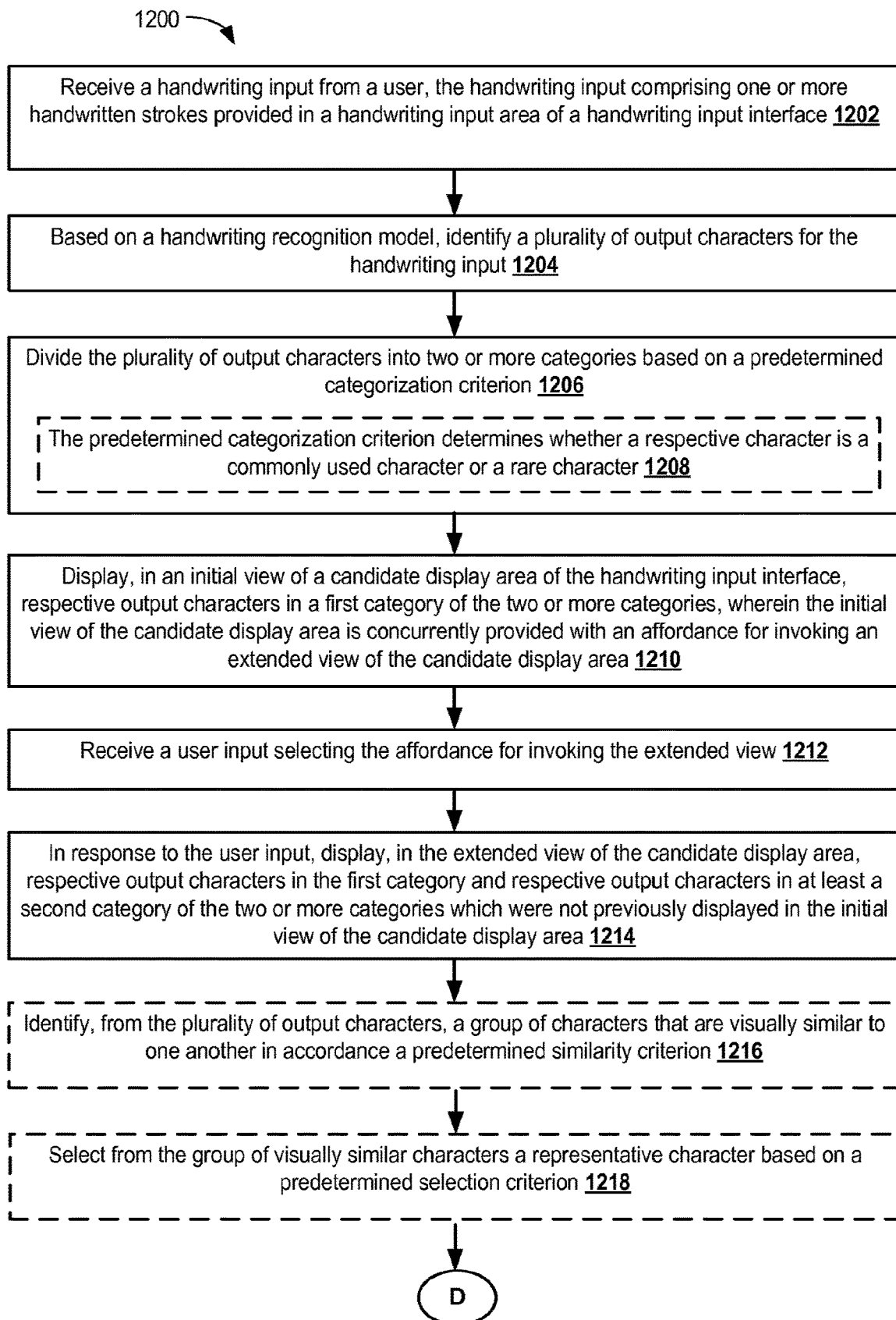
FIGS. 12A-12B is are flow charts of an exemplary process for selectively displaying one category of recognition results in a normal view of a candidate display area, and other categories of recognition results in an extended view of the candidate display area, in accordance with some embodiments.
Figure 12B:
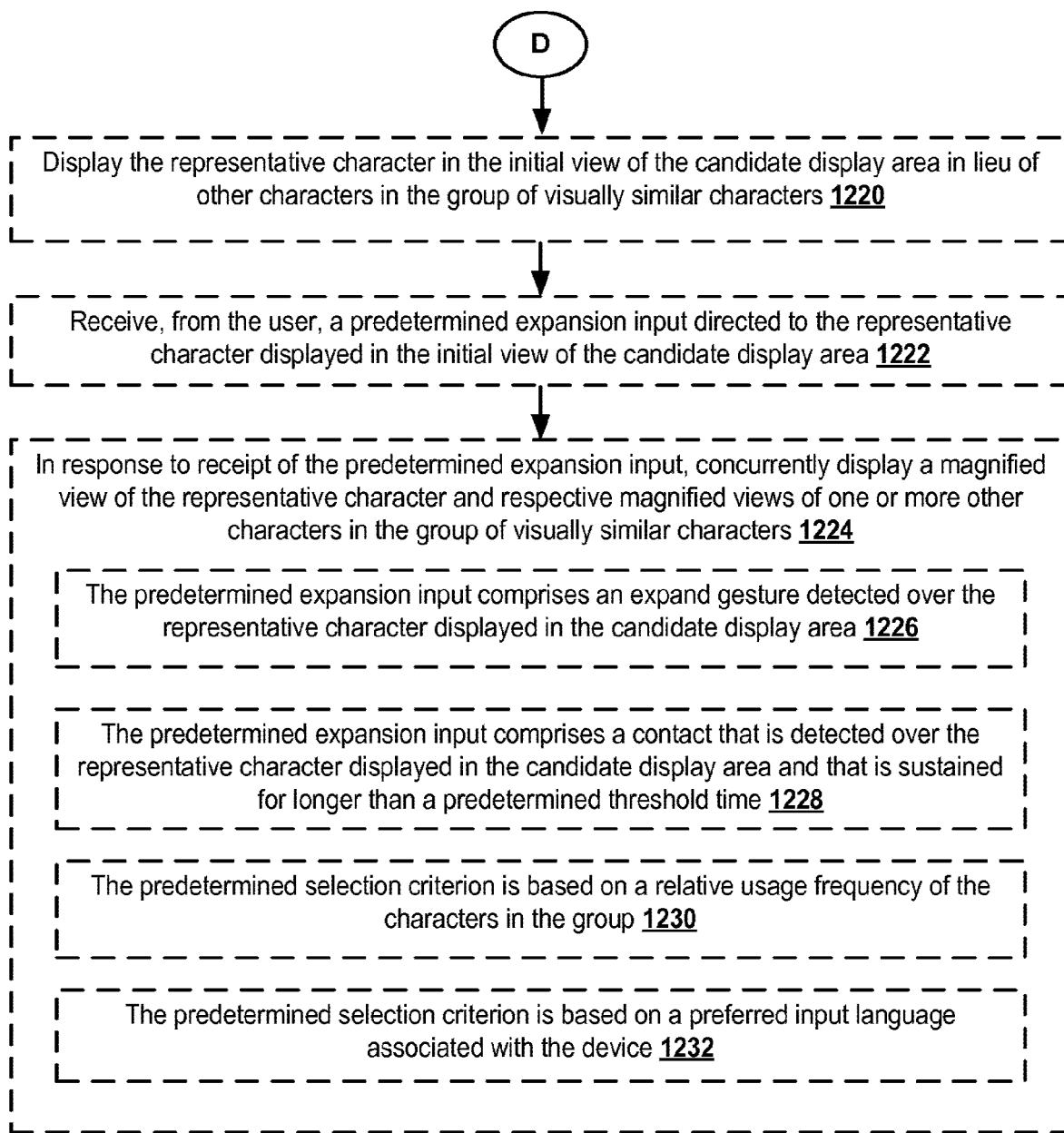

FIGS. 12A-12B are flow charts of an exemplary process 1200 in which a first subset of recognition results are presented in an initial candidate display area, while a second subset of recognition results are presented in an extended candidate display area that is hidden from view until specifically invoked by a user. In the exemplary process 1200, the device identifies from a plurality of handwriting recognition results for a handwriting input, a subset of recognition results that have a visual similarity level exceeding a predetermined threshold. The user device then selects a representative recognition result from the subset of recognition results, and displays the selected representative recognition result in a candidate display area of the display. The process 1200 is illustrated in FIGS. 11A-11K.

As shown in FIG. 12A, in the example process 1200, the user device receives (1202) a handwriting input from a user. The handwriting input includes one or more handwritten strokes (e.g., 1106, 1108, 1110 in FIG. 11C) provided in a handwriting input area (e.g., 806 in FIG. 11C) of a handwriting input interface (e.g., 802 in FIG. 11C). The user device, based on a handwriting recognition model, identifies (1204) a plurality of output characters (e.g., characters shown in tabbed page 1130, FIG. 11C) for the handwriting input. The user device divides (1206) the plurality of output characters into two or more categories based on a predetermined categorization criterion. In some embodiments, the predetermined categorization criterion determines (1208) whether a respective character is a commonly used character or a rare character.

In some embodiments, the user device displays (1210), in an initial view of a candidate display area (e.g., 806 as shown in FIG. 11C) of the handwriting input interface, respective output characters in a first category (e.g., commonly used characters) of the two or more categories, wherein the initial view of the candidate display area is concurrently provided with an affordance (e.g., 1104 in FIG. 11C) for invoking an extended view of the candidate display area (e.g., 1128 in FIG. 11D).

In some embodiments, the user device receives (1212) a user input selecting the affordance for invoking the extended view, e.g., as shown in FIG. 11C. In response to the user input, the user device displays (1214), in the extended view of the candidate display area, the respective output characters in the first category and respective output characters in at least a second category of the two or more categories which were not previously displayed in the initial view of the candidate display area, e.g., as shown in FIG. 11D.

In some embodiments, the respective characters in the first category are characters found in a dictionary of commonly used characters, and respective characters in the second category are characters found in a dictionary of rare characters. In some embodiments, the dictionary of commonly used characters and the dictionary of rare characters are dynamically adjusted or updated based on a usage history associated with the user device.

In some embodiments, the user device identifies (1216) from the plurality of output characters, a group of characters that are visually similar to one another in accordance with a predetermined similarity criterion (e.g., based on a dictionary of similar characters or based on some spatially-derived features). In some embodiments, the user device selects from the group of visually similar characters a representative character based on a predetermined selection criterion (e.g., based on historic usage frequency). In some embodiments, the predetermined selection criterion is based on a relative usage frequency of the characters in the group. In some embodiments, the predetermined selection criterion is based on a preferred input language associated with the device. In some embodiments, the representative candidate is selected based on other factors indicative of the likelihood that each candidate is the intended input by the user. These factors include, for example, whether the candidate character belongs to a script for a soft keyboard that is currently installed on the user's device, or whether the candidate character is among a set of most commonly used characters in a particular language associated with the user or user device, etc.

In some embodiments, the user device displays (1220) the representative character (e.g., "✧") in the initial view of the candidate display area (e.g., 806 in FIG. 11H) in lieu of other characters (e.g., "✦", "❋") in the group of visually similar characters. In some embodiments, visual indications (e.g., selective visual highlighting, special background) is provided in the initial view of the candidate display area to indicate whether each candidate character is a representative character of a group or a normal candidate character not within any group. In some embodiments, the user device receives (1222), from the user, a predetermined expansion input (e.g., an expand gesture) directed to the representative character displayed in the initial view of the candidate display area, e.g., as shown in FIG. 11H. In some embodiments, in response to the receipt of the predetermined expansion input, the user device concurrently displays (1224) a magnified view of the representative character and respective magnified view of one or more other characters in the group of visually similar characters, e.g., as shown in FIG. 11I.

In some embodiments, the predetermined expansion input is an expand gesture detected over the representative character displayed in the candidate display area. In some embodiments, the predetermined expansion input is a contact that is detected over the representative character displayed in the candidate display area and that is sustained for longer than a predetermined threshold time. In some embodiments, the sustained contact for expanding the group has a longer threshold duration than a tap gesture of selecting the representative character for text input.

In some embodiments, each representative character is displayed concurrently with a respective affordance (e.g., a respective expand button) to invoke the extended view of its group of similar-looking candidate characters. In some embodiments, the predetermined expansion input is a selection of the respective affordance associated with the representative character.

As described herein, in some embodiments, the repertoire of the multi-script handwriting recognition model includes an emoji script. The handwriting input recognition module can recognizes an emoji character based on a user's handwriting input. In some embodiments, the handwriting recognition module presents both emoji characters identified directly from the handwriting, and a character or word in a natural human language representing the identified emoji character. In some embodiments, the handwriting input module recognizes a character or word in a natural human language based on a user's handwriting input, and presents both the recognized character or word, and an emoji character that corresponds to the recognized character or word. In other words, the handwriting input module provides ways for entering an emoji character without switching from the handwriting input interface to an emoji keyboard. In addition, the handwriting input module also provides a way to enter regular natural language characters and words, by drawing an emoji character by hand. FIGS. 13A-13E provide exemplary user interfaces illustrating these different ways of entering emoji characters and regular natural language characters.

Figure 13A:
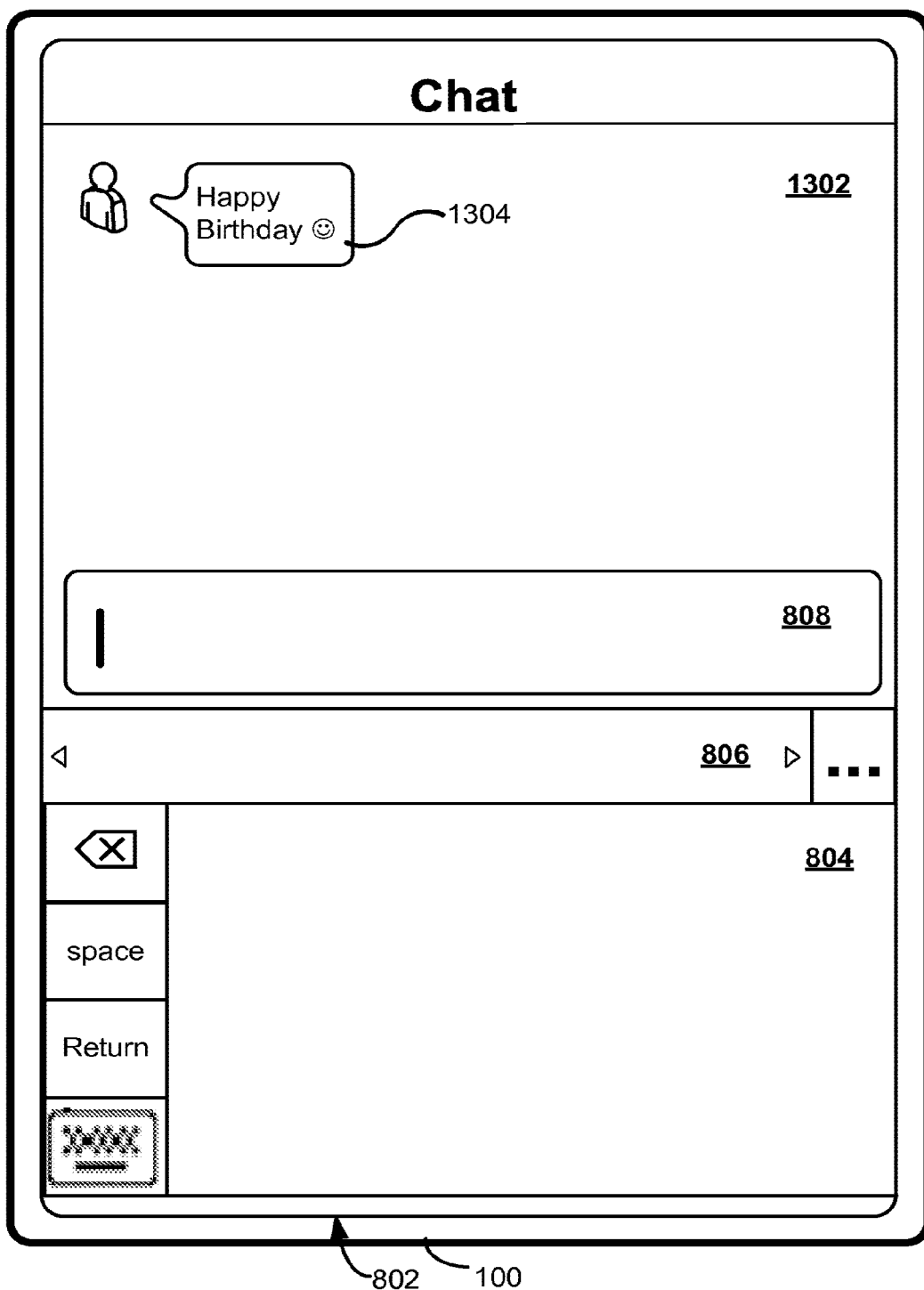
FIGS. 13A-13E show exemplary user interfaces for entering emoji characters through handwriting input in accordance with some embodiments.

FIG. 13A shows an exemplary handwriting input interface 802 invoked under a chat application. The handwriting input interface 802 includes a handwriting input area 804, a candidate display area 806, and a text input area 808. In some embodiments, once the user is satisfied with the text composition in the text input area 808, the user can choose to send the text composition to another participant of the current chat session. The dialog history of the chat session is shown in the dialogue panel 1302. In this example, the user has received a chat message 1304 (e.g., "Happy Birthday ☺") which is displayed in the dialogue panel 1302.

Figure 13B:
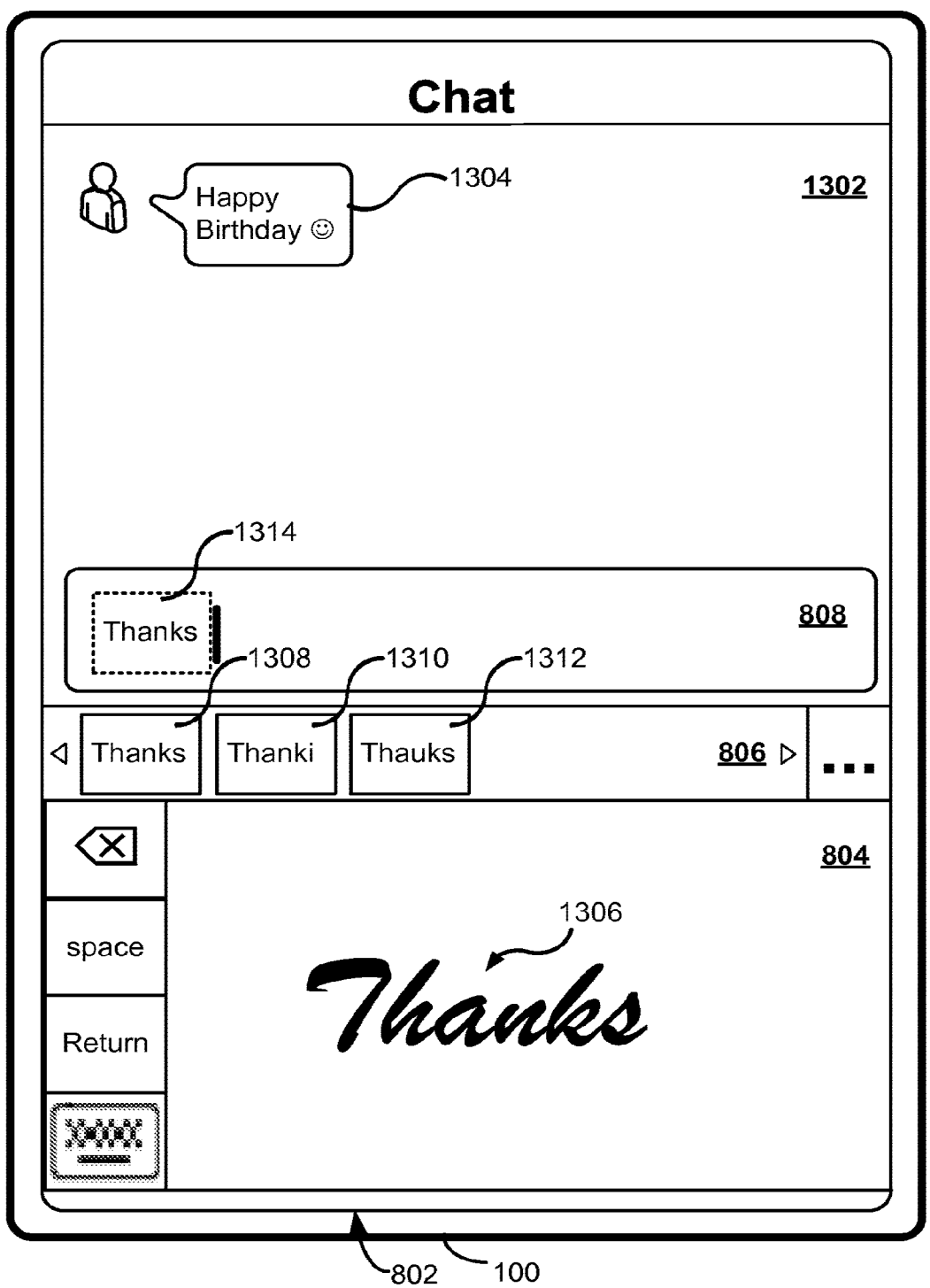

As shown in FIG. 13B, the user has provided a handwriting input 1306 for the English word "Thanks" in a handwriting input area 804. In response to the handwriting input 1306, the user device has identified a number of candidate recognition results (e.g., recognition results 1308, 1310, and 1312). The top-ranked recognition result 1303 has been tentatively entered into the text input area 808 within a box 1314.

Figure 13C:
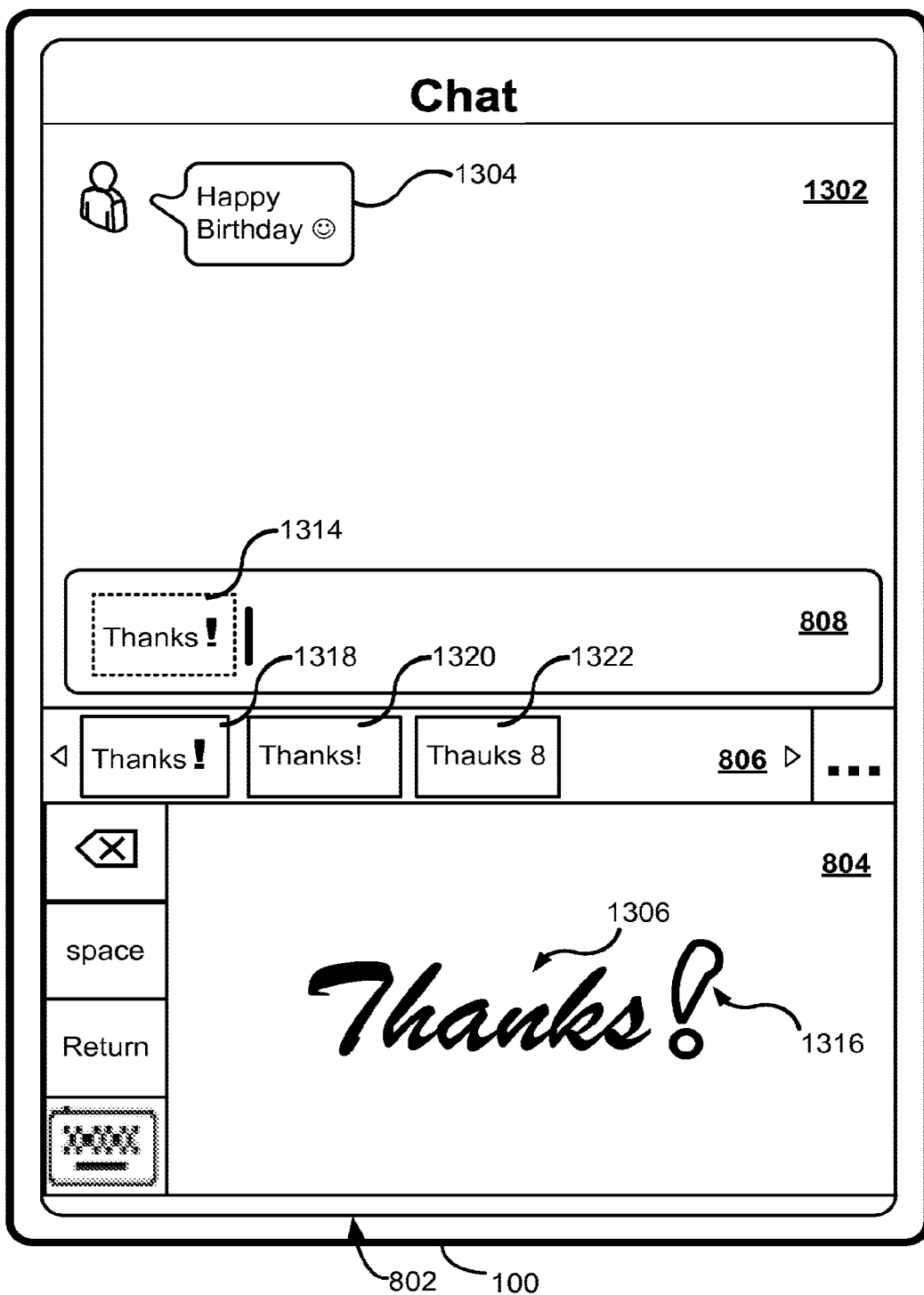

As shown in FIG. 13C, after the user has entered the handwritten word "Thanks" in the handwriting input area 804, the user then draws a stylized exclamation point with strokes 1316 (e.g., an elongated circle with a round circle underneath) in the handwriting input area 804 The user device recognizes that the additional strokes 1316 form a separate recognition unit from the other recognition units previously recognized from the accumulated handwritten strokes 1306 in the handwriting input area 804. Based on the newly entered recognition unit (i.e., the recognition unit formed by the strokes 1316), the user device identifies an emoji character (e.g., a stylized "!") using the handwriting recognition model. Based on this recognized emoji character, the user device presents a first recognition result 1318 (e.g., "Thanks!" with the stylized "!") in the candidate display area 806. In addition, the user device also identifies a number "8" which also visually resembles the newly entered recognition unit. Based on this recognized digit, the user device presents a second recognition result 1322 (e.g., "Thanks 8") in the candidate display area 806. In addition, based on the identified emoji character (e.g., the stylized "!"), the user device also identifies a regular character (e.g., a regular character "!") corresponding to the emoji character. Based on this indirectly identified regular character, the user device presents a third recognition result 1320 (e.g., "Thanks!" with the regular "!") in the candidate display area 806. At this point, the user may select any one of the candidate recognition results 1318, 1320, and 1322 to enter it into the text input area 808.

Figure 13D:
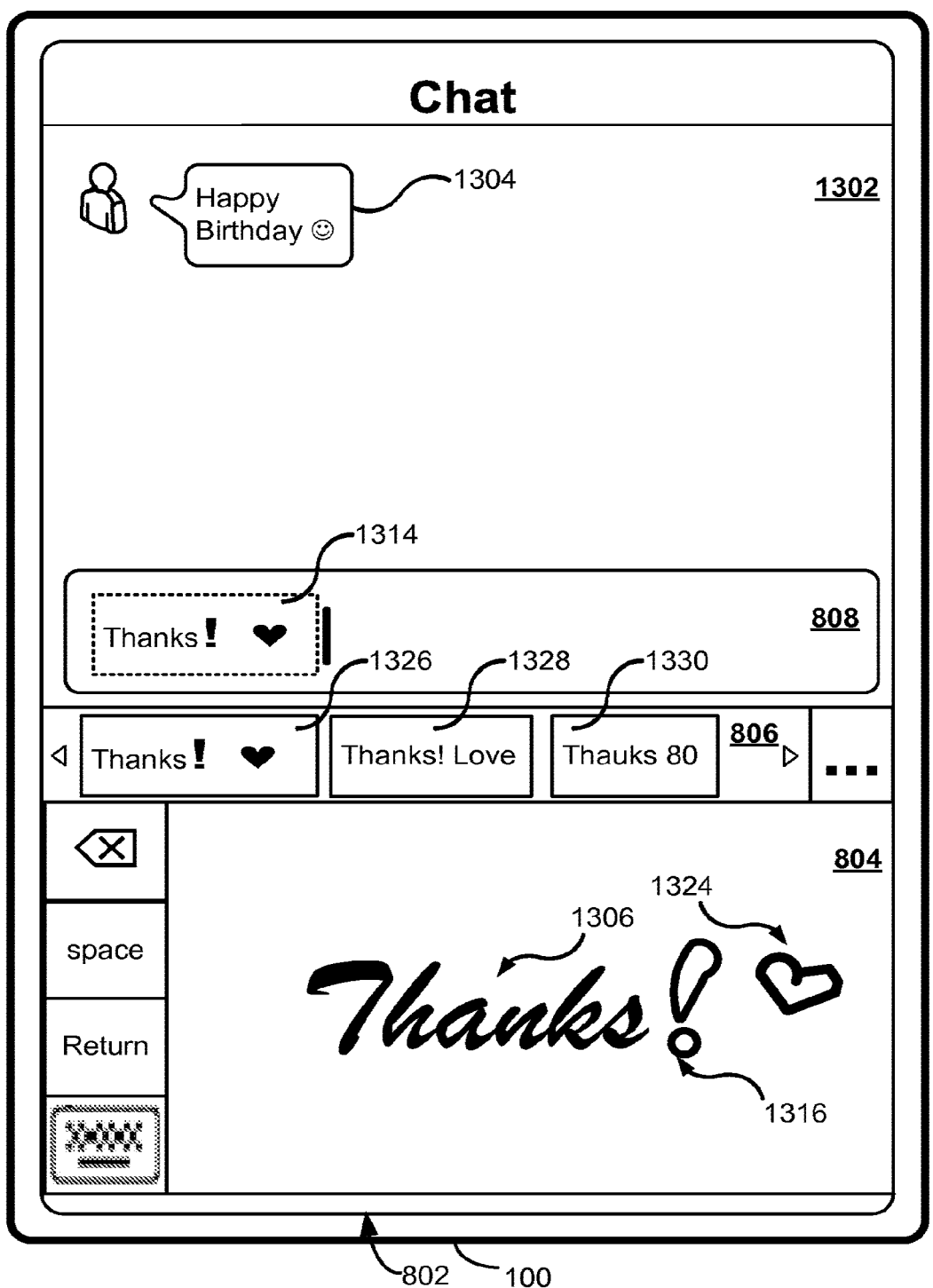

As shown in FIG. 13D, the user continues to provide additional handwritten strokes 1324 in the handwriting input area 804. This time, the user has drawn a heart symbol following the stylized exclamation point. In response to the new handwritten strokes 1324, the user device recognizes that the newly provided handwritten strokes 1324 form yet another new recognition unit. Based on the new recognition unit, the user device identifies the emoji character "♥" and, alternatively, the digit "0" as the candidate characters for the new recognition unit. Based on these new candidate characters recognized from the new recognition unit, the user device presents two updated candidate recognition results 1326 and 1330 (e.g., "Thanks !♥" and "Thanks 80"). In some embodiments, the user device further identifies the regular character(s) or word(s) (e.g., "Love") that correspond to the identified emoji character (e.g., "♥"). Based on the identified regular character(s) or word(s) for the recognized emoji character, the user device presents a third recognition result 1328 in which the recognized emoji character(s) are replaced with the corresponding regular character(s) or word(s). As shown in FIG. 13D, in the recognition result 1328, the emoji character "!" is replaced with a normal exclamation point "!", and the emoji character "♥" has been replaced with regular characters or word "Love".

Figure 13E:
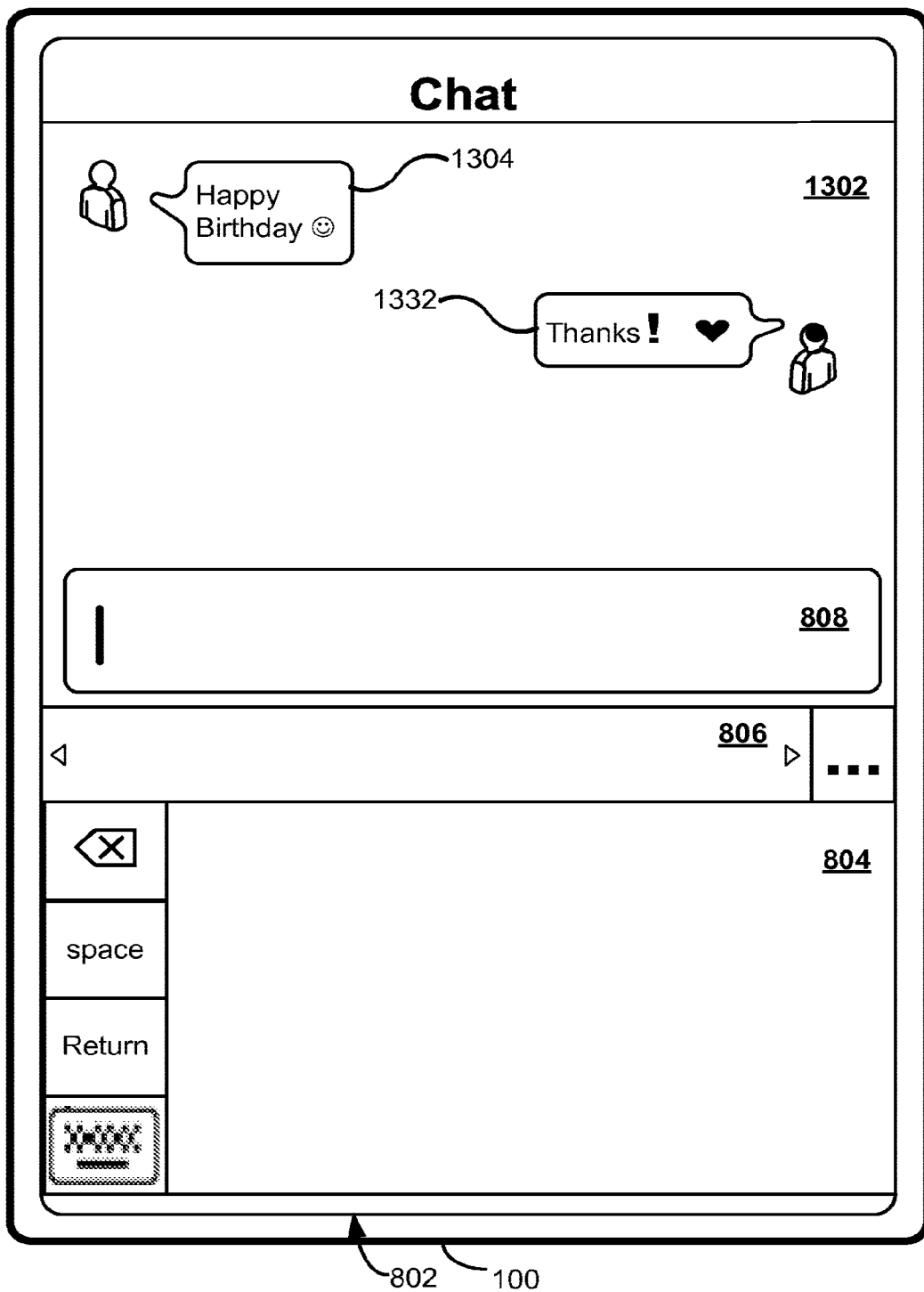

As shown in FIG. 13E, the user has selected one of the candidate recognition results (e.g., candidate result 1326 showing the mixed-script text "Thanks!♥"), and text of the selected recognition result is entered into the text input area 808, and subsequently sent to the other participant of the chat session. The message bubble 1332 shows the text of the message in the dialogue panel 1302.

Figure 14:
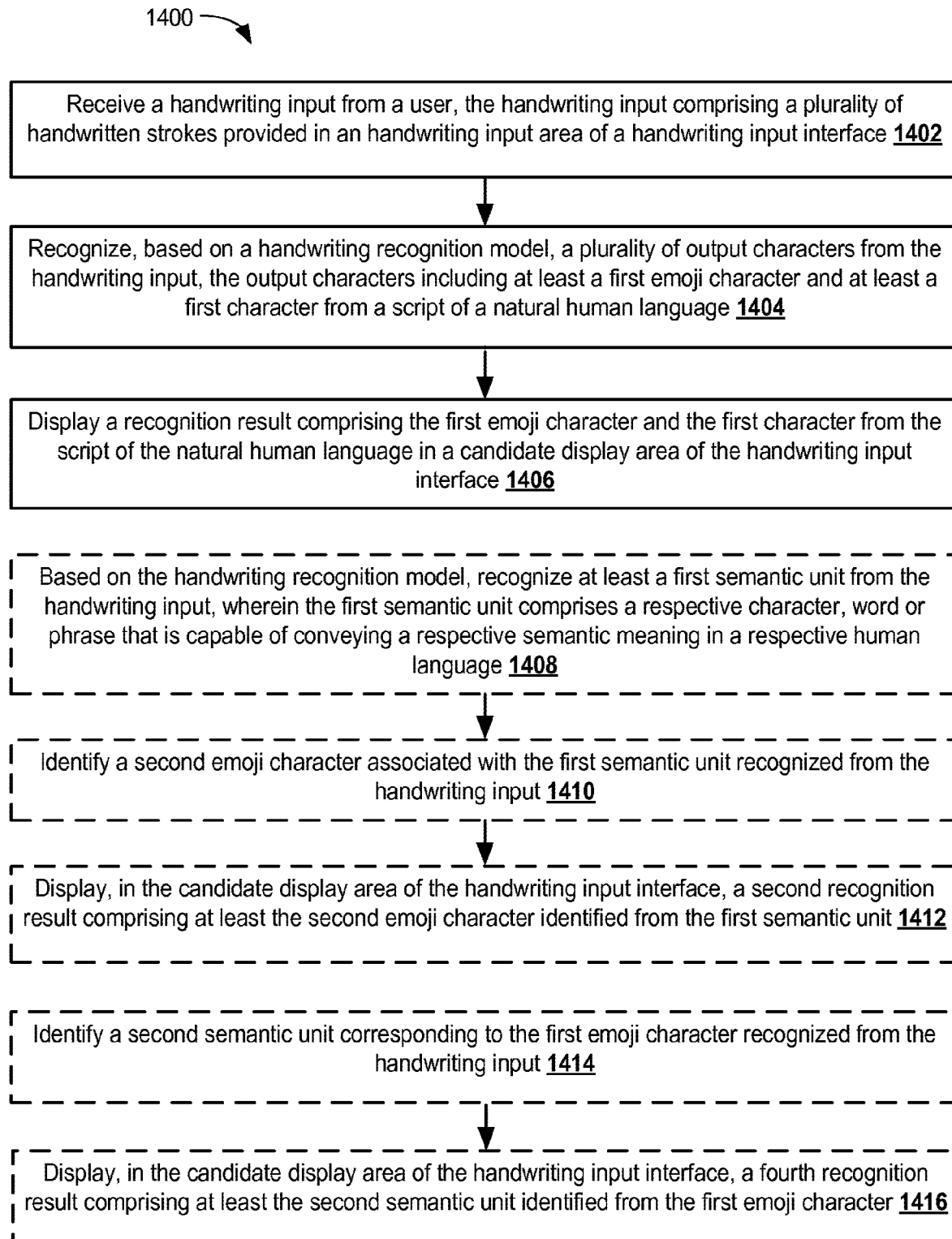
FIG. 14 is a flow chart of an exemplary process for entering emoji characters through handwriting input in accordance with some embodiments.

FIG. 14 is a flow chart of an exemplary process 1400 in which the user enters an emoji character using a handwriting input. FIGS. 13A-13E illustrates the exemplary process 1400 in accordance with some embodiments.

In the process 1400, the user device receives (1402) a handwriting input from a user. The handwriting input includes a plurality of handwritten strokes provided in an handwriting input area of a handwriting input interface. In some embodiments, the user device recognizes (1404), based on a handwriting recognition model, a plurality of output characters from the handwriting input. In some embodiments, the output characters include at least a first emoji character (e.g., the stylized exclamation point "!" or the emoji character "♥" in FIG. 13D) and at least a first character (e.g., a character from the word "Thanks" in FIG. 13D) from a script of a natural human language. In some embodiments, the user device displays (1406) a recognition result (e.g., result 1326 in FIG. 13D) comprising the first emoji character (e.g., the stylized exclamation point !" or the emoji character "♥" in FIG. 13D) and the first character (e.g., a character from the word "Thanks" in FIG. 13D) from the script of the natural human language in a candidate display area of the handwriting input interface, e.g., as shown in FIG. 13D.

In some embodiments, based on the handwriting recognition model, the user device optionally recognizes (1408) at least a first semantic unit (e.g., the word "thanks") from the handwriting input, wherein the first semantic unit comprises a respective character, word or phrase that is capable of conveying a respective semantic meaning in a respective human language. In some embodiments, the user device identifies (1410) a second emoji character (e.g., a "handshake" emoji character) associated with the first semantic unit (e.g., the word "Thanks") recognized from the handwriting input. In some embodiments, the user device displays (1412), in the candidate display area of the handwriting input interface, a second recognition result (e.g., a recognition result showing a "handshake" emoji character followed by the "!" and a "♥" emoji characters) comprising at least the second emoji character identified from the first semantic unit (e.g., the word "Thanks"). In some embodiments, displaying the second recognition result further includes concurrently displaying the second recognition result with a third recognition result (e.g., a recognition result "Thanks!♥") comprising at least the first semantic unit (e.g., the word "Thanks").

In some embodiments, the user receives a user input selecting the first recognition result displayed in the candidate display area. In some embodiments, in response to the user input, the user device enters text of the selected first recognition result in a text input area of the handwriting input interface, where the text includes at least the first emoji character and the first character from the script of the natural human language. In other words, the user is able to enter a mixed-script text input using a single handwriting input (albeit, a handwriting input comprising multiple strokes) in the handwriting input area, without switching between a natural language keyboard and an emoji character keyboard.

In some embodiments, the handwriting recognition model has been trained on a multi-script training corpus comprising writing samples corresponding to characters of at least three non-overlapping scripts, and the three non-overlapping scripts includes a set of emoji characters, Chinese characters, and Latin script.

In some embodiments, the user device identifies (1414) a second semantic unit (e.g., the word "Love") corresponding to the first emoji character (e.g., the "♥" emoji character) recognized directly from the handwriting input. In some embodiments, the user device displays (1416) in the candidate display area of the handwriting input interface, a fourth recognition result (e.g., 1328 in FIG. 13D) comprising at least the second semantic unit (e.g., the word "Love") identified from the first emoji character (e.g., the "♥" emoji character). In some embodiments, the user device concurrently displays the fourth recognition result (e.g., result 1328 "Thanks! Love") with the first recognition result (e.g., result "Thanks♥!") in the candidate display area, as shown in FIG. 13D.

In some embodiments, the user device allows the user to enter regular text by drawing an emoji character. For example, if the user does not know how to spell the word "elephant," the user optionally draw a stylized emoji character for "elephant" in the handwriting input area, and if the user device can correctly recognize the handwriting input as an emoji character for "elephant," the user device optionally also presents the word "elephant" in normal text as one of the recognition results displayed in the candidate display area. In another example, the user may draw a stylized cat in the handwriting input area, in lieu of writing the Chinese character "猫". If the user device identifies the emoji character for "cat" based on the handwriting input provided by the user, the user device optionally also presents the Chinese character "猫" which means "cat" in Chinese, along with the emoji character for "cat" in the candidate recognition results. By presenting normal text for a recognized emoji character, the user device provides an alternative way of entering complex characters or words using a few stylized strokes commonly associated with a well-known emoji character. In some embodiments, the user device stores a dictionary linking emoji characters with their corresponding normal text (e.g., characters, words, phrases, symbols, etc.) in one or more preferred scripts or languages (e.g., English or Chinese).

In some embodiments, the user device recognizes an emoji character based on a visual resemblance of the emoji character to an image generated from the handwriting input. In some embodiments, to enable the recognition of emoji characters from a handwriting input, the handwriting recognition model used on the user device is trained using a training corpus that include both handwriting samples corresponding to characters of a script of a natural human language and also handwriting samples corresponding to a set of artificially designed emoji characters. In some embodiments, the emoji characters related to the same semantic concept may have different appearance when used in a mixed input with text of different natural languages. For example, an emoji character for the semantic concept of "Love" may be a "heart" emoji character when presented with normal text of one natural language (e.g., Japanese), and a "kiss" emoji character when presented with normal text of another natural language (e.g., English or French).

As described herein, when performing recognition of a multi-character handwriting input, the handwriting input module performs segmentation of the handwriting input currently accumulated in the handwriting input area, and divides the accumulated strokes into one or more recognition units. One of the parameters used to determine how to segment a handwriting input may be how the strokes are clustered in the handwriting input area and the distance between the different clusters of strokes. Since people have different writing styles. Some people tend to write very sparsely with large distances between strokes or different parts of the same character, while other people tend to write very densely with very small distances between strokes or different characters. Even for the same user, due to imperfect planning, a handwritten character may depart from a balanced appearance and be lopsided, stretched, or squeezed in different ways. As described herein, the multi-script handwriting recognition model provides stroke-order independent recognition, therefore, the user may write characters or parts of characters out of sequence. As a result, spatial uniformity and balance in a handwriting input between characters may be difficult to attain.

In some embodiments, the handwriting input model described herein provides a way for the user to inform the handwriting input module whether to merge two adjacent recognition units into a single recognition unit or to divide a single recognition unit into two separate recognition units. With the user's help, the handwriting input module can revise the initial segmentation, and generate a result intended by the user.

FIGS. 15A-15J illustrate some exemplary user interfaces and processes in which the user provides a predetermined pinch and expand gestures to modify the recognition units identified by the user device.

Figure 15A:
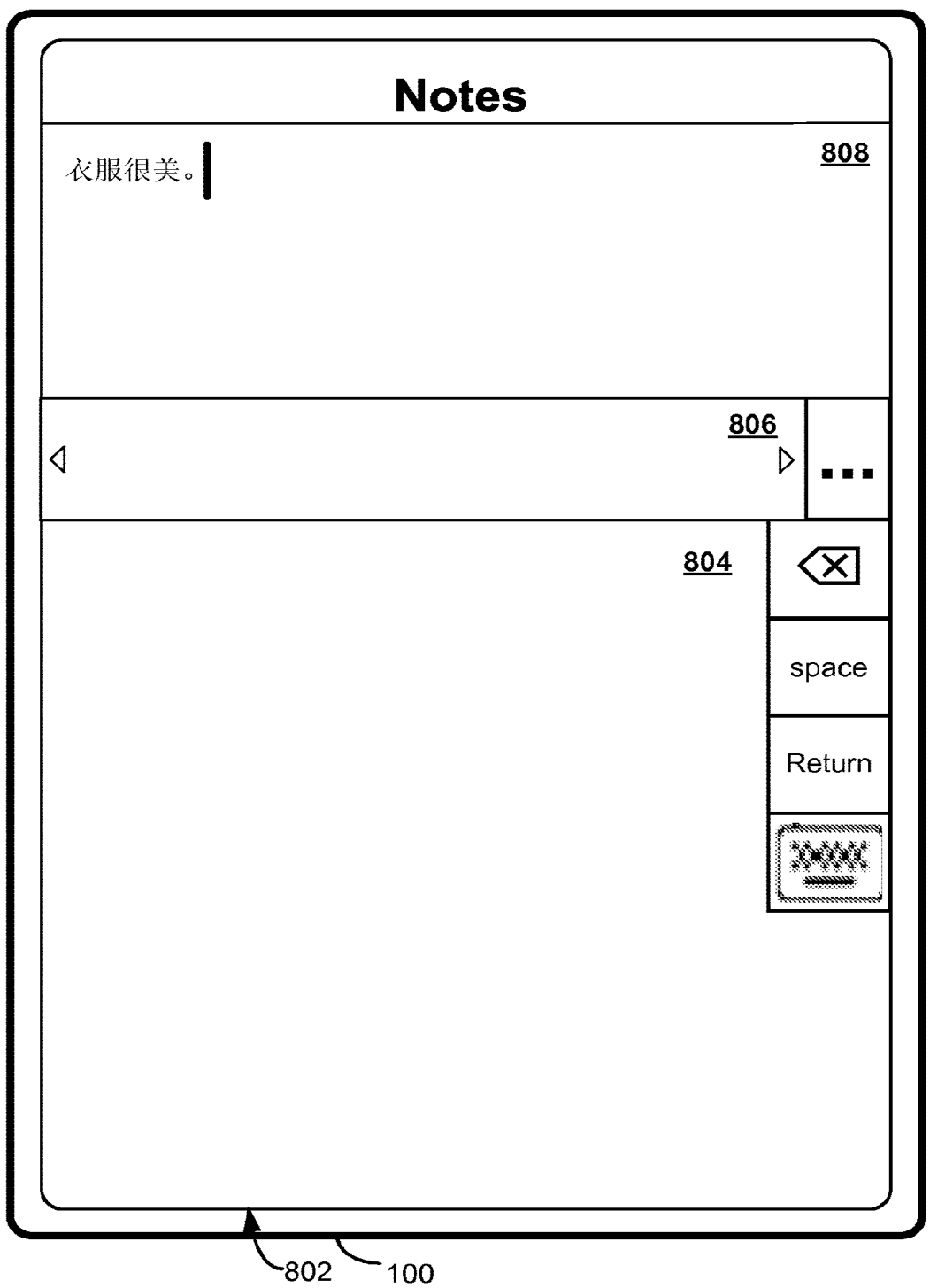
FIGS. 15A-15K show exemplary user interfaces for using a pinch or expand gesture to inform the handwriting input module about how to divide a currently accumulated handwriting input into one or more recognition units, in accordance with some embodiments.
Figure 15B:
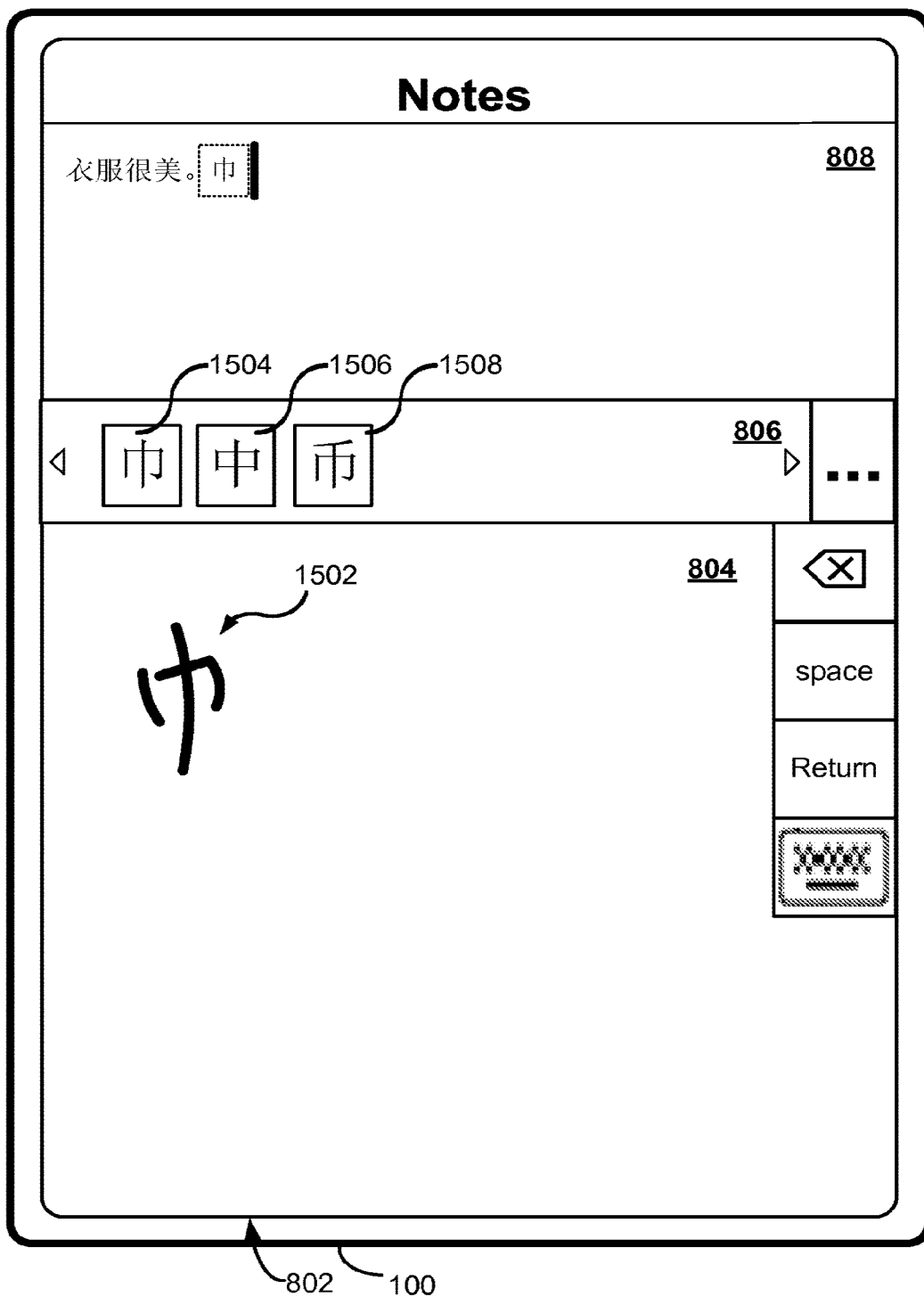

As shown in FIGS. 15A-15B, a user has entered a plurality of handwritten strokes 1502 (e.g., three strokes) in the handwriting input area 804 of a handwriting input interface 802. The user device has identified a single recognition unit based on the currently accumulated handwritten strokes 1502, and presented three candidate characters 1504, 1506, and 1508 (e.g., "巾" "中" and "币", respectively) in the candidate display area 806.

Figure 15C:
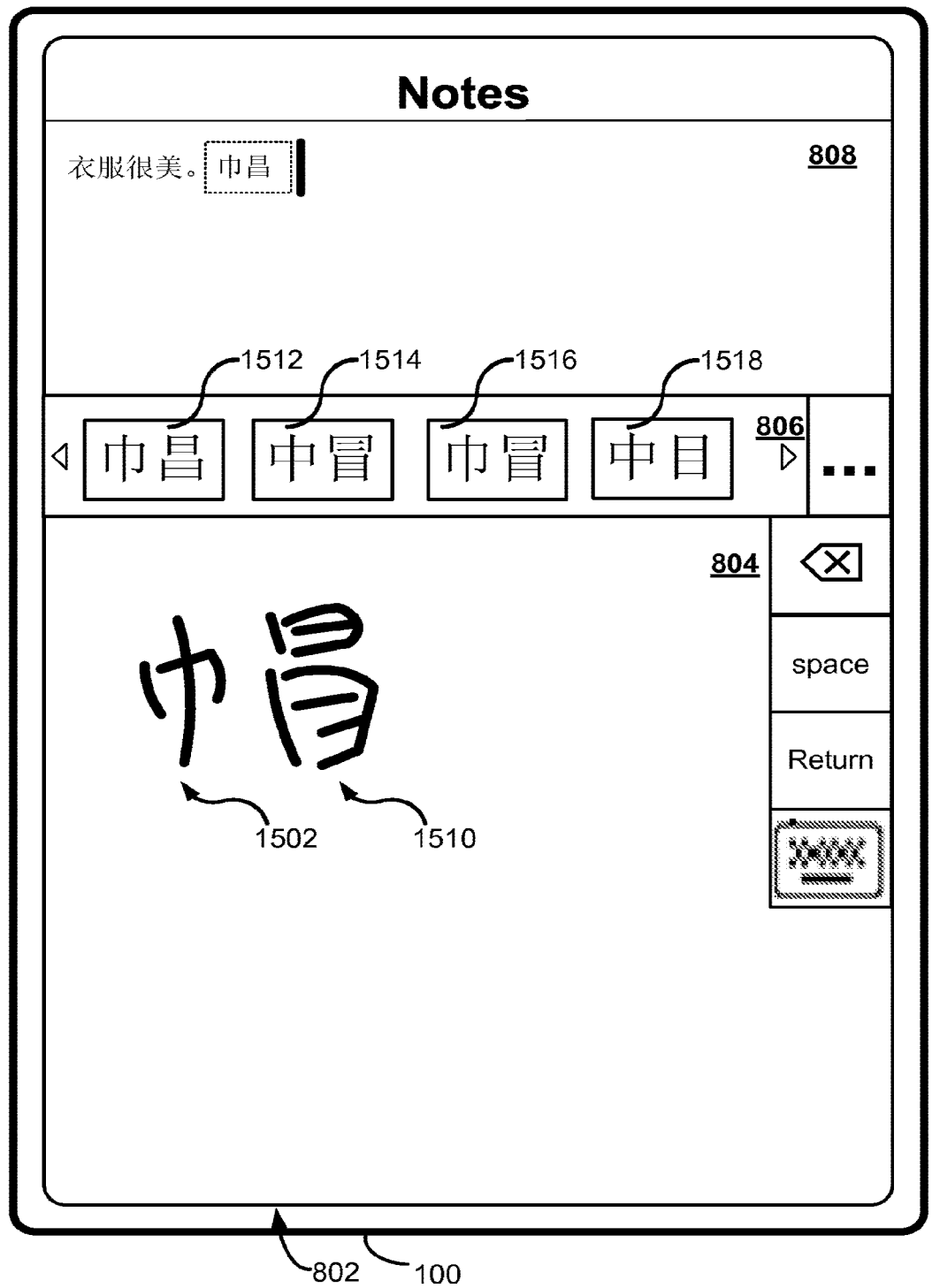

FIG. 15C shows that the user has further entered a few additional strokes 1510 to the right of the initial handwritten strokes 1502 in the handwriting input area 606. The user device determines (e.g., based on the dimensions and spatial distributions of the plurality of strokes 1502 and 1510) that the strokes 1502 and the strokes 1510 should be considered as two separate recognition units. Based on the division of the recognition units, the user device provides the input images of the first and second recognition units to the handwriting recognition model and obtains two sets of candidate characters. The user device then generates a plurality of recognition results (e.g., 1512, 1514, 1516, and 1518) based on different combinations of the recognized characters. Each recognition result includes a recognized character for the first recognition unit, and a recognized character for the second recognition unit. As shown in FIG. 15C, the plurality of recognition results 1512, 1514, 1516, and 1518 each include two recognized characters.

In this example, suppose that the user in fact intended the handwriting input to be recognized as a single character, but unintentionally left too much space between the left portion (e.g., the left radical "巾") and the right portion (e.g., the right radical "冒") of the handwritten character (e.g., "帽"). Having seen the results (e.g., 1512, 1514, 1516, and 1518) presented in the candidate display area 806, the user would realize that the user device has incorrectly segmented the current handwriting input into two recognition units. Although the segmentation may be based on an objective standard, it would not be desirable for the user to delete the current handwriting input and rewrite the whole character again with a smaller distance between the left and the right portions.

Figure 15D:
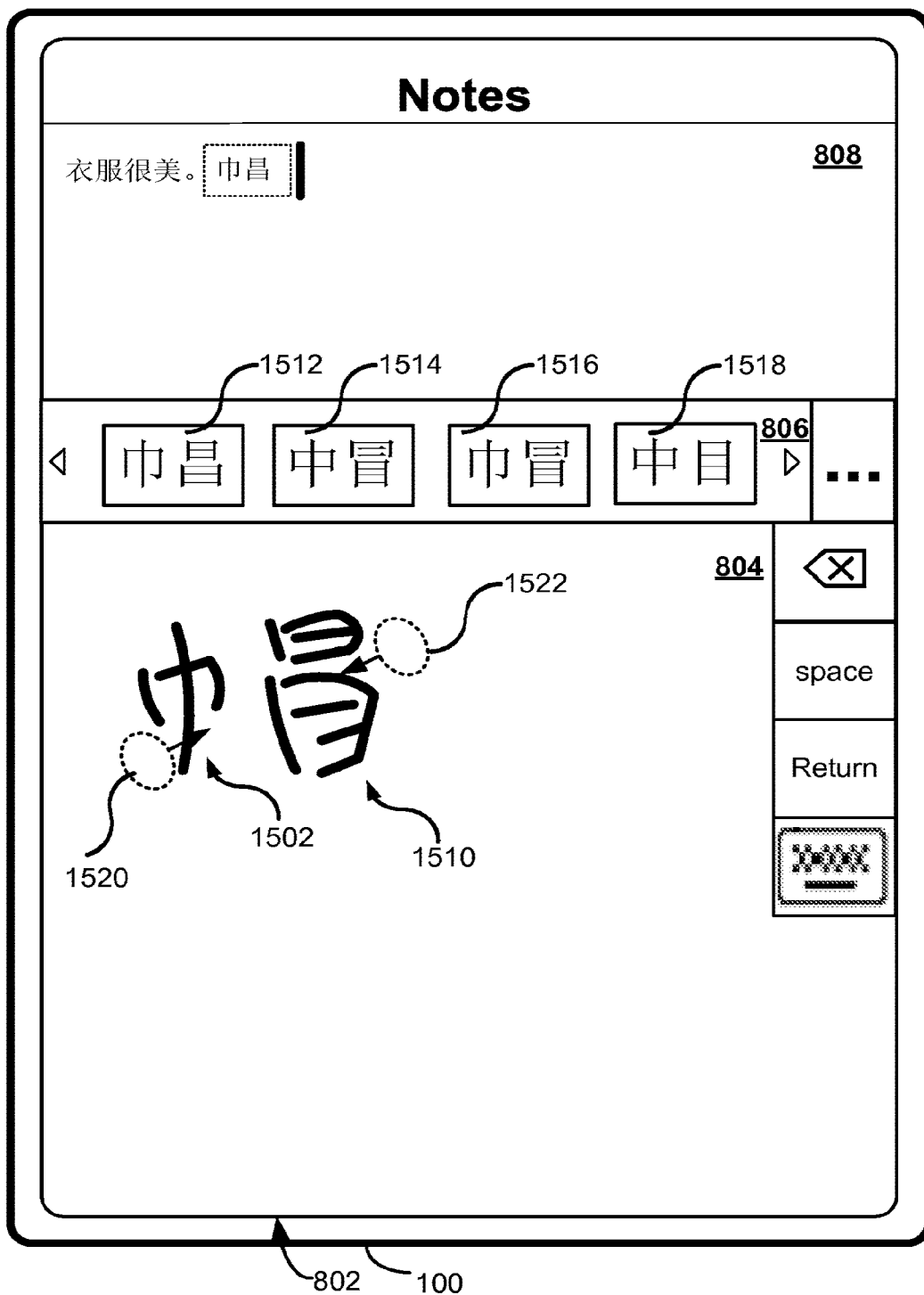

Instead, as shown in FIG. 15D, the user uses a pinch gesture over the two clusters of the handwritten strokes 1502 and 1510 to indicate to the handwriting input module that the two recognition units identified by the handwriting input module should be merged as a single recognition unit. The pinch gesture is indicated by two contacts 1520 and 1522 on the touch-sensitive surface that are move toward each other.

Figure 15E:
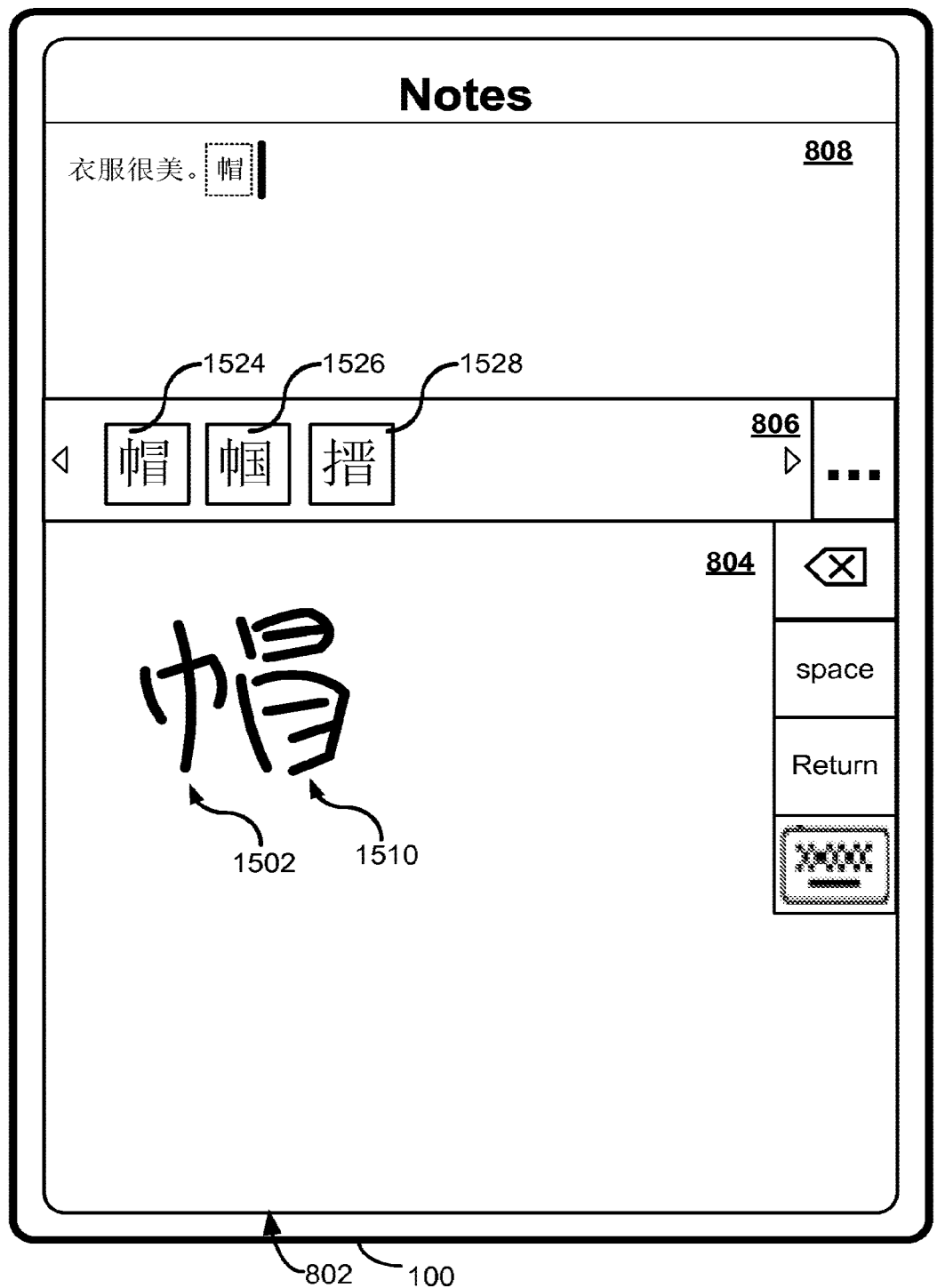

FIG. 15E shows that, in response to the user's pinch gesture, the user device has revised the segmentation of the currently accumulated handwriting input (e.g., strokes 1502 and 1510), and merged the handwritten strokes into a single recognition unit. As shown in FIG. 15E, the user device has provided the input image based on the revised recognition unit to the handwriting recognition model, and obtained three new candidate characters 1524, 1526, and 1528 (e.g., "帽", "帽", and "帽") for the revised recognition unit. In some embodiments, as shown in FIG. 15E, the user device optionally adjusts the rendering of the handwriting input within the handwriting input area 804, such that the distance between the left cluster and the right cluster of the handwritten strokes is reduced. In some embodiments, the user device does not alter the rendering of the handwriting input shown in the handwriting input area 804 in response to the pinch gesture. In some embodiments, the user device distinguishes the pinch gesture from an input stroke based on the two simultaneous contacts (as opposed to one single contact) detected in the handwriting input area 804.

Figure 15F:
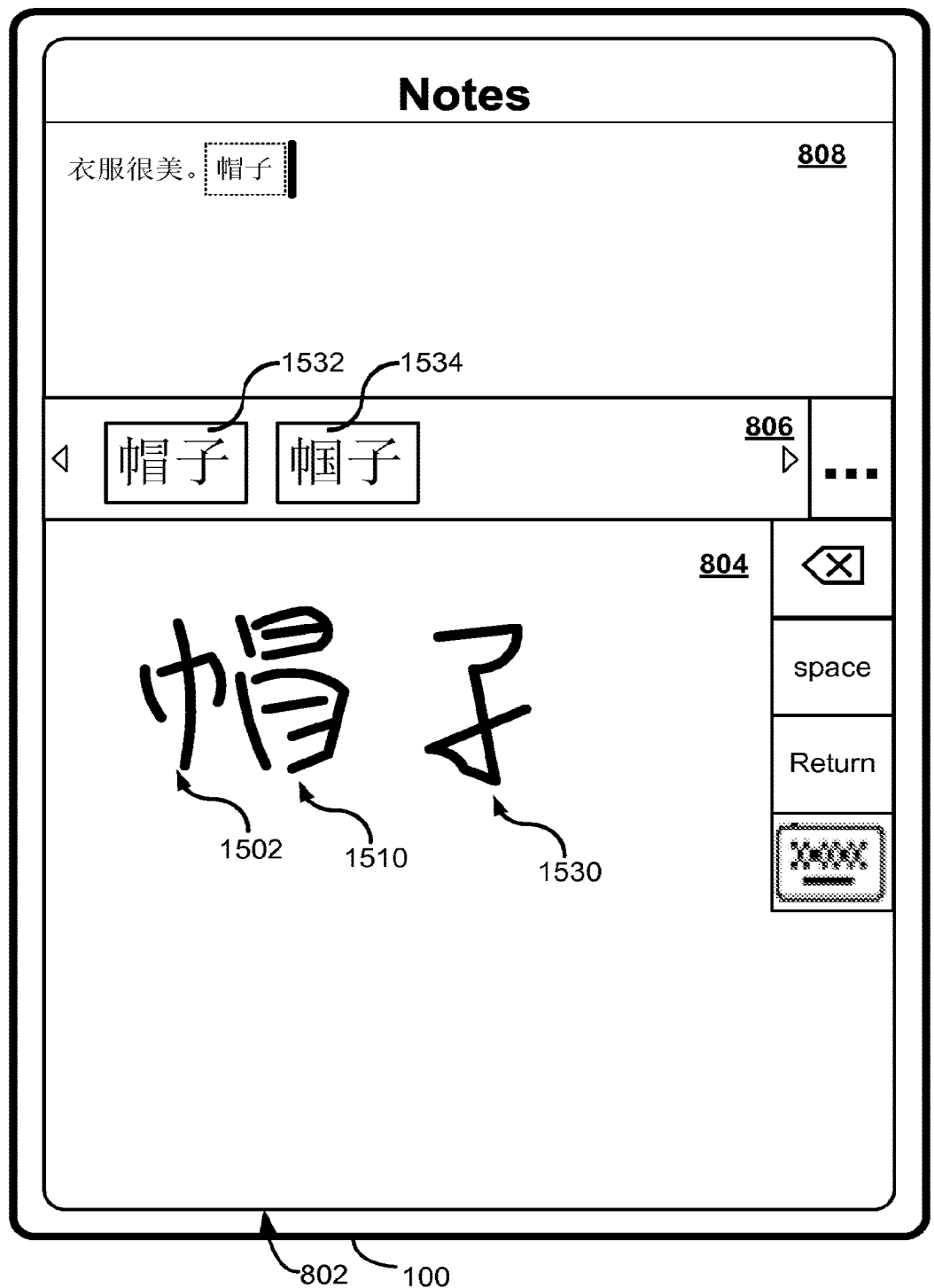

As shown in FIG. 15F, the user has entered two more strokes 1530 to the right of the previously entered handwriting input (i.e., the strokes for the character "帽"). The user device determines that the newly entered strokes 1530 is a new recognition unit, and recognizes a candidate character (e.g., "子") for the newly identified recognition unit. The user device then combines the newly identified character (e.g., "子") with the candidate characters for the earlier identified recognition unit, and presents a number of different recognition results (e.g., results 1532 and 1534) in the candidate display area 806.

Figure 15G:
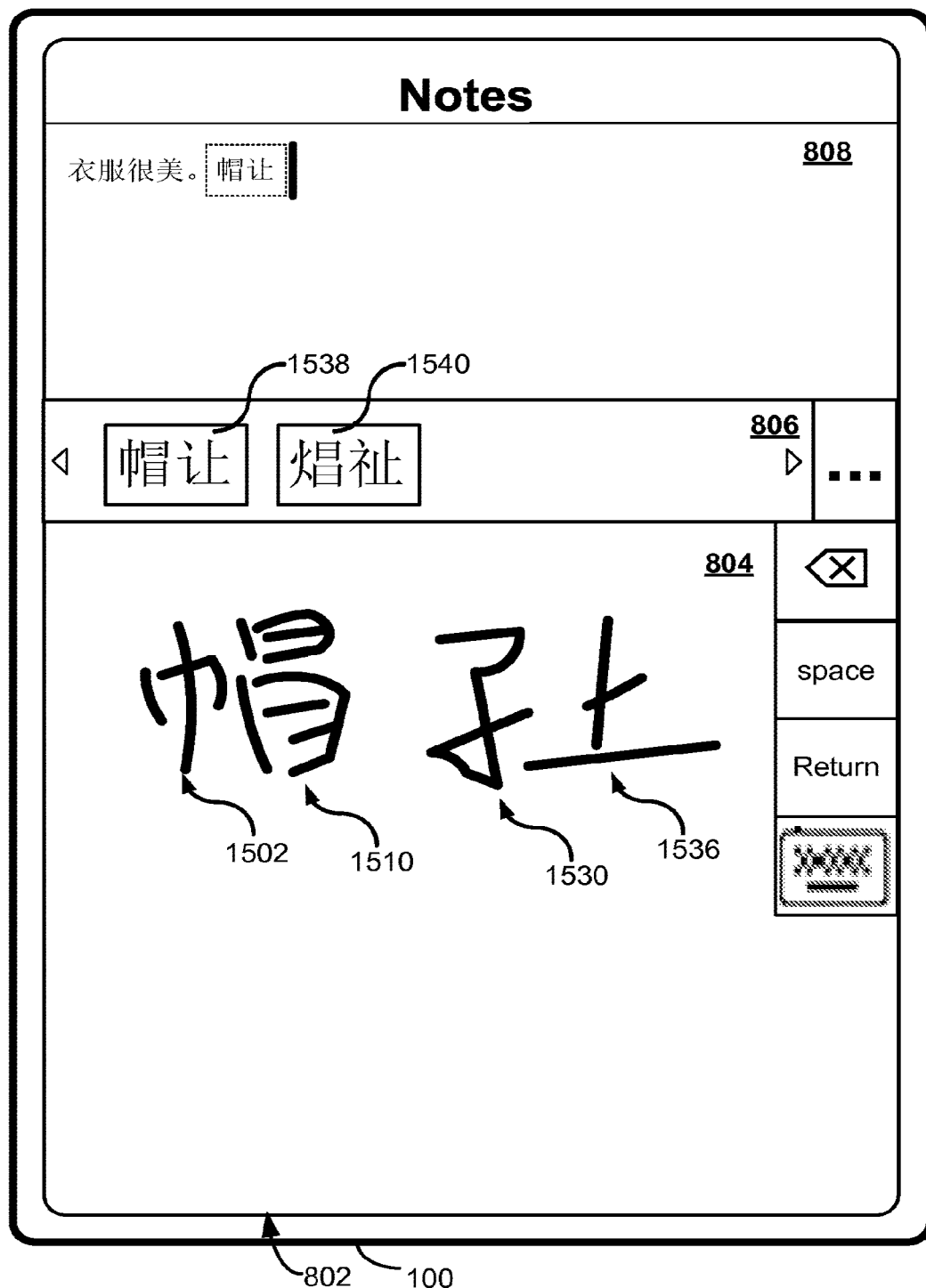

Following the handwritten strokes 1530, the user continues to write more strokes 1536 (e.g., three more strokes) to the right of the strokes 1530, as shown in FIG. 15G. Since the horizontal distance between the strokes 1530 and the strokes 1536 is very small, the user device determines that the strokes 1530 and the strokes 1536 belong to the same recognition unit, and provides an input image formed by the strokes 1530 and 1536 to the handwriting recognition model. The handwriting recognition model identifies three different candidate characters for the revised recognition unit, and generates two revised recognition results 1538 and 1540 for the currently accumulated handwriting input.

Figure 15H:
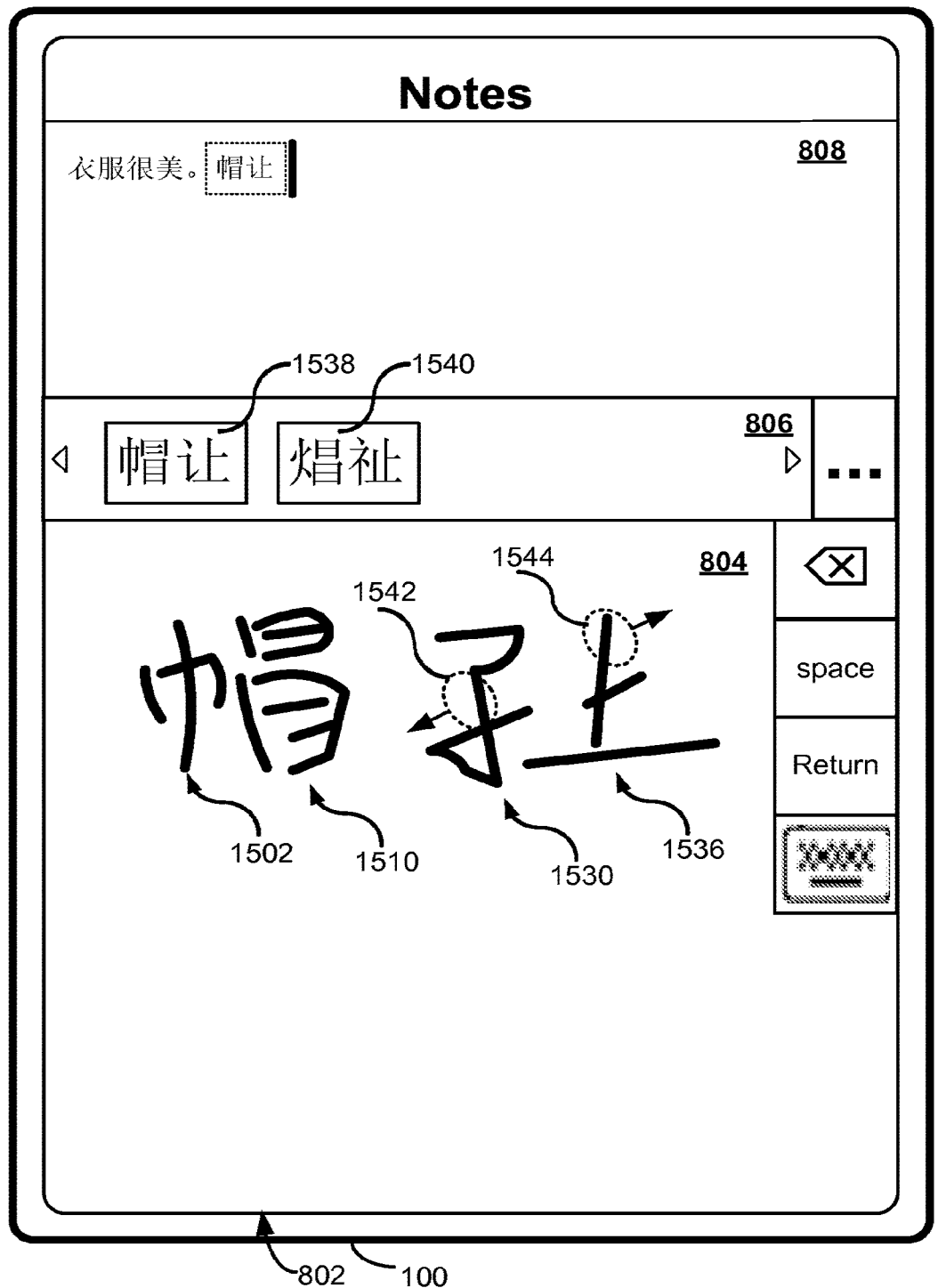

In this example, suppose that the last two sets of strokes 1530 and 1536 are in fact intended as two separate characters (e.g., "子" and "±"). After the user sees that the user device has incorrectly combined the two sets of strokes 1530 and 1536 into a single recognition unit, the user proceeds to provide an expand gesture to notify the user device that the two sets of strokes 1530 and 1536 should be divided into two separate recognition units. As shown in FIG. 15H, the user makes two contacts 1542 and 1544 around the stroke 1530 and 1536, and then moves the two contacts away from each other in a generally horizontal direction (i.e., along the default writing direction).

Figure 15I:
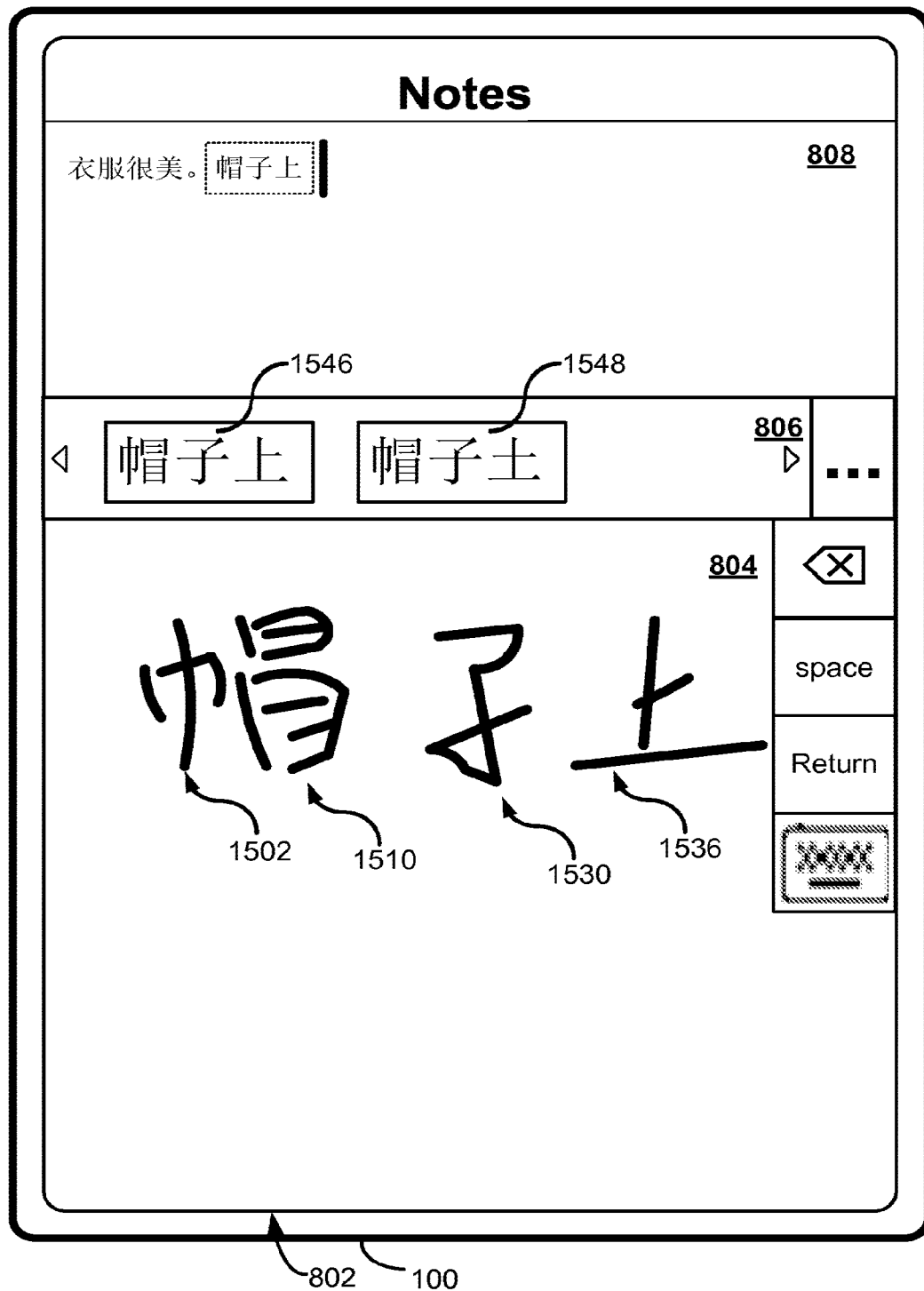

FIG. 15I shows that, in response to the user's expand gesture, the user device revised the previous segmentation of the currently accumulated handwriting input, and assigned the strokes 1530 and the strokes 1536 into two consecutive recognition units. Based on the input images generated for the two separate recognition units, the user device identifies one or more candidate characters for the first recognition unit based on the strokes 1530, and one or more candidate characters for the second recognition unit based on the strokes 1536. The user device then generates two new recognition results 1546 and 1548 based on different combinations of the recognized characters. In some embodiments, the user device optionally modifies the rendering of the strokes 1536 and 1536 to reflect the division of the previously identified recognition unit.

Figure 15J:
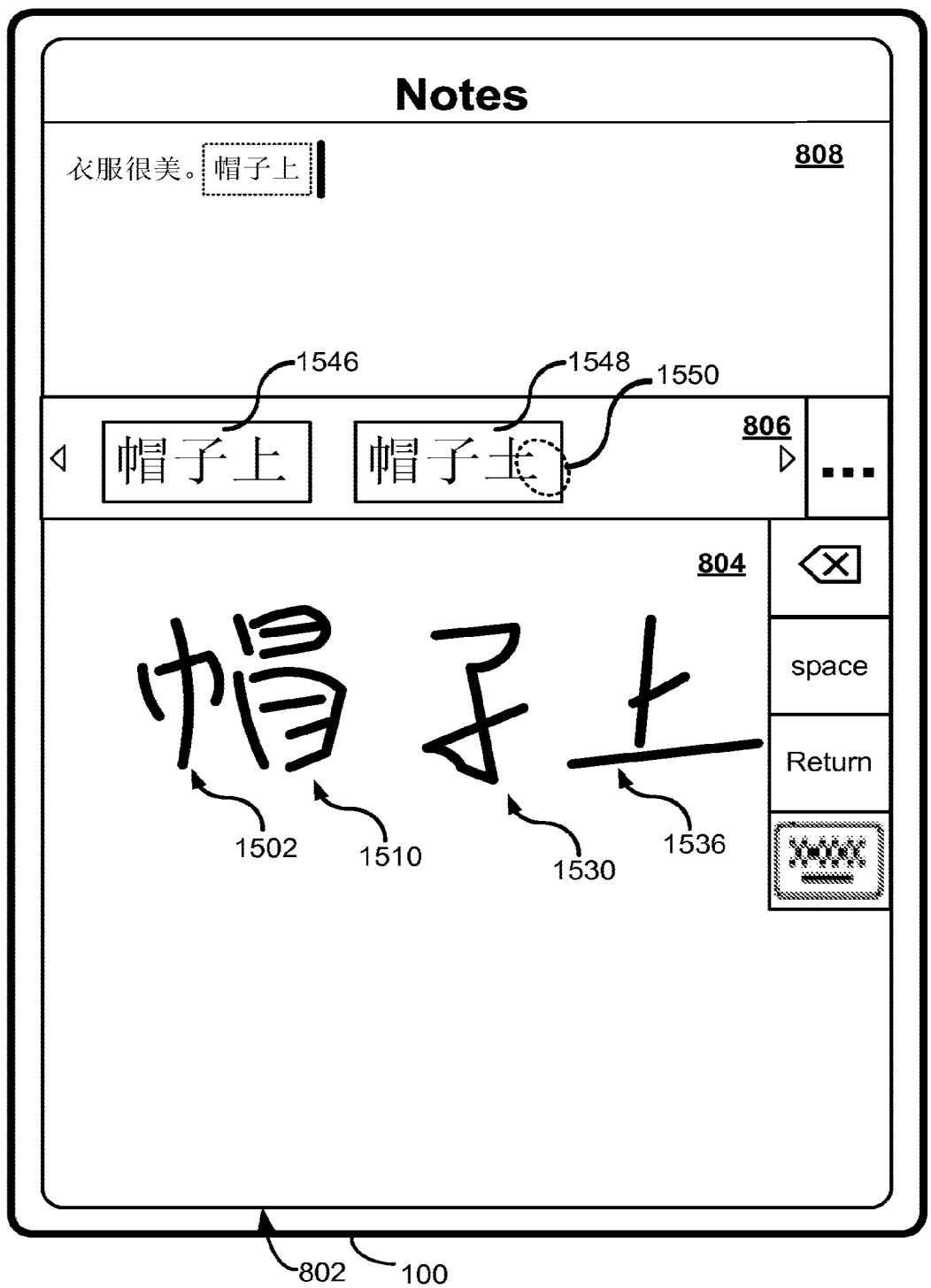
Figure 15K:
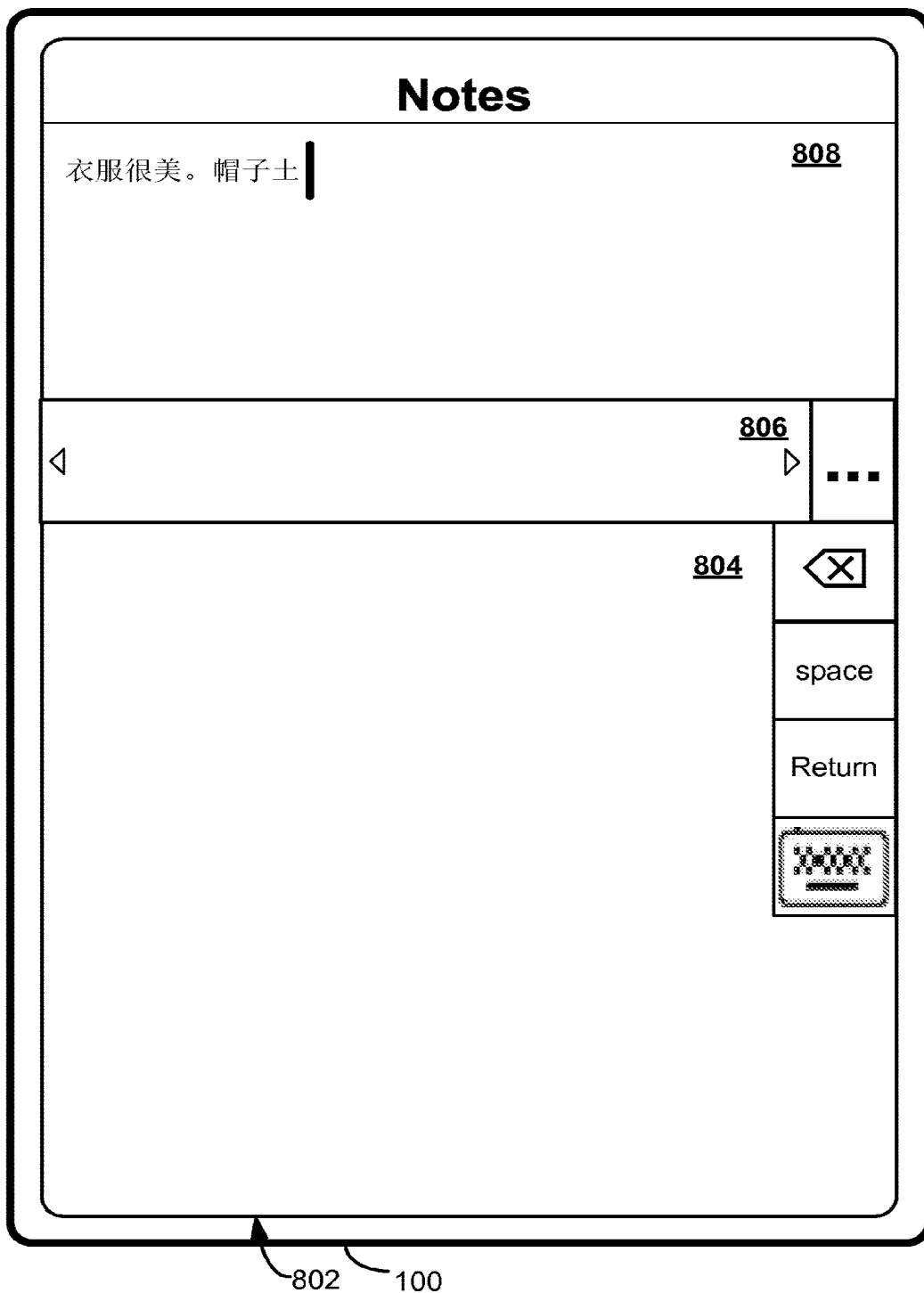

As shown in FIGS. 15J-15K, the user has selected (as indicated by the contact 1550) one of the candidate recognition results displayed in the candidate display area 806, and the selected recognition result (e.g., result 1548) has been entered in the text input area 808 of the user interface. After the selected recognition result has been entered into the text input area 808, the candidate display area 806 and the handwriting input area 804 are both cleared and ready to display subsequent user input.

Figure 16A:
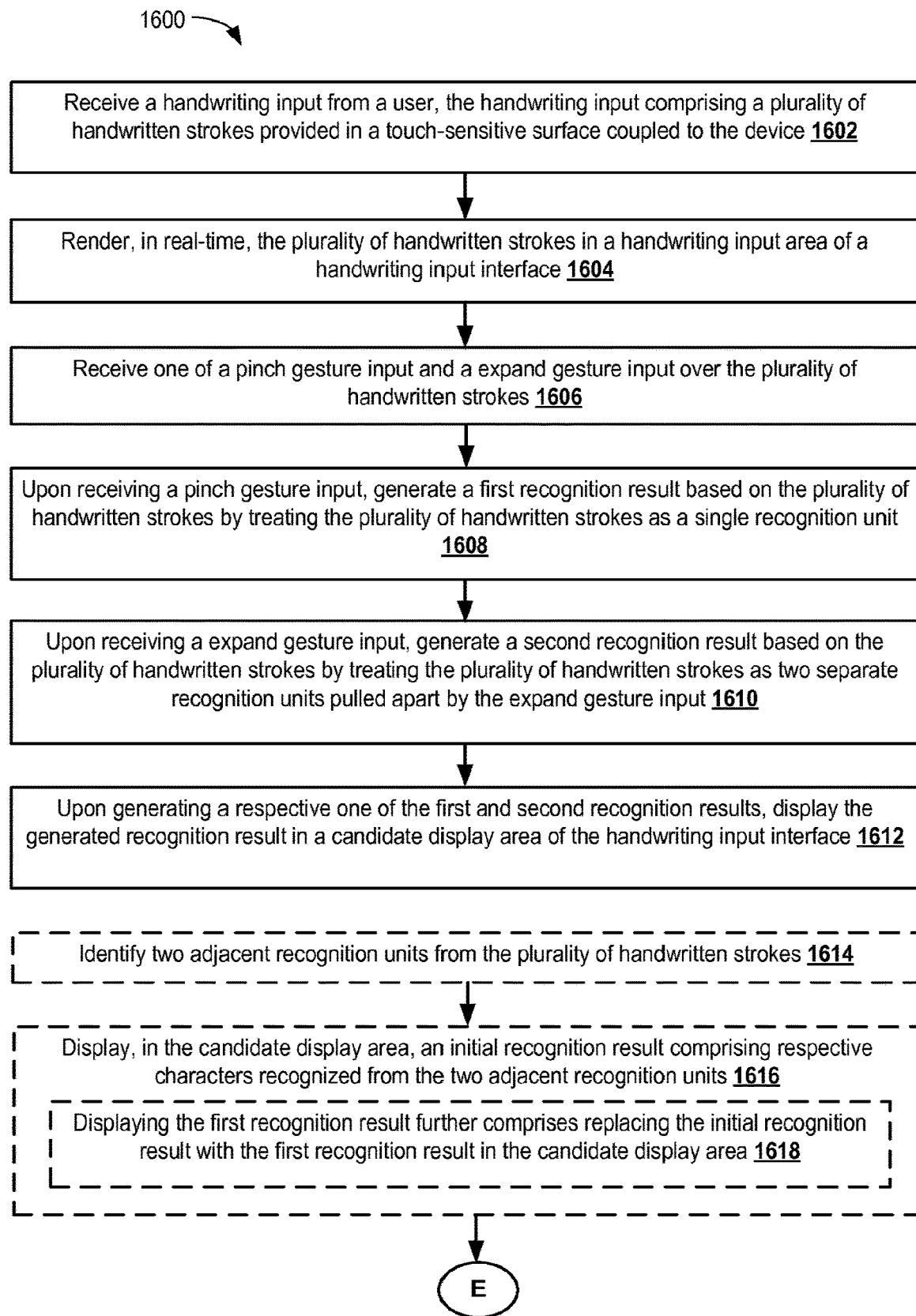
FIGS. 16A-16B are flow charts of an exemplary process for using a pinch or expand gesture to inform the handwriting input module about how to divide a currently accumulated handwriting input into one or more recognition units, in accordance with some embodiments.
Figure 16B:
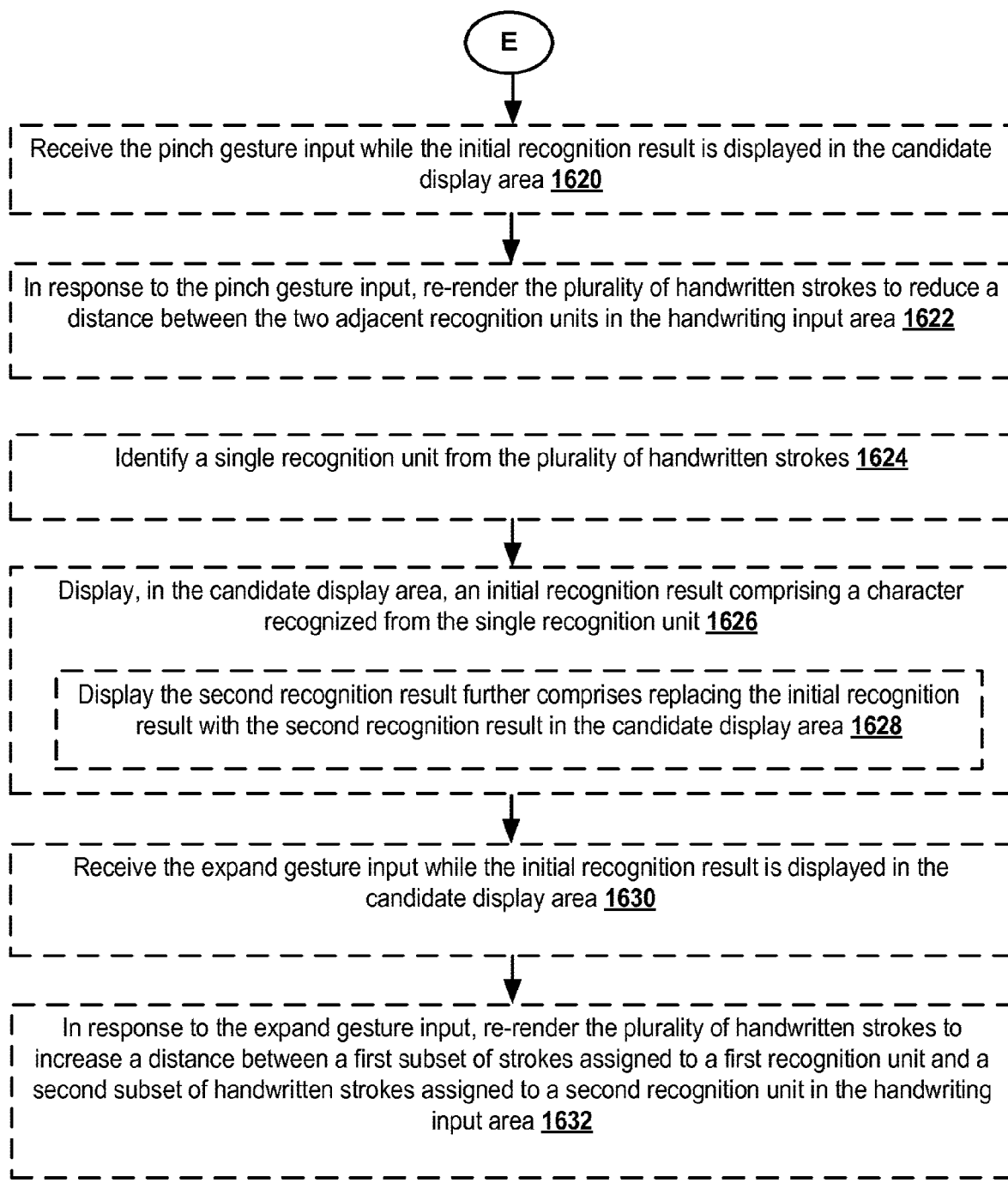

FIGS. 16A-16B are flow charts of an exemplary process 1600 in which the user uses predetermined gesture (e.g., a pinch gesture and/or an expand gesture) to notify the handwriting input module how to segment or revise an existing segmentation of the current handwriting input. FIGS. 15J and 15K provide an illustration of the exemplary process 1600 in accordance with some embodiments.

In some embodiments, the user device receives (1602) a handwriting input from a user. The handwriting input includes a plurality of handwritten strokes provided in a touch-sensitive surface coupled to the device. In some embodiments, the user device renders (1604), in real-time, the plurality of handwritten strokes in a handwriting input area (e.g., handwriting input area 804 of FIGS. 15A-15K) of a handwriting input interface. The user device receiving one of a pinch gesture input and a expand gesture input over the plurality of handwritten strokes, e.g., as shown in FIGS. 15D and 15H.

In some embodiments, upon receiving a pinch gesture input, the user device generates (1606) a first recognition result based on the plurality of handwritten strokes by treating the plurality of handwritten strokes as a single recognition unit, e.g., as illustrated in FIGS. 15C-15E.

In some embodiments, upon receiving a expand gesture input, the user device generates (1608) a second recognition result based on the plurality of handwritten strokes by treating the plurality of handwritten strokes as two separate recognition units pulled apart by the expand gesture input, e.g., as illustrated in FIGS. 15G-15I.

In some embodiments, upon generating a respective one of the first and second recognition results, the user device displays the generated recognition result in a candidate display area of the handwriting input interface, e.g., as shown in FIGS. 15E, and 15I.

In some embodiments, the pinch gesture input comprises two simultaneous contacts on the touch-sensitive surface that converge toward each other in an area occupied by the plurality of handwritten strokes. In some embodiments, the expand gesture input comprises two simultaneous contacts on the touch-sensitive surface that diverge from each other in an area occupied by the plurality of handwritten strokes.

In some embodiments, the user device identifies (e.g., 1614) two adjacent recognition units from the plurality of handwritten strokes. The user device displays (1616), in the candidate display area, an initial recognition result (e.g., results 1512, 1514, 1516, and 1518 in FIG. 15C) comprising respective characters recognized from the two adjacent recognition units, e.g., as illustrated in FIG. 15C. In some embodiments, when displaying the first recognition result (e.g., result 1524, 1526, or 1528 in FIG. 15E) in response to a pinch gesture, the user device replaces (1618) the initial recognition result with the first recognition result in the candidate display area. In some embodiments, the user device receives (1620) the pinch gesture input while the initial recognition result is displayed in the candidate display area, as shown in FIG. 15D. In some embodiments, in response to the pinch gesture input, the user device re-renders (1622) the plurality of handwritten strokes to reduce a distance between the two adjacent recognition units in the handwriting input area, e.g., as shown in FIG. 15E.

In some embodiments, the user device identifies (1624) a single recognition unit from the plurality of handwritten strokes. The user device displays (1626), in the candidate display area, an initial recognition result (e.g., result 1538 or 1540 of FIG. 15G) comprising a character (e.g., " 扯 " " 抵 ") recognized from the single recognition unit. In some embodiments, when displaying the second recognition result (e.g., result 1546 or 1548 in FIG. 15I) in response to the expand gesture, the user device replaces (1628) the initial recognition result (e.g., results 1538 or 1540) with the second recognition result (e.g., result 1546 or 1548) in the candidate display area, e.g., as illustrated in FIGS. 15H-15I. In some embodiments, the user device receives (1630) the expand gesture input while the initial recognition result is displayed in the candidate display area, as illustrated in FIG. 15H. In some embodiments, in response to the expand gesture input, the user device re-renders (1632) the plurality of handwritten strokes to increase a distance between a first subset of strokes assigned to a first recognition unit and a second subset of handwritten strokes assigned to a second recognition unit in the handwriting input area, as illustrated in FIGS. 15H and 15I.

In some embodiments, the user optionally provides a pinch gesture to inform the user device to treat a plurality of strokes as a single recognition unit, immediately after the user has provided the strokes and realized that the strokes may be too spread out for a correct segmentation based on a standard segmentation process. The user device can distinguish the pinch gesture from a regular stroke based on the two simultaneous contacts present in a pinch gesture. Similarly, in some embodiments, the user optionally provides an expand gesture to inform the user device to treat a plurality of strokes two separate recognition units, immediately after the user has provided the strokes and realized that the strokes may be too close together for a correct segmentation based on a standard segmentation process. The user device can distinguish the expand gesture from a regular stroke based on the two simultaneous contacts present in a pinch gesture.

In some embodiments, the motion direction of the pinch or expand gesture is optionally used to provide additional guidance on how to segment the strokes under the gesture. For example, if multi-line handwriting input is enabled for the handwriting input area, a pinch gesture with two contacts moving in the vertical direction can inform the handwriting input module to merge two recognition units identified in two adjacent lines into a single recognition unit (e.g., as a top radical and a bottom radical). Similarly, an expand gesture with two contacts moving in the vertical direction can inform the handwriting input module to divide a single recognition unit into two recognition units in two adjacent lines. In some embodiments, the pinch and expand gestures can also provide segmentation guidance in a sub-portion of a character input, e.g., merging two sub-components or divide a single component in a composite character (※, ※, ※, ※, ※, etc.), in different parts (e.g., upper, lower, left, or right portions) of the composite character. This is particularly helpful for recognizing complex composite Chinese characters, because users tends to lose the correct proportions and balance when writing a complex composite character by hand. Being able to adjust the proportions and balance of the handwriting input, e.g., by way of the pinch and expand gestures, after the completion of the handwriting input is particular helpful for the user to input the correct character without having to make several attempts to get at the correct proportions and balance.

As described herein, the handwriting input module allows a user to enter a multi-character handwriting input, and allows out-of-order strokes for the multi-character handwriting input within a character, across multiple characters, and even across multiple phrases, sentences, and/or lines in the handwriting input area. In some embodiments, the handwriting input module also provides character-by-character deletion in the handwriting input area, where the order of character deletion is in the reverse writing direction, and independent of when the strokes for each character has been provided in the handwriting input area. In some embodiments, the deletion of each recognition unit (e.g., character or radical) in the handwriting input area is optionally performed stroke-by-stroke, where the strokes are deleted in a reverse temporal order by which they were provided within the recognition unit. FIGS. 17A-17H illustrate exemplary user interfaces for responding to a deletion input from a user and provide character-by-character deletion in a multi-character handwriting input.

Figure 17A:
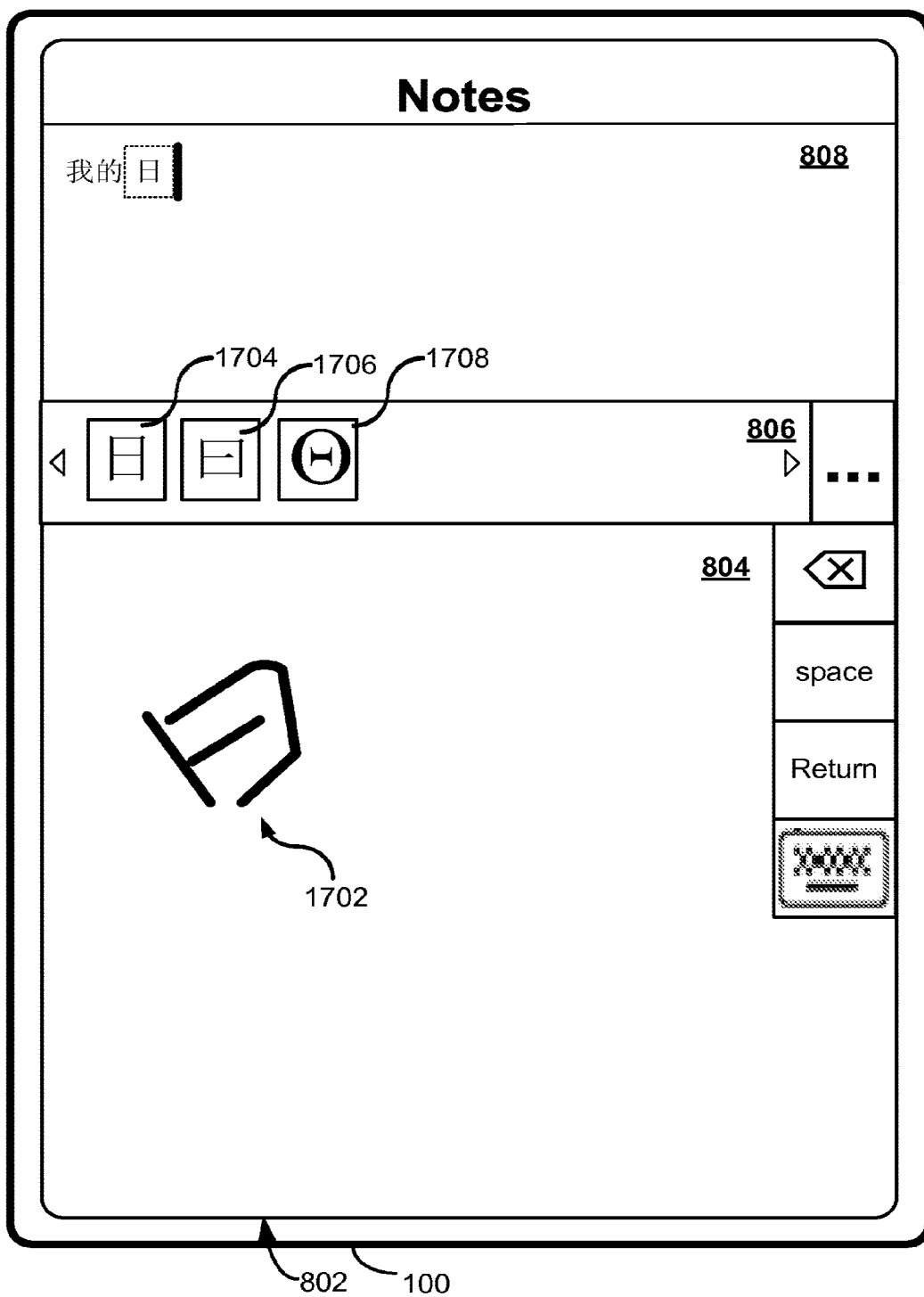
FIGS. 17A-17H show exemplary user interfaces for providing character-by-character deletion of a user's handwriting input in accordance with some embodiments.
Figure 17B:
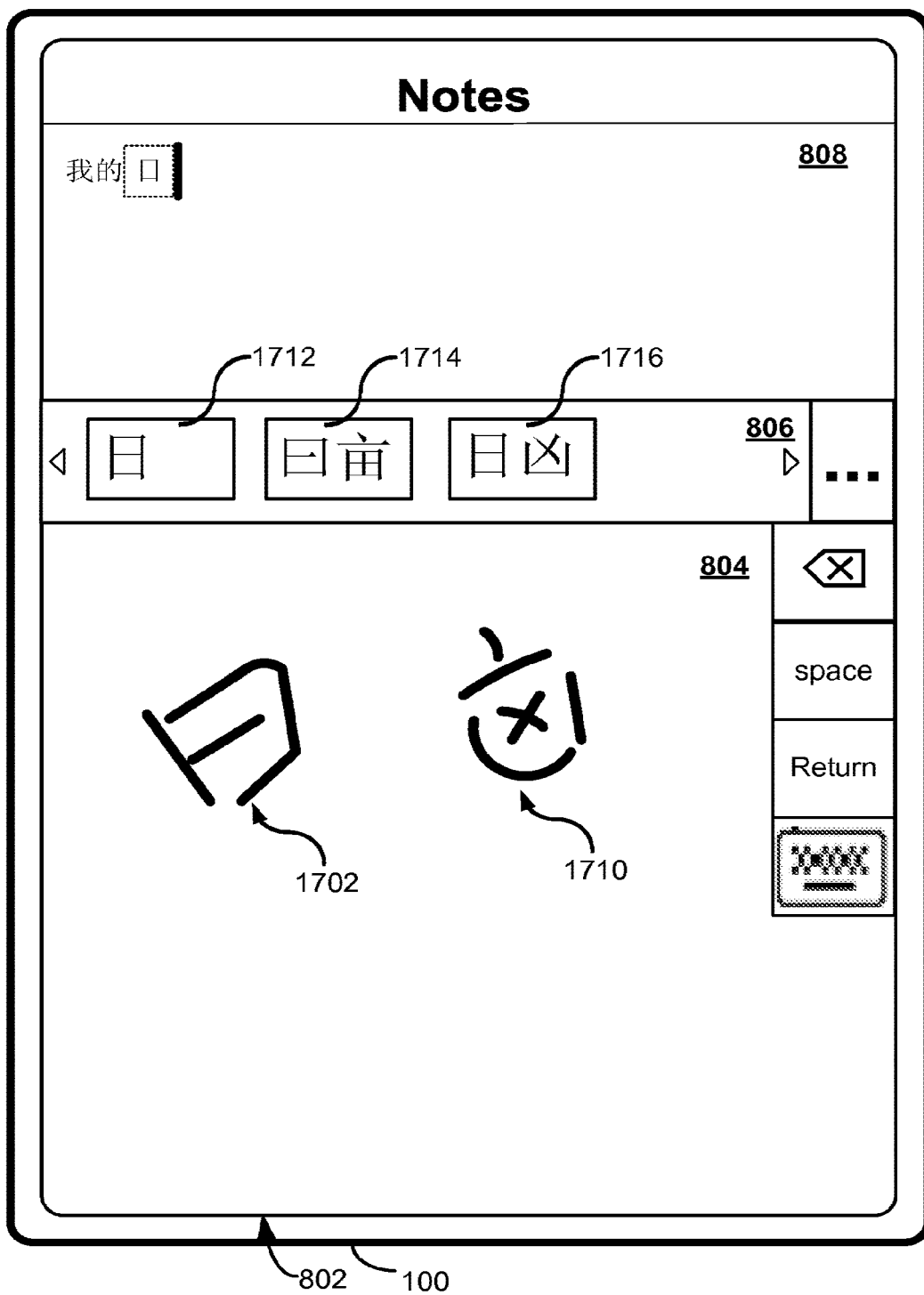

As shown in FIG. 17A, the user has provided a plurality of handwritten strokes 1702 in the handwriting input area 804 of the handwriting input user interface 802. Based on the currently accumulated strokes 1702, the user device presents three recognition results (e.g., results 1704, 1706, and 1708) in the candidate display area 806. As shown in FIG. 17B, the user has provided an additional plurality of strokes 1710 in the handwriting input area 804. The user device recognizes three new output characters, and replaces the three previous recognition results 1704, 1706, and 1708 with the three new recognition results 1712, 1714, and 1716. In some embodiments, as shown in FIG. 17B, even though the user device has identified two separate recognition units from the current handwriting input (e.g., strokes 1702 and strokes 1710), the cluster of strokes 1710 does not correspond well to any known characters in the repertoire of the handwriting recognition module. As a result, the candidate characters (e.g., " ", " ") identified for the recognition unit comprising strokes 1710 are all have a recognition confidence below a predetermined threshold. In some embodiments, the user device presents a partial recognition result (e.g., result 1712) which includes only a candidate character (e.g., " ") for the first recognition unit, but not any candidate character for the second recognition unit in the candidate display area 806. In some embodiments, the user device further displays a full recognition result (e.g., result 1714 or 1716) which includes a candidate character for both recognition units, regardless of whether the recognition confidence has passed the predetermined threshold. Providing a partial recognition result informs the user which part of the handwritten input needs revision. In addition, the user can also choose to enter the correctly recognized portion of handwriting input first, and then rewrite the portion that was not correctly recognized.

Figure 17C:
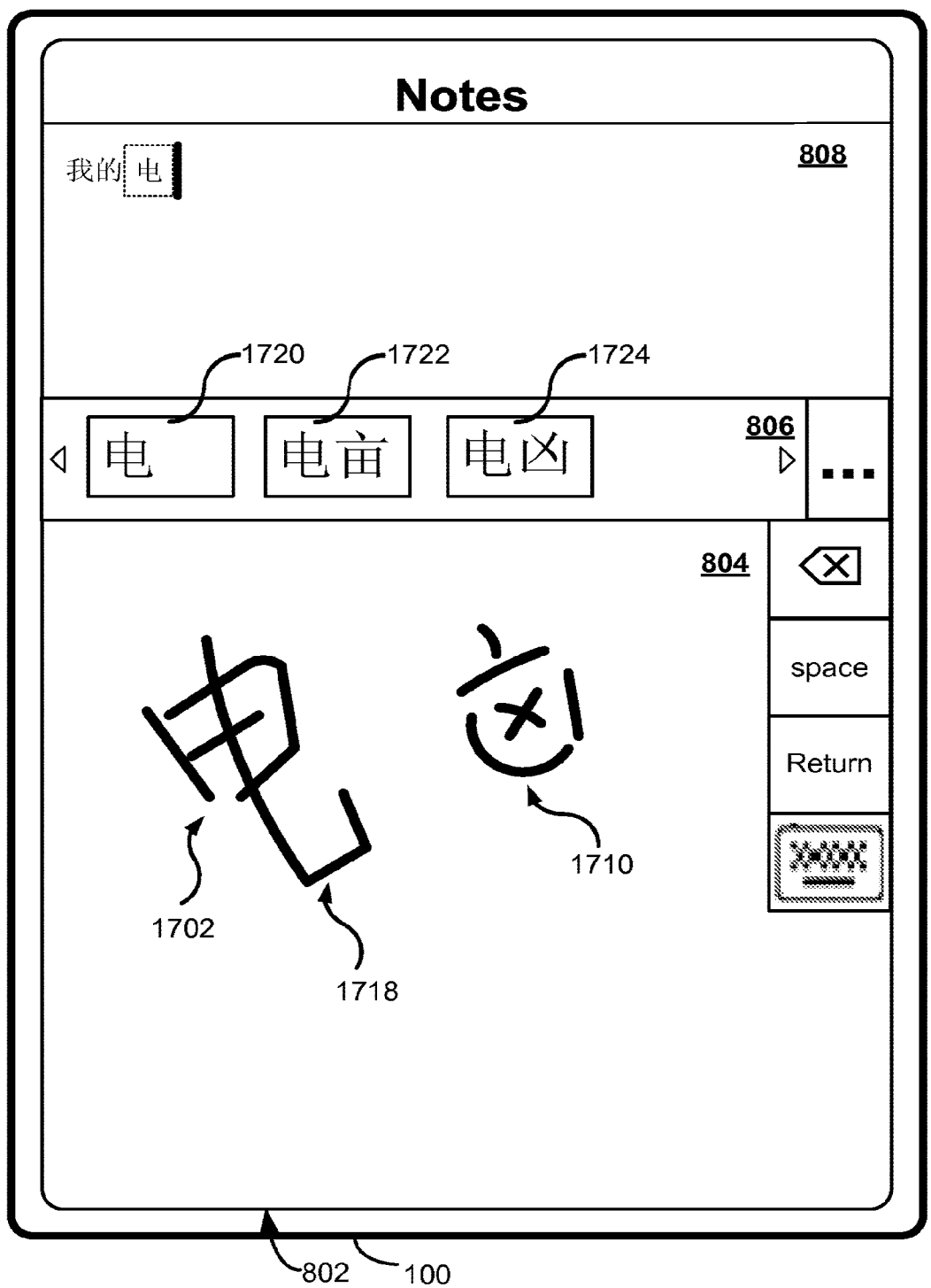

FIG. 17C shows that the user has continued to provide an additional handwritten stroke 1718 to the left of strokes 1710. Based on the relative location and distance of the stroke 1718, the user device determines that the newly added stroke belong to the same recognition unit as the cluster of handwritten strokes 1702. Based on the revised recognition units recognizes a new character (e.g., " ") for the first recognition unit, and generates a set of new recognition results 1720, 1722, and 1724. Again, the first recognition result 1720 is a partial recognition result, because none of the candidate characters identified for the strokes 1710 meet the predetermined confidence threshold.

Figure 17D:
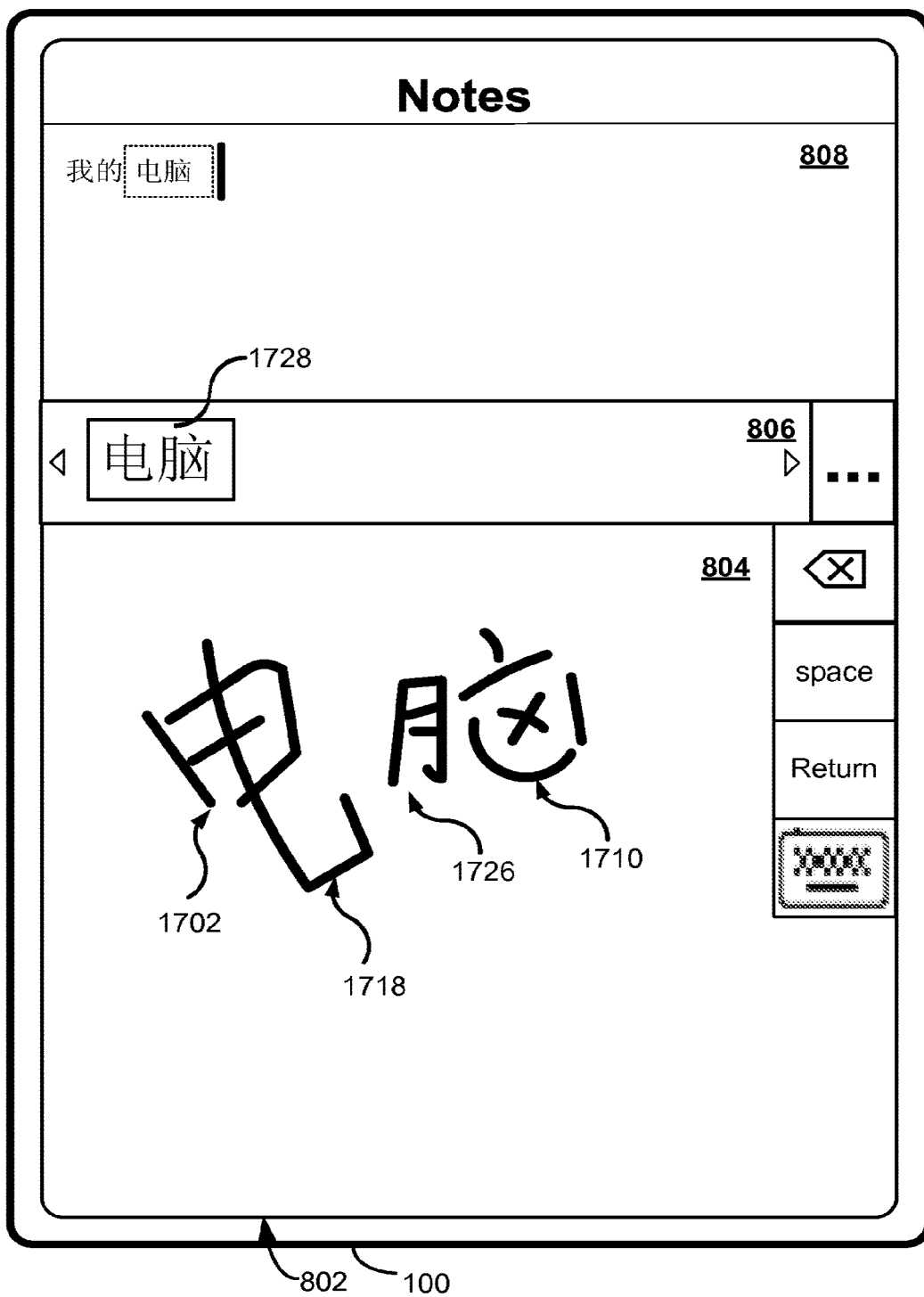

FIG. 17D shows that the user has now entered a plurality of new strokes 1726 to between the strokes 1702 and the strokes 1710. The user device assigns the newly entered strokes 1726 to the same recognition unit as the strokes 1710. Now, the user has completed entering all of the handwritten strokes for the two Chinese characters (e.g., " "), and the correct recognition result 1728 is shown in the candidate display area 806.

Figure 17E:
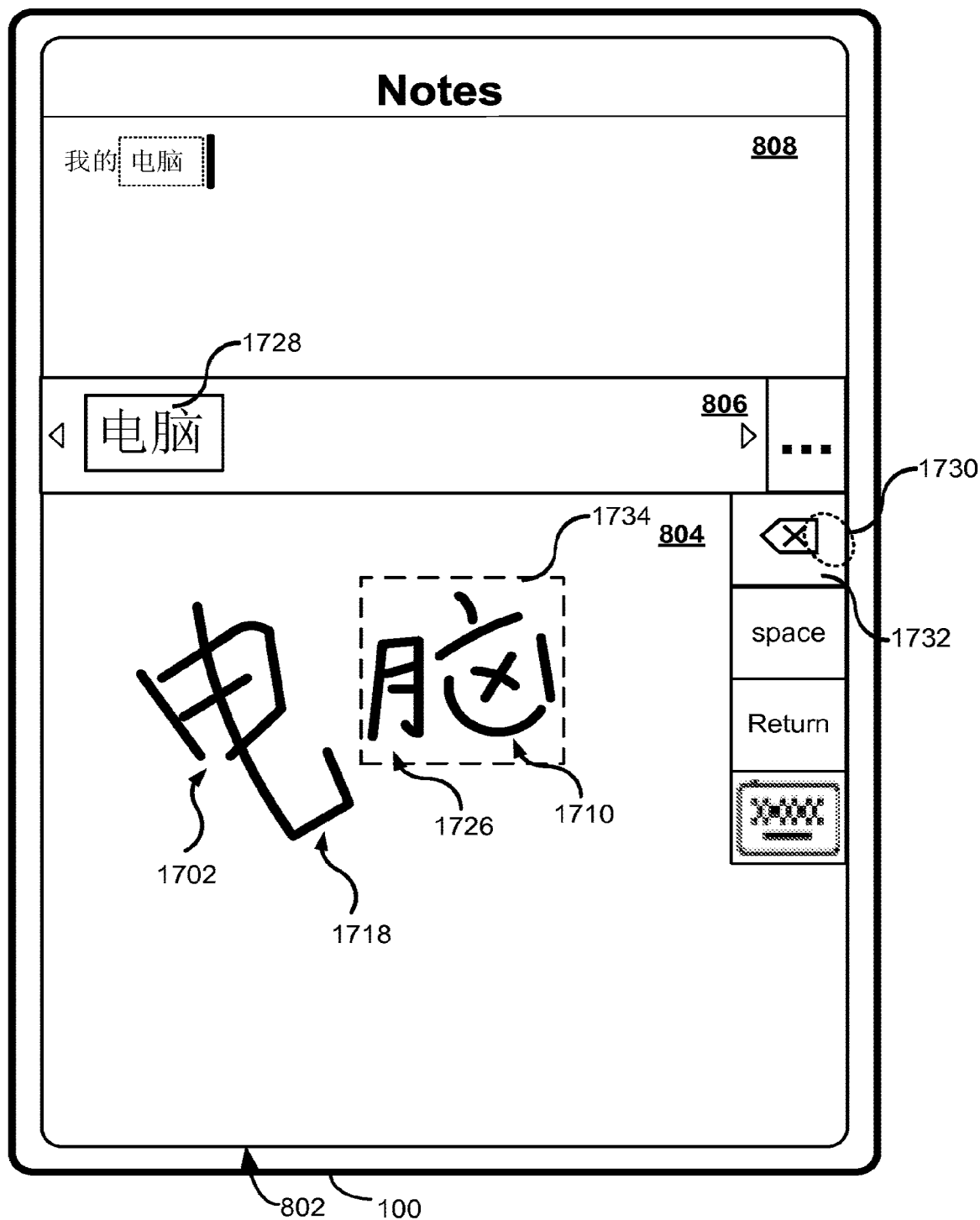

FIG. 17E shows that the user has entered an initial portion of a deletion input, e.g., by making a light contact 1730 on the delete button 1732. If the user maintains the contact with the delete button 1732, the user can delete the current handwriting input character-by-character (or recognition unit by recognition unit). The deletion is not performed for all of the handwritten input at the same time.

In some embodiments, when the user's finger first touches the delete button 1732 on the touch-sensitive screen, the last recognition unit (e.g., the recognition unit for the character " ") in the default writing direction (e.g., from left to right) is visually highlighted (e.g., highlighted with a border 1734, or lightened background, etc.) relative to the other recognition unit(s) concurrently displayed within the handwriting input area 804, as shown in FIG. 17E.

Figure 17F:
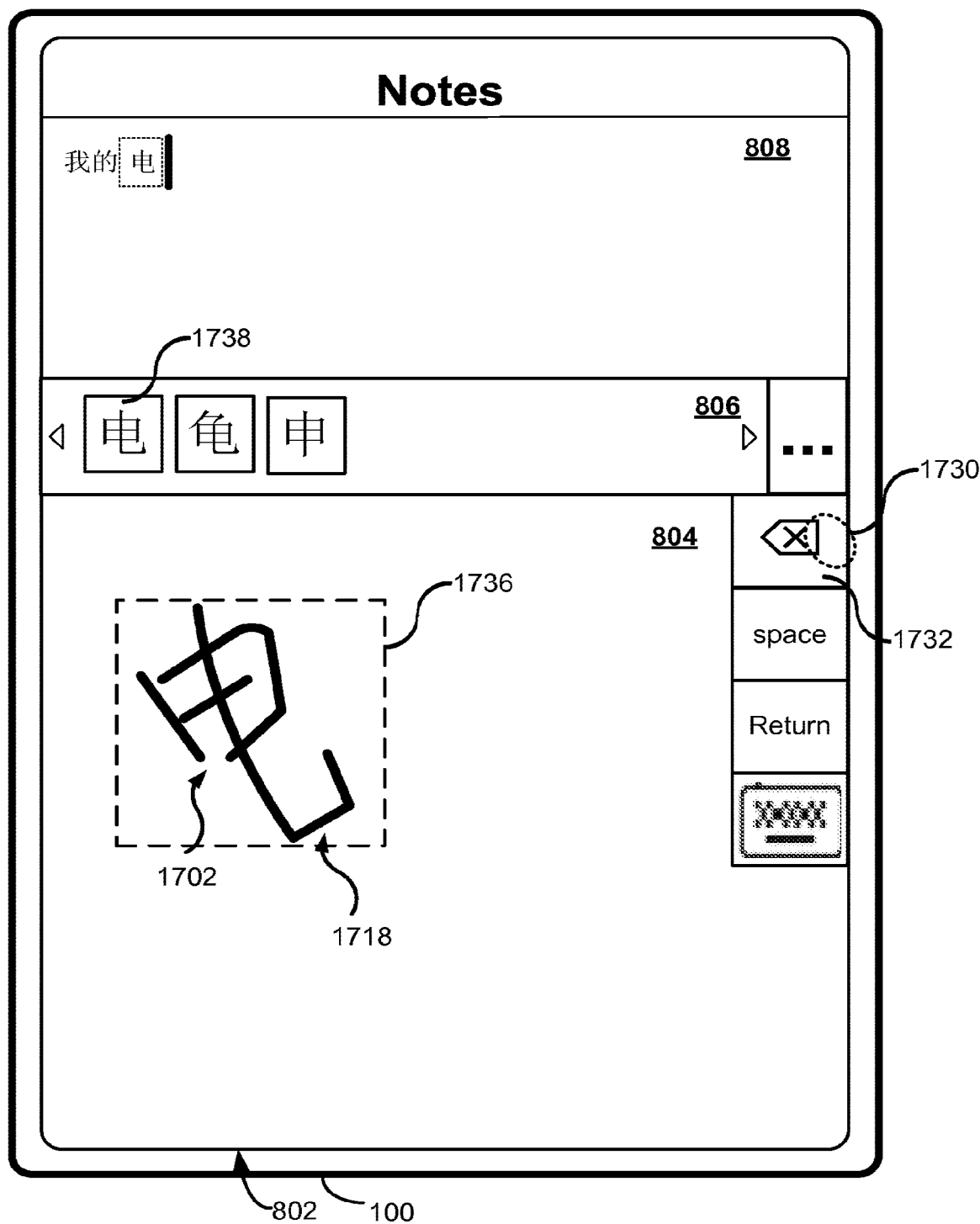

In some embodiments, when the user device detects that the user has maintained the contact 1730 on the delete button 1732 for more than a threshold duration, the user device removes the highlighted recognition unit (e.g., in box 1734) from the handwriting input area 804, as shown in FIG. 17F. In addition, the user device also revises the recognition results shown in the candidate display area 608 to delete any output characters generated based on the deleted recognition unit, as shown in FIG. 17F.

Figure 17G:
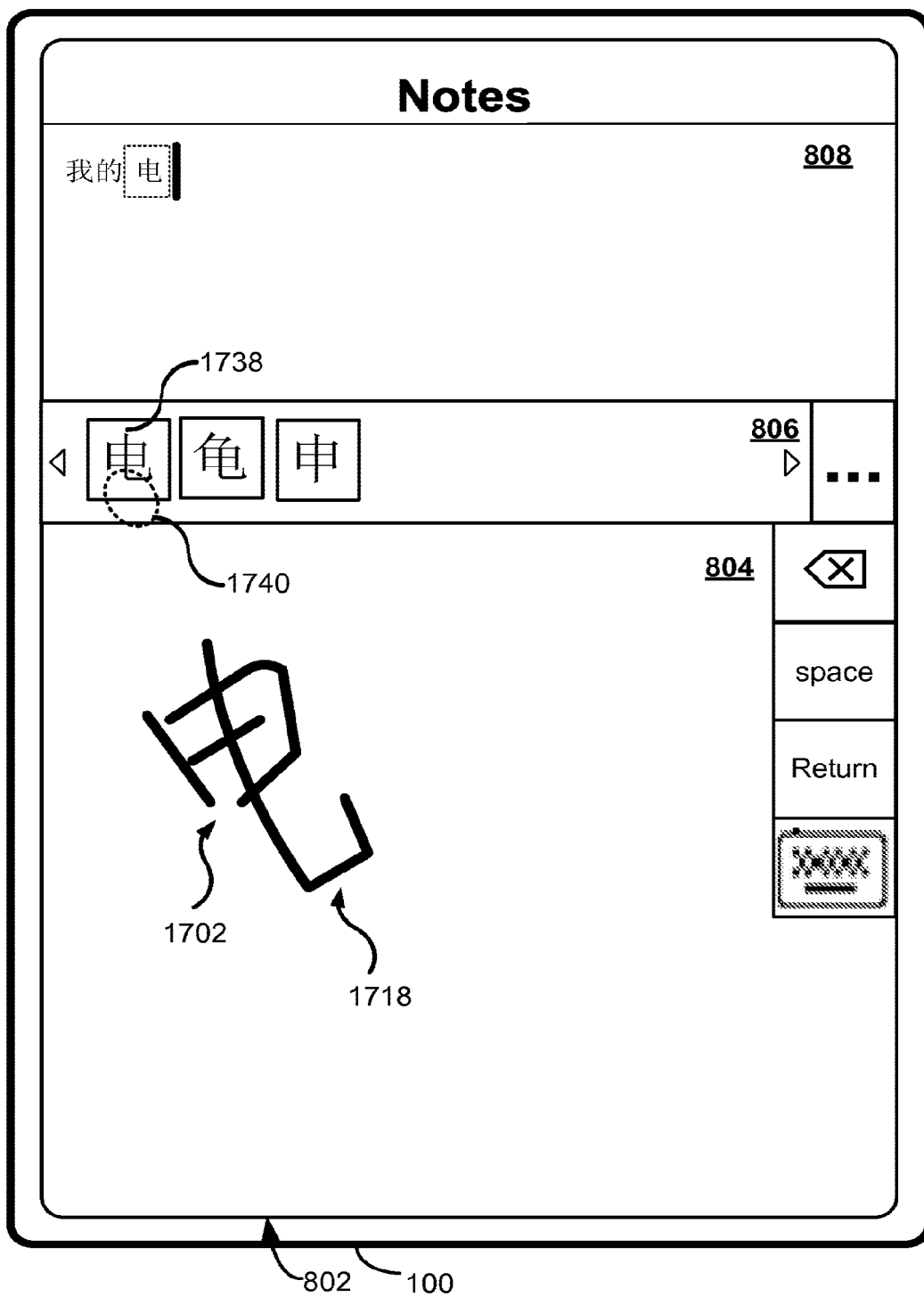
Figure 17H:
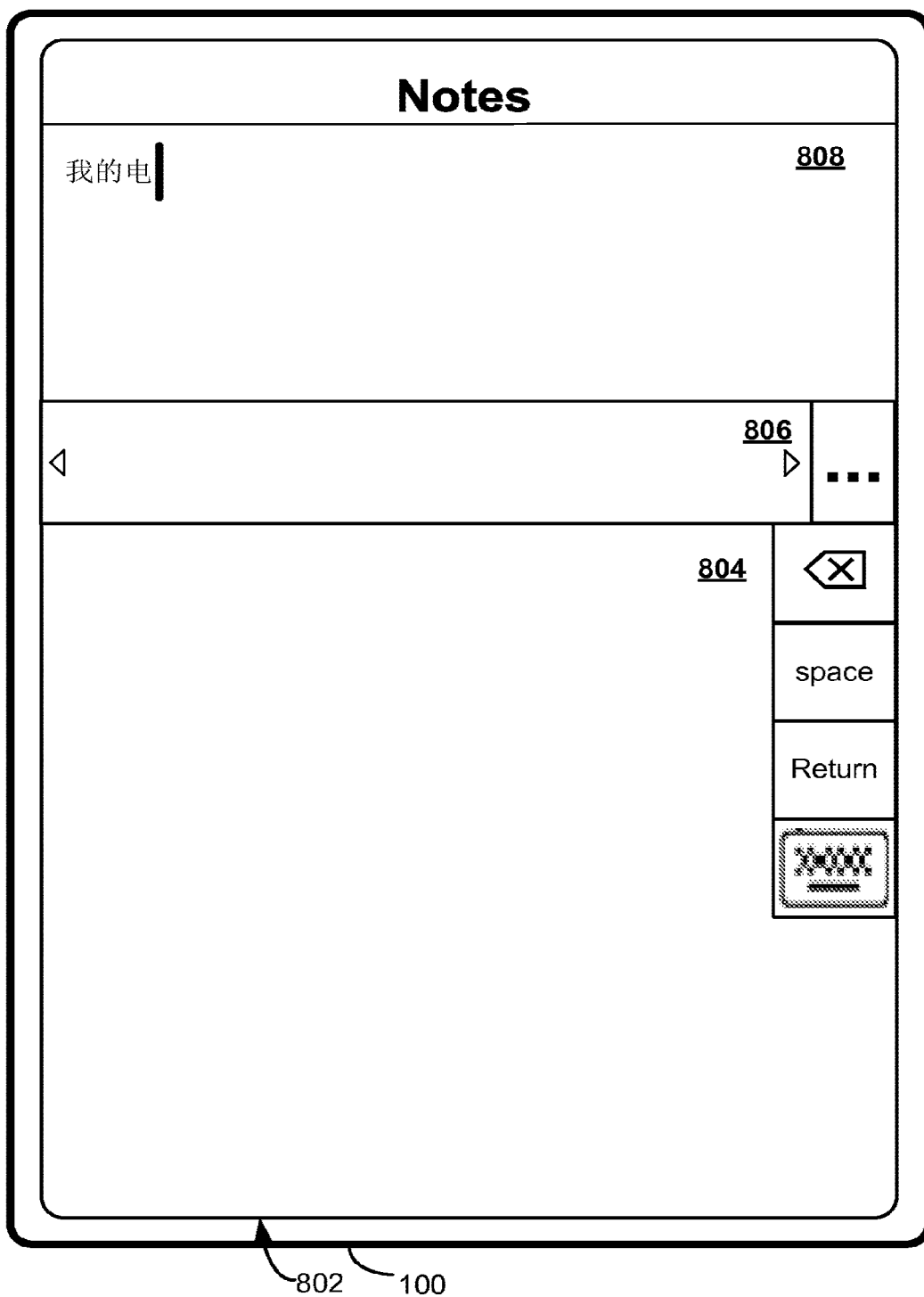

FIG. 17F further illustrates that, if the user continues to maintain the contact 1730 on the delete button 1732 after the last recognition unit (e.g., the recognition unit for the character " ") in the handwriting input area 804 has been deleted, the adjacent recognition unit (e.g., the recognition unit for the character " ") to the deleted recognition unit becomes the next recognition unit to be deleted. As shown in FIG. 17F, the remaining recognition unit has become visually highlighted (e.g., in a box 1736), and ready to be deleted. In some embodiments, the visual highlighting of the recognition unit provides a preview of the recognition unit that would be deleted if the user continues to maintain the contact with the delete button. If the user breaks the contact with the delete button before the threshold duration is reached, the visual highlighting is removed from the last recognition unit, and the recognition unit is not deleted. As a person skilled in the art would recognize, the duration of contact is reset each time a recognition unit has been deleted. In addition, in some embodiments, the contact intensity (e.g., the pressure by which the user has applied the contact 1730 with the touch-sensitive screen) is optionally used to adjust the threshold duration to confirm the user's intent to delete the currently highlighted recognition unit. FIGS. 17F and 17G illustrate that the user has broken the contact 1730 on the delete button 1732 before the threshold duration is reached, and the recognition unit for the character " " is preserved in the handwriting input area 804. When the user has selected (e.g., as indicated by the contact 1740) the first recognition result (e.g., result 1738) for the recognition unit, and the text in the first recognition result 1738 is entered into the text input area 808, as shown in FIGS. 17G-17H.

Figure 18A:
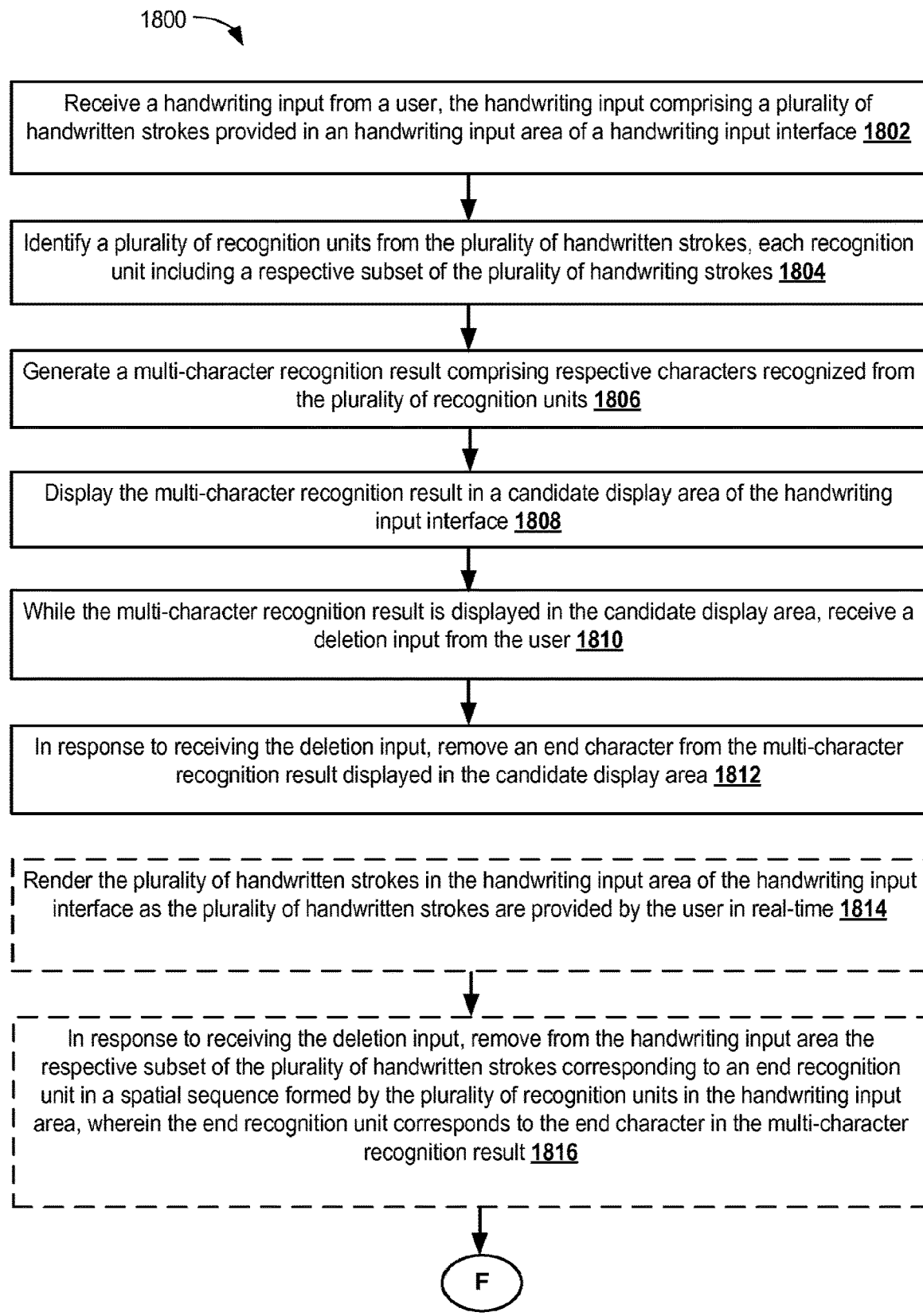

FIGS. 18A-18B are flow charts of an exemplary process 1800 in which the user device provides character-by-character deletion in a multi-character handwriting input. In some embodiments, the deletion of the handwriting input is performed before the characters recognized from the handwriting input have been confirmed and entered into the text input area of the user interface. In some embodiments, the deletion of the characters in the handwriting input proceeds according to the reverse spatial order of the recognition units identified from the handwriting input, and is independent of the temporal sequence by which the recognition units are formed. FIGS. 17A-17H illustrate the exemplary process 1800 in accordance with some embodiments.

As shown in FIG. 18A, in the exemplary process 1800, the user device receives (1802) a handwriting input from a user, the handwriting input including a plurality of handwritten strokes provided in an handwriting input area (e.g., area 804 in FIG. 17D) of a handwriting input interface. The user device identifies (1804) a plurality of recognition units from the plurality of handwritten strokes, each recognition unit including a respective subset of the plurality of handwriting strokes. For example, as shown in FIG. 17D, the first recognition unit includes strokes 1702 and 1718, and the second recognition unit includes strokes 1710 and 1726. The user device generates (1806) a multi-character recognition result (e.g., result 1728 in FIG. 17D) comprising respective characters recognized from the plurality of recognition units. In some embodiments, the user device displays the multi-character recognition result (e.g., result 1728 in FIG. 17D) in a candidate display area of the handwriting input interface. In some embodiments, while the multi-character recognition result is displayed in the candidate display area, the user device receives (1810) a deletion input (e.g., contact 1730 on delete button 1732) from the user, e.g., as shown in FIG. 17E. In some embodiments, in response to receiving the deletion input, the user device removes (1812) an end character (e.g., the character " " that appear at the end of the spatial sequence " ") from the multi-character recognition result (e.g., result 1728) displayed in the candidate display area (e.g., candidate display area 806), e.g., as illustrated in FIGS. 17E-17F.

In some embodiments, the user device renders (1814) the plurality of handwritten strokes in the handwriting input area of the handwriting input interface as the plurality of handwritten strokes are provided by the user in real-time, e.g., as illustrated in FIGS. 17A-17D. In some embodiments, in response to receiving the deletion input, the user device removes (1816) from the handwriting input area (e.g., handwriting input area 804 in FIG. 17E) the respective subset of the plurality of handwritten strokes corresponding to an end recognition unit (e.g., the recognition unit containing strokes 1726 and 1710) in a spatial sequence formed by the plurality of recognition units in the handwriting input area. The end recognition unit corresponds to the end character (e.g., the character " ") in the multi-character recognition result (e.g., result 1728 in FIG. 17E).

In some embodiments, the end recognition unit does not include (1818) a temporally final handwritten stroke among the plurality of handwritten strokes provided by the user. For example, if the user had provided the stroke 1718 after he or she has provided the strokes 1726 and 1710, the end recognition unit including the strokes 1726 and 1710 would still be deleted first.

In some embodiments, in response to receiving an initial portion of the deletion input, the user device visually distinguishes (1820) the end recognition unit from other recognition units identified in the handwriting input area, e.g., as illustrated in FIG. 17E. In some embodiments, the initial portion of the deletion input is (1822) an initial contact detected on a delete button in the handwriting input interface, and the deletion input is detected when the initial contact is sustained for more than a predetermined threshold amount of time.

In some embodiments, the end recognition unit corresponds to a handwritten Chinese character. In some embodiments, the handwriting input is written in a cursive writing style. In some embodiments, the handwriting input corresponds to multiple Chinese characters written in a cursive writing style. In some embodiments, at least one of the handwritten strokes is divided into two adjacent recognition units of the plurality of recognition units. For example, sometimes, a user may use a long stroke that runs on into multiple characters, and in such cases, the segmentation module of the handwriting input module optionally divides the long stroke into several recognition units. When the deletion of handwriting input is performed character-by-character (or recognition unit by recognition unit), only a segment of the long stroke is deleted at a time (e.g., the segment within a corresponding recognition unit).

In some embodiments, the deletion input is (1824) a sustained contact on a deletion button provided in the handwriting input interface, and removing the respective subset of the plurality of handwritten strokes further includes removing the subset of handwritten strokes in the end recognition unit from the handwriting input area, stroke-by-stroke in a reverse temporal order by which the subset of handwritten strokes has been provided by the user.

In some embodiments, the user device generates (1826) a partial recognition result comprising a subset of the respective characters recognized from the plurality of recognition units, where each of the subset of the respective characters meets a predetermined confidence threshold, e.g., as illustrated in FIGS. 17B and 17C. In some embodiments, the user device displays (1828) the partial recognition result (e.g., result 1712 in FIG. 17B and result 1720 in FIG. 17C) concurrently with the multi-character recognition result (e.g., results 1714 and 1722) in the candidate display area of the handwriting input interface.

In some embodiments, the partial recognition result does not include at least the end character in multi-character recognition result. In some embodiments, the partial recognition result does not include at least an initial character in multi-character recognition result. In some embodiments, the partial recognition result does not include at least an intermediate character in multi-character recognition result.

In some embodiments, the smallest unit of deletion is a radical, and handwriting inputs are deleted one radical at a time whenever a radical happens to be the last recognition unit in the handwriting inputs still remaining in the handwriting input area.

As described herein, in some embodiments, the user device provides both a horizontal writing mode and a vertical writing mode. In some embodiments, the user device allows the user to enter text in one or both of a left-to-right writing direction and a right-to-left direction in the horizontal writing mode. In some embodiments, the user device allows the user to enter text in one or both of a top-down writing direction and a bottom-up direction in the vertical writing mode. In some embodiments, the user device provides various affordances (e.g., a writing mode or writing direction button) on the user interface to invoke a respective writing mode and/or writing direction for the current handwriting inputs. In some embodiments, the text input direction in the text input area is the same as the handwriting input direction in the handwriting input direction by default. In some embodiments, the user device allows the user to manually set the input direction in the text input area and the writing direction in the handwriting input area. In some embodiments, the text display direction in the candidate display area is the same as the handwriting input direction in the handwriting input area by default. In some embodiments, the user device allows the user to manually set the text display direction in the text input area independent of the handwriting input direction in the handwriting input area. In some embodiments, the user device associates the writing mode and/or writing direction of a handwriting input interface with a corresponding device orientation, and changes in the device orientation automatically triggers a change in writing mode and/or writing direction. In some embodiments, a change in writing direction automatically causes entry of a top-ranked recognition result to be entered into the text input area.

FIGS. 19A-19F illustrate exemplary user interfaces of a user device that provides both a horizontal input mode and a vertical input mode.

Figure 19A:
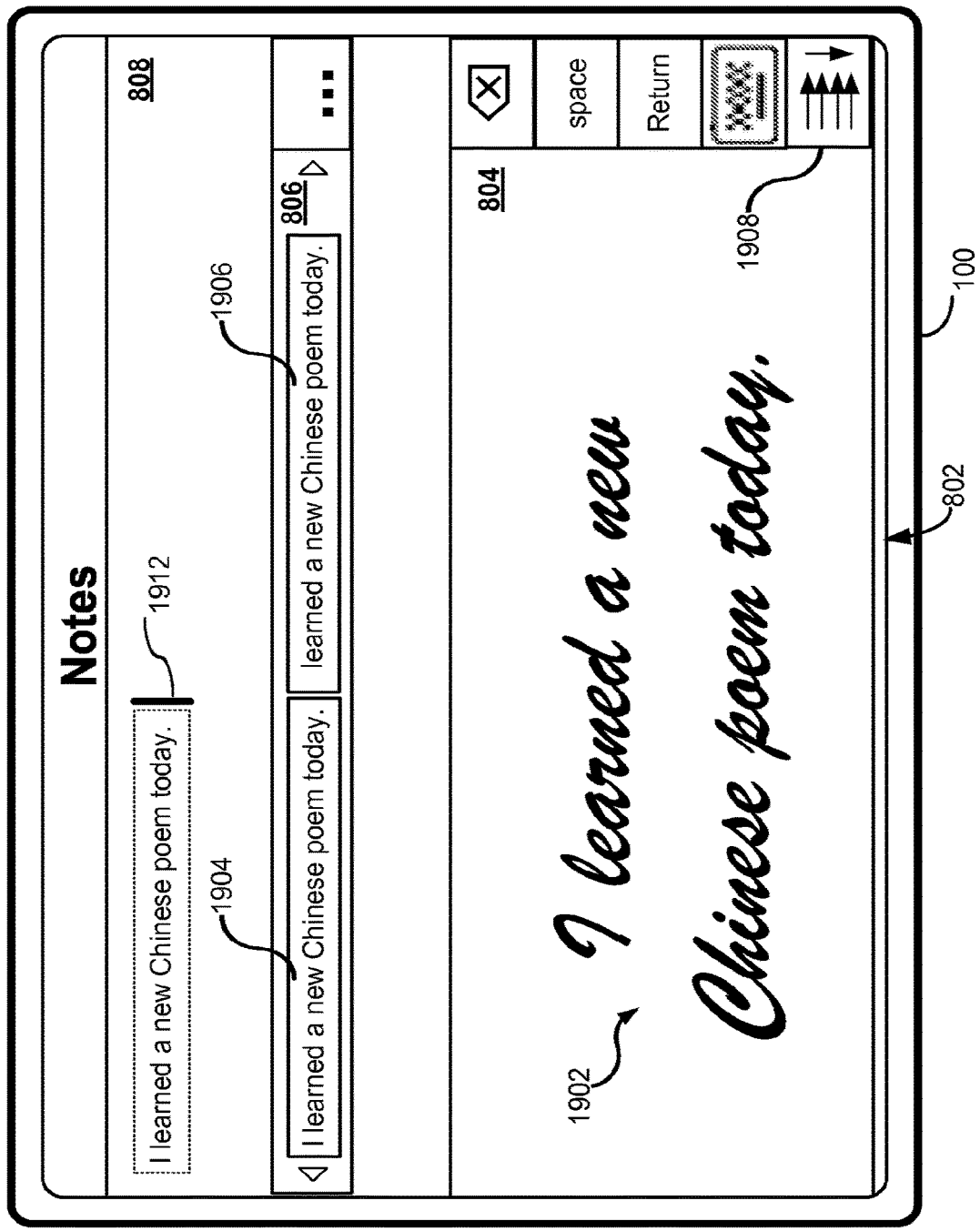
FIGS. 19A-19F show exemplary user interfaces for switching between a vertical writing mode and a horizontal writing mode in accordance with some embodiments.

FIG. 19A shows the user device in a horizontal input mode. In some embodiments, the horizontal input mode is provided when the user device is in a landscape orientation, as shown in FIG. 19A. In some embodiments, the horizontal input mode is optionally associated with and provided when the device is operated in the portrait orientation. In different applications, the association between the device orientation and the writing mode may be different.

In the horizontal input mode, the user can provide handwritten characters in a horizontal writing direction (e.g., with a default writing direction going from left to right, or a default writing direction going from right to left). In the horizontal input mode, the user device performs segmentation of the handwriting input into one or more recognition units along the horizontal writing direction.

In some embodiments, the user device only permits single-line input in the handwriting input area. In some embodiments, as shown in FIG. 19A, the user device allows multi-line input (e.g., two lines of input) in the handwriting input area. In FIG. 19A, the user has provided a plurality of handwritten strokes in several rows in the handwriting input area 804. Based on the sequence that the user has provided plurality of handwritten strokes and the relative locations of and distances between the plurality of handwritten strokes, the user device determines that the user has entered two lines of characters. After segmenting the handwriting input into two separate lines, the device determines the recognition unit(s) within each line.

As shown in FIG. 19A, the user device has recognized a respective character for each recognition unit identified in the current handwriting input 1902, and generated a number of recognition results 1904 and 1906. As further shown in FIG. 19A, in some embodiments, if the output character (e.g. the letter "I") for a particular set of recognition units (e.g., the recognition unit formed by the initial stroke) are low, the user device optionally generates a partial recognition result (e.g., result 1906) that only shows the output characters that have a sufficient recognition confidence. In some embodiments, the user may realize from the partial recognition result 1906, that the first stroke can be revised or individually deleted or rewritten for the recognition model to produce the correct recognition result. In this particular example, editing of the first recognition unit is not necessary because the first recognition unit 1904 does show the desired recognition result for the first recognition unit.

Figure 19B:
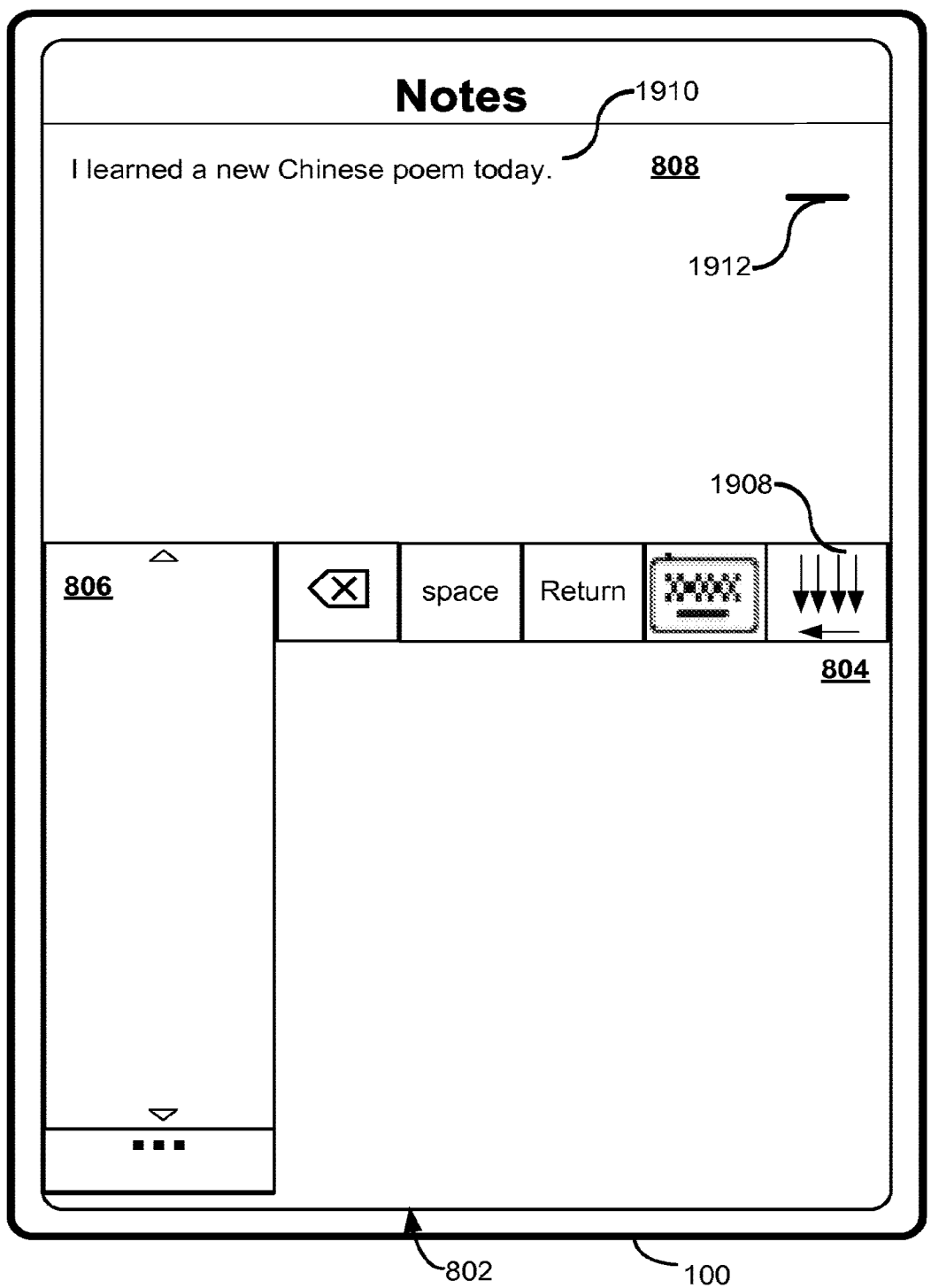

In this example, as shown in FIG. 19A-19B, the user has rotated the device to a portrait orientation (e.g., shown in FIG. 19B). In response to the change in device orientation, the handwriting input interface is changed from the horizontal input mode to a vertical input mode, as shown in FIG. 19B. In the vertical input mode, the layout of the handwriting input area 804, the candidate display area 806, and the text input area 808 may be different from that shown in the horizontal input mode. The particular layout of the horizontal and the vertical input modes can vary to suit different device shapes and application needs. In some embodiments, with the rotation of the device orientation and the change in input mode, the user device automatically enters the top-ranked result (e.g., result 1904) as a text input 1910 into the text input area 808. The orientation and position of the cursor 1912 also reflect the change in input mode and writing direction.

In some embodiments, the change in input mode is optionally triggered by the user touching the special input mode selection affordance 1908. In some embodiments, the input mode selection affordance is a graphical user interface element that also shows the current writing mode, the current writing direction, and/or the current paragraph direction. In some embodiments, the input mode selection affordance can cycle through all available input modes and writing directions provided by the handwriting input interface 802. As shown in FIG. 19A, the affordance 1908 shows that the current input mode is a horizontal input mode, with the writing direction from left to right, and a paragraph direction from top to bottom. In FIG. 19B, the affordance 1908 shows that the current input mode is a vertical input mode, with a writing direction from top to bottom, and a paragraph direction from right to left. Other combinations of writing direction and paragraph direction are possible, in accordance with various embodiments.

Figure 19C:
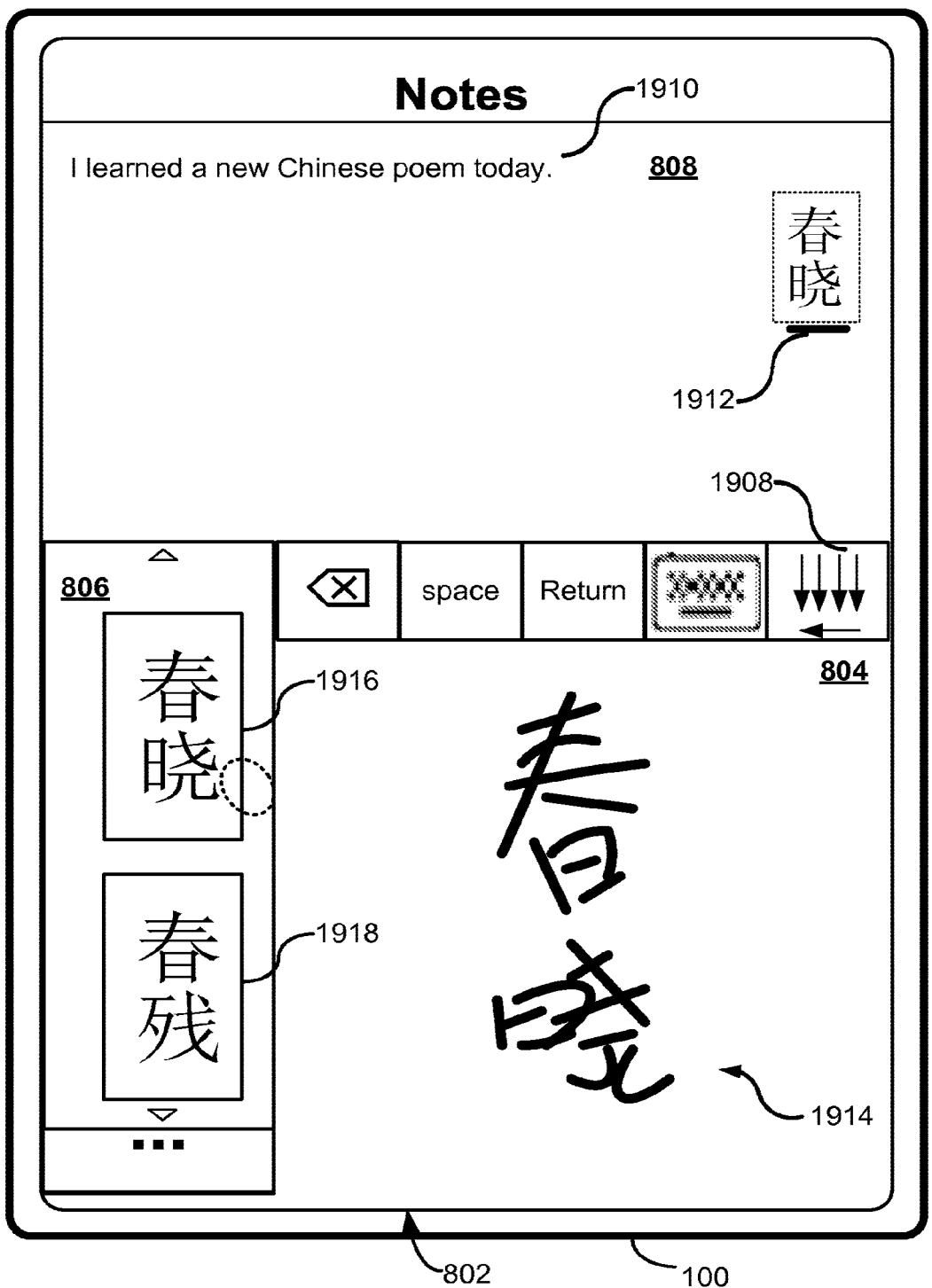

As shown in FIG. 19C, the user has entered plurality of new strokes 1914 (e.g., handwritten strokes for two Chinese characters "禾家") in the handwriting input area 804 in the vertical input mode. The handwriting input is written in the vertical writing direction. The user device segments the handwriting input in the vertical direction into two recognition units, and displays two recognition results 1916 and 1918 each including two recognized characters laid out in the vertical direction.

Figure 19D:
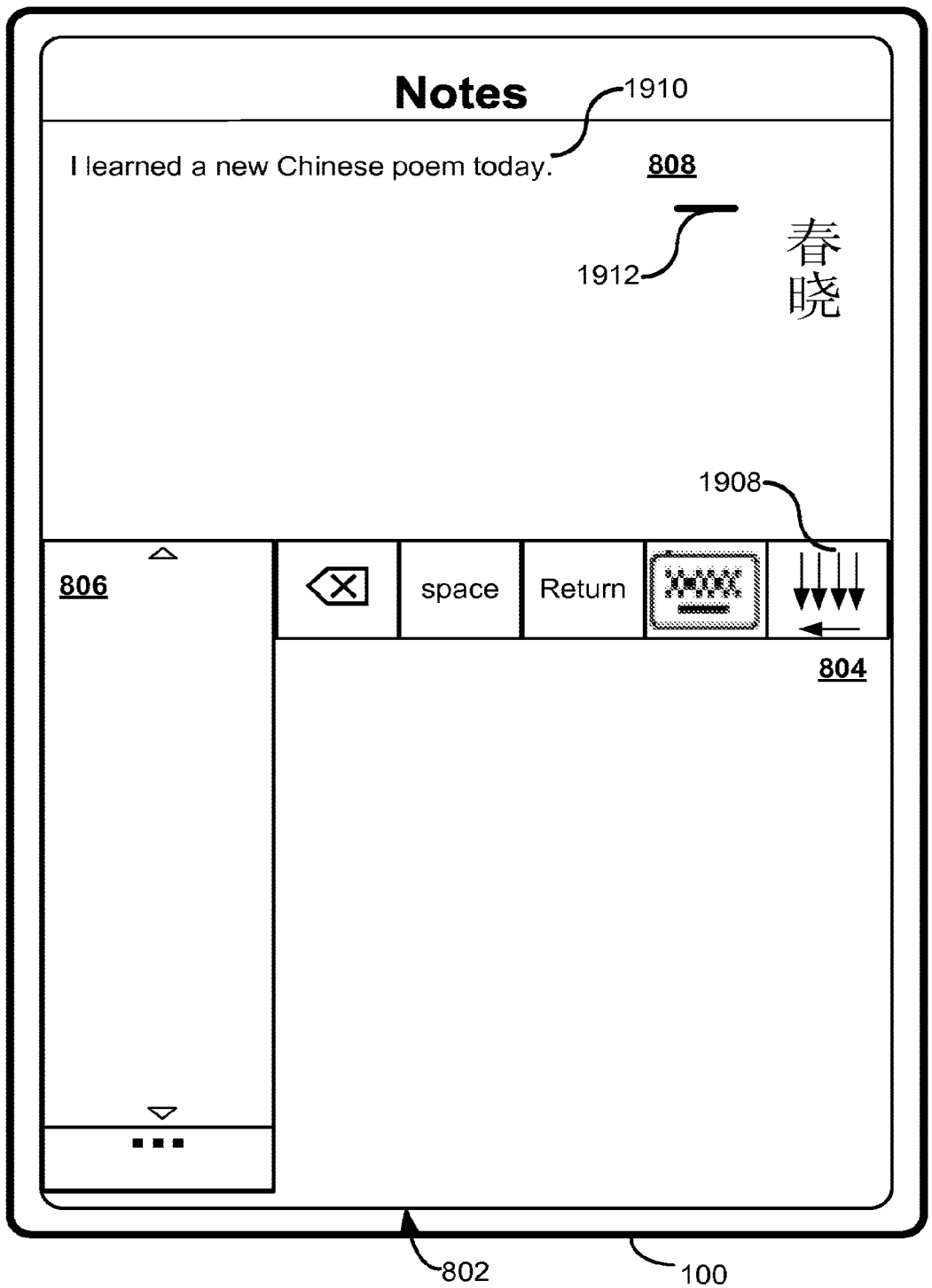

FIGS. 19C-19D illustrate that, when the user selects a displayed recognition result (e.g., result 1916), the selected recognition result is entered into the text input area 808 in the vertical direction.

Figure 19E:
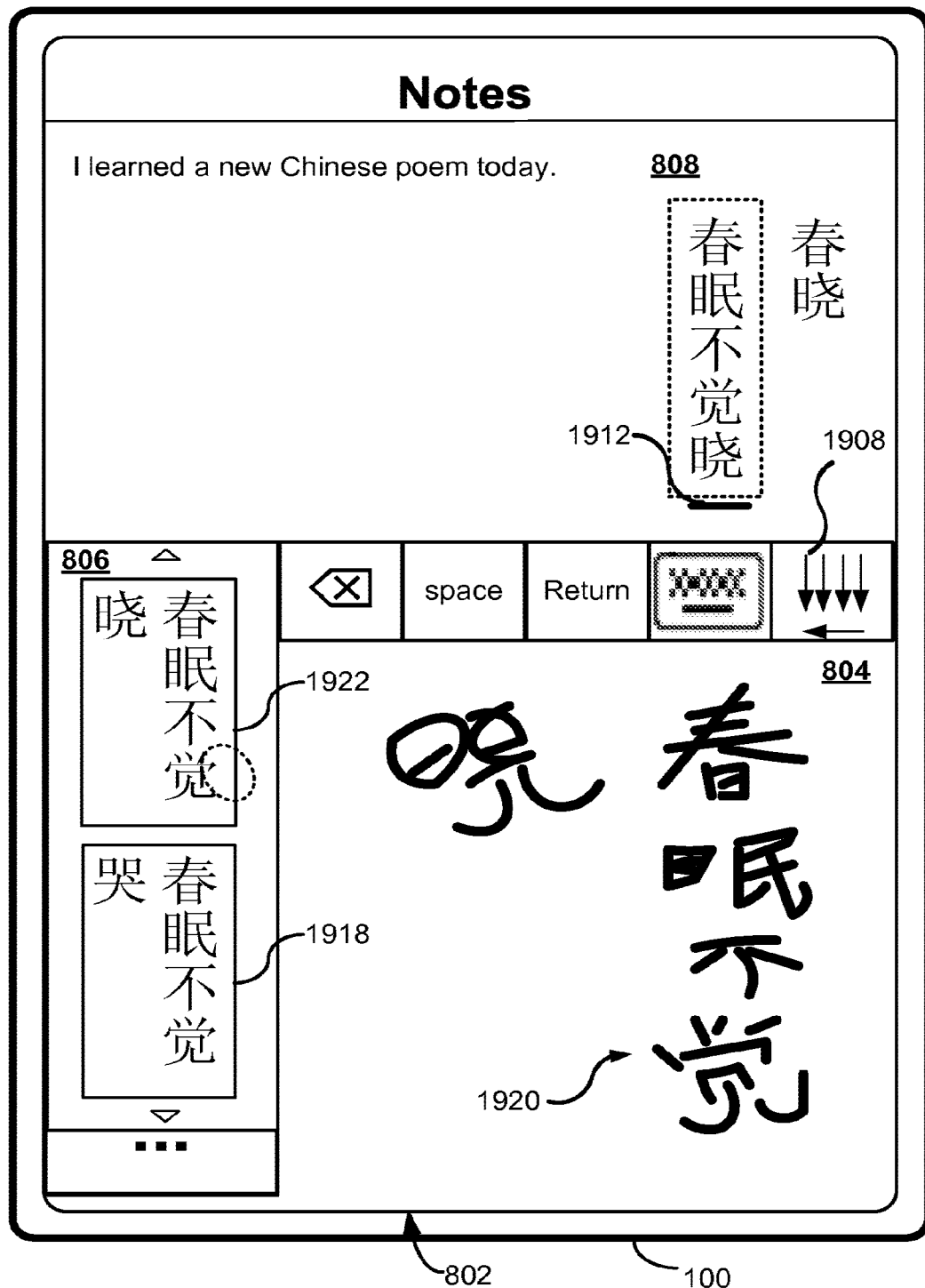
Figure 19F:
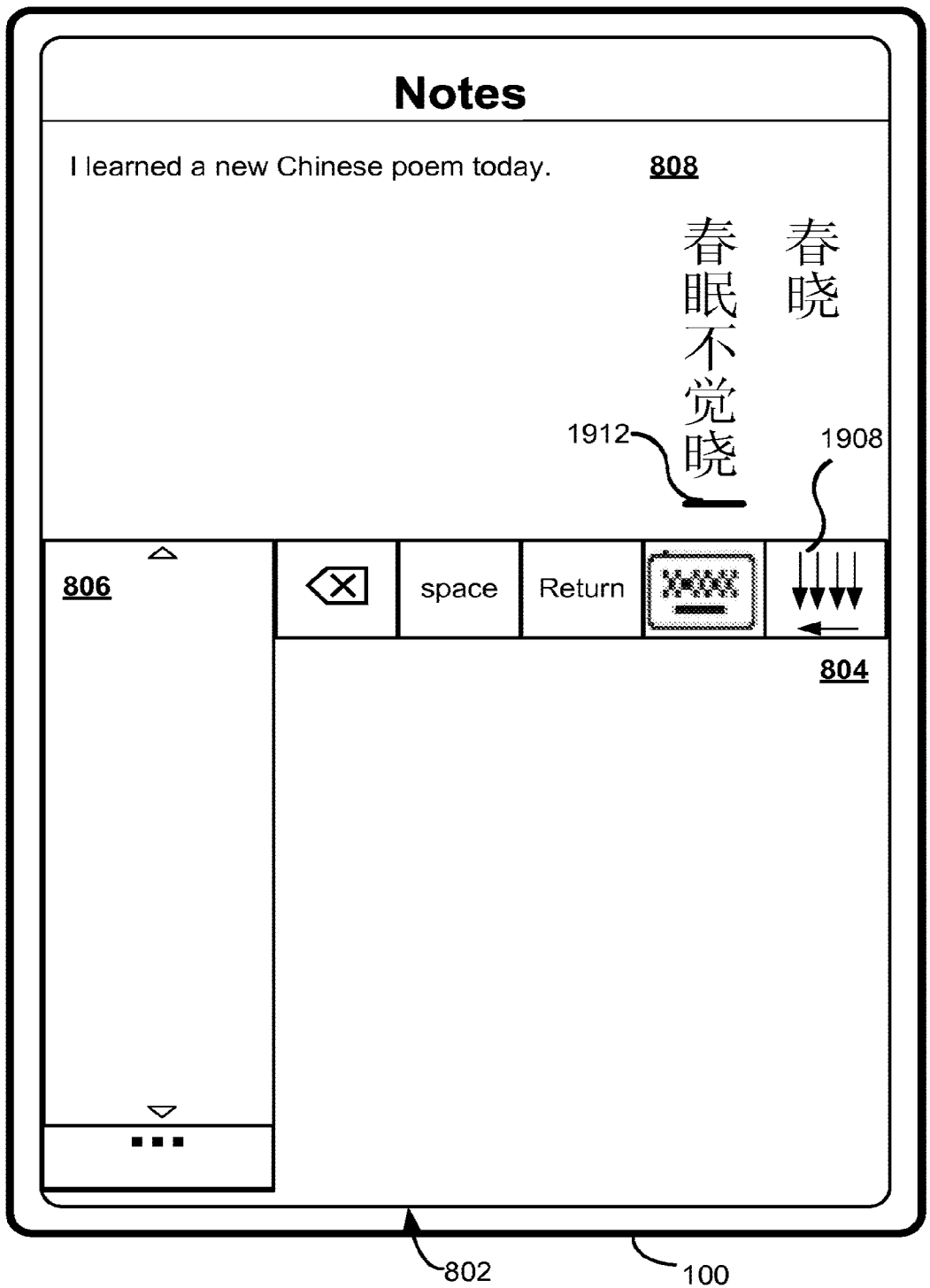

FIGS. 19E-19F illustrate that, the user has entered additional lines of handwriting input 1920 in the vertical writing direction. The lines run from left to right in accordance with the paragraph direction of traditional Chinese writing. In some embodiments, the candidate display area 806 also shows the recognition results (e.g., results 1922 and 1924) in the same writing direction and paragraph direction as that for the handwriting input area. In some embodiments, other writing direction and paragraph direction can be provided by default in accordance with a primary language associated with the user device, or the language (e.g., Arabic, Chinese, Japanese, English, etc.) of a soft keyboard installed on the user device.

FIGS. 19E-19F also show that, when the user has selected a recognition result (e.g., result 1922), the text of the selected recognition result is entered into the text input area 808. As shown in FIG. 19F, the text input currently in the text input area 808 thus includes both text written in a horizontal mode, with a writing direction from left to right, and text written in the vertical mode, with a top-down writing direction. The paragraph direction for the horizontal text is top-down, while the paragraph direction for the vertical text is from right to left.

In some embodiments, the user device allows the user to separately establish preferred writing directions, paragraph directions for each of the handwriting input area 804, the candidate display area 806, and the text input area 808. In some embodiments, the user device allows the user to establish the preferred writing direction and paragraph direction for each of the handwriting input area 804, the candidate display area 806, and the text input area 808, to be associated with each device orientation.

Figure 20A:
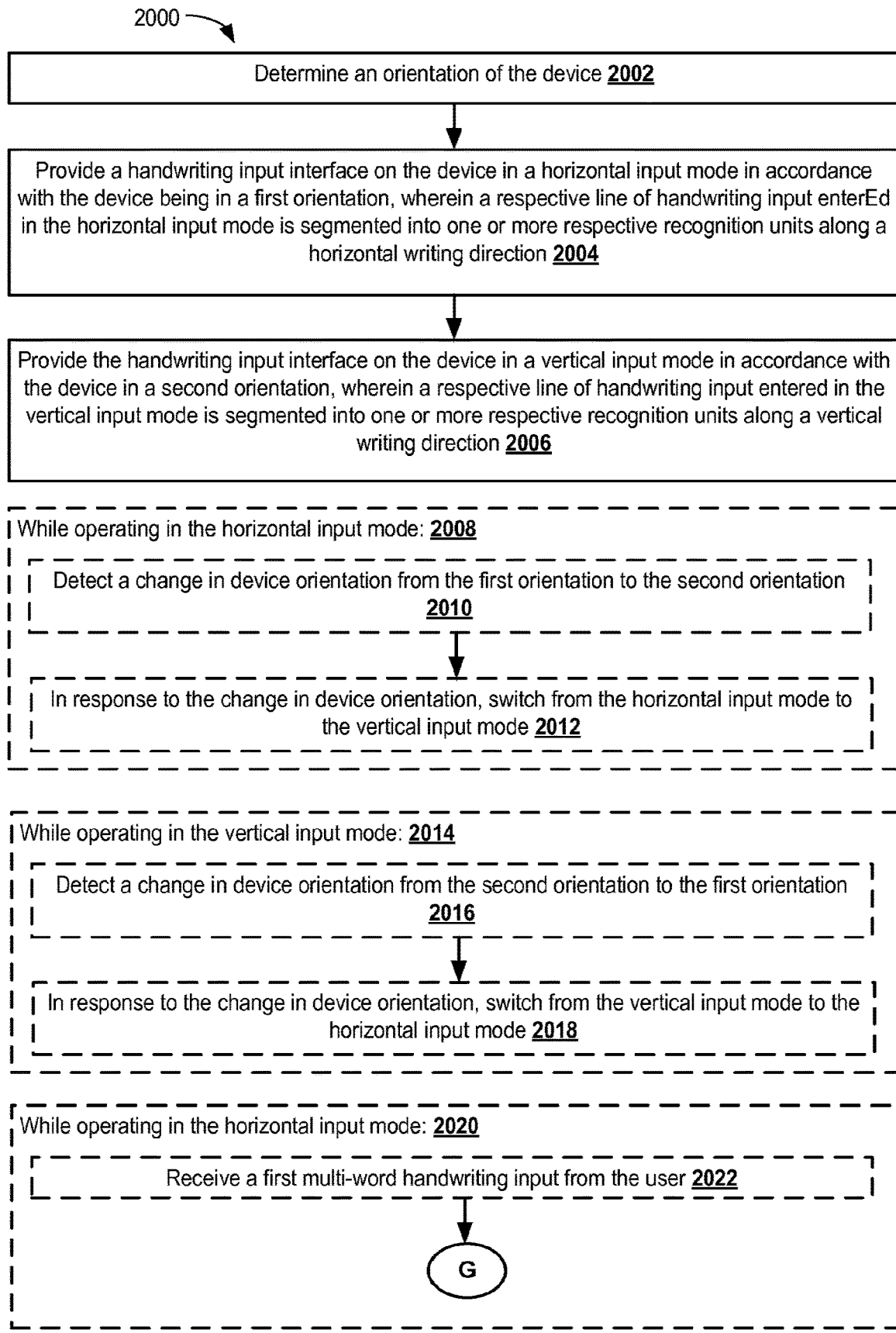
FIGS. 20A-20C are flow charts of an exemplary process for switching between a vertical writing mode and a horizontal writing mode in accordance with some embodiments.
Figure 20B:
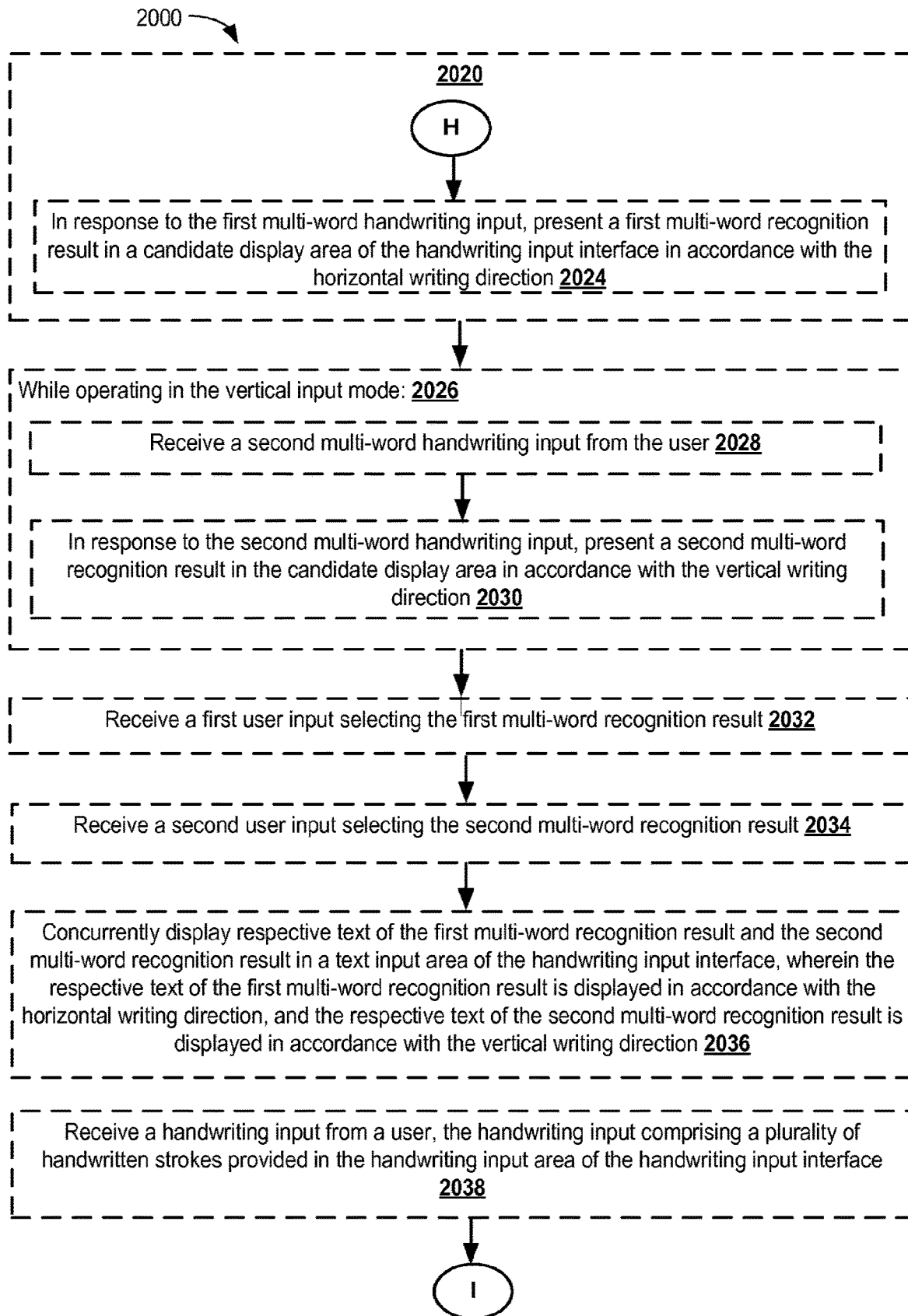
Figure 20C:
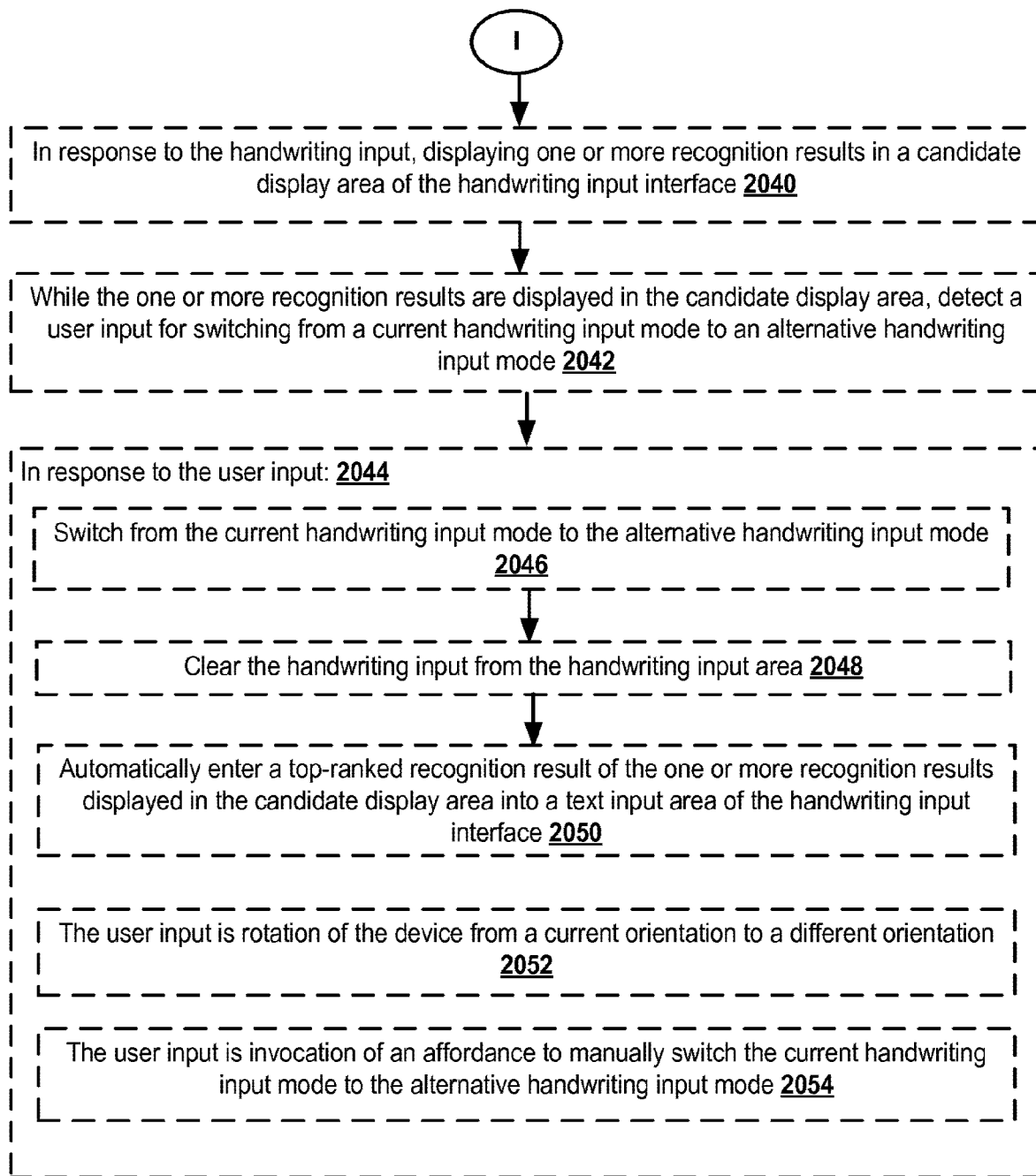

FIGS. 20A-20C are flow charts of an exemplary process 2000 for changing the text input direction and the handwriting input direction of the user interface. FIGS. 19A-19F illustrate the process 2000 in accordance with some embodiments.

In some embodiments, the user device determines (2002) an orientation of the device. The orientation of the device and the changes in device orientation can be detected by the accelerometer and/or other orientation sensing element in the user device. In some embodiments, the user device provides (2004) a handwriting input interface on the device in a horizontal input mode in accordance with the device being in a first orientation. A respective line of handwriting input entered in the horizontal input mode is segmented into one or more respective recognition units along a horizontal writing direction. In some embodiments, the device provides (2006) the handwriting input interface on the device in a vertical input mode in accordance with the device in a second orientation. A respective line of handwriting input entered in the vertical input mode is segmented into one or more respective recognition units along a vertical writing direction.

In some embodiments, while operating in the horizontal input mode (2008): the device detects (2010) a change in device orientation from the first orientation to the second orientation. In some embodiments, in response to the change in device orientation, the device switches (2012) from the horizontal input mode to the vertical input mode. This is illustrated, for example, in FIGS. 19A-19B. In some embodiments, while operating in the vertical input mode (2014): the user device detects (2016) a change in device orientation from the second orientation to the first orientation. In some embodiments, in response to the change in device orientation, the user device switches (2018) from the vertical input mode to the horizontal input mode. In some embodiments, the association between device orientation and the input mode may be opposite of that described above.

In some embodiments, while operating in the horizontal input mode (2020): the user device receives (2022) a first multi-word handwriting input from the user. In response to the first multi-word handwriting input, the user device presents (2024) a first multi-word recognition result in a candidate display area of the handwriting input interface in accordance with the horizontal writing direction. This is illustrated, for example, in FIG. 19A. In some embodiments, while operating in the vertical input mode (2026): the user device receives (2028) a second multi-word handwriting input from the user. In response to the second multi-word handwriting input, the user device presents (2030) a second multi-word recognition result in the candidate display area in accordance with the vertical writing direction. This is illustrated, for example, in FIGS. 19C and 19E.

In some embodiments, the user device receives (2032) a first user input selecting the first multi-word recognition result, e.g., as shown in FIGS. 19A-19B where the selection is made implicitly with an input (e.g., rotation of device or selection of affordance 1908) for changing the input direction. The user device receives (2034) a second user input selecting the second multi-word recognition result, e.g., as shown in FIG. 19C or FIG. 19E. The user device concurrently displays (2036) respective text of the first multi-word recognition result and the second multi-word recognition result in a text input area of the handwriting input interface, where the respective text of the first multi-word recognition result is displayed in accordance with the horizontal writing direction, and the respective text of the second multi-word recognition result is displayed in accordance with the vertical writing direction. This is illustrated in text input area 808 in FIG. 19F, for example.

In some embodiments, the handwriting input area accepts multiple lines of handwriting input in the horizontal writing direction and has a default top-down paragraph direction. In some embodiments, the horizontal writing direction is from left to right. In some embodiments, the horizontal writing direction is from right to left. In some embodiments, the handwriting input area accepts multiple lines of handwriting input in the vertical writing direction and has a default left-to-right paragraph direction. In some embodiments, the handwriting input area accepts multiple lines of handwriting input in the vertical writing direction and has a default right-to-left paragraph direction. In some embodiments, the vertical writing direction is from top to bottom. In some embodiments, the first orientation is a landscape orientation by default, and the second orientation is a portrait orientation by default. In some embodiments, the user device provides a respective affordance in the handwriting input interface for manually switching between the horizontal input mode and the vertical input mode, irrespective of the device orientation. In some embodiments, the user device provides a respective affordance in the handwriting input interface for manually switching between two alternative writing directions. In some embodiments, the user device provides a respective affordance in the handwriting input interface for manually switching between two alternative paragraph directions. In some embodiments, the affordance is a toggle button that rotates through each available combination of the input and paragraph directions, when invoked one or more consecutive times.

In some embodiments, the user device receives (2038) a handwriting input from a user. The handwriting input includes a plurality of handwritten strokes provided in the handwriting input area of the handwriting input interface. In response to the handwriting input, the user device displays (2040) one or more recognition results in a candidate display area of the handwriting input interface. While the one or more recognition results are displayed in the candidate display area, the user device detects (2042) a user input for switching from a current handwriting input mode to an alternative handwriting input mode. In response to the user input (2044): the user device switches (2046) from the current handwriting input mode to the alternative handwriting input mode. In some embodiments, the user device clears (2048) the handwriting input from the handwriting input area. In some embodiments, the user device automatically enters (2050) a top-ranked recognition result of the one or more recognition results displayed in the candidate display area into a text input area of the handwriting input interface. This is illustrated in FIGS. 19A-19B, for example, where the current handwriting input mode is the horizontal input mode, and the alternative handwriting input mode is the vertical input mode. In some embodiments, the current handwriting input mode is the vertical input mode, and the alternative handwriting input mode is the horizontal input mode. In some embodiments, the current handwriting input mode and the alternative handwriting input mode are modes under which any two different handwriting input directions or paragraph directions are provided. In some embodiments, the user input is (2052) rotation of the device from a current orientation to a different orientation. In some embodiments, the user input is invocation of an affordance to manually switch the current handwriting input mode to the alternative handwriting input mode.

As described herein, the handwriting input module allows the user to enter handwritten strokes and/or characters in any temporal order. Thus, deleting an individual handwritten character in a multi-character handwriting input, and rewriting the same or a different handwritten character in the same location as the deleted character is advantageous, because it would help the user revise a long handwriting input without having to delete the whole handwriting input.

FIGS. 21A-21H illustrate exemplary user interfaces for visually highlighting and/or deleting a recognition unit identified in a plurality of handwritten strokes currently accumulated in the handwriting input area. Allowing the user to individually select, view, and delete any one of multiple recognition units identified in a plurality inputs is particularly useful when multi-character, and even multi-line handwriting input is permitted by the user device. By allowing the user to delete a particular recognition unit in the beginning or the middle of the handwriting inputs allows to the user to make corrections to a long input, without requiring the user to delete all recognition units positioned after an undesirable recognition unit.

Figure 21A:
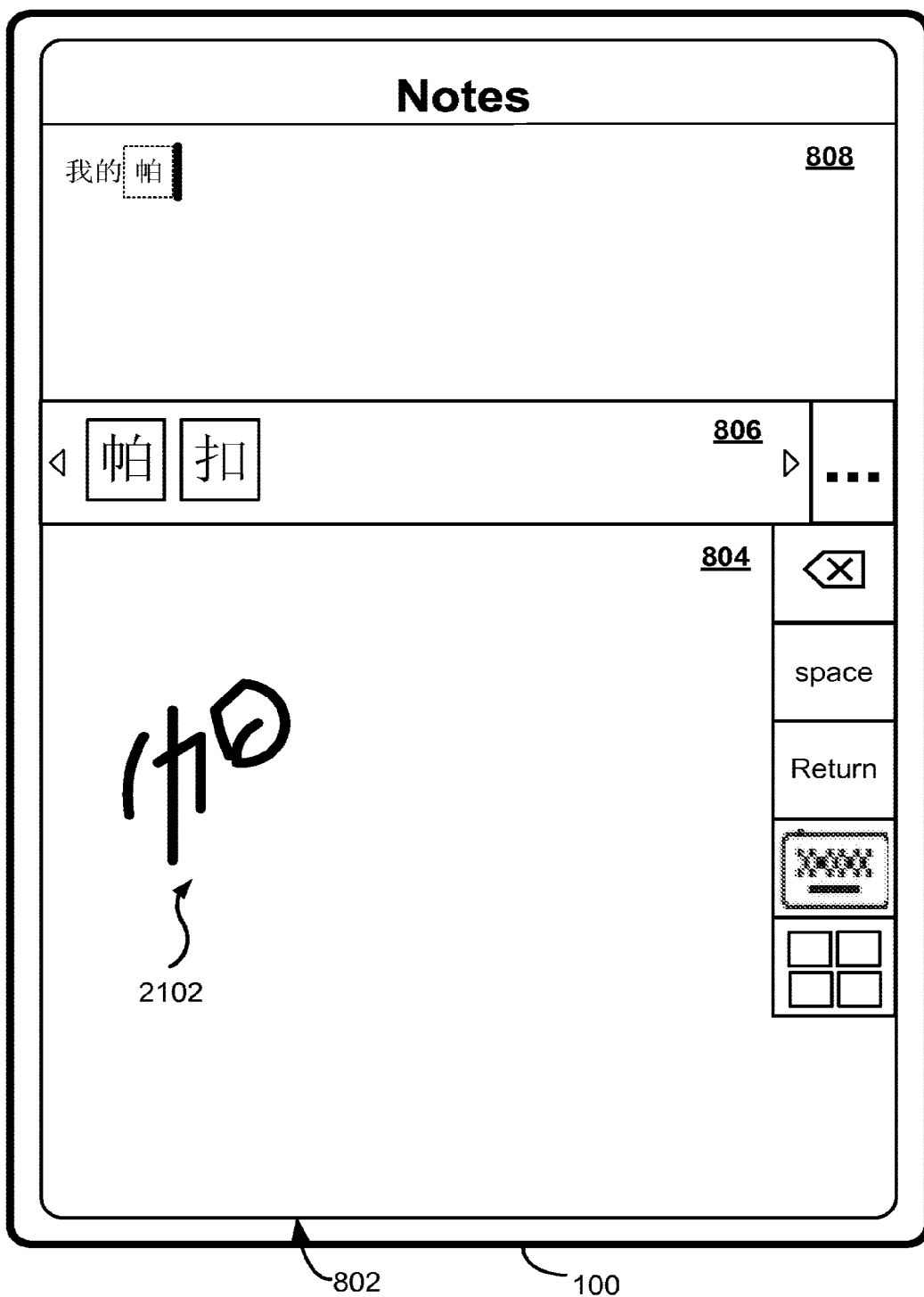
FIGS. 21A-21H show user interfaces for providing a means to display and selectively delete individual recognition units identified in a user's handwriting input, in accordance with some embodiments.
Figure 21B:
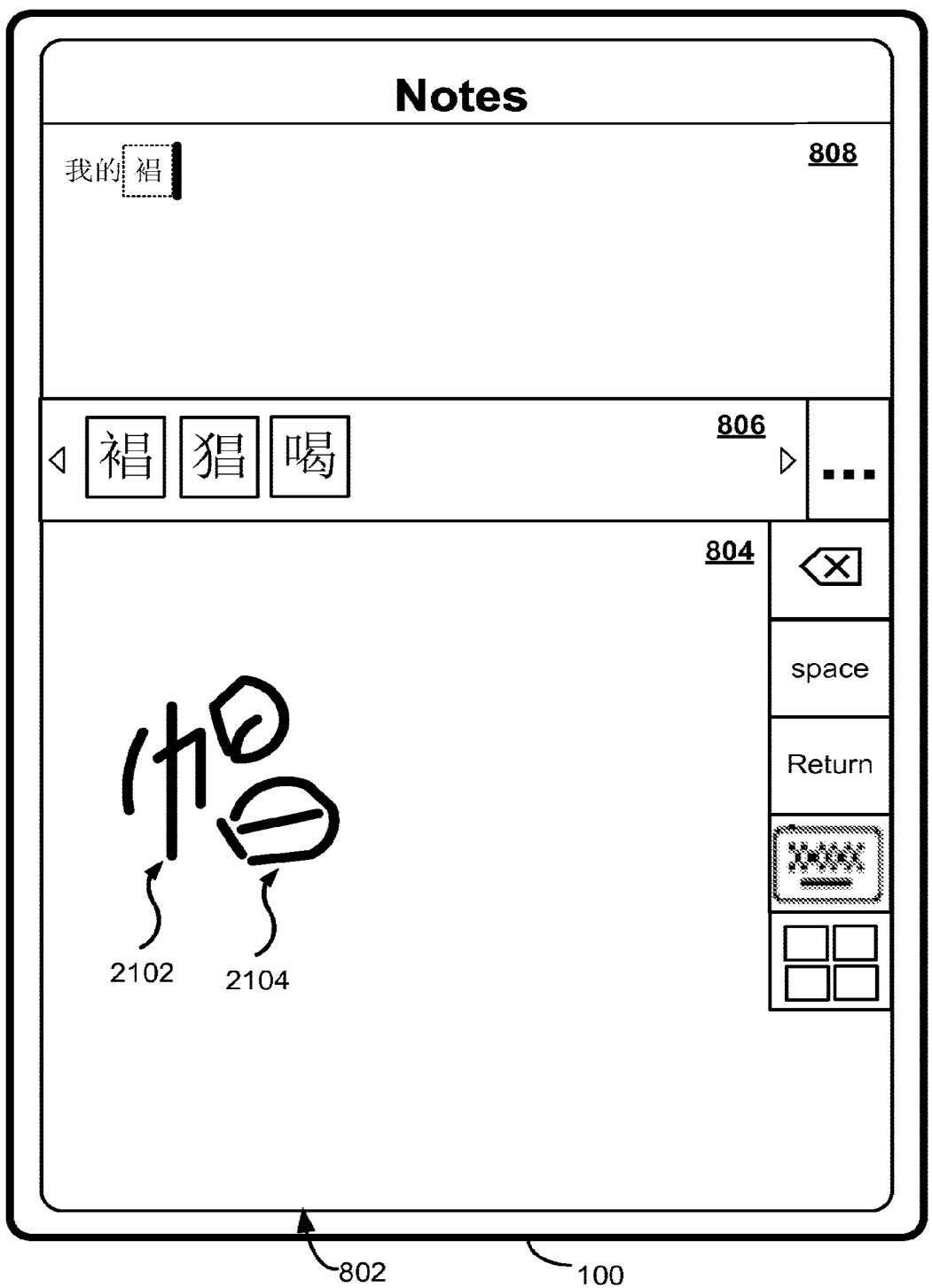
Figure 21C:
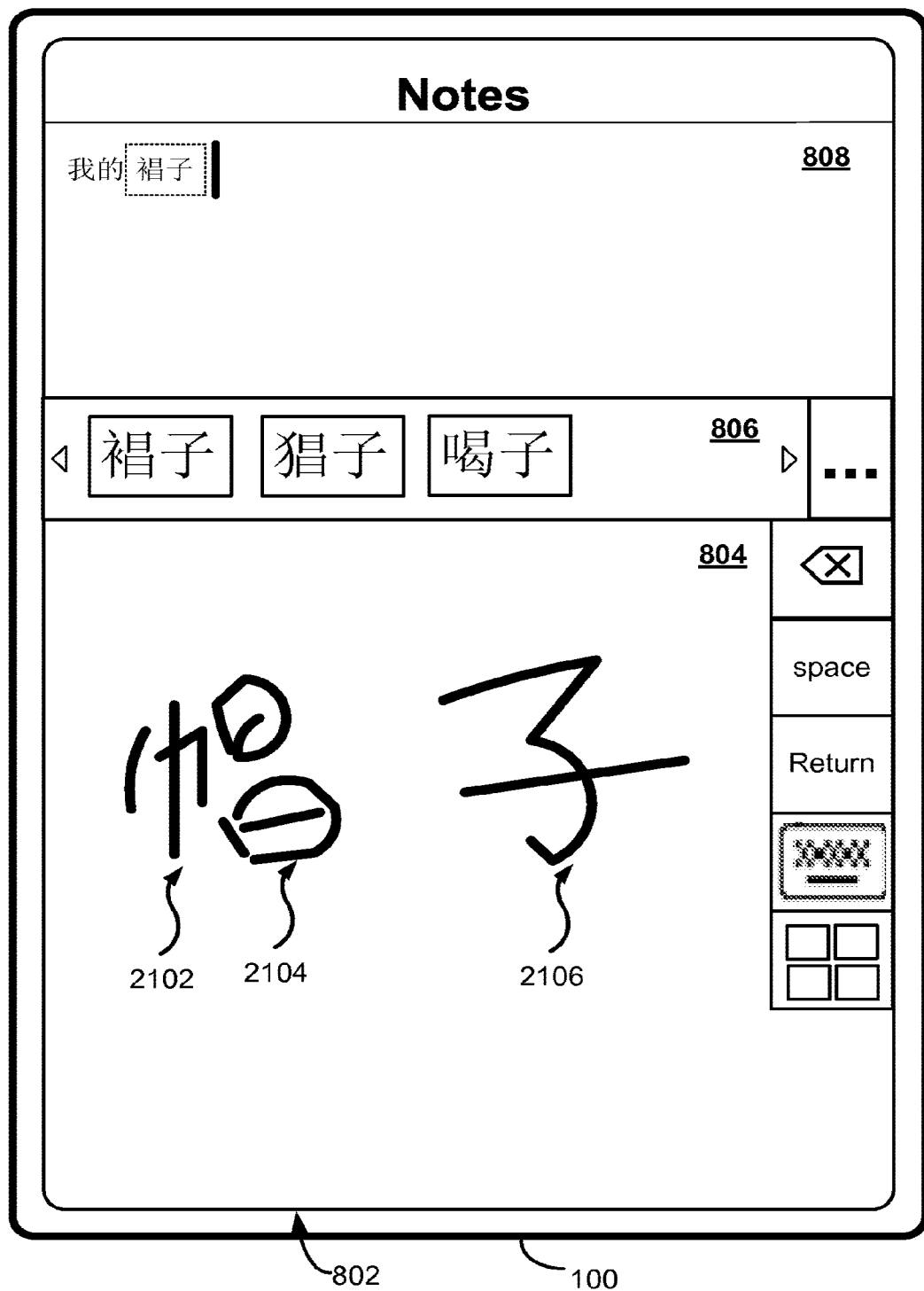

As shown in FIGS. 21A-21C, the user has provided a plurality of handwritten strokes (e.g., strokes 2102, 2104, and 2106) in the handwriting input area 804 of the handwriting input user interface 802. While the user continues to provide additional strokes to the handwriting input area 804, the user device updates the recognition units identified from the handwriting input currently accumulated in the handwriting input area, and revises the recognition results according to the output characters recognized from the updated recognition units. As shown in FIG. 20C, the user device has identified two recognition units from the current handwriting input, and presented three recognition results (e.g., 2108, 2010, and 2112) each including two Chinese characters.

In this example, after the user has written the two handwriting characters, the user realizes that the first recognition unit is incorrectly written, and as a result, the user device has not identified and presented the desired recognition result in the candidate display area.

In some embodiments, when the user provides a tap gesture (e.g., a contact followed with an immediate lift-off at the same location) on the touch-sensitive display, the user device interprets the tap gesture as an input to cause visually highlighting of individual recognition units that are currently identified in the handwriting input area. In some embodiments, another predetermined gesture (e.g., a multi-finger wiping gesture over the handwriting input area) is used to cause the user device to highlight the individual recognition units in the handwriting input area 804. A tap gesture is sometimes preferred because it is relatively easy to distinguish from a handwritten stroke, which usually involves a sustained contact of a longer duration and with movement of the contact within the handwriting input area 804. A multi-touch gesture is sometimes preferred because it is relatively easy to distinguish from a handwritten stroke, which usually involves a single contact within the handwriting input area 804. In some embodiments, the user device provides an affordance 2112 in the user interface that can be invoked (e.g., via a contact 2114) by the user to cause the individual recognition units to be visually highlighted (e.g., as shown by boxes 2108 and 2110). In some embodiments, the affordance is preferred when there is sufficient screen space to accommodate such an affordance. In some embodiments, the affordance can be invoked multiple consecutive times by the user, which causes the user device to visually highlight recognition unit(s) identified according to a different segmentation chain in the segmentation lattice and for the highlighting to be turned off when all segmentation chains have been shown.

Figure 21D:
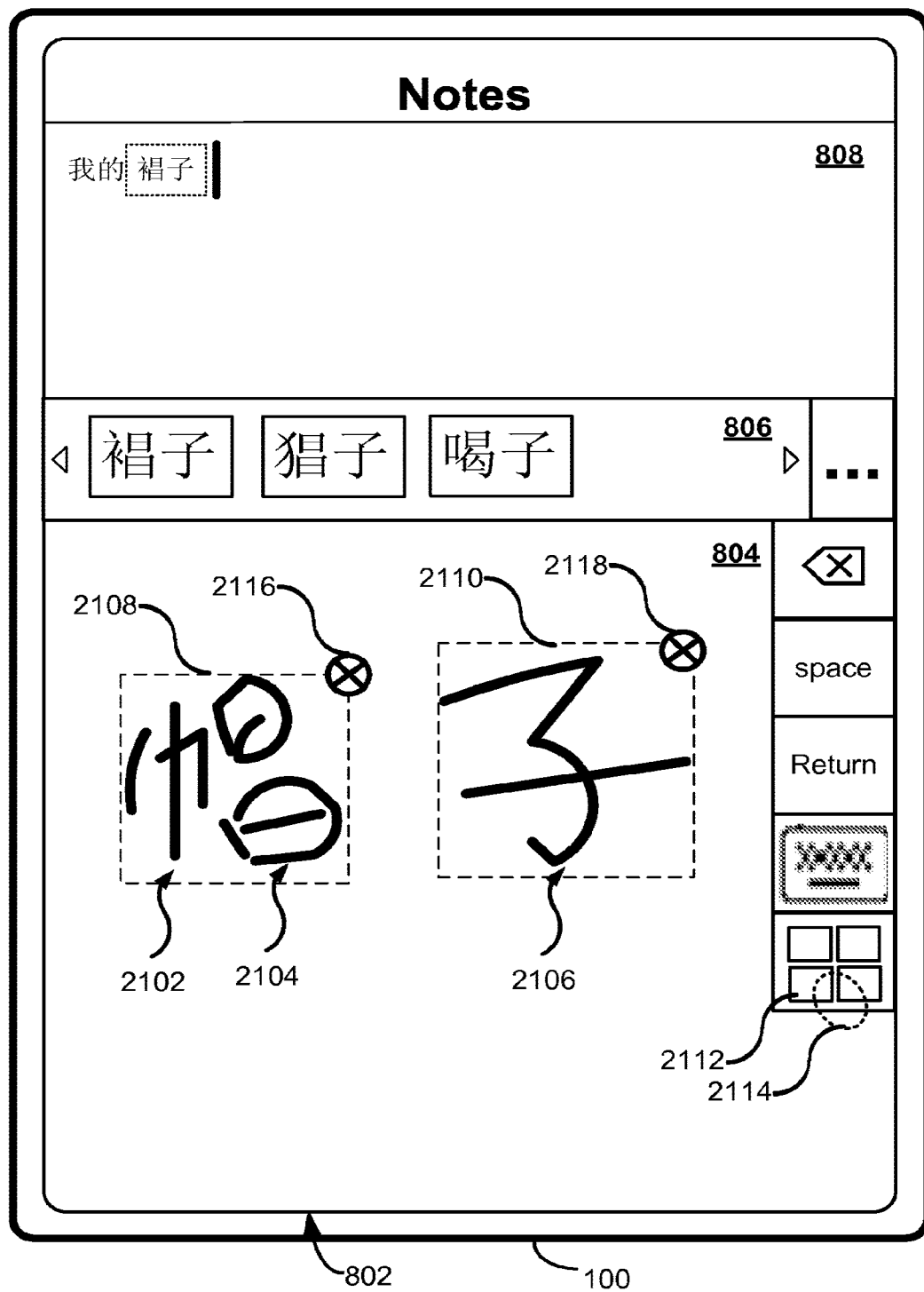
Figure 21E:
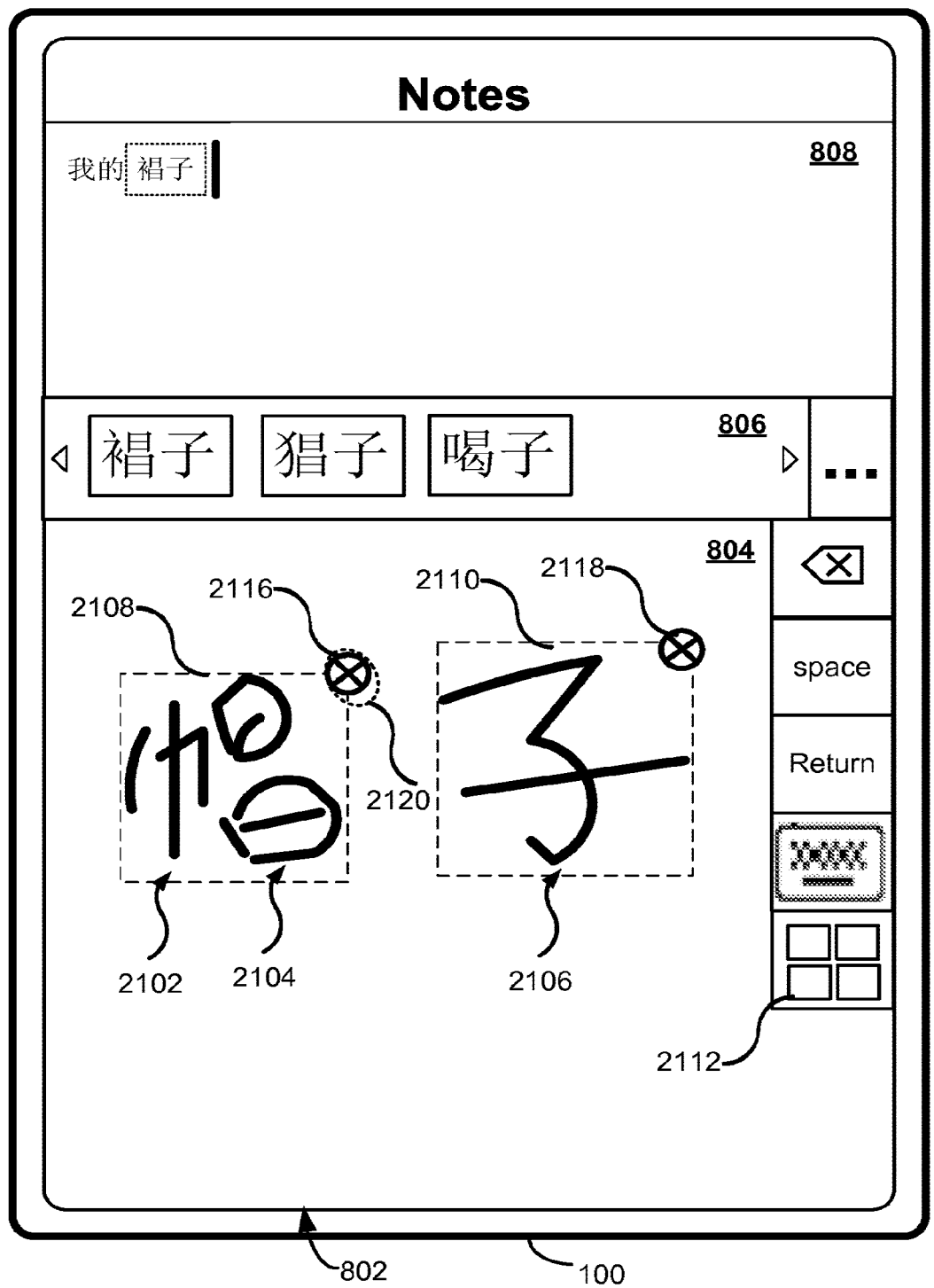
Figure 21F:
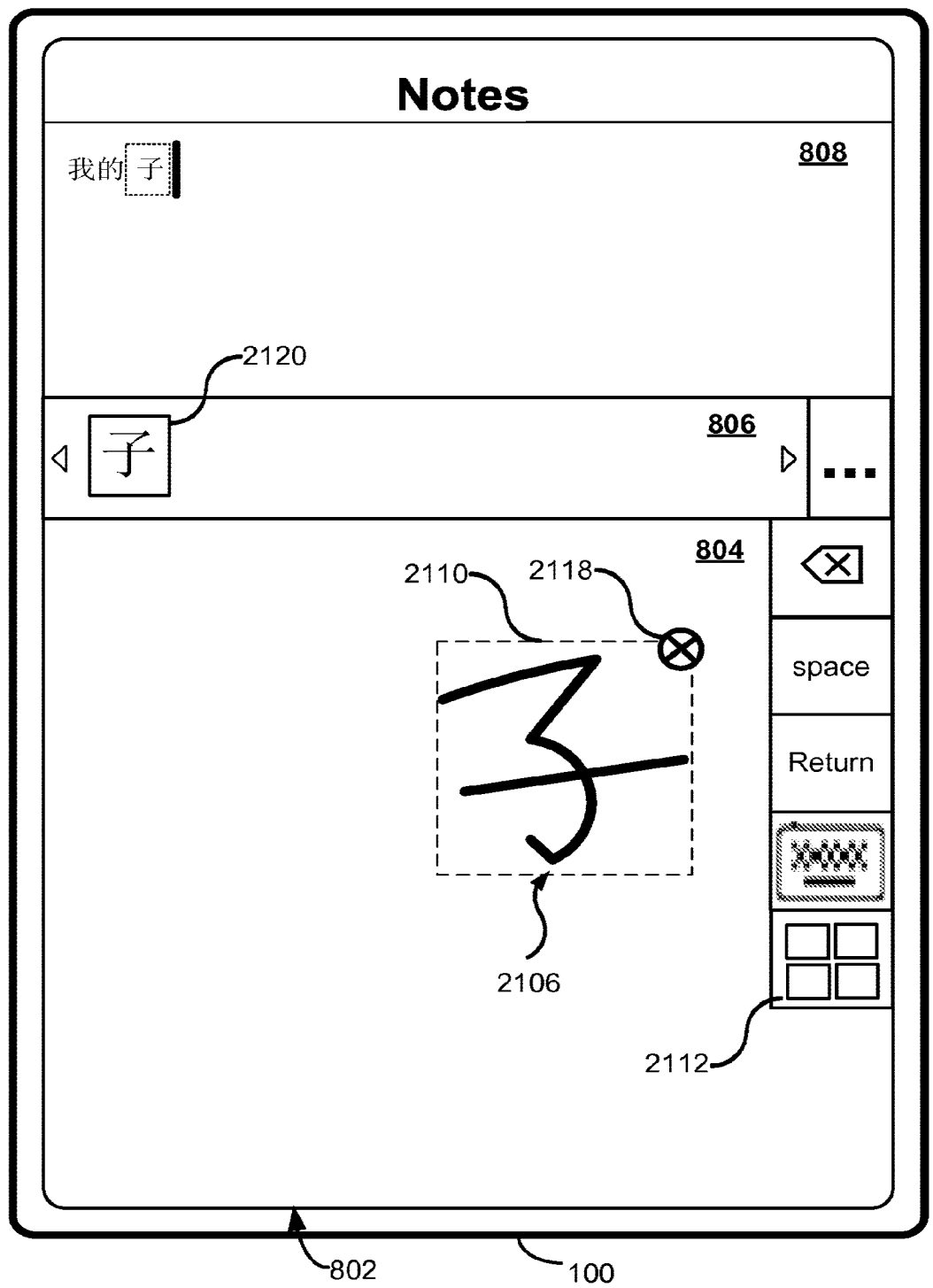

As shown in FIG. 21D, when the user has provided the necessary gesture to highlight the individual recognition units in the handwriting input area 804, the user device further displays a respective deleting affordance (e.g., small delete buttons 2116 and 2118) over each highlighted recognition unit. FIGS. 21E-21F show that when the user touches (e.g., via a contact 2120) the deleting affordance of a respective recognition unit (e.g., the delete button 2116 for the first recognition unit in box 2118), the respective recognition unit (e.g., in box 2118) is removed from the handwriting input area 804. In this particular example, the deleted recognition unit is not the last entered recognition unit temporally, nor is it the spatially last recognition unit along the writing direction. In other words, the user can delete any recognition unit regardless of when and where it has been provided in the handwriting input area. FIG. 21F shows that, in response to the deletion of the first recognition unit in the handwriting input area, the user device also updates the recognition results displayed in the candidate display area 806. As shown in FIG. 21F, the user device has also deleted candidate character corresponding to the deleted recognition unit from the recognition results. As a result, a new recognition result 2120 is shown in the candidate display area 806.

Figure 21G:
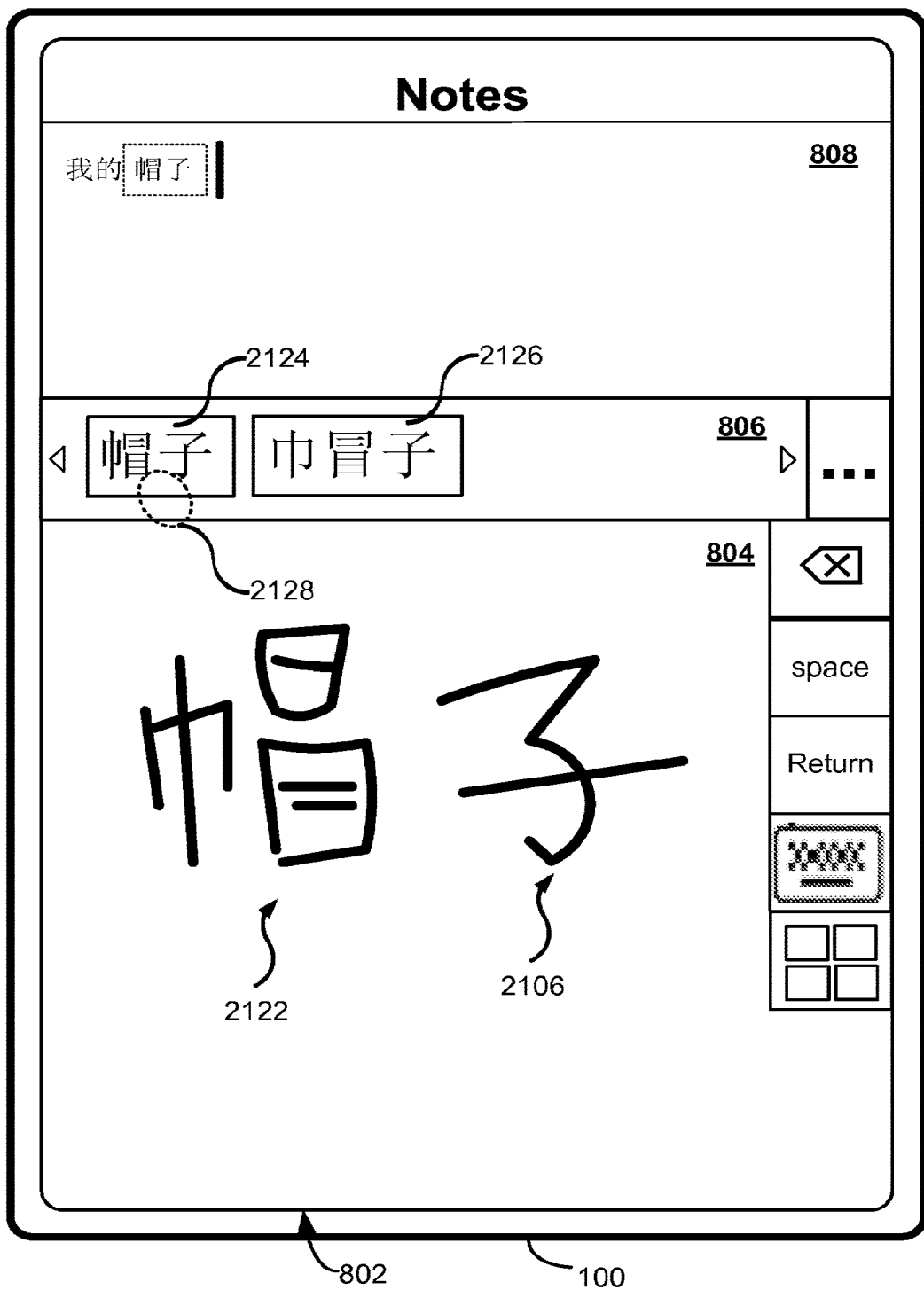
Figure 21H:
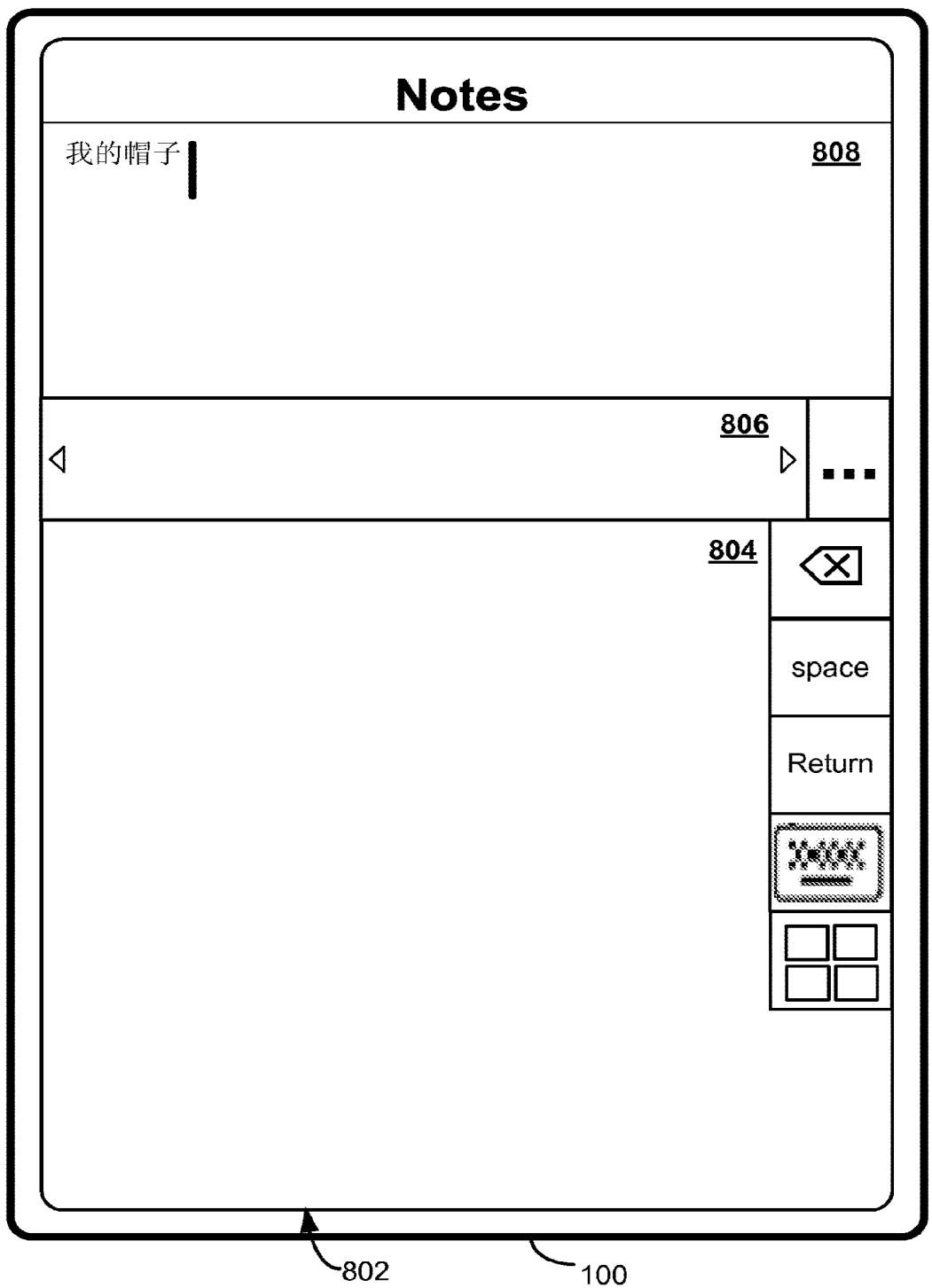

As shown in FIGS. 21G-21H, after the first recognition unit has been removed from the handwriting input interface 804, the user has provided a plurality of new handwritten strokes 2122 in the area that was previously occupied by the deleted recognition unit. The user device has re-segmented the currently accumulated handwriting input in the handwriting input area 804. Based on the recognition units identified from the handwriting input, the user device regenerated recognition results (e.g., results 2124 and 2126) in the candidate display area 806. FIG. 21G-21H show that the user has selected (e.g., via the contact 2128) one of the recognition results (e.g., result 2124), and text of the selected recognition result is entered into the text input area 808.

Figure 22A:
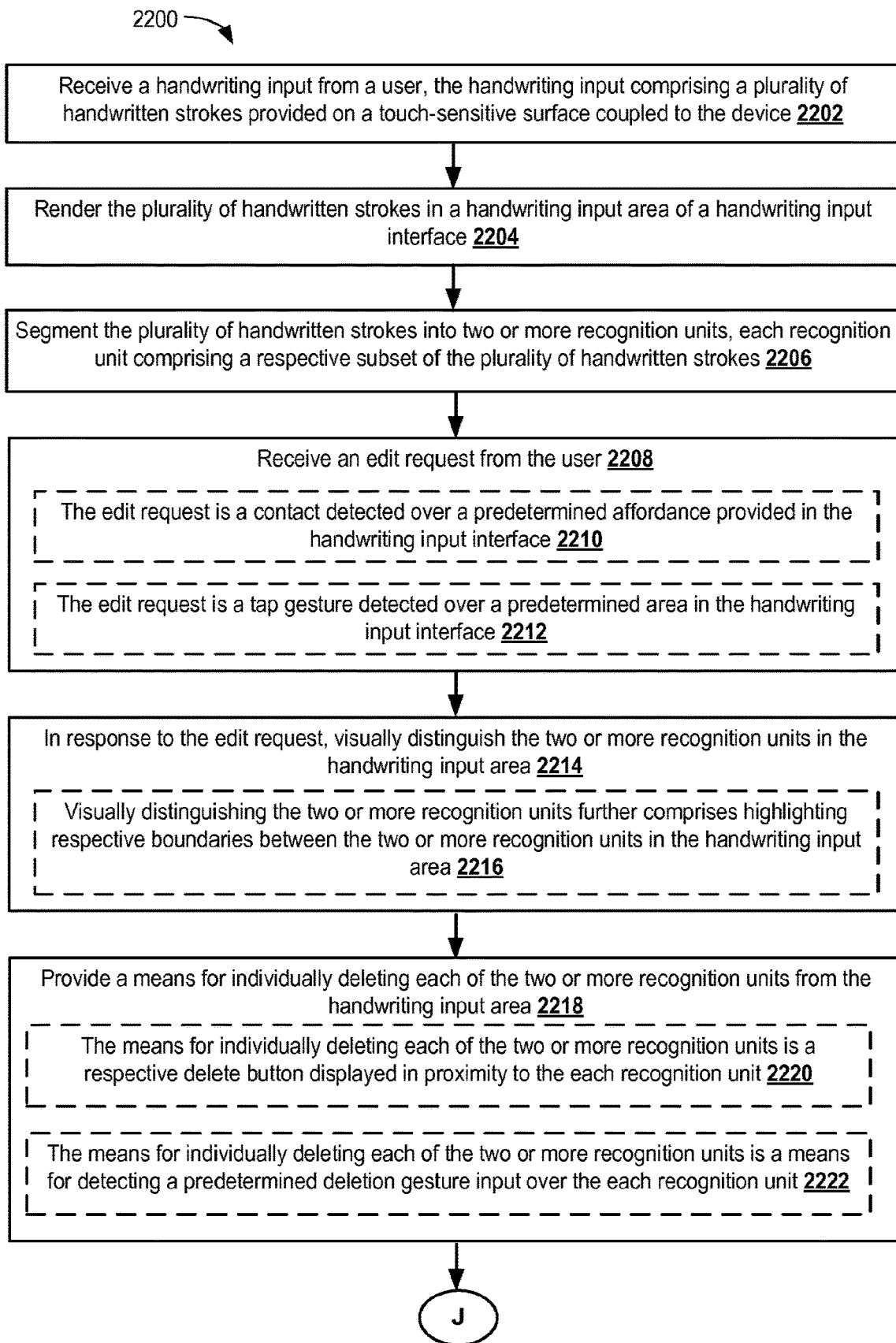
FIGS. 22A-22B are flow charts of an exemplary process for providing a means to display and selectively delete individual recognition units identified in a user's handwriting input, in accordance with some embodiments.
Figure 22B:
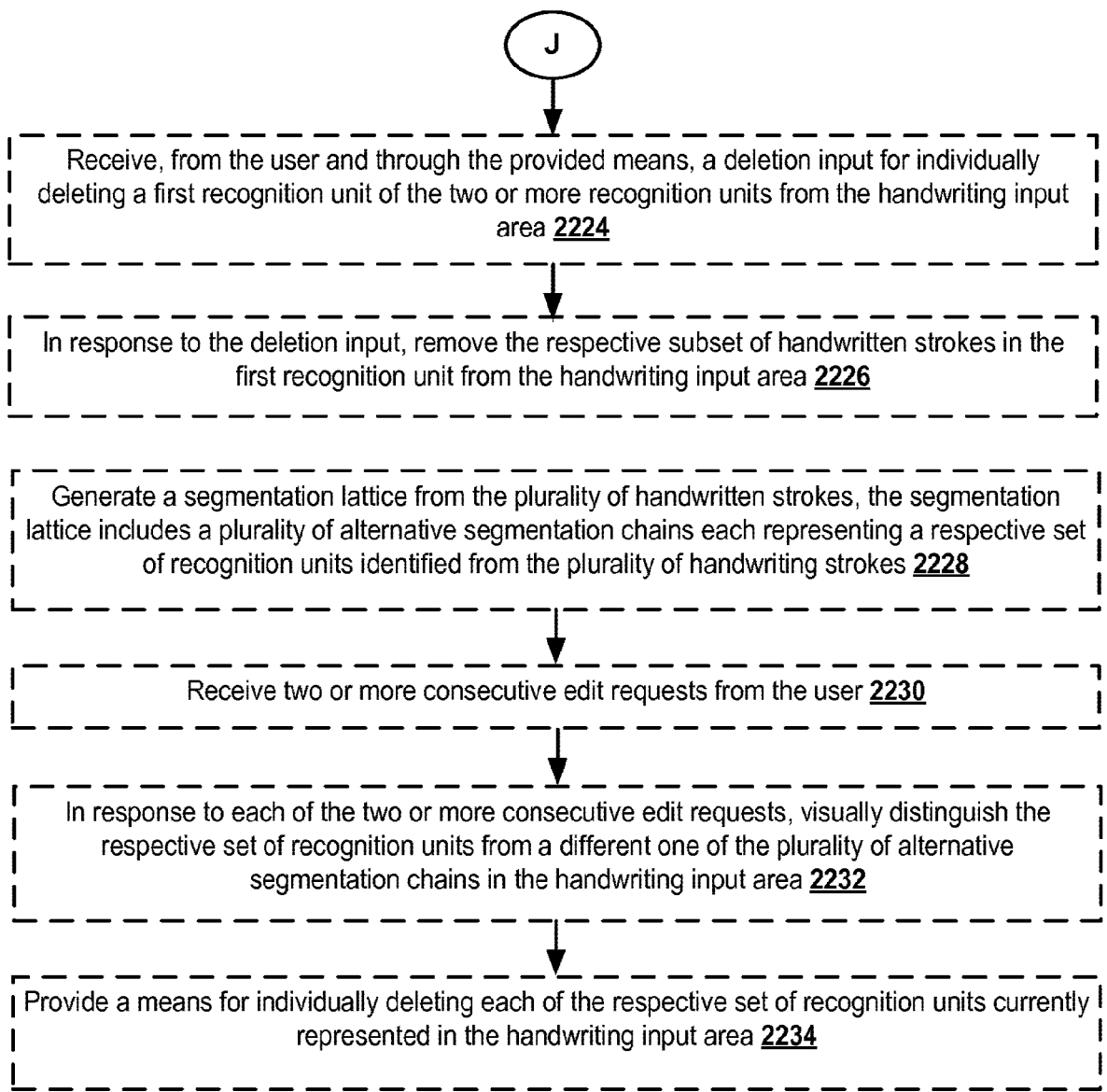

FIGS. 22A-22B are flow charts for an exemplary process 2200 in which individual recognition units identified in the current handwriting input is visually presented, and can be individually deleted, regardless of the temporal order by which the recognition units are formed. FIGS. 21A-21H illustrate the process 2200 in accordance with some embodiments.

In the exemplary process 2200, the user device receives (2202) a handwriting input from a user. The handwriting input includes a plurality of handwritten strokes provided on a touch-sensitive surface coupled to the device. In some embodiments, the user device renders (2204) the plurality of handwritten strokes in a handwriting input area (e.g., handwriting input area 804) of a handwriting input interface. In some embodiments, the user device segments (2206) the plurality of handwritten strokes into two or more recognition units, each recognition unit comprising a respective subset of the plurality of handwritten strokes.

In some embodiments, the user device receives (2208) an edit request from the user. In some embodiments, the edit request is (2210) a contact detected over a predetermined affordance (e.g., affordance 2112 in FIG. 21D) provided in the handwriting input interface. In some embodiments, the edit request is (2212) a tap gesture detected over a predetermined area in the handwriting input interface. In some embodiments, the predetermined area is within the handwriting input area of the handwriting input interface. In some embodiments, the predetermined area is outside of the handwriting input area of the handwriting input interface. In some embodiments, another predetermined gesture (e.g., a cross gesture, a horizontal swipe gesture, a vertical swipe gesture, a slanted swipe gesture) outside of the handwriting input area can be used as an edit request. Gestures outside of the handwriting input area can be easily distinguished from a handwritten stroke, since it is provided outside of the handwriting input area.

In some embodiments, in response to the edit request, the user device visually distinguishes (2214) the two or more recognition units in the handwriting input area, e.g., using the boxes 2108 and 2110 in FIG. 21D. In some embodiments, visually distinguishing the two or more recognition units further includes (2216) highlighting respective boundaries between the two or more recognition units in the handwriting input area. In various embodiments, different ways of visually distinguishing the recognition units identified in the current handwriting input may be used.

In some embodiments, the user device provides (2218) a means for individually deleting each of the two or more recognition units from the handwriting input area. In some embodiments, the means for individually deleting each of the two or more recognition units is a respective delete button displayed in proximity to the each recognition unit, e.g., as shown by delete buttons 2116 and 2118 in FIG. 21D. In some embodiments, the means for individually deleting each of the two or more recognition units is a means for detecting a predetermined deletion gesture input over the each recognition unit. In some embodiments, the user device does not visibly display the individual deletion affordance over the highlighted recognition units. Instead, in some embodiments, the user is allowed to use a deletion gesture to delete a respective recognition unit underneath the deletion gesture. In some embodiments, as the user device is displaying the recognition units in a visually highlighted manner, the user device does not accept additional handwritten strokes in the handwriting input area. Instead, a predetermined gesture or any gesture detected over a visually highlighted recognition unit will cause the user device to remove the recognition unit from the handwriting input area, and revise the recognition results displayed in the candidate display area accordingly. In some embodiments, a tap gesture causes the user device to visually highlight the individual recognition units identified in the handwriting recognition area, and the user can then use the delete button to delete the individual recognition units one by one in the reverse writing direction.

In some embodiments, the user device receives (2224), from the user and through the provided means, a deletion input for individually deleting a first recognition unit of the two or more recognition units from the handwriting input area, e.g., as shown in FIG. 21E. In response to the deletion input, the user device removes (2226) the respective subset of handwritten strokes in the first recognition unit from the handwriting input area, e.g., as shown in FIG. 21F. In some embodiments, the first recognition unit is a spatially initial recognition unit in the two or more recognition units. In some embodiments, the first recognition unit is a spatially intermediate recognition unit among the two or more recognition units, e.g., as shown in FIGS. 21E-21F. In some embodiments, the first recognition unit is a spatially end recognition unit among the two or more recognition units.

In some embodiments, the user device generates (2228) a segmentation lattice from the plurality of handwritten strokes, the segmentation lattice includes a plurality of alternative segmentation chains each representing a respective set of recognition units identified from the plurality of handwriting strokes. For example, FIG. 21G shows the recognition results 2024 and 2026, where the recognition result 2024 is generated from one segmentation chain with two recognition units, and the recognition result 2026 is generated from another segmentation chain with three recognition units. In some embodiments, the user device receives (2230) two or more consecutive edit requests from the user. For example, the two or more consecutive edit request can be several consecutive taps on the affordance 2112 in FIG. 21G. In some embodiments, in response to each of the two or more consecutive edit requests, the user device visually distinguishes (2232) the respective set of recognition units from a different one of the plurality of alternative segmentation chains in the handwriting input area. For example, in response to a first tap gesture, two recognition units (e.g., for the characters "朋" and "子", respectively) are highlighted in the handwriting input area 804, and in response to a second tap gesture, three recognition units (e.g., for the characters "月", "月", and "子", respectively). In some embodiments, in response to a third tap gesture, the visual highlighting is optionally removed from all recognition units, and the handwriting input area is returned to the normal state ready to accept additional strokes. In some embodiments, the user device provides (2234) a means for individually deleting each of the respective set of recognition units currently represented in the handwriting input area. In some embodiments, the means is an individual delete button for each highlighted recognition unit. In some embodiments, the means is a means for detecting of a predetermined deletion gesture over each highlighted recognition unit, and for invoking a function to delete the highlighted recognition unit under the predetermined deletion gesture.

As described herein, in some embodiments, the user device provides a continuous input mode in the handwriting input area. Since the area of the handwriting input area is limited on a portable user device, it is sometimes desirable to provide a way to cache the handwriting inputs provided by the user, and allow the user to reuse the screen space without commit the previously provided handwriting inputs. In some embodiments, the user device provides a scrolling handwriting input area, where input area gradually shifts by a certain amount (e.g., one recognition unit at a time) when the user is getting sufficiently close to the end of the handwriting input area. In some embodiments, since shifting the existing recognition units in the handwriting input area may interfere with the user's writing process, and possibly interfere with the correct segmentation of the recognition units, it is sometimes advantageous to recycle a previously used region of the input area without dynamically shifting the recognition units. In some embodiments, when the user reuses an area that is occupied by a handwriting input that has not yet been entered into the text input area, a top recognition result for the handwriting input area is automatically entered into the text input area, such that the user can continue providing a new handwriting input without explicitly selecting the top-ranked recognition result.

In some conventional systems, the user is allowed to write over an existing handwriting input that is still shown in the handwriting input area. In such systems, temporal information is used to determine whether a new stroke is part of an earlier recognition unit or a new recognition unit. Such temporal-information dependent systems place stringent requirements on the speed and tempo by which the user provides the handwriting input, which is difficult to meet by many users. In addition, the visual rendering of the handwriting input can be a jumble that is difficult to for the user to decipher. Thus, the writing process can be frustrating, and confusing for the user, leading to a bad user experience.

As described herein, a fading process is used to indicate when the user can reuse an area occupied by a previously written recognition unit, and continue writing in the handwriting input area. In some embodiments, the fading process gradually reduces the visibility of each recognition unit that has been provided in the handwriting input area for a threshold amount of time, such that when new strokes are written over it, the existing text does not visually compete with the new strokes. In some embodiments, writing over a faded recognition unit automatically causes a top-ranked recognition result for the recognition unit to be entered into the text input area, without requiring the user to stop writing and to explicitly provide a selection input for the top-ranked recognition result. This implicit and automatic confirmation of the top-ranked recognition result improves the input efficient and speed of the handwriting input interface, and reduces the cognitive burden placed on the user to maintain the thought flow of the current text composition. In some embodiments, writing over a faded recognition unit does not cause automatic selection of the top-ranked search result. Instead, the faded recognition units are cached in a handwriting input stack, and combined with the new handwriting input as the current handwriting input. The user can see a recognition results generated based on all of the recognition units accumulated in the handwriting input stack before making a selection.

FIGS. 23A-23J illustrate exemplary user interfaces and processes in which recognition units provided in different region of the handwriting input area are gradually faded out from their respective regions, e.g., after a predetermined amount of time and after the fade-out has occurred in a particular region, the user is allowed to provide new handwritten strokes in that region.

Figure 23A:
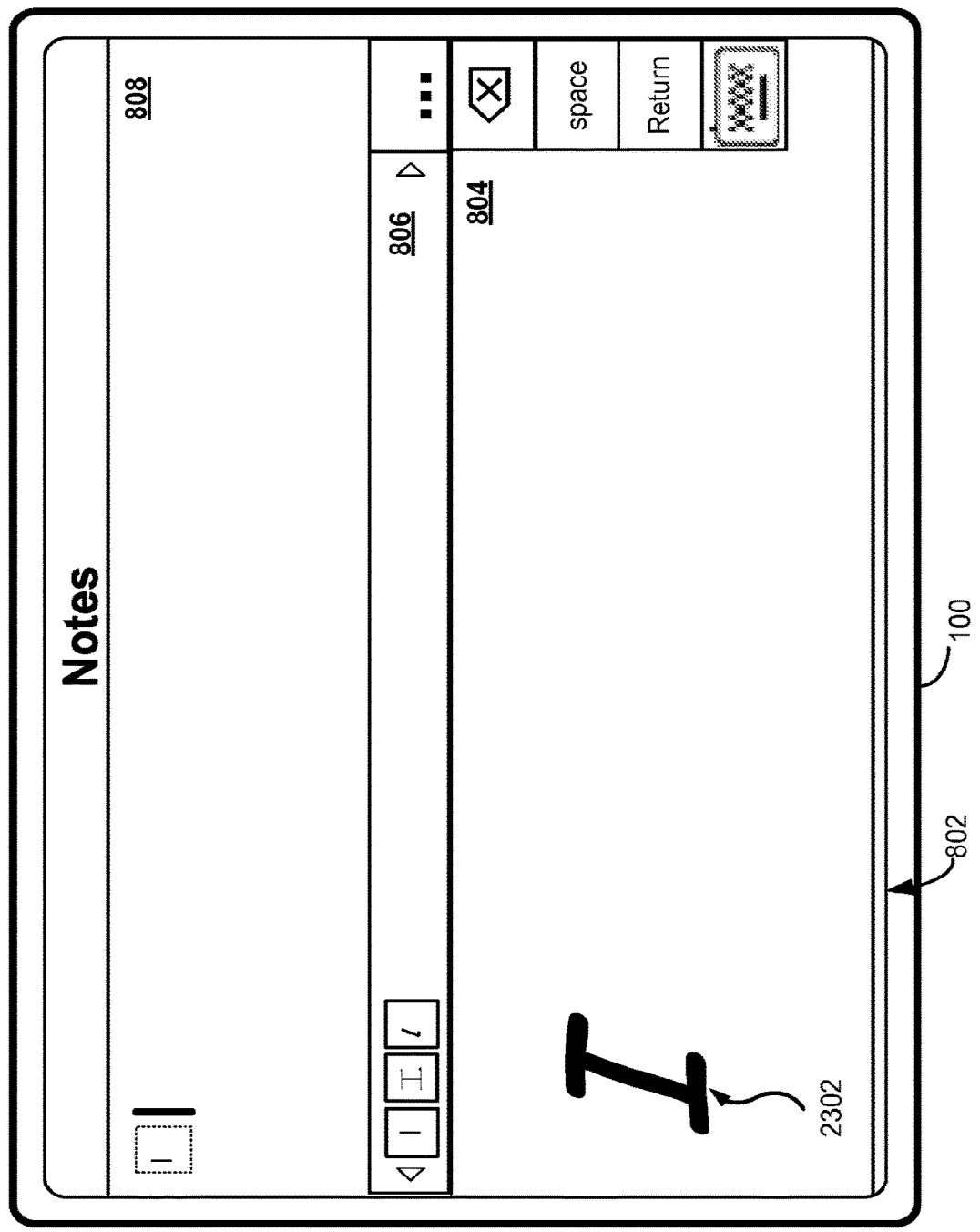
FIGS. 23A-23L show exemplary user interfaces for utilizing a new handwriting input provided over an existing handwriting input in the handwriting input area as an implicit confirmation input for entering a recognition result displayed for the existing handwriting input, in accordance with some embodiments.

As shown in FIG. 23A, the user has provided a plurality of handwritten strokes 2302 (e.g., three handwritten strokes for the capital letter "I") in the handwriting input area 804. The handwritten strokes 2302 are identified by the user device as a recognition unit. In some embodiments, the handwriting input currently shown in the handwriting input area 804 is cached in a first layer in the handwriting input stack of the user device. A number of recognition results generated based on the identified recognition unit are provided in the candidate display area 804.

Figure 23B:
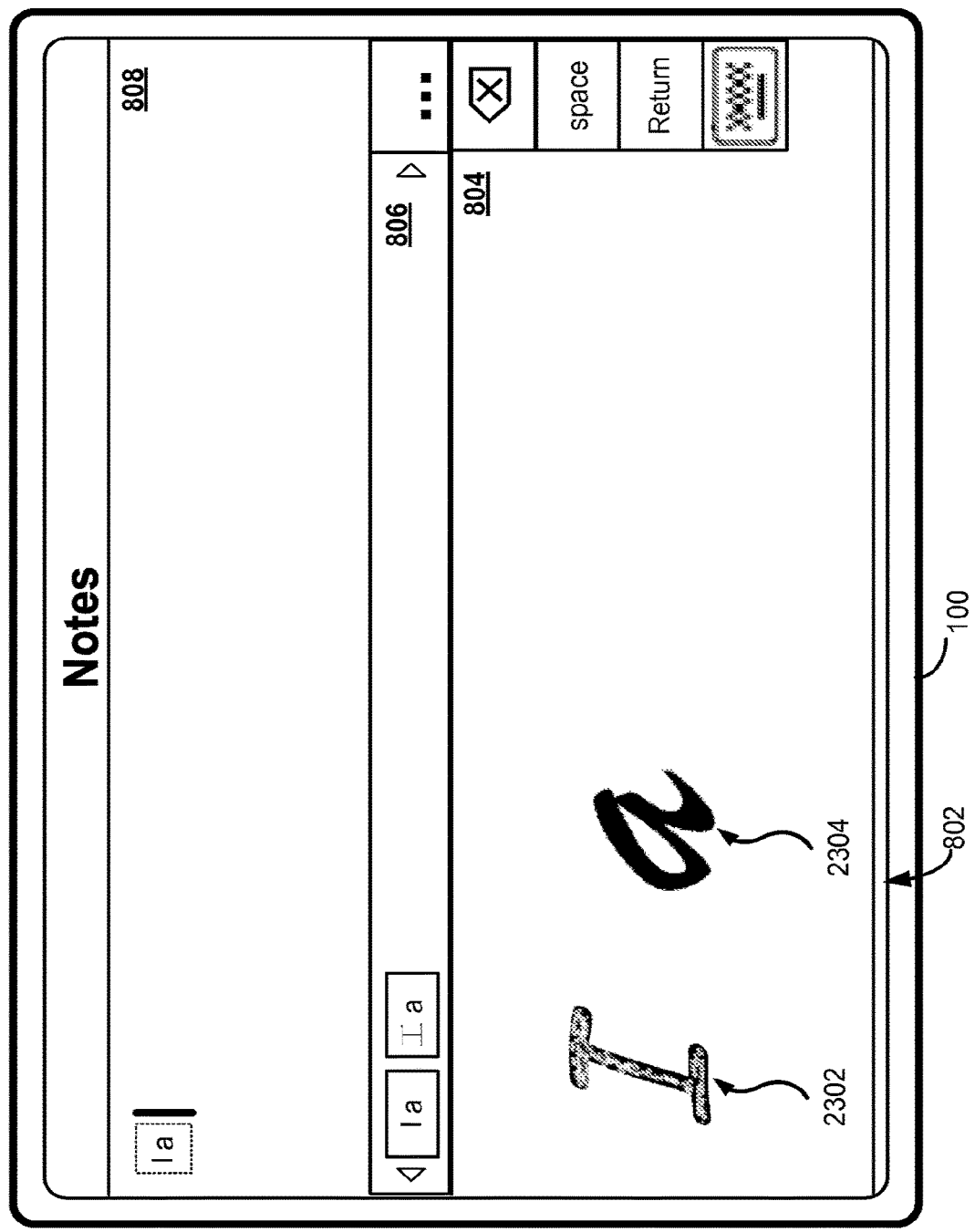

FIG. 23B shows that, when the user continues to write one or more strokes 2302 to the right of the strokes 2304, the handwritten strokes 2302 in the first recognition unit starts to fade out gradually in the handwriting input area 804. In some embodiments, an animation is displayed to mimic the gradual fading or dissipation of the visual rendering of the first recognition unit. For example, the animation may produce a visual effect of ink evaporating from a white board. In some embodiments, the fading of the recognition unit is not uniform across the entire recognition unit. In some embodiments, the fading of the recognition unit increases over time and eventually the recognition unit is completely invisible in the handwriting area. However, even though the recognition unit is no longer visible in the handwriting input area 804, in some embodiments, the invisible recognition unit remains at the top of the handwriting input stack, and the recognition results generated from the recognition unit continue to be displayed in the candidate display area. In some embodiments, a faded recognition unit is not completely removed from view until new handwriting input has been written over it.

In some embodiments, the user device allows new handwriting input to be provided over the region occupied by a faded recognition unit immediate upon the start of the fading animation. In some embodiments, the user device allows new handwriting input to be provided over the region occupied by a faded recognition unit only after the fading has progressed to a certain stage (e.g., to the faintest level or until the recognition is completely invisible in the region).

Figure 23C:
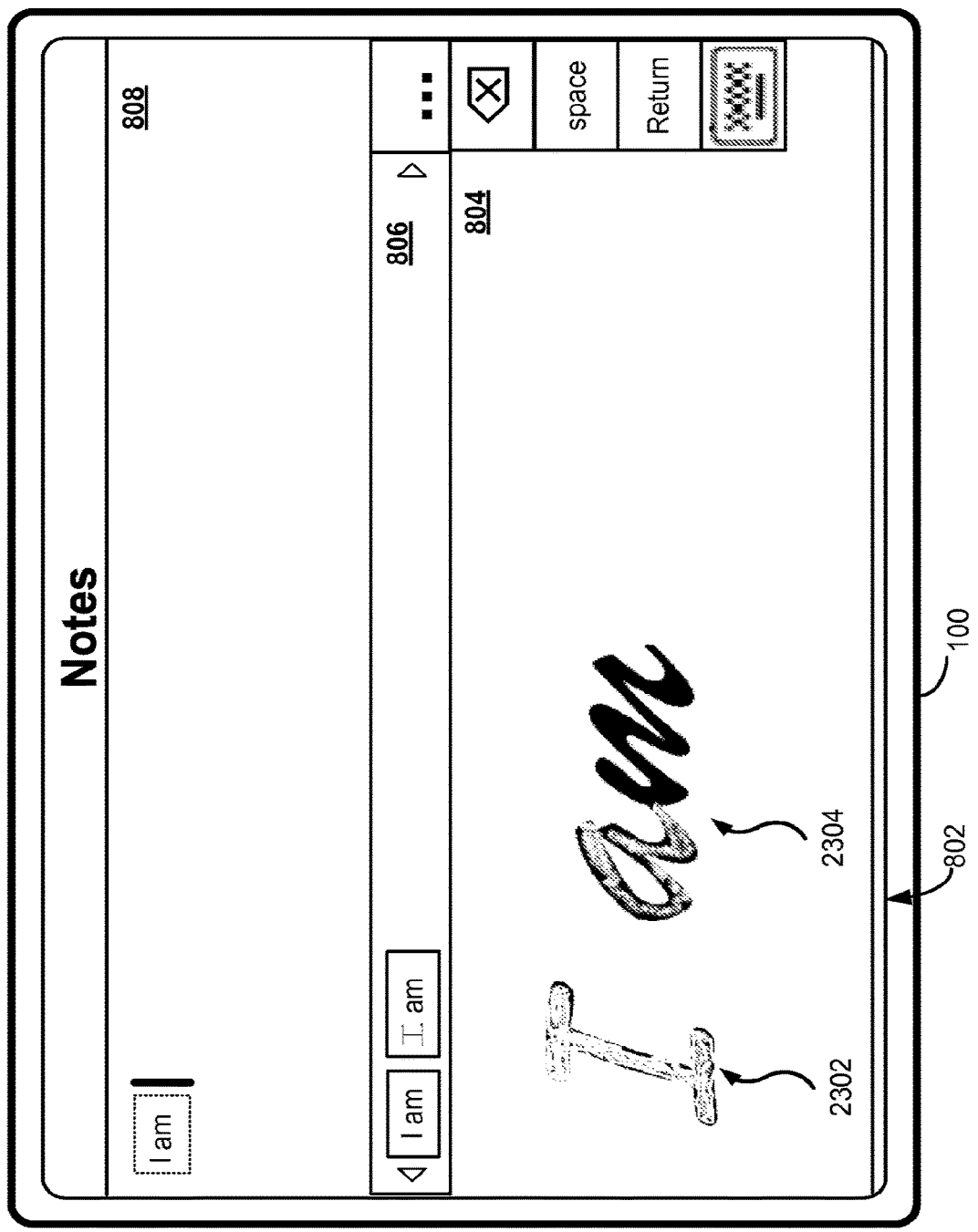

FIG. 23C shows that the first recognition unit (i.e., strokes 2302) has completed its fading process (e.g., the ink color has stabilized at very faint level or has become invisible). The user device has identified additional recognition units from the additional handwritten strokes provided by the user (e.g., the recognition units for the handwritten letters "a" and "m"), and updated the recognition results presented in the candidate display area 804.

Figure 23D:
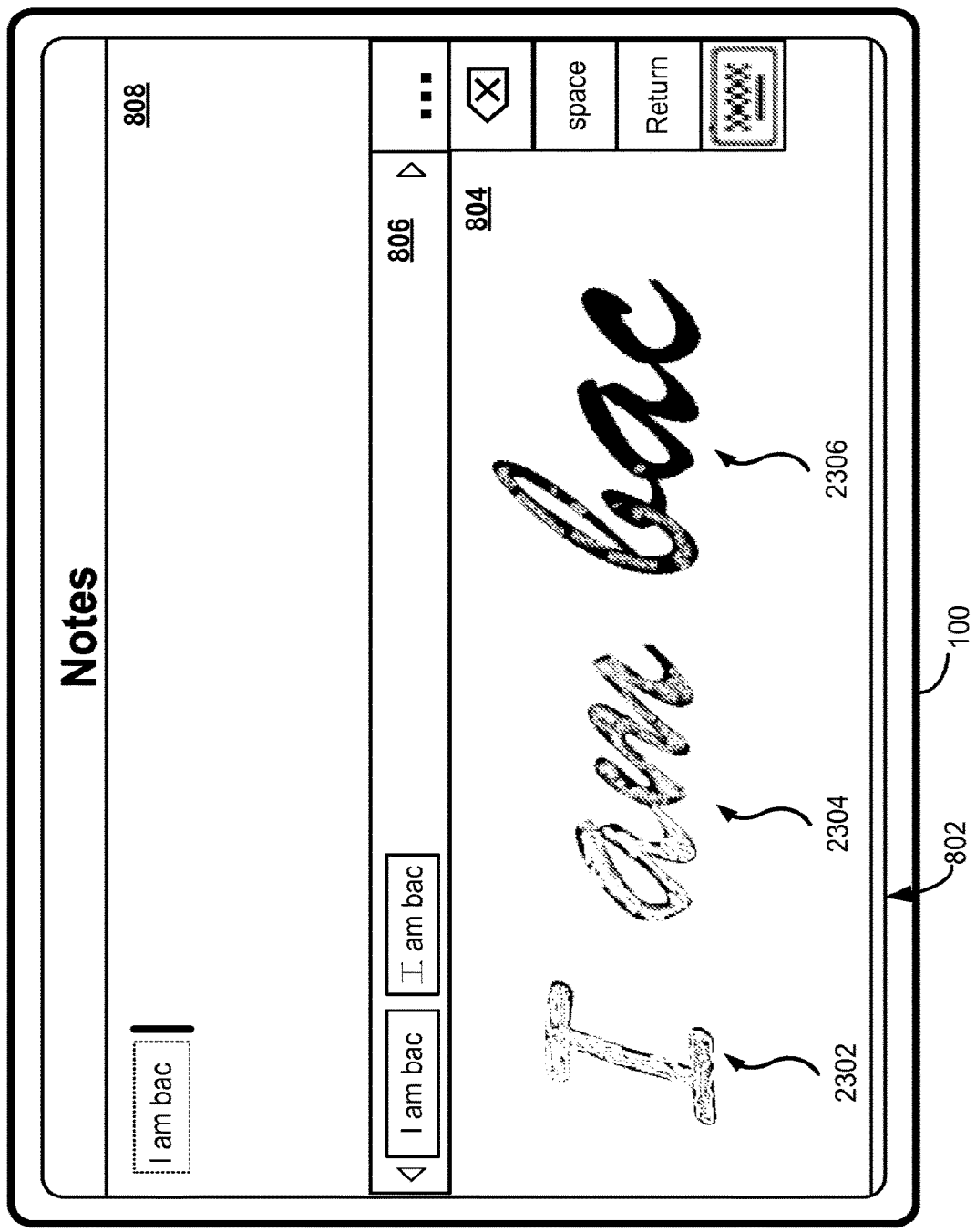
Figure 23E:
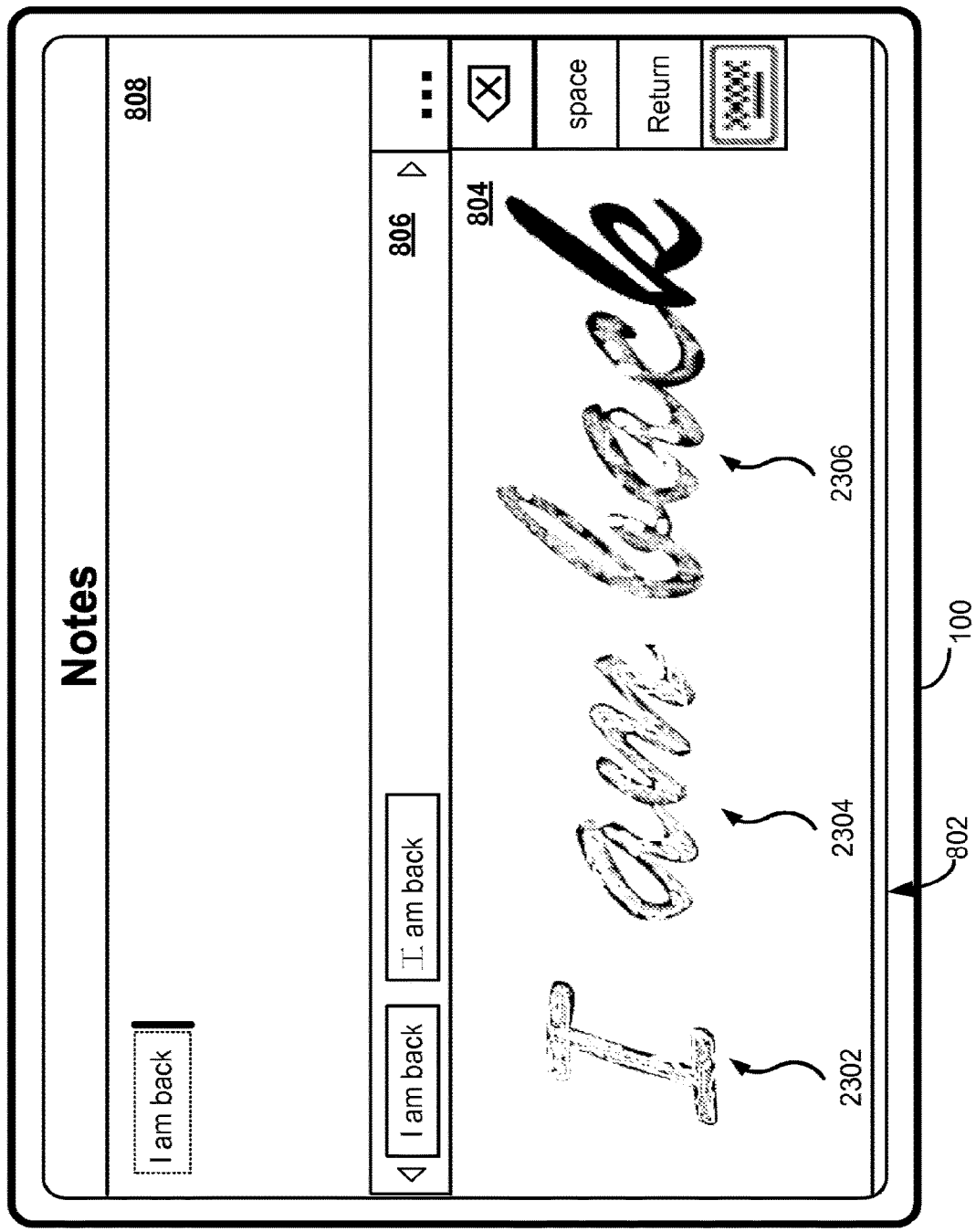
Figure 23F:
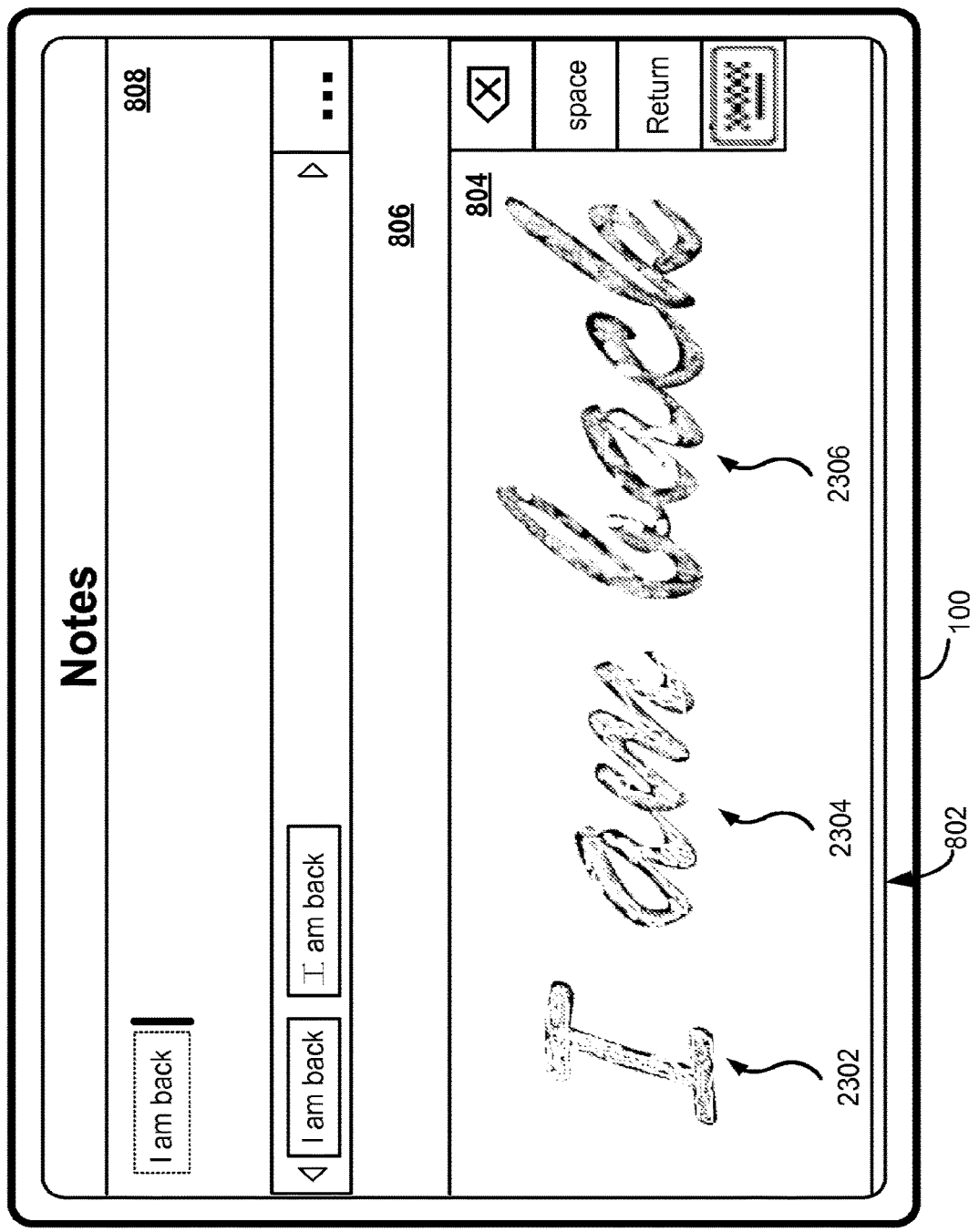

FIGS. 23D-23F illustrate that, as time goes on, and the user has provided a plurality of addition handwritten strokes (e.g., 2304 and 2306) in the handwriting input area 804. At the same time, the previously identified recognition units gradually fade away from the handwriting input area 804. In some embodiments, it takes a predetermined amount of time for each recognition unit to start its own fading process after the recognition unit has been identified. In some embodiments, the fading process for each recognition unit does not start until the user has started inputting a second recognition unit downstream from it. As shown in FIGS. 23B-23F, when the handwriting input is provided in a cursive style, a single stroke (e.g., stroke 2304 or stroke 2306) may run through multiple recognition units (e.g., recognition unit for each handwritten letter in the word "am" or "back") in the handwriting input area.

Figure 23G:
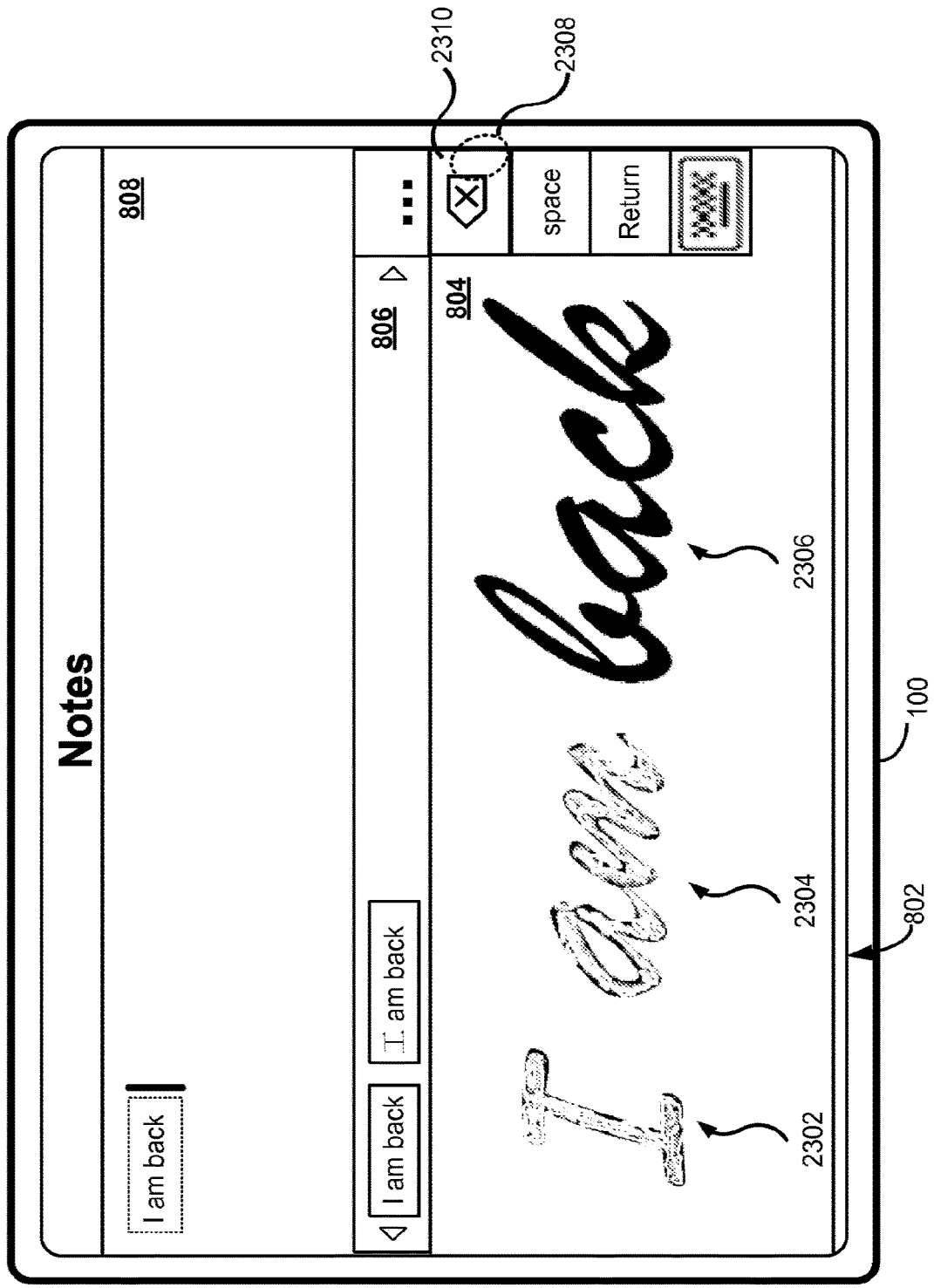

FIG. 23G illustrate that, even after a recognition unit has started its fading process, the user can bring it back to the un-faded state by a predetermined revival input, e.g., a tap gesture (e.g., as indicated by a contact 2308 followed by an immediate lift-off) on a delete button 2310. When the recognition units are revived, its appearance returns to the normal visibility level. In some embodiments, the revival of faded recognition units is made character-by-character in the reverse writing direction in the handwriting input area 804. In some embodiments, the revival of faded recognition units is made word-by-word in the handwriting input area 804. As shown in FIG. 23G, the recognition units corresponding to the word "back" has been revived from a completed faded state to a completely un-faded state. In some embodiments, the clock for starting the fading process is reset each recognition unit when the recognition unit is revived into the un-faded state.

Figure 23H:
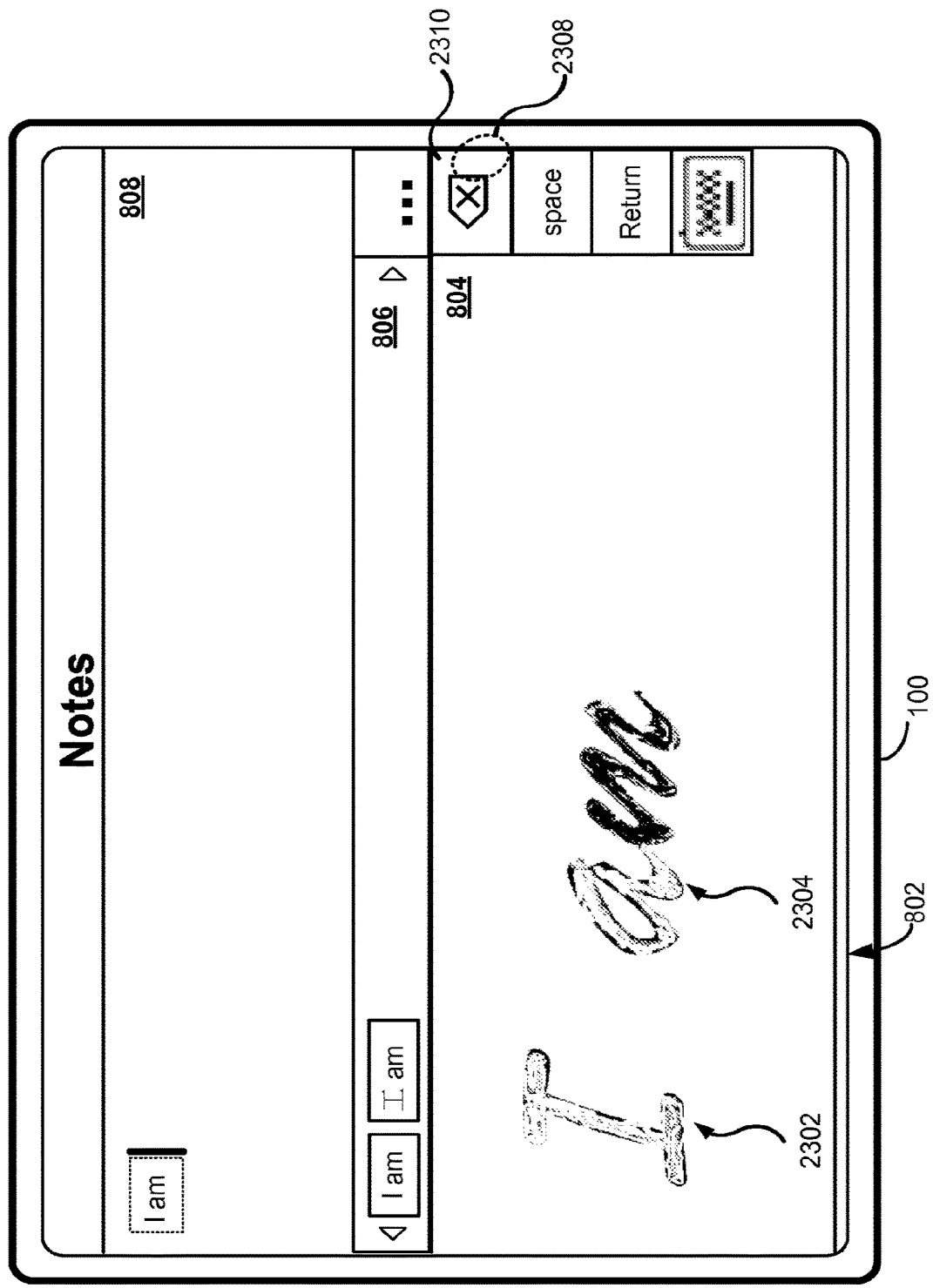

FIG. 23H shows that, a sustained contact on the delete button causes the last recognition unit (e.g., the recognition unit for the letter "k" in the word "back") in the default writing direction to be deleted from the handwriting input area 804. As the deletion input is continually maintained, more recognition units (e.g., the recognition units for the letters "c", "a", "b" in the word "back") are deleted one by one in the reverse writing direction. In some embodiments, the deletion of the recognition unit is word by word, and all letters of the handwritten word "back" is deleted from the handwriting input area 804 are removed at the same time. FIG. 23H also shows that, as the contact 2308 is maintained on the delete button 2310 after the deletion of the recognition unit for the letter "b" in the handwritten word "back", the previously faded recognition unit "m" is revived as well.

Figure 23I:
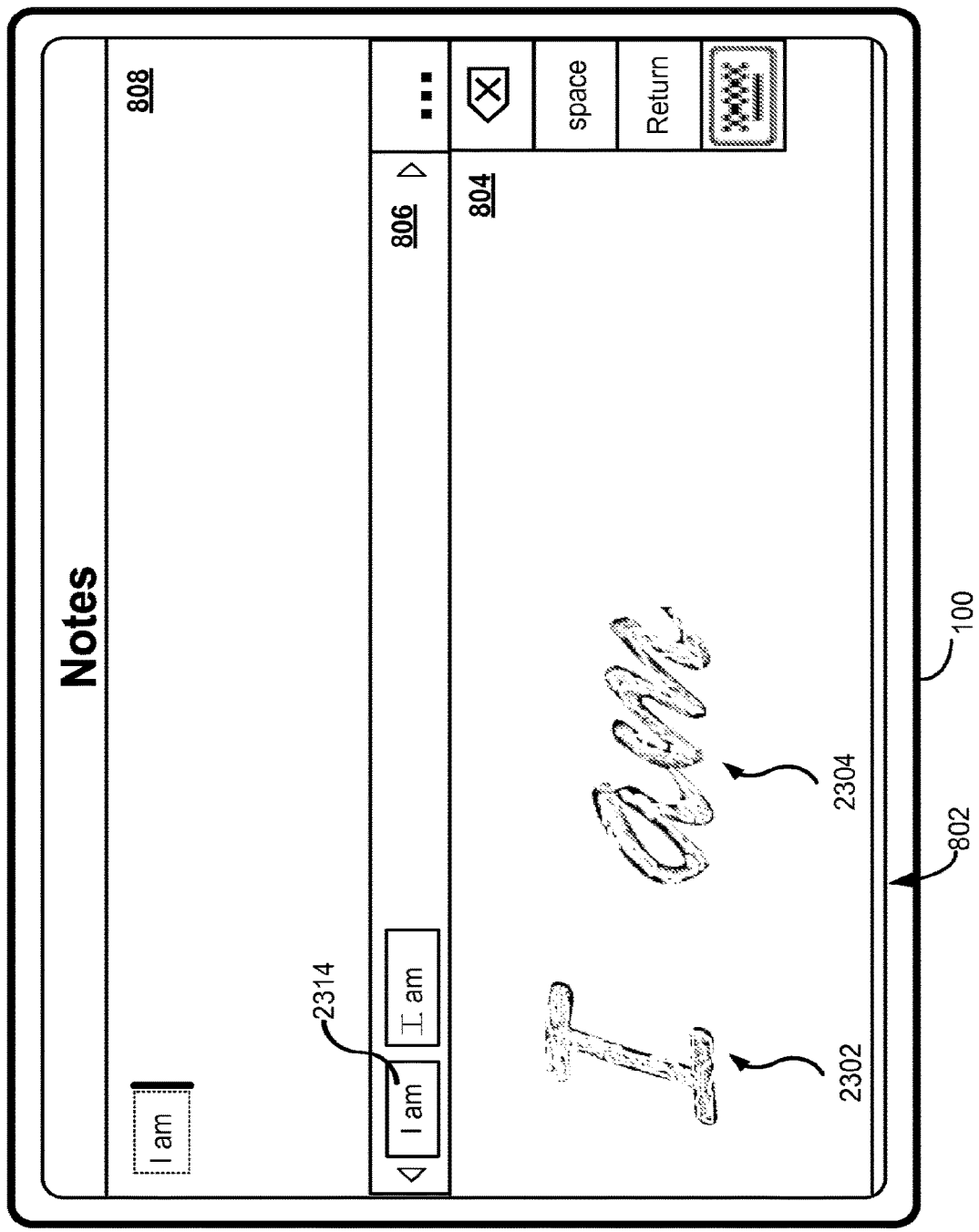

FIG. 23I shows that, if the delete input ceases before the deletion of the revived recognition unit "m" in the handwritten word "am" occurs, the revived recognition unit gradually fades again. In some embodiments, the state (e.g., a state selected from a set of one or more faded states and the un-faded state) of each recognition unit is maintained and updated in the handwriting input stack.

Figure 23J:
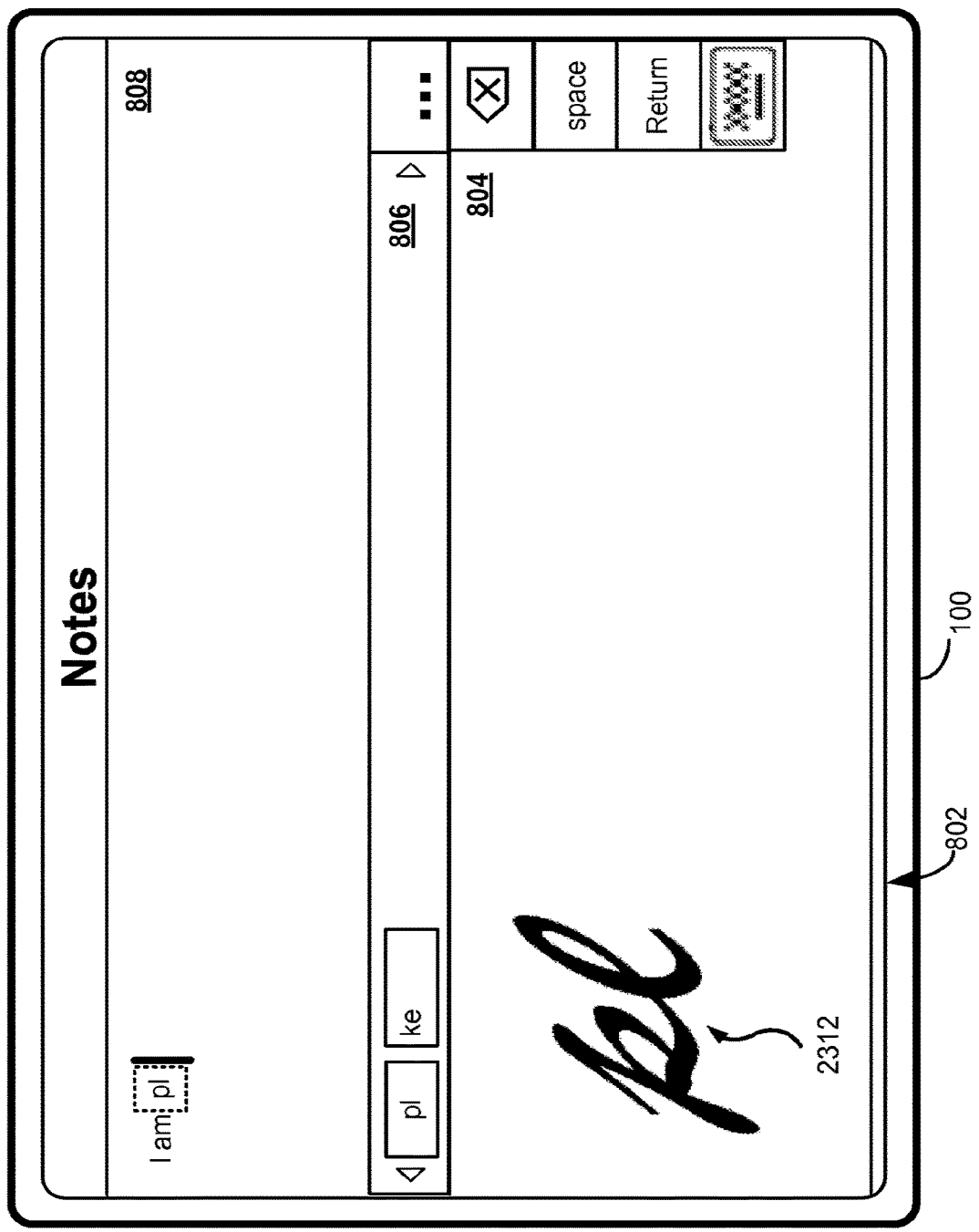

FIG. 23J illustrate that, when the user has provided one or more strokes 2312 over the area occupied by a faded recognition unit (e.g., the recognition unit for the letter "I") in the handwriting input area, in some embodiments, text of the top-ranked recognition result (e.g., result 2314) for the handwriting input made before the strokes 2312 are automatically entered into the text input area 808, as shown in FIGS. 23I-23J. As shown in FIG. 23J, the text "I am" is no longer shown as being tentative, but instead, has been committed in the text input area 808. In some embodiments, once a text input has been made for a fully or partially faded handwriting input, the handwriting input is removed from the handwriting input stack. The newly entered strokes (e.g., strokes 2312) become the current input in the handwriting input stack.

As shown in FIG. 23J, the text "I am" is no longer shown as being tentative, but instead, has been committed in the text input area 808. In some embodiments, once a text input has been made for a fully or partially faded handwriting input, the handwriting input is removed from the handwriting input stack. The newly entered strokes (e.g., strokes 2312) become the current input in the handwriting input stack.

In some embodiments, when the strokes 2312 is provided over the area occupied by a faded recognition unit (e.g., the recognition unit for the letter "I") in the handwriting input area, the text of the top-ranked recognition result (e.g., result 2314) for the handwriting input made before the strokes 2312 are not automatically entered into the text input area 808. Instead, the currently handwriting input (both faded and un-faded) in the handwriting input area 804 is cleared, and cached in the handwriting input stack. The new strokes 2312 appended to the cached handwriting input in the handwriting input stack. The user device determines the recognition results based on the entirety of the handwriting input currently accumulated in the handwriting input stack. The recognition results are displayed in the candidate display area. In other words, even though only a part of the currently accumulated handwriting input is shown in the handwriting input area 804, the recognition results are generated based on the entire handwriting input cached in the handwriting input stack (both the portion that is visible and the portions that are no longer visible).

Figure 23K:
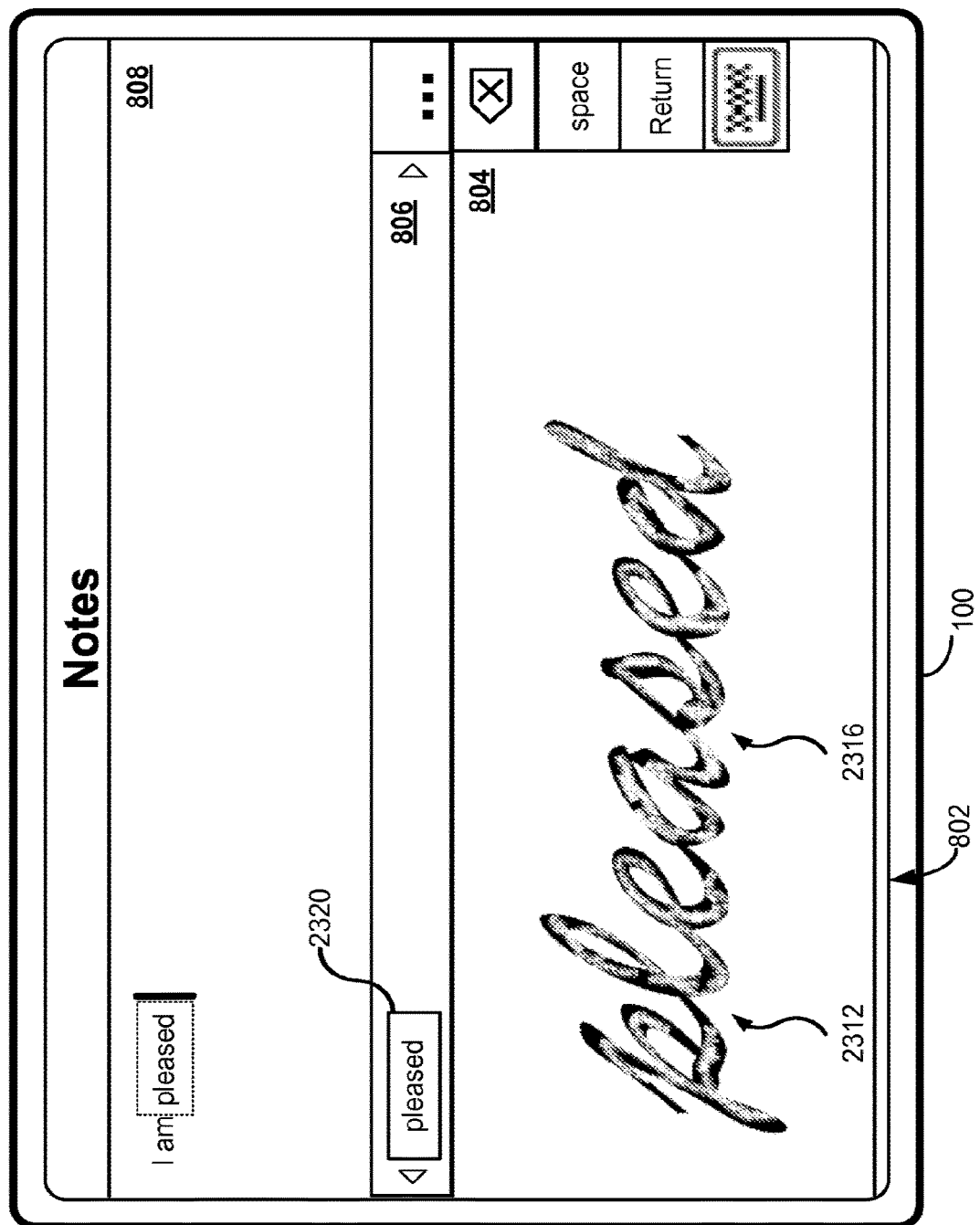
Figure 23L:
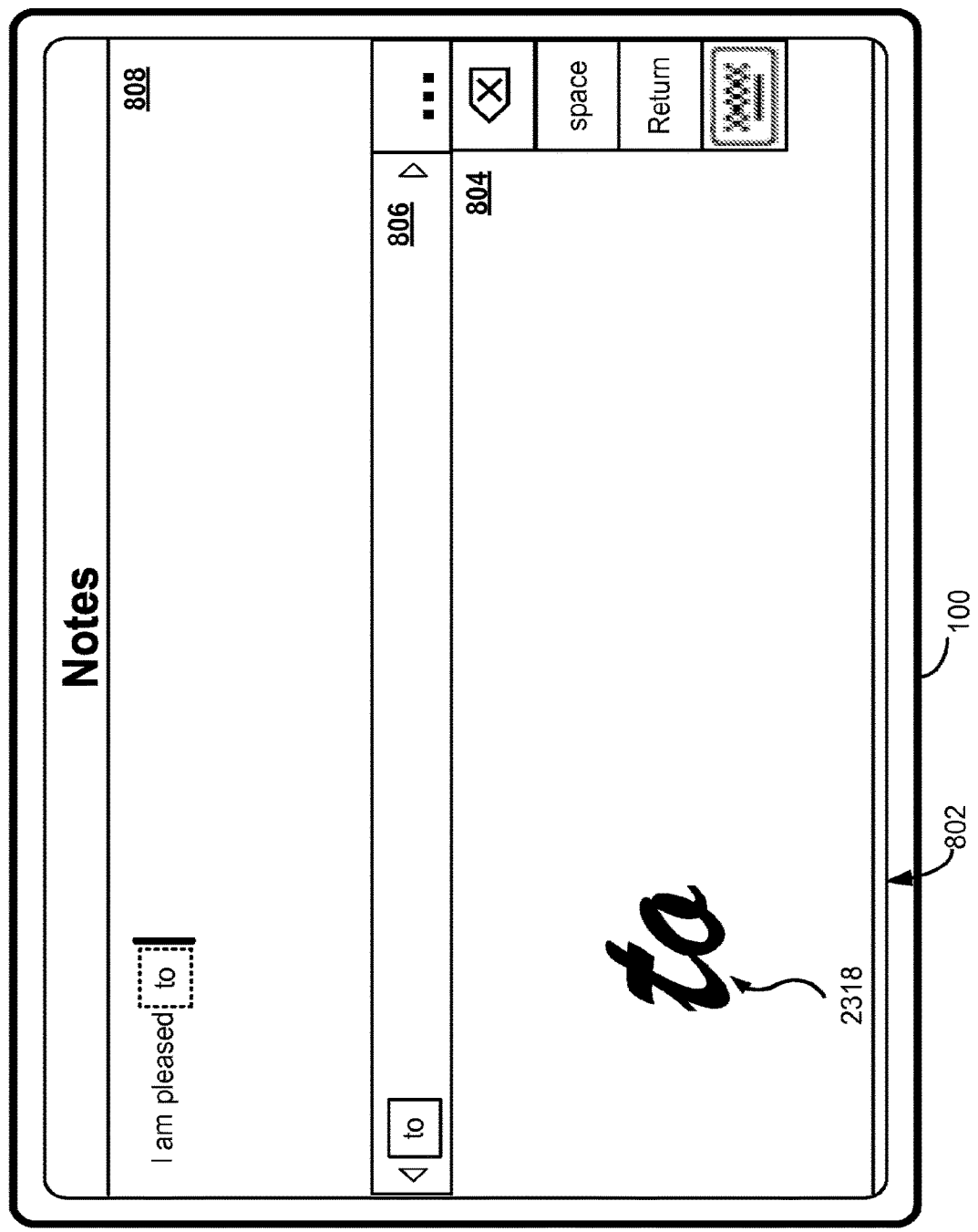

FIG. 23K shows that the user has entered more strokes 2316 in the handwriting input area 804, which has become faded over time. FIG. 23L shows that a new stroke 2318 written over the faded strokes 2312 and 2316, has caused text of the top recognition result 2320 for the faded strokes 2312 and 2316 to be entered into the text input area 808.

In some embodiments, the user optionally provides a handwriting input in multiple lines. In some embodiments, the same fading process can be used to clear the handwriting input area for a new handwriting input, when multi-line input is enabled.

Figure 24A:
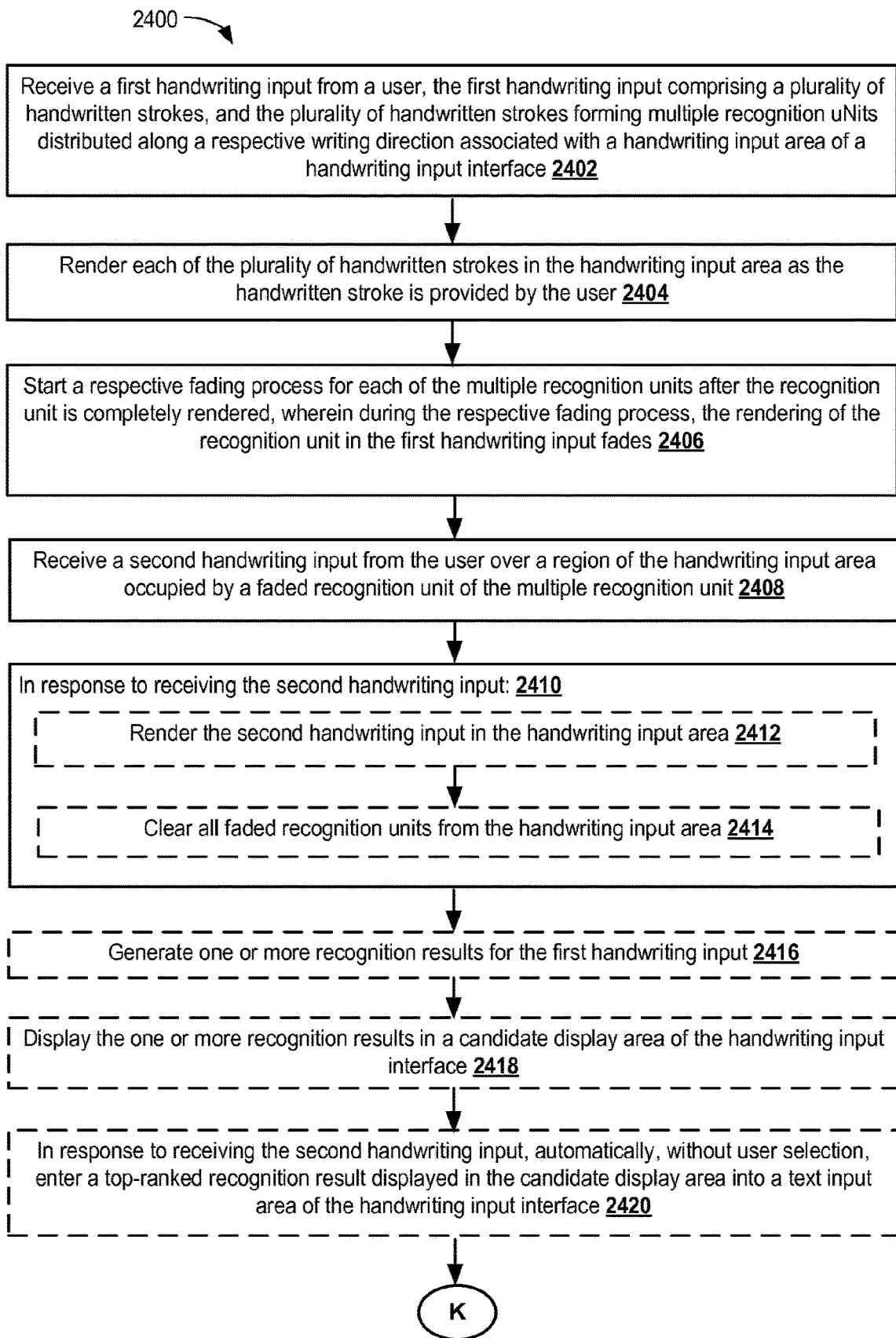
FIGS. 24A-24B are flow charts of an exemplary process for utilizing a new handwriting input provided over an existing handwriting input in the handwriting input area as an implicit confirmation input for entering a recognition result displayed for the existing handwriting input, in accordance with some embodiments.
Figure 24B:
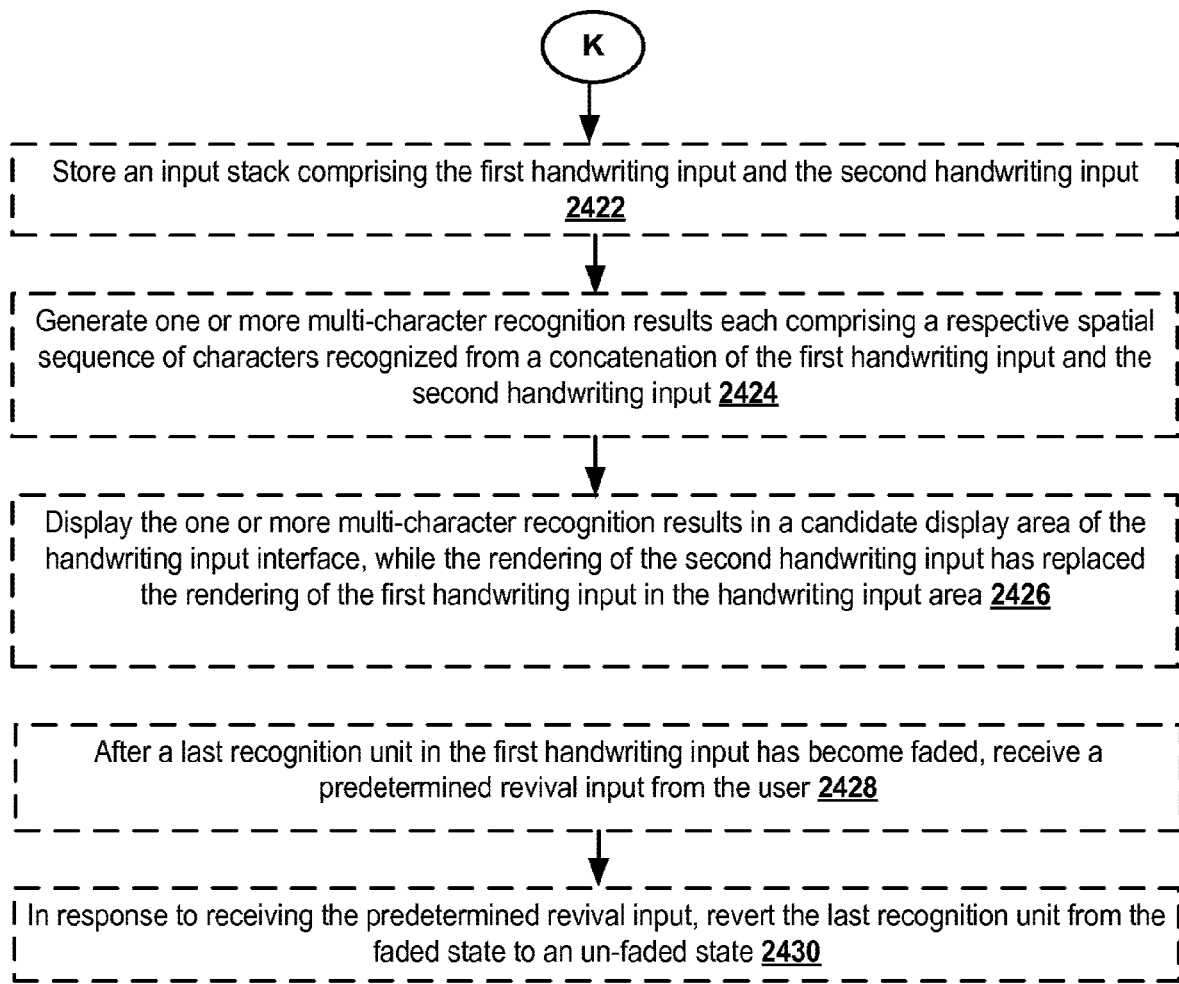

FIGS. 24A-24B are flow charts of an exemplary process 2400 for providing a fading process in the handwriting input area of a handwriting input interface. FIGS. 23A-23K illustrate the process 2400 in accordance with some embodiments.

In some embodiments, the device receives (2402) a first handwriting input from a user. The first handwriting input includes a plurality of handwritten strokes, and the plurality of handwritten strokes form multiple recognition units distributed along a respective writing direction associated with a handwriting input area of a handwriting input interface. In some embodiments, the user device renders (2404) each of the plurality of handwritten strokes in the handwriting input area as the handwritten stroke is provided by the user.

In some embodiments, the user device starts (2406) a respective fading process for each of the multiple recognition units after the recognition unit is completely rendered. In some embodiments, during the respective fading process, the rendering of the recognition unit in the first handwriting input fades away. This is illustrated in FIGS. 23A-23F in accordance with some embodiments.

In some embodiments, the user device receives (2408) a second handwriting input from the user over a region of the handwriting input area occupied by a faded recognition unit of the multiple recognition unit, e.g., as illustrated in FIGS. 23I-23J, and 23K-23L. In some embodiments, in response to receiving the second handwriting input (2410): the user device renders (2412) the second handwriting input in the handwriting input area and clears (2414) all faded recognition units from the handwriting input area. In some embodiments, all recognition units that were entered in the handwriting input area before the second handwriting input are cleared from the handwriting input area, regardless of whether the recognition unit has started its fading process. This is illustrated in FIGS. 23I-23J, and 23K-23L, for example.

In some embodiments, the user device generates (2416) one or more recognition results for the first handwriting input. In some embodiments, the user device displays (2418) the one or more recognition results in a candidate display area of the handwriting input interface. In some embodiments, in response to receiving the second handwriting input, the user device, automatically, without user selection, enters (2420) a top-ranked recognition result displayed in the candidate display area into a text input area of the handwriting input interface. This is illustrated in FIGS. 23I-23J and 23K-23L, for example.

In some embodiments, the user device stores (2422) an input stack including the first handwriting input and the second handwriting input. In some embodiments, the user device generates (2424) one or more multi-character recognition results each comprising a respective spatial sequence of characters recognized from a concatenation of the first handwriting input and the second handwriting input. In some embodiments, the user device displays (2426) the one or more multi-character recognition results in a candidate display area of the handwriting input interface, while the rendering of the second handwriting input has replaced the rendering of the first handwriting input in the handwriting input area.

In some embodiments, the respective fading process for each recognition unit is started when a predetermined time period has elapsed after the recognition unit is completed by the user.

In some embodiments, fading process for each recognition unit is started when the user has started inputting the strokes for a next recognition unit after the recognition unit.

In some embodiments, an end state of the respective fading process for each recognition unit is a state with a predetermined minimum visibility for the recognition unit.

In some embodiments, an end state of the respective fading process for each recognition unit is a state with zero visibility for the recognition unit.

In some embodiments, after a last recognition unit in the first handwriting input has become faded, the user device receives (2428) a predetermined revival input from the user. In response to receiving the predetermined revival input, the user device reverts (2430) the last recognition unit from the faded state to an un-faded state. This is illustrated in FIGS. 23F-23H, for example. In some embodiments, the predetermined revival input is an initial contact detected on a deletion button provided in the handwriting input interface. In some embodiments, a sustained contact detected on the deletion button deletes the last recognition unit from the handwriting input area and revives the second to last recognition unit from the faded state to the un-faded state. This is illustrated in FIGS. 23G-23H, for example.

As described herein, the multi-script handwriting recognition model performs stroke-order independent, and stroke-direction independent recognition of handwritten characters. In some embodiments, the recognition model is trained on only spatially-derived features contained in flat images of writing samples corresponding to different characters in the vocabulary of the handwriting recognition model. Since the images of the writing sample do not contain any temporal information related to individual strokes contained in the images, the resulting recognition model is stroke-order independent and stroke-direction independent.

As illustrated above, stroke-order and stroke-direction independent handwriting recognition provide many advantages over conventional recognition systems that rely on information related to the temporal generation of the characters (e.g., temporal sequences of strokes in the characters). However, in real-time handwriting recognition scenarios, temporal information related to individual strokes is available, and it is sometimes beneficial to utilize this information to improve recognition accuracy of the handwriting recognition system. The follow describe a technique that integrates temporally-derived stroke-distribution information into the spatial feature extraction of a handwriting recognition model, where the use of the temporally-derived stroke-distribution information does not destroy the stroke-order and/or stroke direction independence of the handwriting recognition system. Based on the stroke-distribution information related to different characters, disambiguation between similar-looking characters that are produced with distinctively different set of strokes becomes possible.

In some embodiments, when a handwriting input is converted to an input image (e.g., an input bitmap image) for the handwriting recognition model (e.g., a CNN), the temporal information associated with individual strokes is lost. For example, for a Chinese character "滑", eight strokes (e.g., labeled #1-#8 in FIG. 27) can be used to write out the Character. The sequence and direction of the strokes for the character provides some unique features associated with the character. A naïve way to capture the stroke-order and stroke-direction information, without destroying the stroke-order and stroke-direction independence of the recognition system is to explicitly enumerate all possible permutations in stroke order and stroke direction in the training samples. But even for a character of only moderate complexity, this would amount to over one billion possibilities, which makes it unfeasible if not impossible to implement in practice. As described herein, a stroke-distribution profile is generated for each writing sample, which abstract out the chronological aspects of stroke generation (i.e., temporal information). The stroke-distribution profiles of writing samples are trained to extract a set of temporally-derived features which are subsequently combined with the spatially-derived features (e.g., from input bitmap images), to improve recognition accuracy without impacting the stroke-order and stroke direction independence of the handwriting recognition system.

As described herein, the temporal information associated with a character is extracted by computing a variety of pixel distributions to characterize each handwritten stroke. Every handwritten stroke of a character gives rise to a deterministic pattern (or profile) when projected onto a given direction. While this pattern in and of itself may be insufficient to recognize the stroke unambiguously, when combined with other similar patterns, it may be adequate to capture certain characteristics inherent to this particular stroke. Integrating this kind of stroke representation alongside spatial feature extraction (e.g., feature extraction based on input images in a CNN) in turn provides orthogonal information that can be useful to disambiguate between similar-looking characters in the repertoire of the handwriting recognition model.

FIGS. 25A-25B are flow charts of an exemplary process 2500 for integrating temporally-derived features and spatially-derived features of handwriting samples during training of a handwriting recognition model, where the resulting recognition model remains stroke-order and stroke direction independent. In some embodiments, the exemplary process 2500 is performed on a server device that provides the trained recognition model to a user device (e.g., a portable device 100). In some embodiments, the server device includes one or more processors and memory containing instructions for performing the process 2500 when executed by the one or more processors.

In the exemplary process 2500, the device separately trains (2502) a set of spatially-derived features and a set of temporally-derived features of a handwriting recognition model, where the set of spatially-derived features are trained on a corpus of training images each being an image of a handwriting sample for a respective character of an output character set, and the set of temporally-derived features are trained on a corpus of stroke-distribution profiles, each stroke-distribution profile numerically characterizing a spatial distribution of a plurality of strokes in a handwriting sample for a respective character of the output character set.

Figure 26:
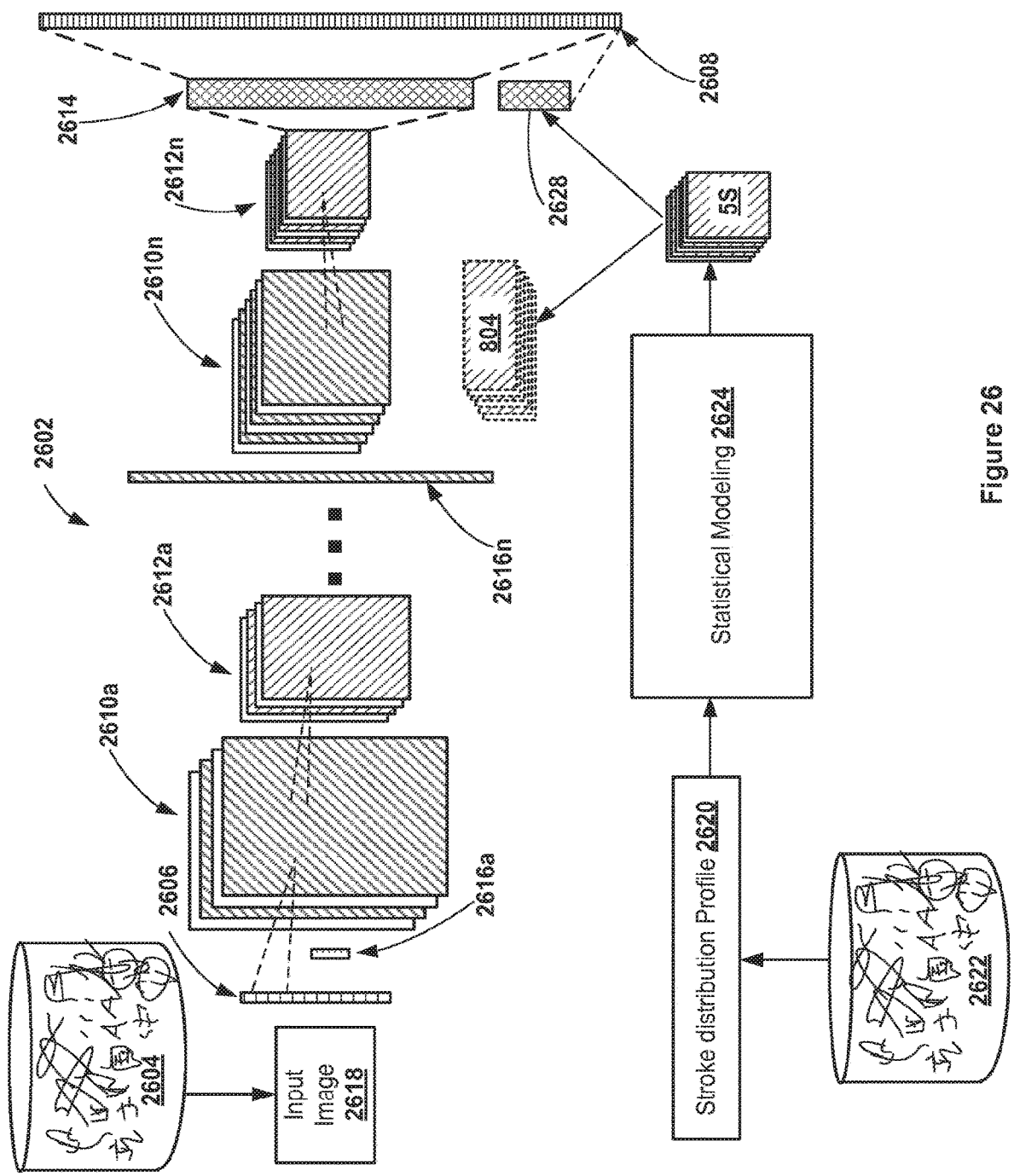
FIG. 26 is a block diagram illustrating separate training and subsequent integration of spatially-derived features and temporally-derived features of an exemplary handwriting recognition system in accordance with some embodiments.

In some embodiments, separately training the set of spatially-derived features further includes (2504) training a convolutional neural network having an input layer, an output layer, and a plurality of convolutional layers including a first convolutional layer, a last convolutional layer, zero or more intermediate convolutional layers between the first convolutional layer and the last convolutional layer, and a hidden layer between the last convolutional layer and the output layer. An exemplary convolutional network 2602 is shown in FIG. 26. The exemplary convolutional network 2602 can be implemented in substantially the same way as the convolutional network 602 shown in FIG. 6. The convolutional network 2602 includes an input layer 2606, an output layer 2608, a plurality of convolutional layers including a first convolutional layer 2610a, zero or more intermediate convolutional layers, and a last convolutional layer 2610n, and a hidden layer 2614 between the last convolutional layer and the output layer 2608. The convolutional network 2602 also includes kernel layers 2616 and sub-sampling layers 2612 in accordance with the arrangement shown in FIG. 6. The training of the convolutional network is based on images 2618 of writing samples in the training corpus 2604. Spatially-derived features are obtained and respective weights associated with the different features are determined by minimizing the recognition errors for the training samples in the training corpus. The same features and weights, once trained, are used for recognition of new handwriting samples not present in the training corpus.

In some embodiments, separately training the set of temporally-derived features further includes (2506) providing the plurality of stroke-distribution profiles to a statistical model to determine a plurality of temporally-derived parameters and respective weights for the plurality of temporally-derived parameters for classifying the respective characters of the output character set. In some embodiments, as shown in FIG. 26, a stroke-distribution profile 2620 is derived from each writing sample in a training corpus 2622. The training corpus 2622 optionally includes the same writing samples as the corpus 2604, but also includes temporal information associated with stroke generation in each writing sample. The stroke-distribution profiles 2622 are provided to a statistical modeling process 2624, during which temporally-derived features are extracted and respective weights for the different features are determined by minimizing a recognition or classification error based on a statistical modeling method (e.g., a CNN, K-Nearest Neighbor, etc.). As shown in FIG. 26, the set of temporally derived features and respective weights are converted to a set of feature vectors (e.g., feature vectors 2626 or feature vectors 2628) and injected into a respective layer in the convolutional neural network 2602. The resulting network thus includes spatially-derived parameters and temporally-derived parameters that are orthogonal to each other, and together contribute to the recognition of characters.

In some embodiments, the device combines (2508) the set of spatially-derived features and the set of temporally-derived features in the handwriting recognition model. In some embodiments, combining the set of spatially-derived features and the set of temporally-derived features in the handwriting recognition model includes (2510) injecting the plurality of spatially-derived parameters and the plurality of temporally-derived parameters into one of the convolutional layers or the hidden layer of the convolutional neural network. In some embodiments, the plurality of temporally-derived parameters and respective weights for the plurality temporally-derived parameters are injected into the last convolutional layer (e.g., the last convolutional layer 2610n in FIG. 26) of the convolutional neural network for handwriting recognition. In some embodiments, the plurality of temporally-derived parameters and respective weights for the plurality temporally-derived parameters are injected into the hidden layer (e.g., the hidden layer 2614 in FIG. 26) of the convolutional neural network for handwriting recognition.

In some embodiments, the device provides (2512) real-time handwriting recognition for a user's handwriting input using the handwriting recognition model.

In some embodiments, the device generates (2514) the corpus of stroke-distribution profiles from a plurality writing samples. In some embodiments, each of the plurality of handwriting samples corresponds (2516) to a character in the output character set and separately preserves respective spatial information for each constituent stroke of the handwriting sample as it was written. In some embodiments, to generate the corpus of stroke-distribution profiles, the device performs (2518) the following steps:

For each of the plurality of handwriting samples (2520): the device identifies (2522) constituent strokes in the handwriting sample; for each of the identified strokes of the handwriting sample, the device calculates (2524) a respective occupancy ratio along each of a plurality of predetermined directions, occupancy ratio being a ratio between a projected span of said each stroke direction and a maximum projected span of said writing sample; for each of the identified strokes of the handwriting sample, the device also calculates (2526) a respective saturation ratio for said each stroke based on a ratio between a respective number of pixels within said each stroke and an overall number of pixels within said writing sample. The user device then generates (2528) a feature vector for the handwriting sample as the stroke-distribution profile of the writing sample, the feature vector including the respective occupancy ratios and the respective saturation ratio of at least N strokes in the handwriting sample, wherein N is a predetermined natural number. In some embodiments, N is less than a maximum stroke count observed in any single writing sample within the plurality of writing samples.

In some embodiments, for each of the plurality of handwriting samples: the device sorts the respective occupancy ratios of the identified strokes in each of the predetermined directions in a descending order; and includes only N top-ranked occupancy ratios and saturation ratios of writing sample in the feature vector of the writing sample.

In some embodiments, the plurality of predetermined directions include a horizontal direction, a vertical direction, a positive 45 degree direction, and a negative 45 degree direction of the writing sample.

In some embodiments, to provide real-time handwriting recognition for a user's handwriting input using the handwriting recognition model, the device receives the user's handwriting input; and in response to receiving the user's handwriting input, provides a handwriting recognition output to the user substantially contemporaneously with the receipt of the handwriting input.

Figure 27:
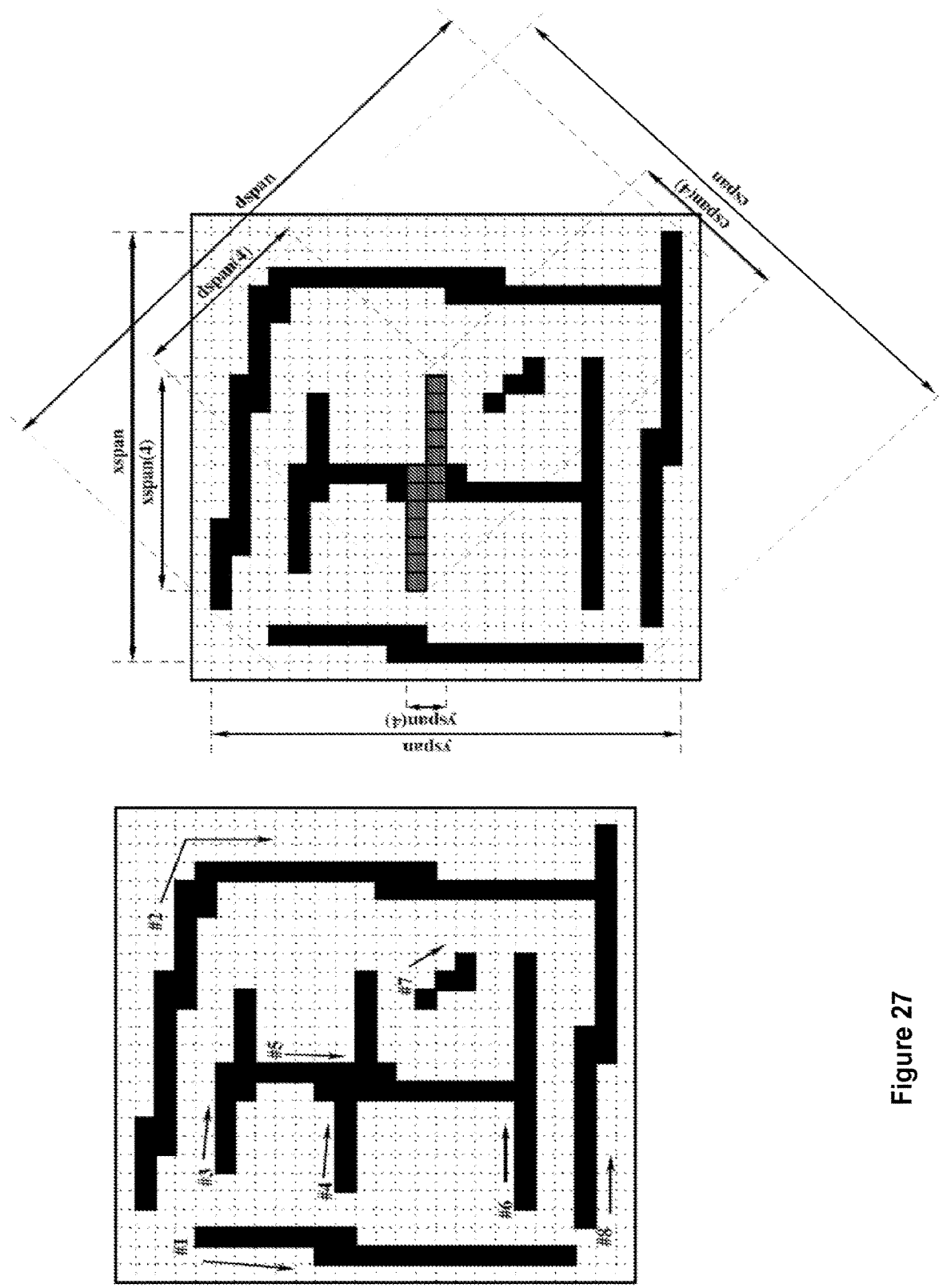
FIG. 27 is a block diagram illustrating an exemplary method for computing the stroke distribution profile of a character.

Using the character "慢" shown in FIG. 27, an exemplary embodiment is described herein for illustrative purposes. In some embodiments, each input image of a handwritten character is optionally normalized into a square. The span of each individual handwritten stroke (e.g., stroke #1, #2, . . . , and #8) is measured when projected onto the horizontal, vertical, the +45 degree diagonal, and the −45 degree diagonal of the square. The spans of each stroke Si are recorded as xspan(i), yspan(i), cspan(i), and dspan(i), respectively, for the four projection directions. In addition, the maximum spans observed across the entire image is also recorded. The maximum spans of character are recorded as xspan, yspan, cspan, and dspan, respectively, for the four projection directions. For illustrative purposes, four directions of projection are optionally considered here, although in principle any arbitrary set of projections may be used in various embodiments. The maximum spans (e.g., denoted as xspan, yspan, cspan, and dspan), and the spans (e.g., denoted as xspan(4), yspan(4), cspan(4), and dspan(4)) of one of the strokes (e.g., stroke #4) in the character "﹡" in the four projection directions are shown in FIG. 27.

In some embodiments, once the above spans have been measured for all strokes 1 through 5, where 5 is the number of individual handwritten strokes associated with the input image, the respective occupancy ratio along each projection direction is computed. For example, the respective occupancy ratio $R_x(i)$ along the x-direction for the stroke $S_i$ is calculated as $R_x(i)$=xspan (i)/xspan. Similarly, the respective occupancy ratios along the other projection directions can be calculated, $R_y(i)$=yspan (i)/yspan, $R_c(i)$=cspan (i)/cspan, $R_d(i)$=dspan (i)/dspan.

In some embodiments, the occupancy ratios of all strokes in each direction is sorted separately in decreasing order, and a respective ranking of all strokes in the input image is thus obtained for each projection direction in terms of their occupancy ratios in that direction. The ranking of strokes in each projection direction reflects the relative importance of each stroke along the associated projection direction. This relative importance is irrespective of the order and the direction by which the stroke has been produced in the writing sample. Thus, this ranking based on occupancy ratios is temporally-derived information that is stroke-order and stroke-direction independent.

In some embodiments, a relative weight is given to each stroke, indicating the importance of the stroke relative to the entire character. In some embodiments, the weight is measured by the ratio of the number of pixels in each stroke to the overall number of pixels in the character. This ratio is referred to as a saturation ratio associated with each stroke.

In some embodiments, based on the occupancy ratios and saturation ratio of each stroke, a feature vector can be created for each stroke. For each character, a set of feature vectors including 5S number of features is created. This set of features is referred to as a stroke-distribution profile of the character.

In some embodiments, only a predetermined number of top-ranked strokes are used in constructing the stroke-distribution profile of each character. In some embodiments, the predetermined number of strokes is 10. Based on the top ten strokes, 50 stroke-derived features can be generated for each character. In some embodiments, these features are injected either at the last convolutional layer of a convolutional neural network, or at the subsequent hidden layer.

In some embodiments, during real-time recognition, an input image of a recognition unit is provided to the handwriting recognition mode that has been trained with both the spatially-derived features and the temporally-derived features. The input image is processed through each layer of the handwriting recognition model shown in FIG. 26. When the processing of the input image reaches the layer (e.g., the last convolutional layer or the hidden layer) in which the stroke-distribution profile input is needed, the stroke-distribution profile of the recognition unit is injected into that layer. The processing of the input image and the stroke-distribution profile continues until an output classification (e.g., one or more candidate characters) is provided in output layer 2608. In some embodiments, the stroke-distribution profiles of all recognition units are computed, and provided to the handwriting recognition model as input, together with the input images of the recognition units. In some embodiments, the input image of a recognition unit goes through the handwriting recognition model (without the benefit of the temporally-trained features) initially. When two or more similar-looking candidate characters are identified with close recognition confidence values, the stroke-distribution profiles of the recognition unit is then injected into the handwriting recognition model at the layer that has been trained with the temporally-derived features (e.g., the last convolutional layer, or the hidden layer). When the input image and the stroke-distribution profile of the recognition unit passes through the last layers of the handwriting recognition model, the two or more similar-looking candidate characters can be better differentiated due to the differences in their stroke-distribution profiles. Thus, temporally-derived information related to how the recognition unit is formed by individual handwritten strokes is used to improve recognition accuracy, without compromising the stroke-order and stroke-direction independence of the handwriting recognition system.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a device with a display and a touch-sensitive surface:
        receiving, via the touch-sensitive surface, a handwriting input from a user, the handwriting input comprising a plurality of handwritten strokes provided in a handwriting input area of a handwriting input interface;
        recognizing, based on a handwriting recognition model, a plurality of output characters from the handwriting input, the plurality of output characters including at least a first emoji character and at least a first character from a script of a natural human language; and
        displaying, on the display, a first recognition result comprising the first emoji character and the first character from the script of the natural human language in a candidate display area of the handwriting input interface.

2. The method of claim 1, further comprising:
    based on the handwriting recognition model, recognizing at least a first semantic unit from the handwriting input, wherein the first semantic unit comprises a respective character, word or phrase that is capable of conveying a respective semantic meaning in a respective human language;
    identifying a second emoji character associated with the first semantic unit recognized from the handwriting input; and
    displaying, in the candidate display area of the handwriting input interface, a second recognition result comprising at least the second emoji character identified from the first semantic unit.

3. The method of claim 2, wherein displaying the second recognition result further comprises:
concurrently displaying the second recognition result with a third recognition result comprising at least the first semantic unit.

4. The method of claim 1, further comprising:
receiving a user input selecting the first recognition result displayed in the candidate display area; and
in response to the user input, entering text of the selected first recognition result in a text input area of the handwriting input interface, wherein the text includes at least the first emoji character and the first character from the script of the natural human language.

5. The method of claim 1, wherein the handwriting recognition model has been trained on a multi-script training corpus comprising writing samples corresponding to characters of at least three non-overlapping scripts, and the three non-overlapping scripts includes a set of emoji characters, Chinese characters, and Latin script.

6. The method of claim 1, further comprising:
identifying a second semantic unit corresponding to the first emoji character recognized from the handwriting input;
displaying, in the candidate display area of the handwriting input interface, a fourth recognition result comprising at least the second semantic unit identified from the first emoji character.

7. The method of claim 6, wherein displaying the fourth recognition result further comprises:
concurrently displaying the fourth recognition result with the first recognition result in the candidate display area.

8. A non-transitory computer-readable medium storing one or more programs configured to be executed by one or more processors of an electronic device with a display and a touch-sensitive surface, the one or more programs including instructions for:
receiving, via the touch-sensitive surface, a handwriting input from a user, the handwriting input comprising a plurality of handwritten strokes provided in a handwriting input area of a handwriting input interface;
recognizing, based on a handwriting recognition model, a plurality of output characters from the handwriting input, the plurality of output characters including at least a first emoji character and at least a first character from a script of a natural human language; and
displaying, on the display, a first recognition result comprising the first emoji character and the first character from the script of the natural human language in a candidate display area of the handwriting input interface.

9. The non-transitory computer-readable medium of claim 8, the one or more programs further including instructions for:
based on the handwriting recognition model, recognizing at least a first semantic unit from the handwriting input, wherein the first semantic unit comprises a respective character, word or phrase that is capable of conveying a respective semantic meaning in a respective human language;
identifying a second emoji character associated with the first semantic unit recognized from the handwriting input; and
displaying, in the candidate display area of the handwriting input interface, a second recognition result comprising at least the second emoji character identified from the first semantic unit.

10. The non-transitory computer-readable medium of claim 9, wherein displaying the second recognition result further comprises:
concurrently displaying, on the display, the second recognition result with a third recognition result comprising at least the first semantic unit.

11. The non-transitory computer-readable medium of claim 8, the one or more programs further including instructions for:
receiving a user input selecting the first recognition result displayed in the candidate display area; and
in response to the user input, entering text of the selected first recognition result in a text input area of the handwriting input interface, wherein the text includes at least the first emoji character and the first character from the script of the natural human language.

12. The non-transitory computer-readable medium of claim 8, wherein the handwriting recognition model has been trained on a multi-script training corpus comprising writing samples corresponding to characters of at least three non-overlapping scripts, and the three non-overlapping scripts includes a set of emoji characters, Chinese characters, and Latin script.

13. The non-transitory computer-readable medium of claim 8, the one or more programs further including instructions for:
identifying a second semantic unit corresponding to the first emoji character recognized from the handwriting input;
displaying, in the candidate display area of the handwriting input interface, a fourth recognition result comprising at least the second semantic unit identified from the first emoji character.

14. The non-transitory computer-readable medium of claim 13, wherein displaying the fourth recognition result further comprises:
concurrently displaying the fourth recognition result with the first recognition result in the candidate display area.

15. An electronic device, comprising:
a display;
a touch-sensitive surface;
one or more processors; and
memory storing one or more programs configured to be executed by the one or more processors, the one or more programs including instructions for:
receiving, via the touch-sensitive surface, a handwriting input from a user, the handwriting input comprising a plurality of handwritten strokes provided in a handwriting input area of a handwriting input interface;
recognizing, based on a handwriting recognition model, a plurality of output characters from the handwriting input, the plurality of output characters including at least a first emoji character and at least a first character from a script of a natural human language; and
displaying, on the display, a first recognition result comprising the first emoji character and the first character from the script of the natural human language in a candidate display area of the handwriting input interface.

16. The electronic device of claim 15, the one or more programs further including instructions for:
based on the handwriting recognition model, recognizing at least a first semantic unit from the handwriting input, wherein the first semantic unit comprises a respective character, word or phrase that is capable of conveying a respective semantic meaning in a respective human language;

identifying a second emoji character associated with the first semantic unit recognized from the handwriting input; and displaying, in the candidate display area of the handwriting input interface, a second recognition result comprising at least the second emoji character identified from the first semantic unit.

17. The electronic device of claim 16, wherein displaying the second recognition result further comprises:

concurrently displaying the second recognition result with a third recognition result comprising at least the first semantic unit.

18. The electronic device of claim 15, the one or more programs further including instructions for:

receiving a user input selecting the first recognition result displayed in the candidate display area; and in response to the user input, entering text of the selected first recognition result in a text input area of the handwriting input interface, wherein the text includes at least the first emoji character and the first character from the script of the natural human language.

19. The electronic device of claim 15, wherein the handwriting recognition model has been trained on a multi-script training corpus comprising writing samples corresponding to characters of at least three non-overlapping scripts, and the three non-overlapping scripts includes a set of emoji characters, Chinese characters, and Latin script.

20. The electronic device of claim 15, the one or more programs further including instructions for:

identifying a second semantic unit corresponding to the first emoji character recognized from the handwriting input;

displaying, in the candidate display area of the handwriting input interface, a fourth recognition result comprising at least the second semantic unit identified from the first emoji character.

21. The electronic device of claim 20, wherein displaying the fourth recognition result further comprises:

concurrently displaying the fourth recognition result with the first recognition result in the candidate display area.

* * * * *